United States Patent [19]
Wootten

[11] Patent Number: 5,964,985
[45] Date of Patent: Oct. 12, 1999

[54] METHOD AND APPARATUS FOR CONVERTING COAL TO LIQUID HYDROCARBONS

[76] Inventor: William A. Wootten, P.O. Box 62466, Boulder City, Nev. 89006

[21] Appl. No.: 08/863,030

[22] Filed: May 23, 1997

Related U.S. Application Data

[63] Continuation-in-part of application No. 08/653,967, May 28, 1996, Pat. No. 5,902,524, which is a continuation of application No. 08/190,754, Feb. 2, 1994, abandoned
[60] Provisional application No. 60/019,153, Jun. 4, 1996.

[51] Int. Cl.$^6$ .............................. C10B 3/02; C10G 1/00
[52] U.S. Cl. .................................. 201/40; 201/6; 201/8; 201/14; 201/25; 208/400; 208/427; 585/241
[58] Field of Search ................................ 201/5, 6, 8, 14, 201/25, 40; 208/400, 427, 402; 585/241

[56] References Cited

U.S. PATENT DOCUMENTS

| | | | |
|---|---|---|---|
| 3,008,187 | 11/1961 | Slade | 264/209.2 |
| 3,279,501 | 10/1966 | Donald | 264/209.2 |
| 4,031,123 | 6/1977 | Espino et al. | 260/449.5 |
| 4,065,483 | 12/1977 | Pinto | 260/449.5 |
| 4,072,625 | 2/1978 | Pinto | 252/373 |
| 4,087,449 | 5/1978 | Marschner et al. | 260/449.5 |
| 4,107,189 | 8/1978 | van der Veen et al. | 260/404 |
| 4,119,656 | 10/1978 | Poutsma et al. | 260/449 R |
| 4,181,630 | 1/1980 | Baglin et al. | 252/476 |
| 4,181,675 | 1/1980 | Makin et al. | 260/449.5 |
| 4,203,915 | 5/1980 | Supp et al. | 260/449.5 |
| 4,206,713 | 6/1980 | Ryason | 110/347 |
| 4,219,412 | 8/1980 | Hassall | 209/399 |
| 4,235,800 | 11/1980 | Pinto | 260/449.5 |
| 4,238,403 | 12/1980 | Pinto | 260/449.5 |
| 4,266,798 | 5/1981 | Smith | 280/481 |
| 4,271,086 | 6/1981 | Supp et al. | 518/704 |
| 4,798,696 | 1/1989 | Bofn Per | 264/209.2 |
| 4,938,908 | 7/1990 | Shiraki et al. | 264/209.2 |
| 5,011,625 | 4/1991 | Le Blanc | 252/376 |
| 5,614,156 | 3/1997 | Wang | 422/174 |
| 5,780,696 | 7/1998 | Bauer | 585/241 |

OTHER PUBLICATIONS

Article by Reuel Shimmer in Chemical Engineering Science, vol. 43, No. 8, pp. 2303–2318, 1988 entitled "Thermodynamic Analysis of Chemical Process and Reactor Design".

*Primary Examiner*—Bekir L. Yildirim
*Attorney, Agent, or Firm*—Pollock, Vande Sande & Amernick, R.L.L.P.

[57] ABSTRACT

A method of forming liquid hydrocarbons from solid coal. The coal is pulverized to provide a particulate coal feed, which is then extruded to provide a hollow tube of compressed coal supported inside of a support tube. A clay feed is extruded to provide a hollow tube of compressed clay supported inside of the coal tube and a combustible fuel is burned inside of the clay tube. The temperature of combustion is sufficient to fire the extruded clay and pyrolyze the extruded coal to produce hydrocarbon gases and coal char. The support tube has holes for releasing the hydrocarbon gases, which contain suspended particles formed during combustion. The suspended particles are removed from the hydrocarbon gases to provide clean gases, which are passed through an ionizing chamber to ionize at least a portion thereof. The ionized gases are then passed through a magnetic field to separate them from each other according to their molecular weight. Selected portions of at least some of the separated gases are mixed, and the mixed gases are cooled to provide at least one liquid hydrocarbon product of predetermined composition.

10 Claims, 40 Drawing Sheets

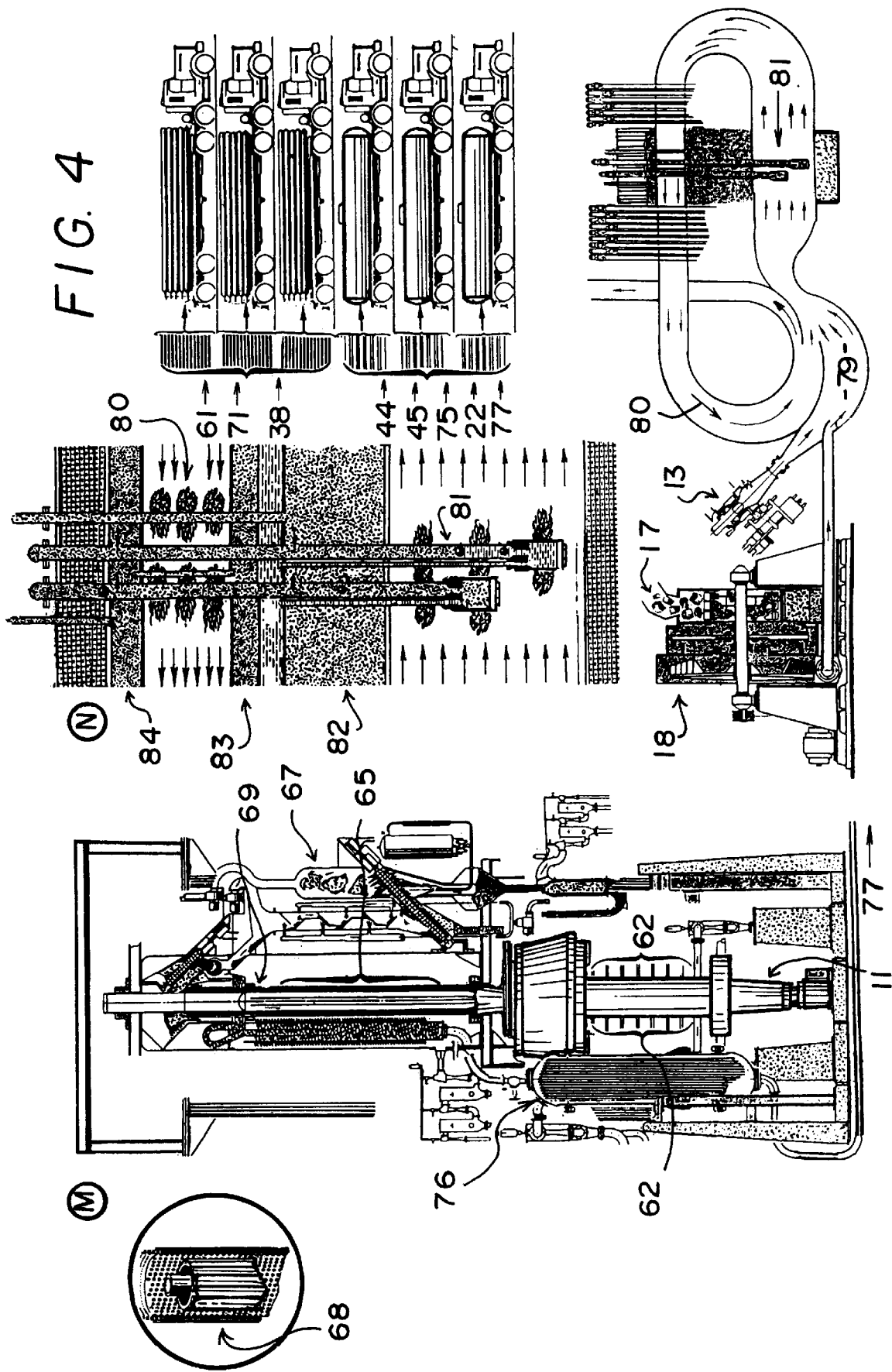

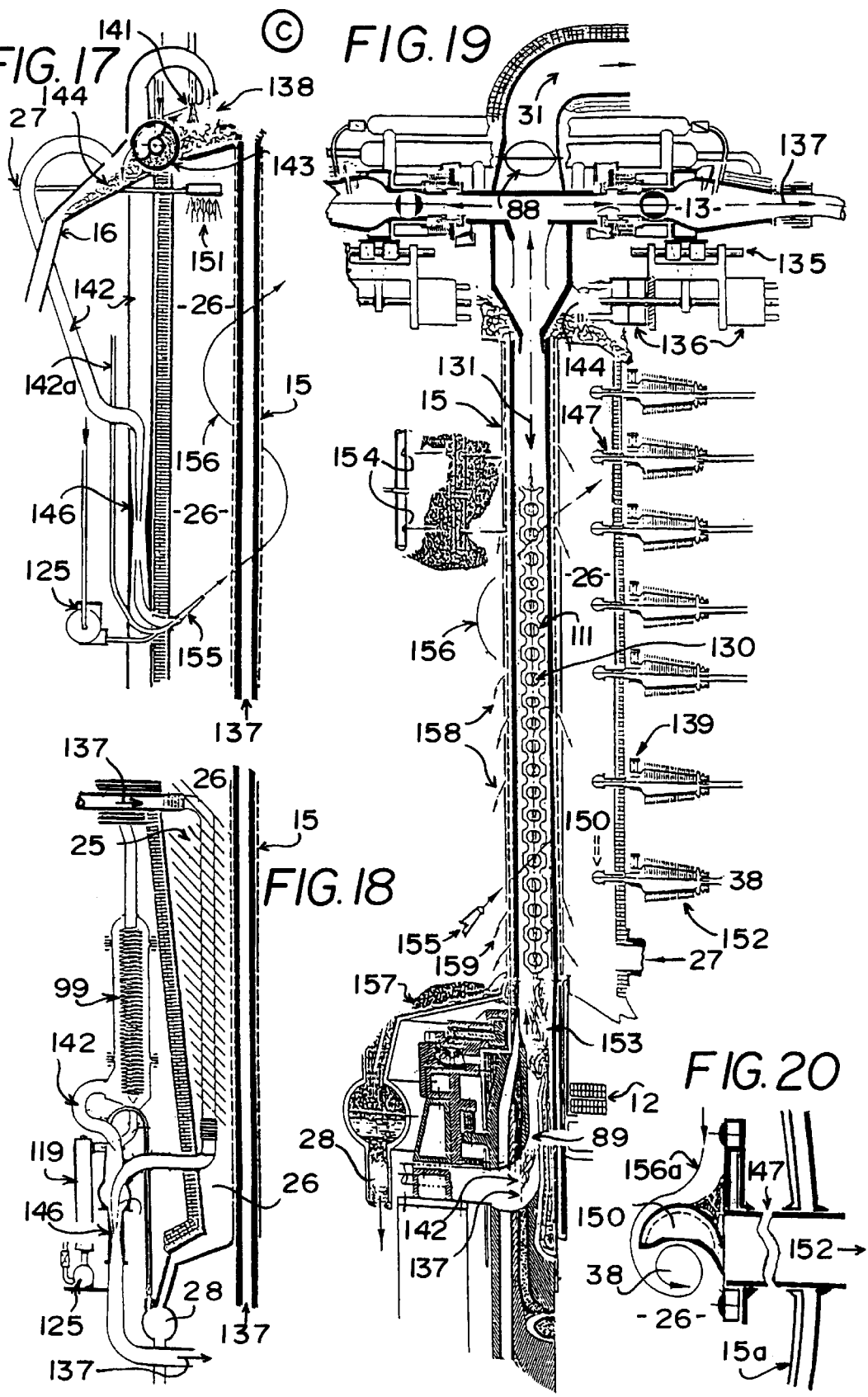

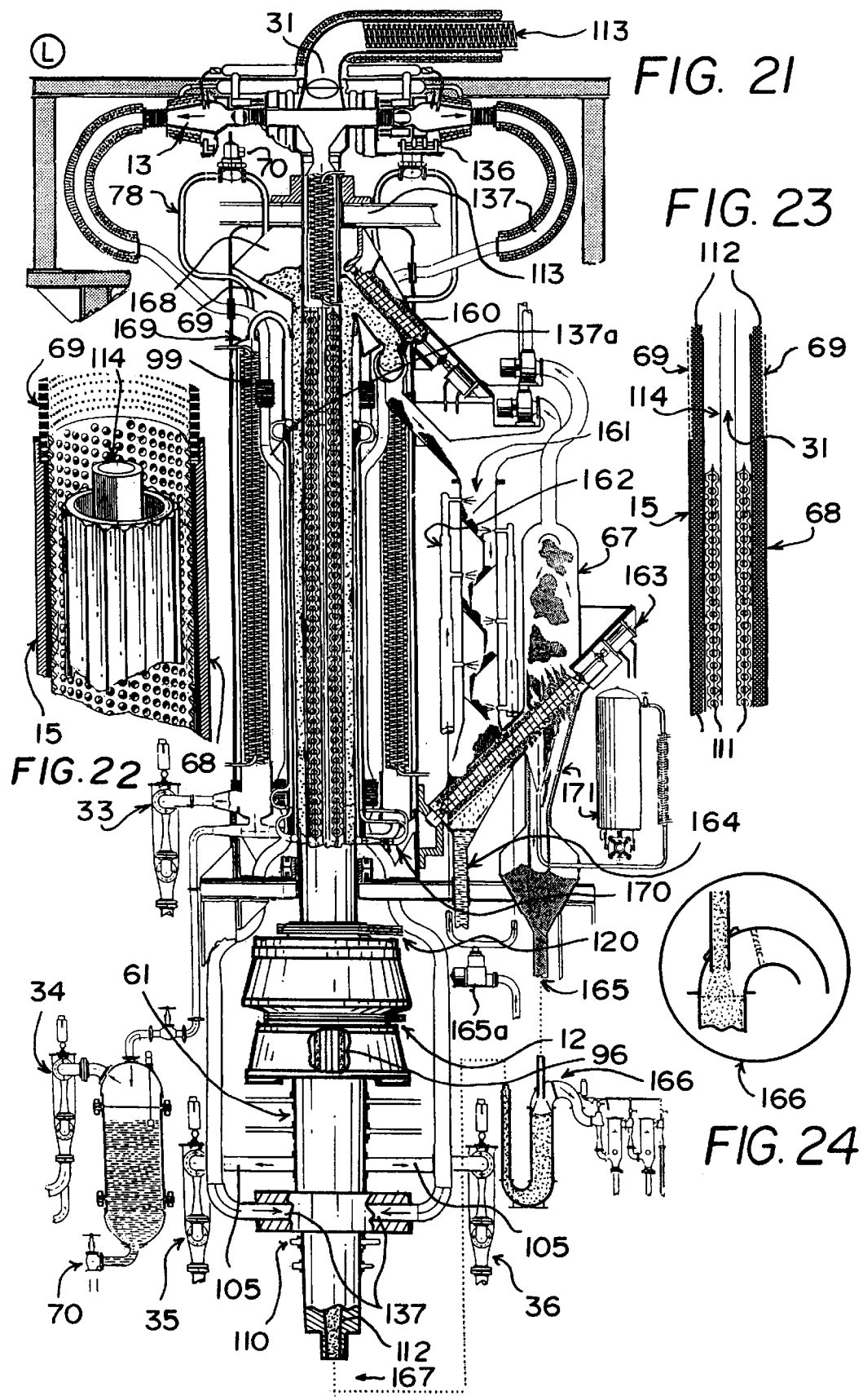

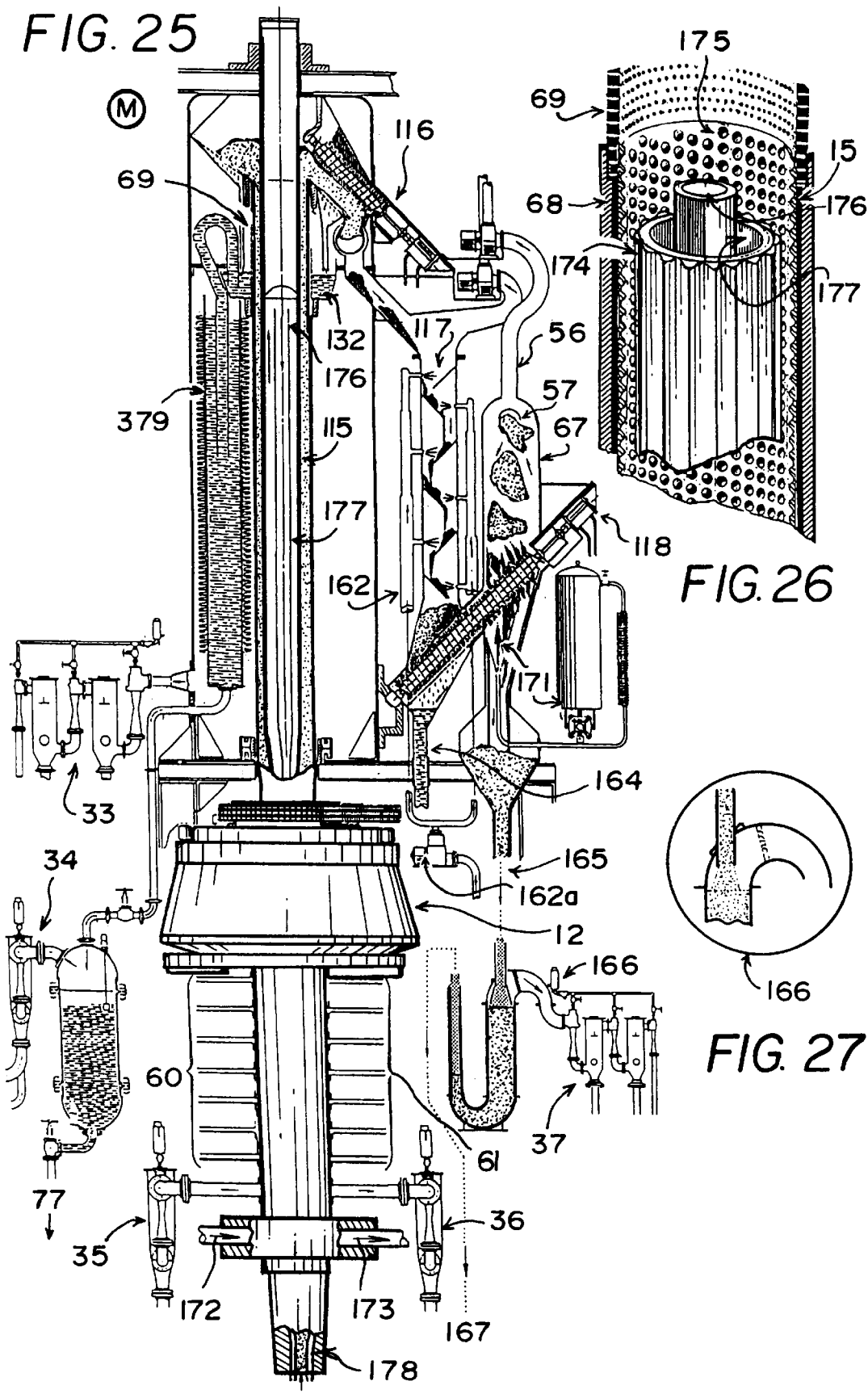
FIG. 25
FIG. 26
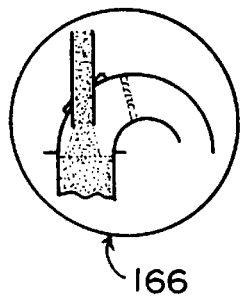
FIG. 27

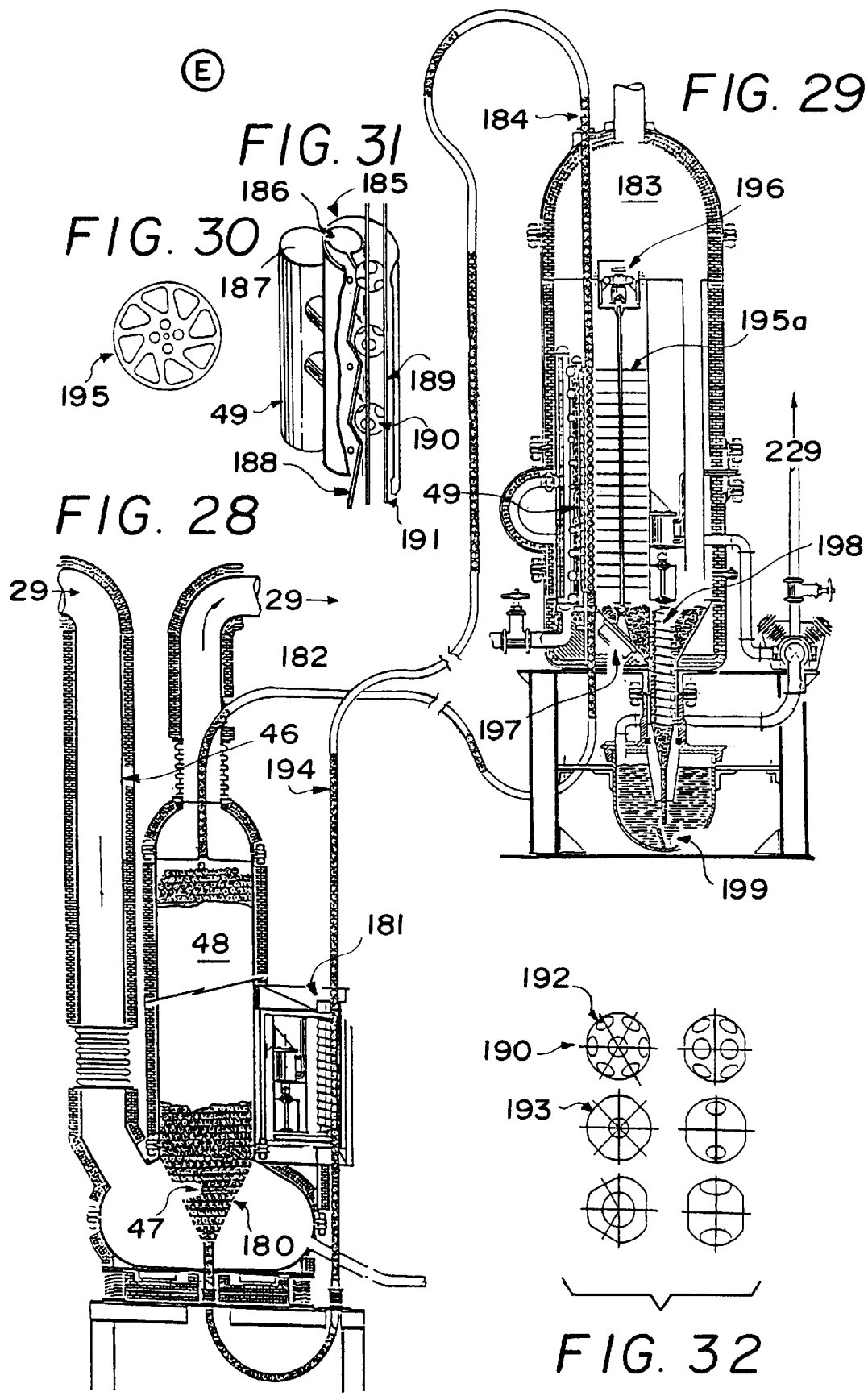

FIG. 33
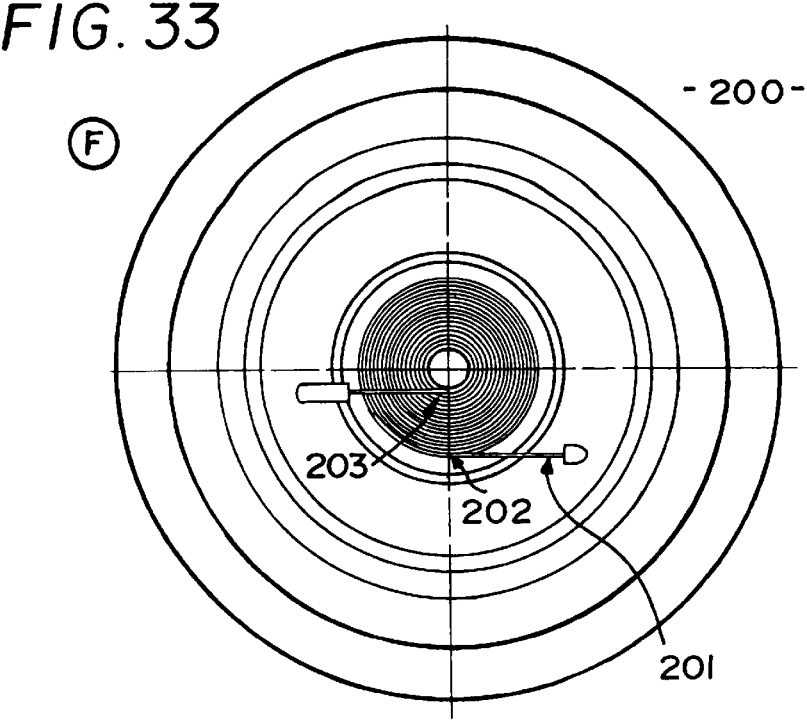
FIG. 35
FIG. 34
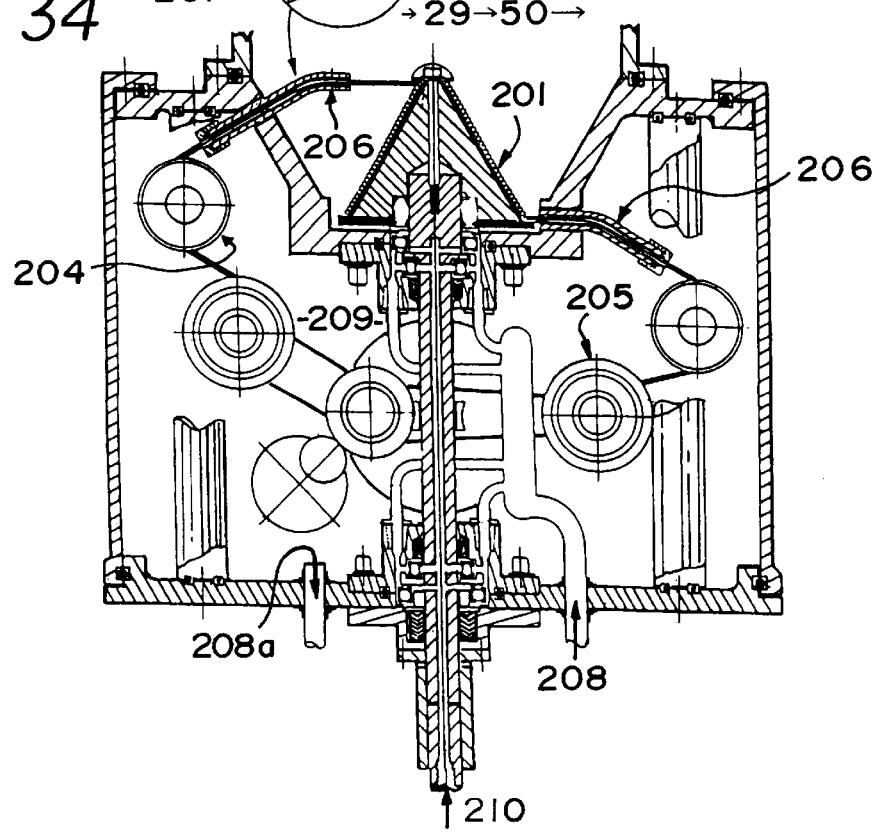

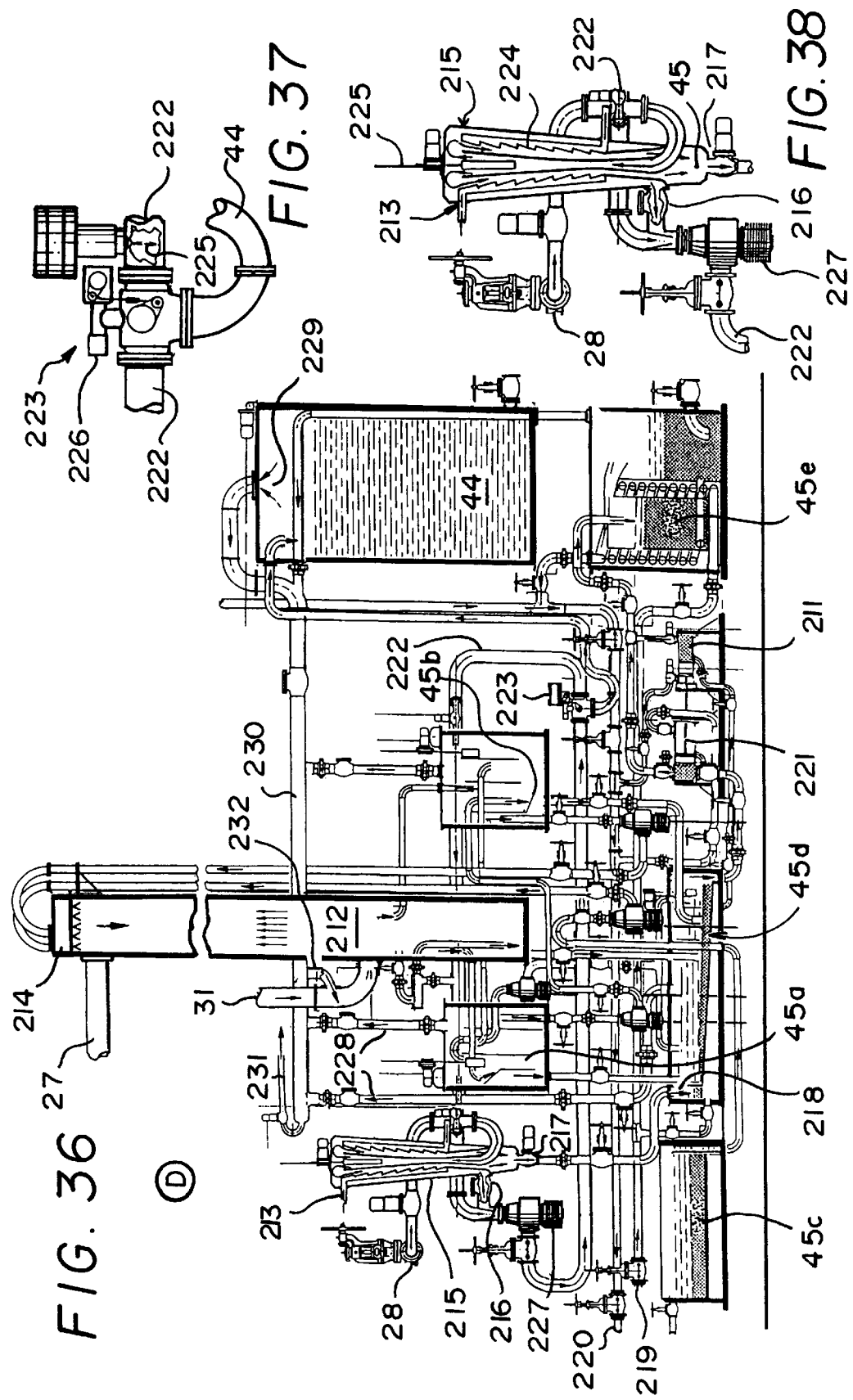

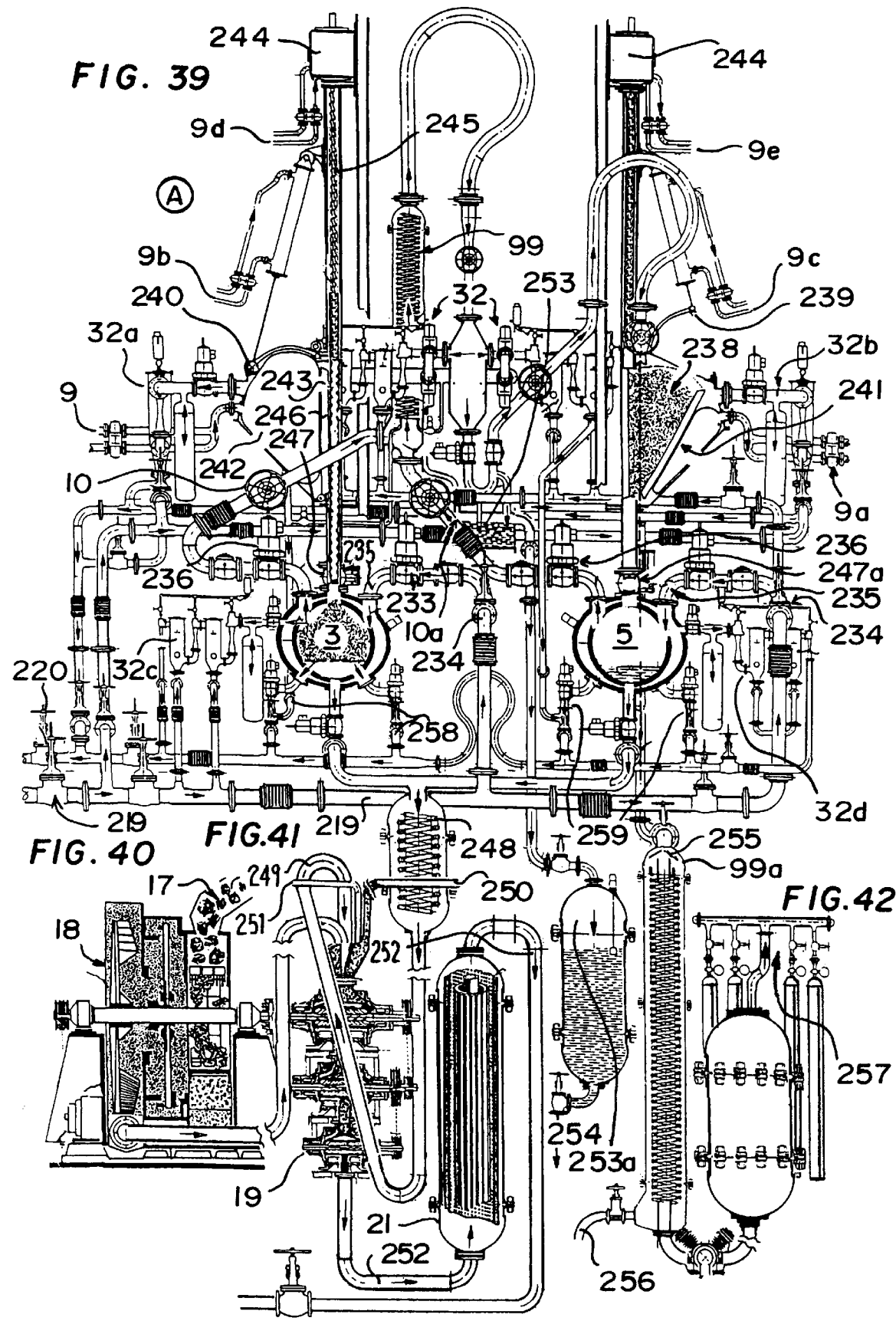

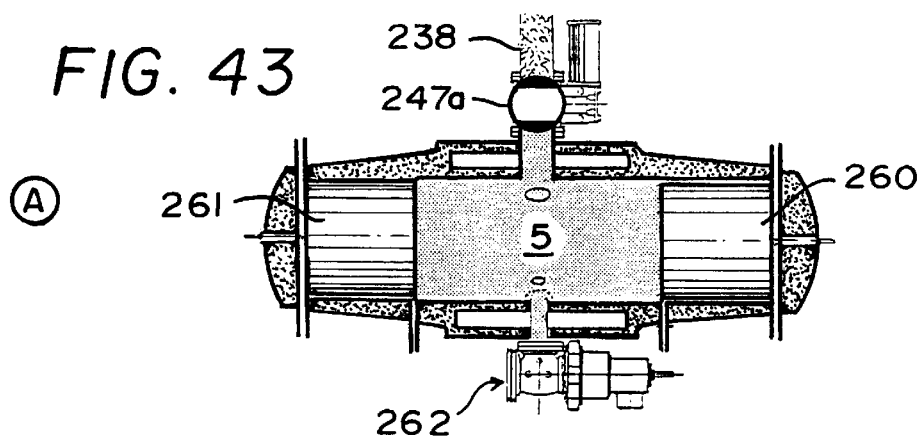
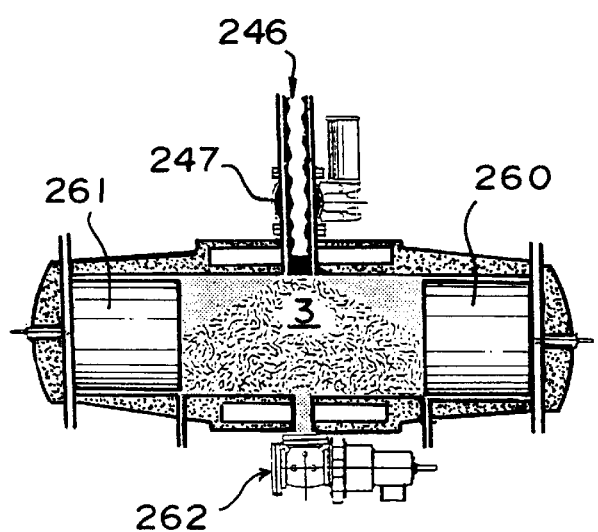
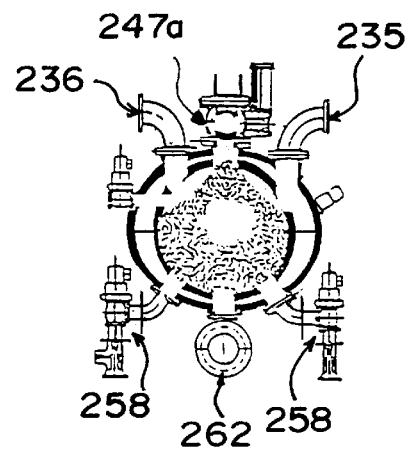
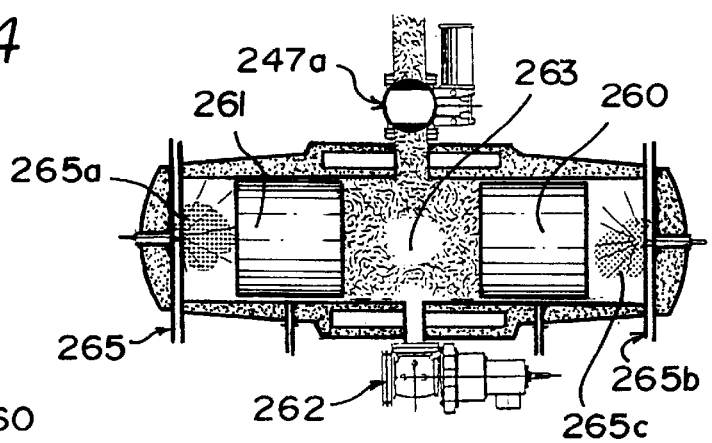
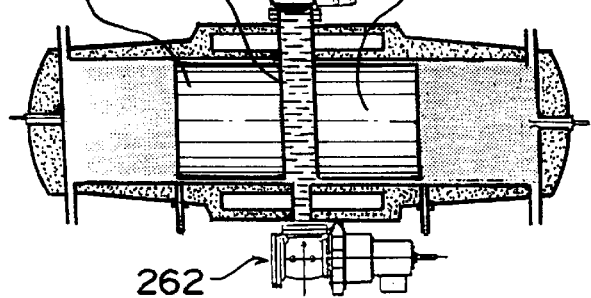

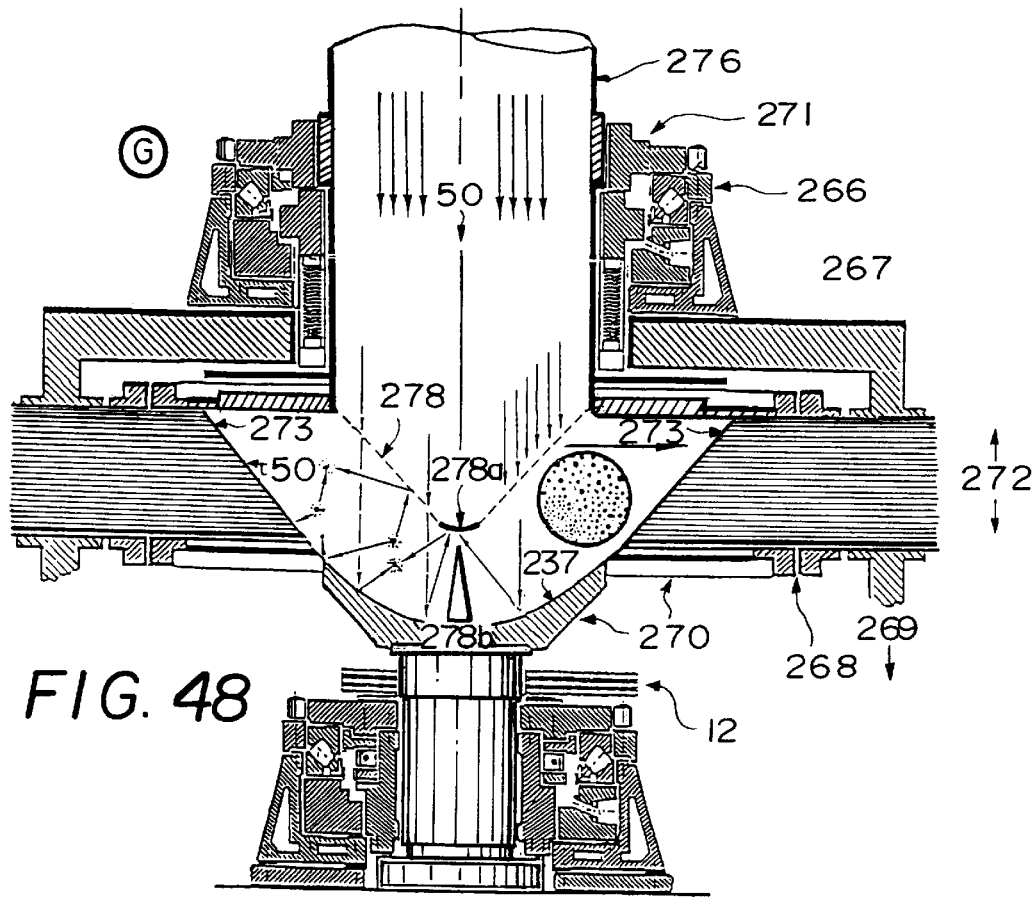
FIG. 48
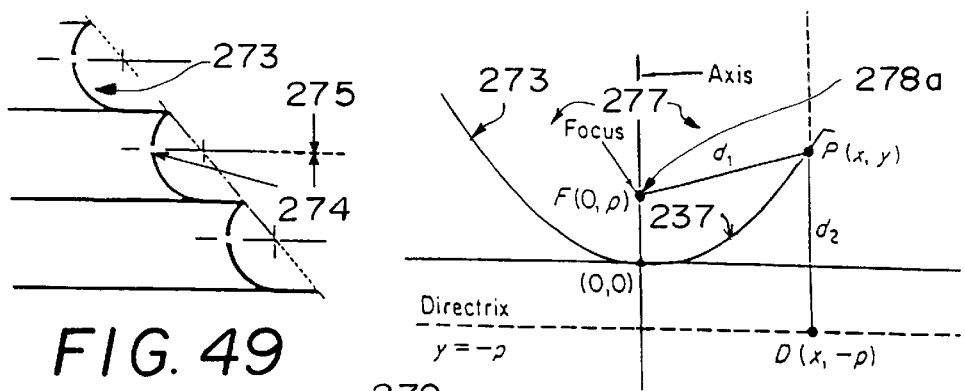
FIG. 49
FIG. 50
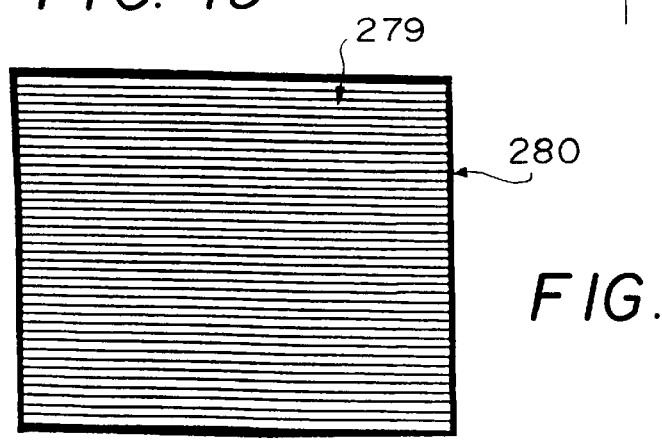
FIG. 51

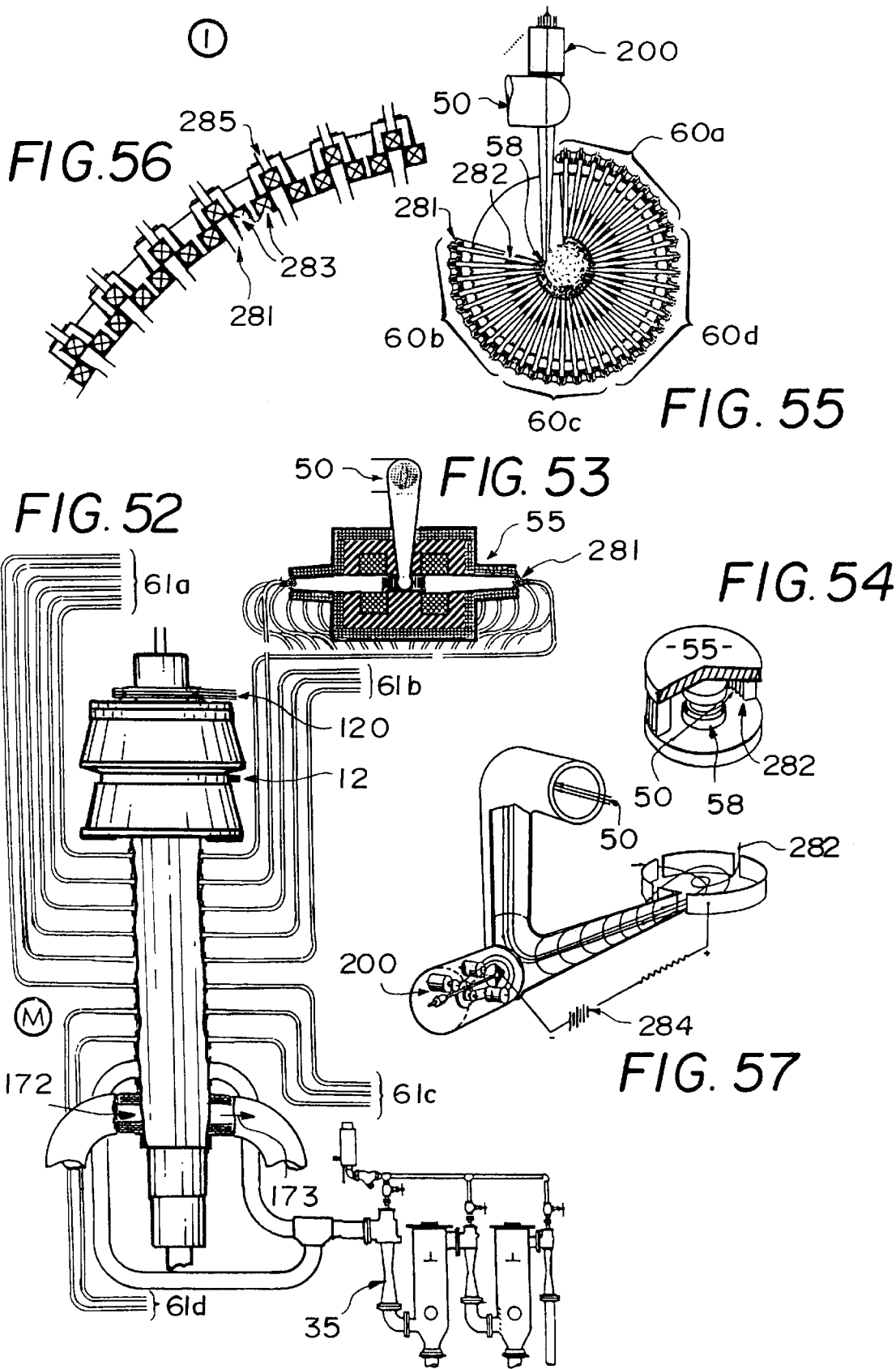

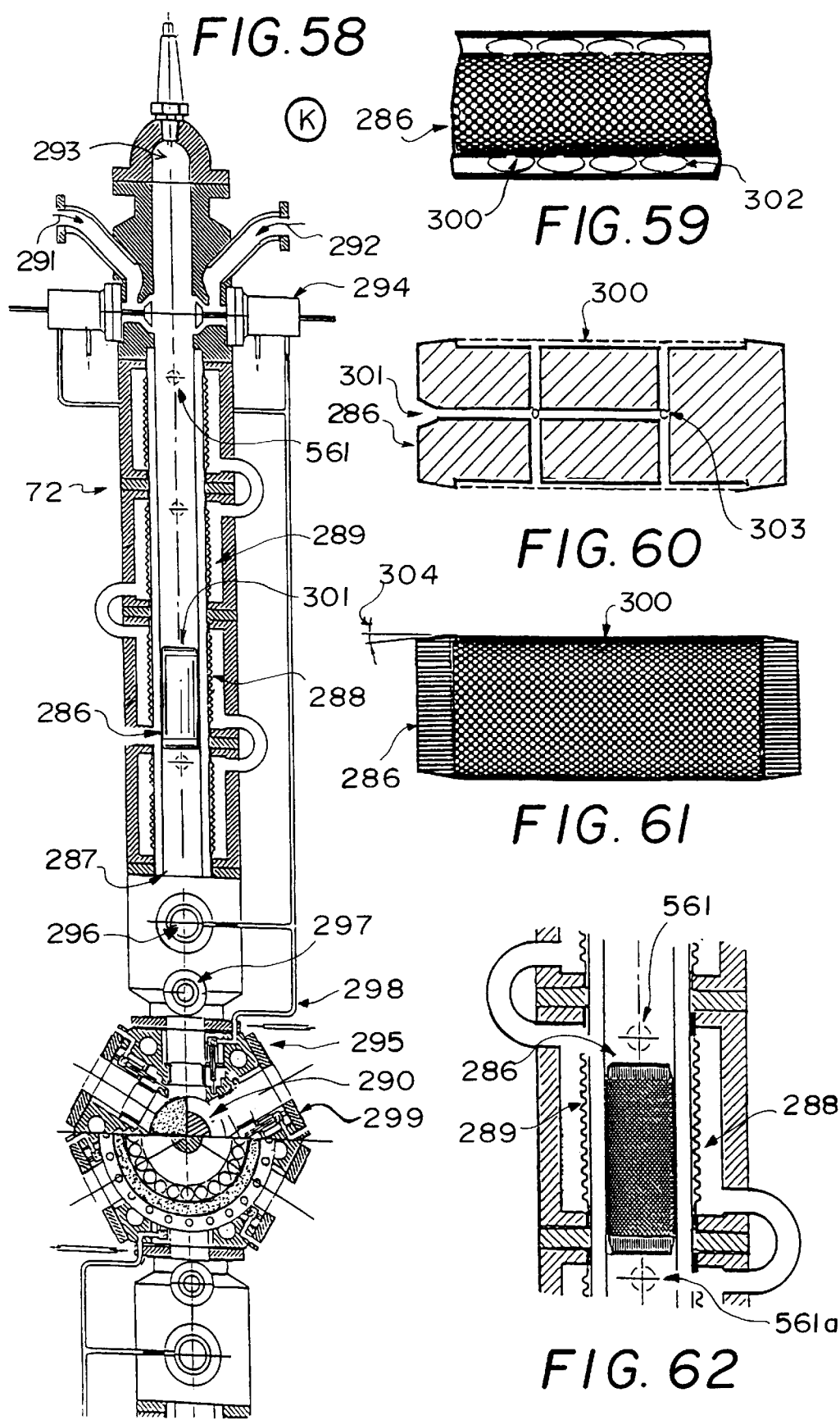

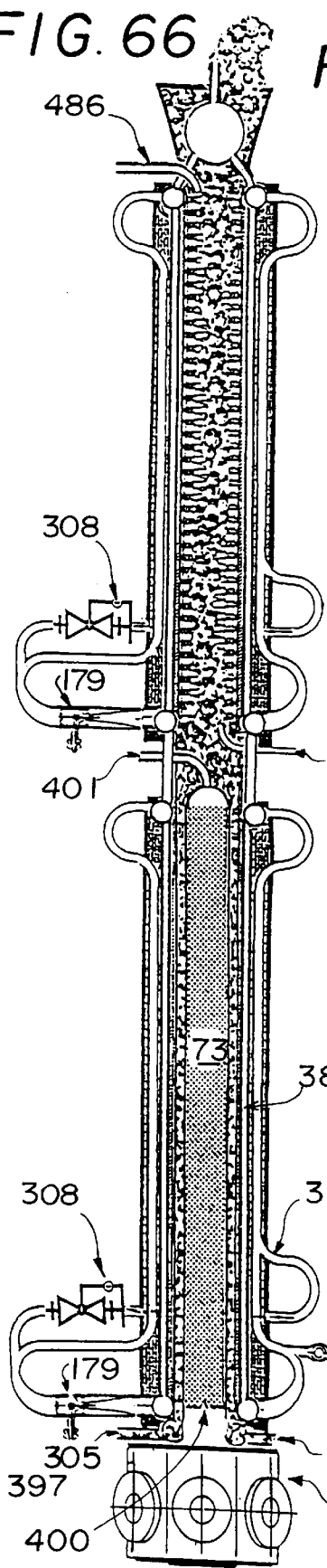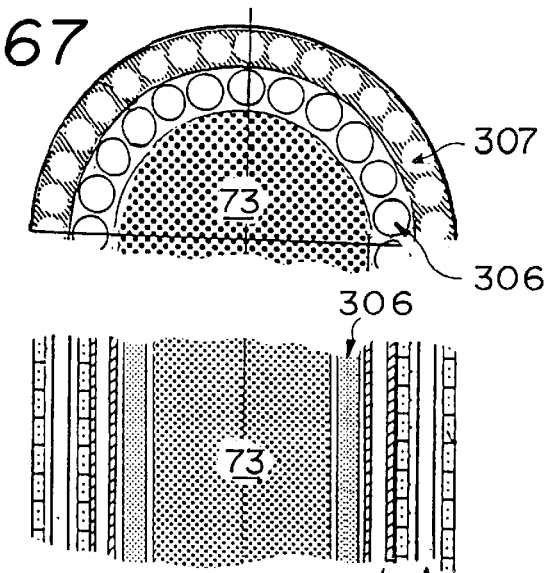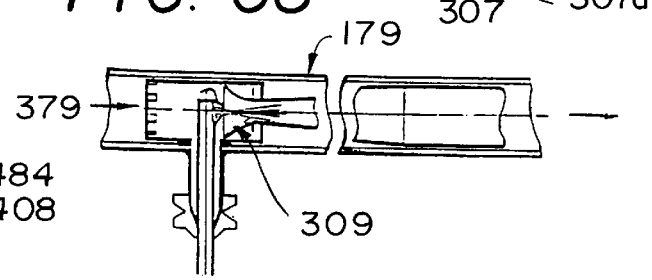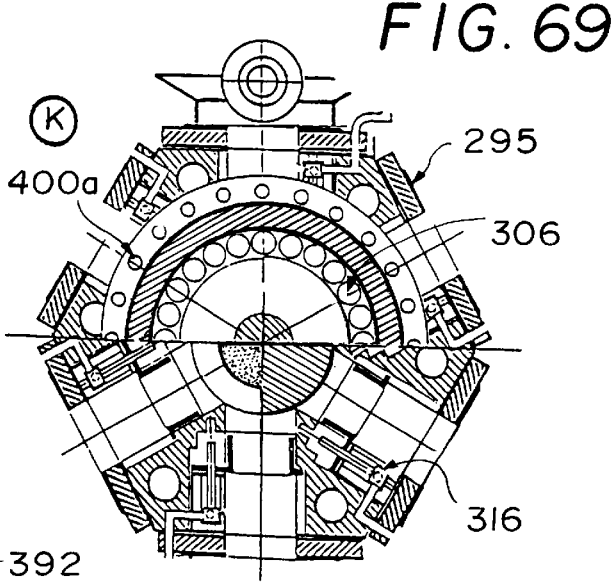

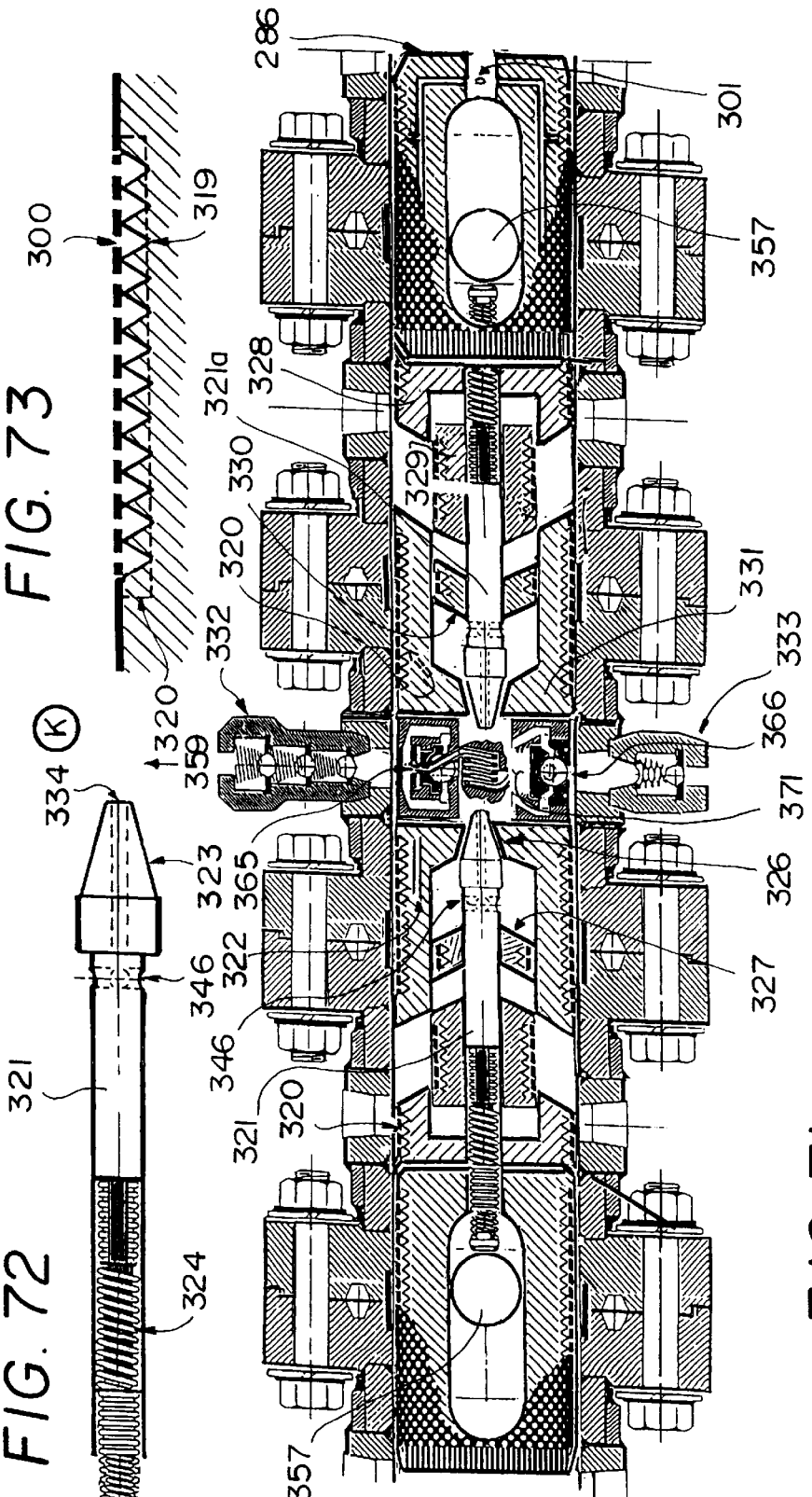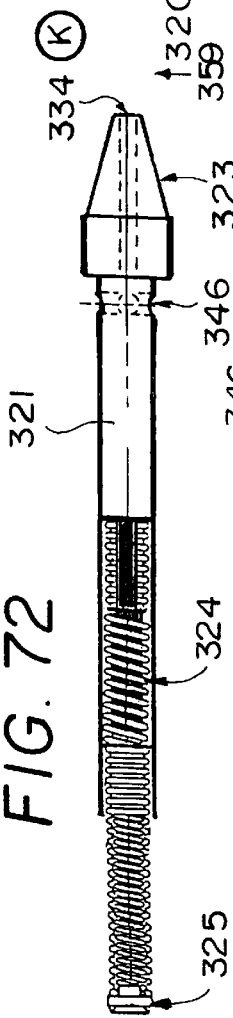

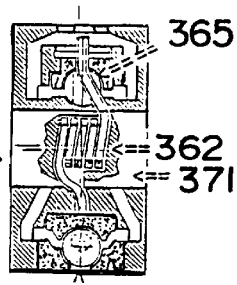
FIG. 76
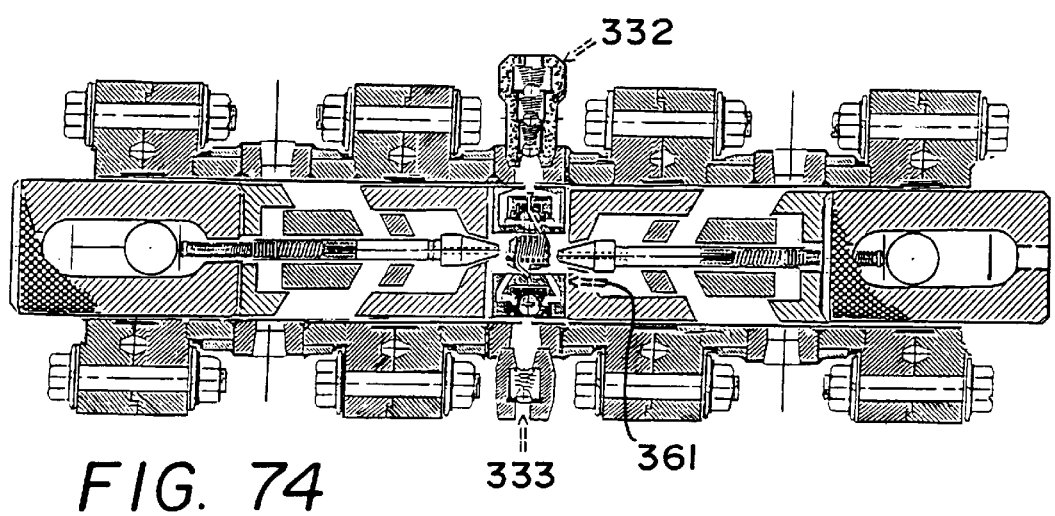
FIG. 74
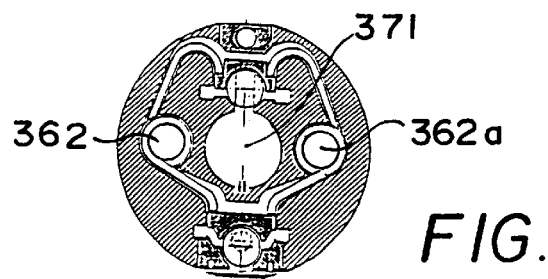
FIG. 77
FIG. 75
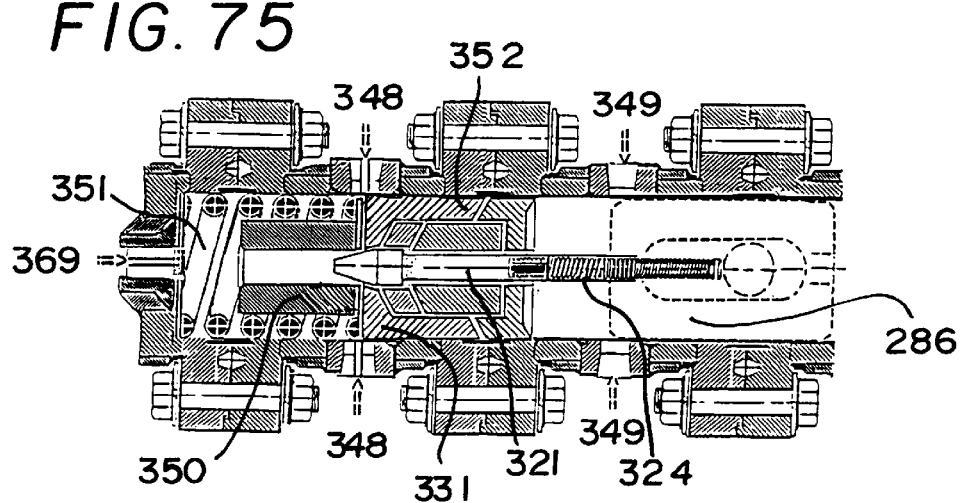

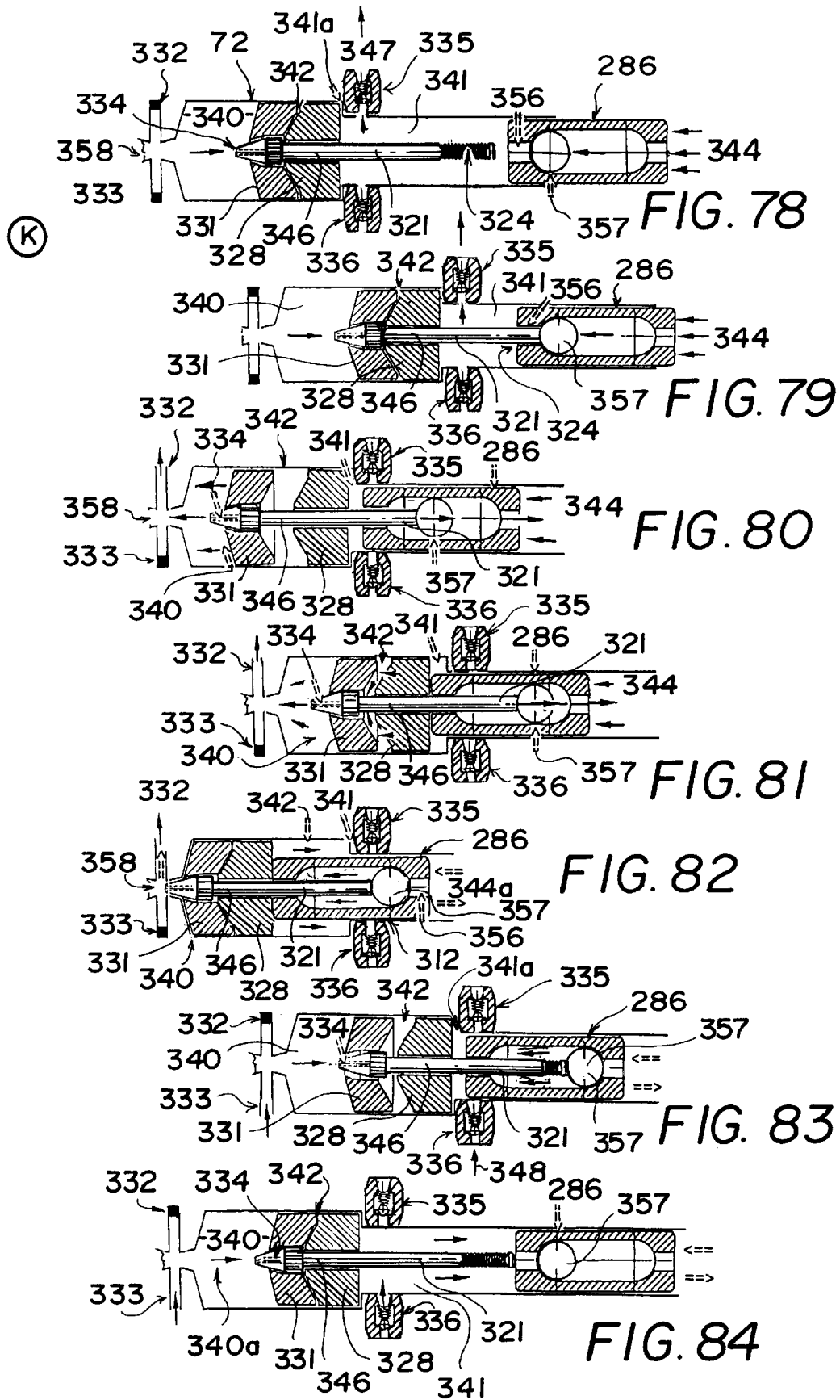

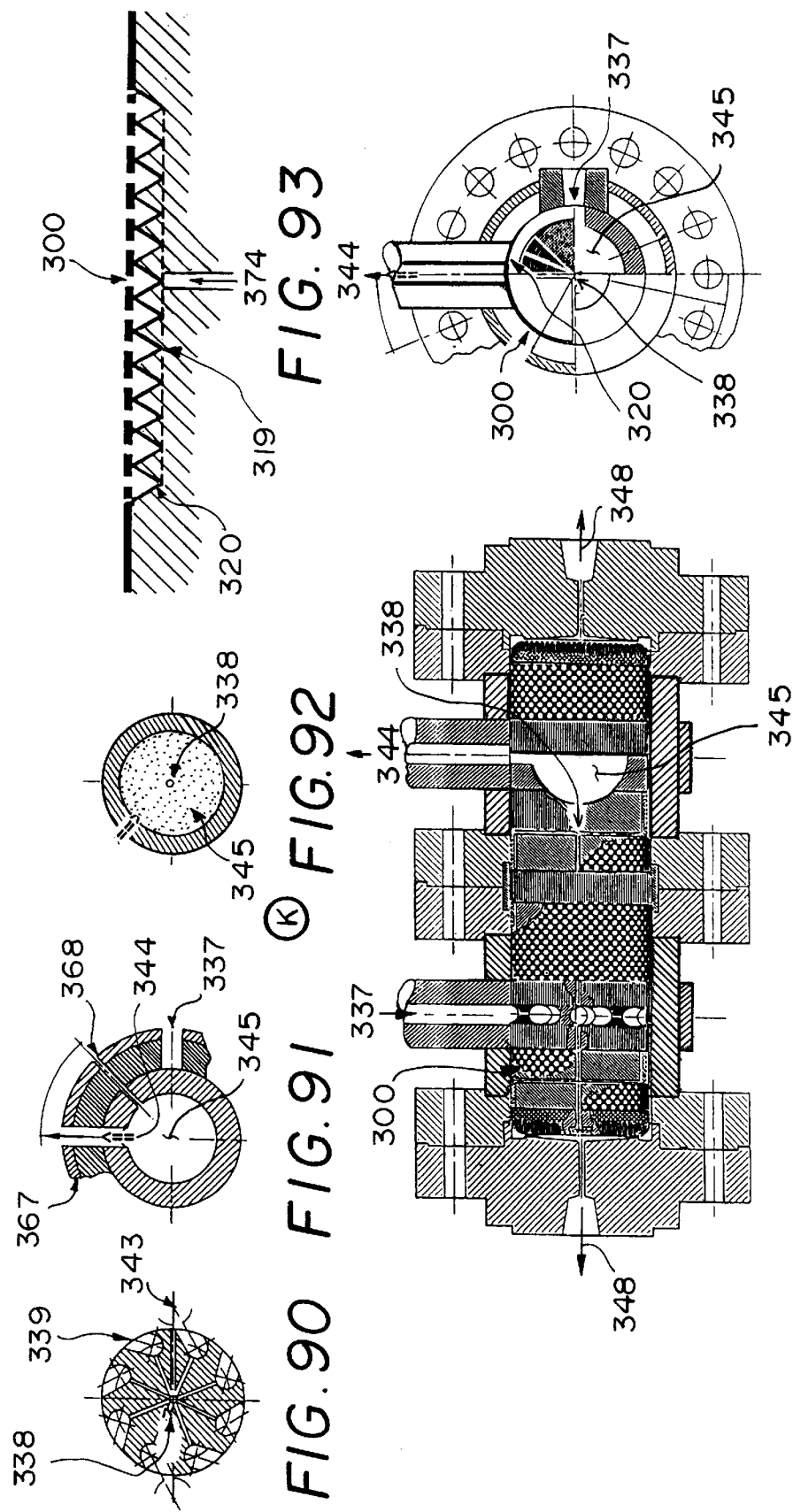

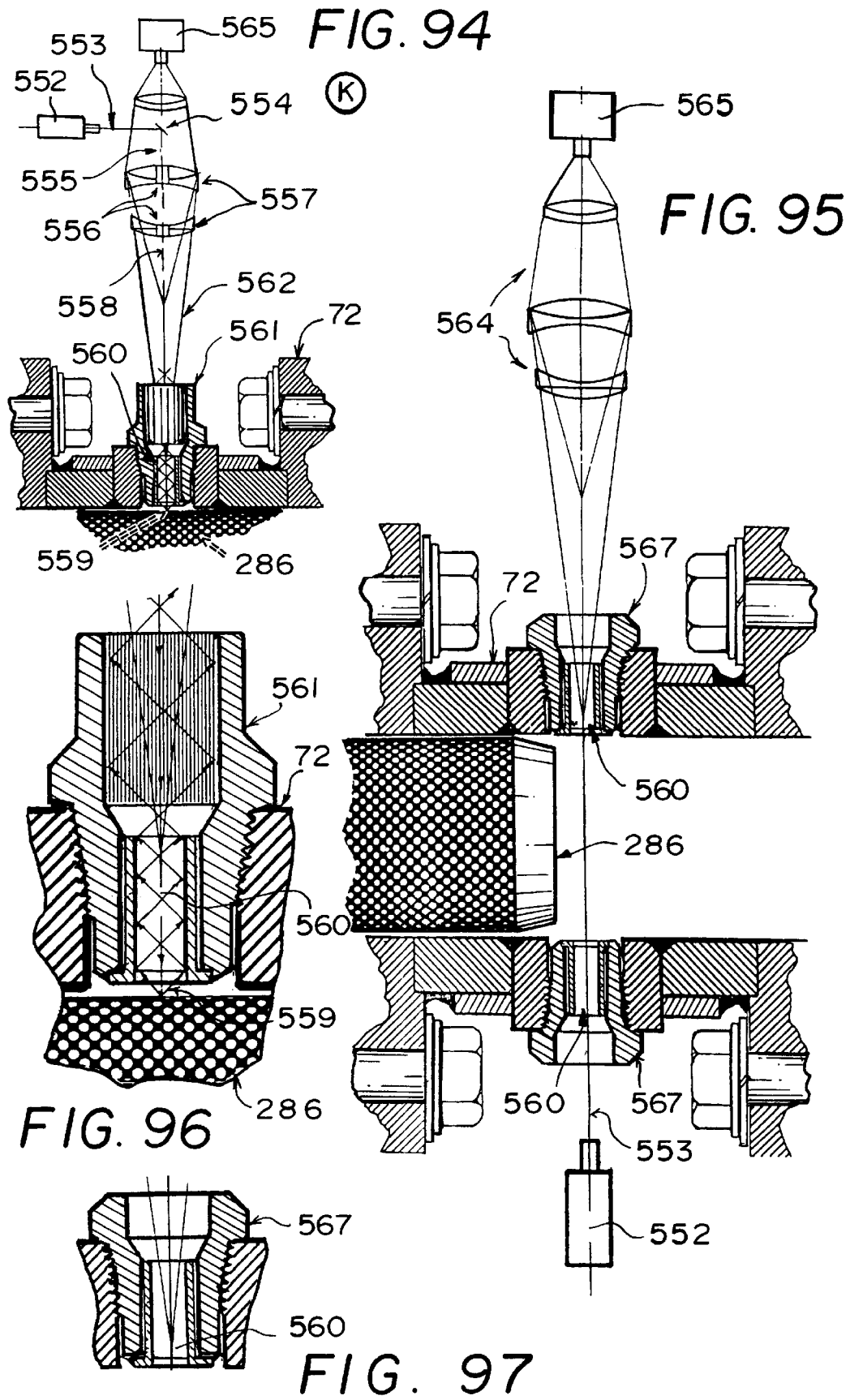

METHOD AND APPARATUS FOR CONVERTING COAL TO LIQUID HYDROCARBONS

RELATED APPLICATIONS

This application is a Continuation-In-Part of U.S. application Ser. No. 08/653,967 filed May 28, 1996, now U.S. Pat. No. 5,902,524, which was a Continuation of U.S. application Ser. No. 08/190,754 filed Feb. 2, 1994, now abandoned. This application also claims the benefit under Title 35, U.S. Code § 119(e) of U.S. provisional application No. 60/019,153 filed Jun. 4, 1996.

PREFACE

The world is awash in Waste that is accumulating at an alarming rate in every urban community world-wide. Also the planet is girdled with layers of low grade coal that find little use and when it is used normally as fuel it creates havoc with the atmosphere.

This work was started by the Inventor in an effort to determine if this unwanted waste and imperfect ore might not somehow compliment one another if they were combined to produce one or more products. Both comprise Hydrocarbons in various degrees of development so it seemed a potential opportunity to put them together if an process and the associated apparatus were specifically designed to overcome the energy problems and the chemical difficulties that are involved. As this problem was defined it quickly became apparent that a whole family of process would be involved with at least two dozen supporting apparatus forms.

Coke is the product usually associated with the fire reduction of coal.

The existing processes for the production of coke from coal and the varied systems used for disposal of waste plastics and paper products are totally unsatisfactory ecologically and generally non-productive with respect to the gases driven off of these processes.

Coke production for steel manufacturing as practiced now involves huge machines and ovens of great length and complexity that are grossly inefficient in heat consumption and atmospheric contamination. Volumes of toxic gases escape and such ovens are being banned by regulatory agencies.

Coke is preferred by some steel makers over the use of electric ovens, but the blast furnaces have been largely condemned.

Consideration turned to the total reduction of a low grade coal to carbon with the intent to extract every constituent possible from its makeup. With this done could the resulting soft char carbon be used as a stand alone product or could saturated hydrocarbons be recovered from waste plastic to enhance this a liquefied coal. This became the direction of development of this Invention.

Everything indicated a improved mechanical approach to many of the procedures presently used would save energy and reduce equipment size, particularly if a continuous process were devised that had features permitting constructive adjustment of chemical throughput as the product came off the end of the line. In the batch firing associated with coking this has been an impossibility.

Refining processes and their associated chemistry involve such complex chemical reactions and installations in the reduction of hydrocarbons to usable products that those of us who are not chemists stand in awe of all that has been accomplished. Indeed it seems presumptuous to suggest a mechanical approach to reaction chemistry. However, it is the belief of the Inventor that the use of this invention rather than the application of great amounts of heat as applied to large vessels supplied from external steam sources for feed to a reactor can perform these same functions with less free-energy loss and cost.

BACKGROUND OF THE INVENTION

Emphasis is in this work is on center-fire heat application inside an extruded form of feedstock to pyrolize and gasifty for the generation of a super-heated cloud mass, followed by dry cleaning means, molecular mass division, the use of high pressure compacting shock steam reforming, cryogenic reconstitution for liquefication, overall apparatus size reduction, the close coupling of gas/steam handling to minimize piping and facilitate the use and reuse of steam circulation passed through reaction catalysts to maximize thermal efficiency.

In these fire reduction processes gases are collected in a chamber as a gas cloud mass as they are extracted from the feedstock center-fired extrusion of this invention. Based on the reluctance of gases to mix together, the molecular content is separated in various ways to provide individual gases that are then subjected to reaction means, sub-sonic shock and finally combined with other products of the process or combined with cryogenic means to form salable chemical compounds.

In the Gas Collection Chamber causes layers or stratas of gas molecules to form as they are attracted or repelled by barriers of varied temperature. There are collisions or repulsion as large and small molecules approach one another. As gas viscosity increases the mean free paths shorten. An analogy to a fluid bed of particles might be considered in which their vibration creates a separation of molecules by size.

It would seem logical that the sweep of the rotating center member or the Absorber Receiver Tube at the center of the Gas Collection Chamber will move the gas in a circular path turning upon itself in helical form augmented by the high temperature steam jets directed across the surface of the absorber retention tube. As the gas molecules are swept around the annulus space of this chamber, the centrifugal force in this motion will tend to move the heavier and larger molecules to the outside wall. This wall has a cooler surface than that of the Absorber Receiver Tube's so based on thermal diffusion theory the heavier molecules will be attracted to this outside wall.

The lighter molecules attract to the hot center area and gradually rise to the top of the chamber. Holed annular collars or flanges extend a few inches inward from the outer wall where they are welded at midpoints between each level of an exhaust port to help create a boundary for strata formation of varied molecular size selection, ranging from the light and small at the top to the heaviest at the bottom. The hole circle in the horizontal collar ringing the inside of the Gas Collection Chamber wall are placed dose to the wall to permit the drainage of liquors as they accumulate and run down the wall to collect in downcomers and mains.

Concave cups are at the ends of tube extensions on exhaust valves opening to the Raw Gas Receivers. The convex side of the cups face upstream to the sweep of passing gases. These create eddy currents and a gas dwell at the tube opening. As the valve is opened at the Raw Gas Receiver gas moves through the tube into this cooler expansion chamber and moves beyond to the Hollow Ball Cleaning means.

Emphasis in the III Process is directed to the heating of the feedstock to the highest temperature possible without gas destruction so every possible constituent is reduced to a carbon or a gas.

The gas is exhausted to a cleaning function to remove particulate. It can be then be subjected to Thermal Diffusion separation as in Process I and II, but this seems redundant here in the Process III procedure. Here the traveling gas mass is ionized and driven into a Parabola Collimation Unit to reverse its direction and cause horizontal spin out of molecular weights in a centrifugal force field to create horizontal bands of gas that is capture for delivery into the magnetic field of the Spectro-Cyclotron in a partitioned wave-guide-like tube of horizontal rectangular slots. The magnetic field apparatus is the last step to a possible division into a possible 38 molecular mass variations.

Finally after all the reduction, rough gas separation and cleaning the IV Process does the work of assembling these many gas fractions into a marketable product.

In the apparatus the divided gases are recombined here using a multi-port extrusion nozzle that pushes an inert mass of media or catalyst that functions as a carrier for the newly combined gas. The media and hot gas content form a rising column that churns in the an annulus space between a Top Perforated Absorber Receiver Tube and a Static Internal Temperature Control Tube that is a conduit for high heats or an intense cold liquid so the gas mix in a catalyst media to reacts or reform in an inert media under Cryogenic conditions to form liquid chemical compounds as mixed with this means.

Before the gas mix has reached the top level of perforation location in this absorption tube it gas has reacted with heat, or becomes a liquid if cold is applied, and either is collected as it flows from the perforations into an evacuated Gas Collection Chamber which is physically smaller but somewhat like the Gas Collection Chambers of the Processes I, II and III particularly with respect to a hot reaction process, but with a greater difference in the cold application.

Control of metering in a form of titration to delivery gases and chemicals to the nozzle of the extruder is the critical factor in the success of this IV Processor. The controls for heat and cold, as well as the rotational speeds, seals and the like are modifications of conventional designs.

An ancillary but critically addition to these procedures is Process V. This a branching procedure for treatment of a gases derived from this process, as stack gas as produced in a power plant, or natural gas, or any one of many hydrocarbon products that are compatible with steam reforming. The V Process comprise two or more special free piston elements that are propelled toward one another at high velocity by combustion or steam expansion means causing them to impact against two or more rams that closing into a common center chamber containing a prepressurized gas and steam to cause reforming of these with or without passing the combination through a catalyst tower. The piston positions and movement in the cylinders are controlled by optical means and they move against zero pressure to strike the rams. They travel on gas or steam bubbles exuding from minute holes in their surfaces so no lubricant is required in this virtual weightless friction-free travel employing the mass kinetic energy of the piston as well as the propulsion force of the drive to create a massive force impact and very high pressures in the steam/gases compacted in this way.

A marketable product is created with use of these Process with the Encapsulated Fire Reduction, Fractionating, Mole Mass Division, Disassociation, Sub-Sonic Shock Steam Reformation and the Reconstitution a plurality of gases to form a Liquefied Chemical Compound.

It is graphically apparent that there are dozens of apparatus variations generic to these methods that will be developed by the inventor and others skilled in the art. For example the height of the unit will vary as will the diameter of the absorption receiver tubes in both hot and cold processes, depending upon the character of the feedstock produced. Fractionating points will differ with feedstocks as will adjustments of temperatures, flow rates and pressures as well as electrical voltages and magnetic field gauss levels.

Shape and form will change with further experimentation, particularly in the area of molecular weight and mass division. Temperature ranges will require different heating procedures and fuels. Improvement in circulatory means, valving and controls will create many new apparatus forms as well.

SEARCHES

A search of the patent classes and sub-classes 48/127.1, 127.3 and 127.5 show art generally like that of M. W. Kellogg U.S. Pat. No. 5,011,625 Autothermal Steam Reforming which functionally is based on conventional chemistry and chemical reactions under pressure and heat. There are great numbers of patents in the literature dealing with the treatment of natural gas conversion to methanol and the use of catalyst in this connection. Some of this work has been examined in connection with this application.

The Sub-Sonic Shock Steam Reforming portion of this work that is an essential part of the overall program was carried forward with emphasis on conservation of free energy in effort to use the multiple compression stages of this invention to provide the potential for the creation of a substitute for a seimipermeable membrane as in the following.

A most significant work has had major influence on the Inventor's effort . . . that of Reuel Shimmer, The Department of Chemical Engineering, City College of New York, N.Y. 10031 and specifically a publication in Chemical Engineering Science, Vol. 43, No. 8 pp 2303–2318, 1988 entitled, "Thermodynamic Analysis of Chemical Process and Reactor Design".

In this paper the writer points out that " . . . when the process depletes moles the reactor designer can replenish these with compression of the product" . . . "[proportional] to improvement of thermal efficiency . . . made in energy recovery".

The Inventor feels that these statements point up the potential for an improved compression/gas/compacting method with internal means for effective heat transfer and recovery as suggested here.

The nature of the pulsed force of this invention, in the creation of an "Unstable State Reaction", imparts a low frequency vibratory effect against the catalyst chamber standing above the compressor, causing the beads or particles of the catalyst to vibrate. This makes a "fluid-bed" condition and provides a "stirring" function within the body of catalyst.

Shimmer comments: " . . . a stirred [reactor] tank operated at high conversion will have a higher iso-octane yield than is achievable in any plug flow reactor".

Relative to the fact that the compressor of the invention's design permits the progressive handling of successive compression functions suited to the handling of more than one reaction and catalyst treatment station, there is this: "There are several options that one can use to overcome constraints resulting from catalyst properties.

1) Search for catalyst with different properties.

2) Use two or multiple step non-isothermal reactors, which are often accompanied by an increase in number of chemical species involved.

3) Use selective separation processes, i.e., look for the equivalent of a semipermeable membrane.

... how to imitate a semipermeable membrane ... integrate a separation process into the reactor, [but] ... if for some reason, one cannot run a reactor such that (heat release) is reasonably negative, one must generate free energy by a separation process ... an exception is a process with a large contraction of volume where the compression of the feed creates free energy".

Other patents considered in the application of this method and apparatus to reaction chemistry were:

R. L. Espino and T. S. Pletzke; U.S. Pat. No. 4,031,123, 1977

A. Pinto; U.S. Pat. No. 4,065,483, 1977

F Marchner, et al; U.S. Pat. No. 4,087,449, 1978

P. G. Bonder, et al; U.S. Pat. No. 4,107,189, 1978

M. L. Poutsma, et al; U.S. Pat. No. 4,119,656, 1978

A. Pinto; U.S. Pat. No. 4,235,800, 1980

A. Pinto; U.S. Pat. No. 4,072,625, 1978

A. Pinto; U.S. Pat. No. 4,238,403, 1980

E. G. Baglin, et al; U.S. Pat. No. 4,181,630, 1980

E. C. Makin, et al; U.S. Pat. No. 4,181,675, 1980

E. Supp, et al; U.S. Pat. No. 4,203,915, 1980

E. Supp, et al; U.S. Pat. No. 4,271,086, 1981

K. Konoki, et al; U.S. Pat. No. 4,219,412, 1980

E. B. Bowman; U.S. Pat. No. 4,266,798, 1980

Few of these make references to the use of compressor apparatus for the conduct of the processes described and none propose the use of an extruder to prepare a feedstock for internal heat application with use of a tube in the form of a feedstock.

None that we have found considered a plurality of means for evacuation of air from an extrusion;

or means injection of gases in this evacuated space;

or means for extrusion of a fire resistant lining as a second extrusion in the first feedstock extrusion;

or the introduction of flame and fuels to the inside of an extruded feedstock tube as it is being extruded;

or the progressive use of plurality of ways proposed for the division of gas masses.

or reconstitution of metered volumes of gas put in a cryogenic environment to mix and combine resulting in chemical compounds.

There are hundreds of patents on piston/cylinder configurations as associated with compressors and combustion engines. Hundred also on extruders and nozzles. The compressors are almost all driven by cranking mechanism of one kind or another in the compressors and in engines that perform as prime movers with the transmission of energy from combustion moving pistons connected to cranks and shafts.

None describe a compressor with a free piston moving against zero pressure;

or a piston with special nucleate bubble forming surfaces;

or isolation of the compression gas product in a chamber closed by rams impacted by the pistons;

or high velocity piston action to impart shock to the gas increment;

or a free piston compression apparatus optionally driven by steam or gas combustion.

OUTLINE OF THE SUB-SONIC SHOCK STEAM REFORMING PROCESS

The objective of this method is not to replace the normal reaction chemistry of gas reforming, but to introduce a "tool" involving a relatively small and easily maintained "engine-like" apparatus that can compact a gas with great energy efficiency (unlike conventional compressors) and pass this reformed gas to a catalyst procedure.

The apparatus for this purpose is a ported device in which the transfer of gases and steam is accomplished without external piping so the heat generated is conserved within the compression body and the cooling function, using low temperature steam, creates saturated steam within the cylinder walls that convert to superheated steam which is then passed to compression and used in the hydrocarbon reforming function while exhaust steam provides jet-cycle refrigeration.

The pistons and some static cylinder surfaces are fitted with perforated sleeves that provide very small holes in their surfaces. Steam forms because of temperature differences between the piston and cylinder walls steam associated with the piston motion is driven into spaces in the piston's interior through small ports and manifolds that feed these outer diameter perforations uniformly so a minute portion ends in the form of nucleate bubbles between the working surfaces of the cylinder and piston. This holds the pistons in the center of the tolerance space between the cylinder bore and the piston surface.

The piston glides effortlessly on this explosive laminar layer created by wet-gas slip bypass bubbles that flatten and divide to eliminate the normal friction between piston and cylinders. This increases the piston velocity, reduces energy required for the piston's drive, and the clinging nucleate bubbles actually seal the perforation opening and reduce slip bypass.

The apparatus associated with the practice of this invention generates substantial heat that if taken off with conventional cooling procedure would cause a great loss of free-energy. Unlike the normal steel construction as used in such equipment the use of high temperature exotic metals like inconel or titanium permits the conversion of this heat and the control of high temperatures with use of flash steam generation as the cooling agent. This is done with a plurality of so-called attemperation water mist injection devices that employ high pressure low temperature steam injected through a venturi to drive this vapor into all the spaces that surround the heat generating elements of the process. This attemperation means maintains a controlled cylinder temperature. The steam temperature rises to saturation levels that and can go as high as super-heated steam while still held within the temperature tolerance of the metals employed in the construction.

In the case of natural gas combustion driving the pistons, the hot exhaust is carried through the reactors heat exchanger tubes surrounding the catalyst it is maintained at 1,500 degrees F. transferred to the reaction which, with exothermic conditions, creates even more heat passed out to gas preheaters, etc. The walls of the reactor vessels are holed vertically and cool this shell with the same attemperation used on the combustion and compression heat control. Finally the steam from these many sources is accumulated and conducted in a circulatory manner to a steam compactor that is another free piston apparatus that compresses steam for use with the feedstock prior to the reactors feed. This steam is injected into an expansion tower where the pressure rises as heat in steam heat exchangers with injected with additional mist to maintain water to the steam system. This procedure provides the ability to create a wide range of steam temperatures and pressures that may be needed in variations of the processes used with this method. The multiple mist injection also provides the generation of new steam in the volumes needed for the process itself, generally in the range of 11 mole of steam for each 2 mole of carbon.

THE ENCAPSULATED EXTRUSION PROCESS FOR WASTE PRODUCTS

Great volumes of waste plastic, carpet fiber, glass, rubber tires and paper are buried, or are simply accumulating because of landfill closing and the inability of cities and counties to provide a properly approved system for disposal that conforms to ecological laws and restrictions.

CONVENTIONAL PROCESSING

The design of conventional processes described in the prior art foretell the need for an extraction method for the processing of coal, other ores, waste plastic, tires and even petrochemical plant "tank-bottom". Ground waste glass is usable in this invention in a feedstock lining and waste newsprint paper can be employed as fuel with special treatment described here. Therefore the processes of this invention encompass virtually all of the waste forms that are accumulating with only token disposal solutions.

Efforts to apply average pyrolizing techniques to the disposal of Waste Plastic have usually created exhausts that are objectionable, tended to make a crude oil product of little value and a "tank-bottom" that presents its own disposal problems. In short these lack emphasis in the area of high temperature gas generation, separation and cryogenic recovery which is the crux of the solution to this waste disposal problem.

Many of the energy problems of developing countries as well as our own nation's dependence upon foreign oils could be alleviated by the introduction of these combined processing methods so effective use could be made of the vast world-wide surplus of low grade coals and the waste hydrocarbons. These waste products can be used for the enhancement of low grade coal residue after valuable chemical gases are removed from the coal with use of the vacuum non-destructive pyrolization, or the carbonization/distillation processes of this invention.

ENHANCEMENT OF VERY LOW GRADE COAL

There are coal ores in abundance throughout the world which are most frequently of low quality Btu levels. The procedure of this invention provides a means to upgrade such ores by the application of controlled heats to reduce water and sulfur contents while at once extracting valuable gases with this low energy cost center-fire extrusion heat treatment.

In addition this invention permits the infusion of gases or chemicals into the extrusion to enhance the features of a low value coal so its Btu performance can be of uniformly high quality and with water removed the shipping tonnage Vs Btu levels are proportional to a that of higher quality coal. Recovered gas values, will In some cases, offset or exceed the costs of the ore and this associated enhancement procedure. With a salable coke or improved coal product as the primary cash product such an operation can be highly profitable.

The process is an ideal one for the production of a coke because of all the variables that can be input in this continuous processing procedure as it functions, while the product through-put is tested and evaluated progressively. This is impossible in the current coal reduction batching procedures.

PRODUCTS DERIVED FROM COAL AND WASTE

The Products produced by the characteristics of these combined processes are production of; (1) Gases derived from Coal and Waste as Chemical Constituents using the Encapsulated Fire Reduction and Carbonization of Ores and Waste Materials; (2) Saturated Hydrocarbons as gas constituents as derived from Waste Materials subjected to Sub-Sonic Shock Steam Reforming; (3) A Thixotropic High Viscosity Liquefied Pipe Line Coal comprising a mix of the Soft-Char by-product of the Encapsulated Firing and Carbonization process with Saturated Hydrocarbons derived from the Sub-Sonic Shock Steam Reforming Process for treating waste plastics and (4) A Saturated Steam for the process use produced by the Anti-Nucleate Flash Tube Boiler system using newsprint waste paper in the "cottonizing" fuel process of this invention. The processes function well in the Sonic Shock Steam Reforming of Natural Gas and even fume Stack Gas for the production of Methanol.

The purpose of this invention is to make use of the existing Waste Recycling Program as a cash generating function for the Communities who are struggling to make this work. Their present programs make possible the extraction of selected plastics so that they can be processed in proper proportions to generate desirable gases that make possible predictable performance. This invention is not intended to solve the overall waste disposal problems, but instead provide a means to deliver a nearly pure and well defined hydrocarbon feedstock to a gas generating process making use of Waste Plastics for recovery of Saturated Hydrocarbons while Waste Newsprint is used for the generation of the energy required in the process. Surplus steam could be applied to co-generation of electric power to fed into the public utility power grid for added profit.

The boiler process and apparatus proposed for steam generation uses of waste newsprint is specially treated and used in a energy source that would be environmentally approved as a part of this process. Newsprint and waste papers when handled properly can provide an efficient and clean, low cost fuel that can dispose of the vast accumulation of this material with an easily handled stack-gas product of carbon and water vapor. The carbon is of acceptional quality and recovery provides another profit.

SUB-SONIC SHOCK STEAM REFORMING

This is branching feature of this combination of processes has been describe briefly in the foregoing. It is a means for processing the derived gases from ores or waste with a different Steam Reforming treatment in which Sub-Sonic Shock is applied to isolated gas increments using a highly efficient shock compacting means with immediate injection into a Catalytic Unstable Reaction Tower with dependence for heat generation and free energy conservation on the Sub-Sonic Shock apparatus to create economically sound marketable products.

In 1922 L. Pescara began the development of the free-piston engine in France. SIGMA has built over 1,500 5" bore compressor units and about 1,000 13.4" free-piston gas generators.

Free piston engine-compressors and gas generators are usually two-stroke units comprising four piston elements that are connected as pairs as single units. One end faces a diesel combustion charge and the other smaller end compresses the exhaust gas discharge from the diesel combustion. Usually the two small ends of the piston assemblies are opposed and compound the compression as they act together. The resulting gas exhaust that is compressed in this manner goes to a receiver and beyond to a turbine drive for rotating a prime mover shaft and thereafter the gas exhausts to the atmosphere. The action of the pistons may optionally be divided into two functions, one to compress air and the other to compress the exhaust gas. The compressed air is used for supercharging the combustion functions.

There are many shortcomings in these, namely that the piston's weight inhibits the "bounce" effect that returns the piston with the compression of air or exhaust gases. Frequency of stroke maximizes at about 600 per minute and decreasing the strokes tends to reduce the power by as much as 60% so a constant speed is essential for efficient operation. Cooling the pistons, which have significant friction losses, is critical and represents a substantial problem.

The nature of the compression apparatus of the invention of this application is in the piston design that is virtually friction free. Because the piston can be ideally calculated for optimum weight and mass to achieve a maximum velocity as related to the pressure required and the combustion energy or steam expansion needed to propel it, its return speed or "bounce" characteristic can be applied effectively unlike the high weight and mass of the dual piston of the Pescara engine. The expelling of compressed feedstock gas over the check valve setting leaves a residual pressure in the compression space. The piston return "bounce" is partly accomplished by this return pressure of captured gas that is not expelled on impact. The ram rebounding against the piston has reversed direction responding to this and as the expanded steam has been exhausted on the piston's opposite side and a new steam injection between the ram and piston is injected the is returned to the starting position.

New feedstock gas is introduced behind the ram piston in readiness for impact and when combustion occurs, or steam is introduced as the piston comes to this return stroke end the action is repeated. On the drive stroke back all valves are opened progressively as the piston passes so its drives toward the ram is against zero pressure.

The piston can have the pressure advantage of size difference between it inside the combustion area while ram smaller in diameter increases the compression ratio.

Unlike the Pescara engine/compressor form that is intended as a heat machine joined with a turbine, the free piston compressor of this invention functions secondarily as a heat machine. It does conserve the heat it generates by radiating this heat to an injected water mist that forms flash-steam in jacket chambers enclosing the cylinder. This means provides the steam for the reforming portion of the process of the invention.

The compressor's primary function is to drive a lightweight piston toward another like piston at maximum velocity to achieve sub-sonic shock impact against a pair of ram assemblies between them. The rams in turn impact against a pre-pressurized trapped isolated and trapped gas volume placed to receive this shock compacting kinetic energy. This gas is driven from this Retention Chamber past a series of set pressure resistance-points comprising relief check-valves, each opening into a new chamber with increased space that is the start of decompression. These factors plus the geometry of the piston itself change the thermodynamics completely and result in an efficient compression device that meets the pressure/temperature criteria for a "cracking" function with some chemical gases.

The piston cylinder form in the apparatus of this invention varies from other forms of piston cylinder apparatus in that;

(a) It operates continuously at very high temperatures.

(b) Generates very ultra-high pressure and temperature steam within the compression chamber apparatus while generating flash steam as means for maintaining a temperature gradient between the cylinder wall and the piston surface.

(c) Optionally, the piston and cylinder form may involve multi-annular and concentric telescoping parts as well as a internal moving ball functioning as a check valve within the piston itself for control of impact on both stroke directions as the piston as it moves in the two directions.

(d) Working piston and/or cylinder surfaces are equipped with minute openings to permit delivery of pressurized nucleate steam/gas bubbles to these non-lubricated bearing surfaces that cause the piston to float in the cylinder tolerance space on expanding-steam bubbles.

(e) Piston pairs or multiple pairs are opposed on a common or series of radial axes, but driven in pairs toward one another to double kinetic energy and shock.

(f) Compression creating momentary pressures as high as 6,000 psia and temperatures of 2,000 degrees F. in actual "cracking" of the molecular content of the feedstock.

(g) Control of gases using adjustable pressure relief valves imbedded within the body of a center control section containing internal porting with connection to the cylinder wall storage spaces that provide closely coupled and cycled delivery of fuel gas, feedstock gas or liquid, steam and/or compressed air, all of which can be pressurized with single piston strokes, (h) or conversely cylinder pairs are arranged to operate progressively one after another so different compression functions of each can apply to a different temperature, pressure and catalyst treatment. Even different gases can be treated and combined with this progressive processing. (i) The ability to assemble a unit with the cylinder pairs arranged radially beneath one or a plurality of reactors or steam receivers provides free energy savings with close coupling and finally, (j) application to a different purpose from that normal in piston/cylinder apparatus within a compressor device, as in the method of this invention.

Another compressor apparatus configuration that uses high pressure steam as the driving force for the piston is a generic form to that described above as used with gas combustion but is a somewhat more simple design intended to use power plant steam expansion for the drive energy. This unit is used to convert stack gas created by steam reforming the $CO_2$ in the stack gas in the production of methane or methanol for subsequent use as fuel for conventional engine-driven electrical generators or feed combined at the burner in a coal fuel boiler of the power plant generating the stack gas.

The use of these processes is the basis for a plan that is a starting point in attacking the waste disposal problems and with this pure plastic feedstock there is assured success in a program for profitable disposal of this specific waste form. With this type of program in operation on a national scale the processing of the whole garbage stream can be explored later using variations in the Encapsulated Firing and Carbonization-Gasification procedure of this invention. It is better to solve the easier waste problems first and pay a higher price for an uncontaminated feedstock than fight all of the difficulties associated with processing the whole garbage mass.

PUBLIC HEALTH OVERTONES TO WASTE HANDLING

An Analysis of Recycling and Waste Disposal

Economics and the Impact on Public Heal

A recent study made by Franklin Associates, Ltd. of Prairie Village, Kans., a consulting firm that quantifies waste trends for the Environmental Protection Agency and for companies in packing and consumer-products industry, confirms that recycling based on the concept that the country was running out of dump sites has now been shown to be totally false. Further the study shows that collection costs dominate the recycling effort and curbside collection adds $1.50 per month to a monthly household trash bill that in 1992 cost $382,000,000. California alone estimates a cost of $2 billion to reach a 50% recycling goal originally set for the year 2,000. Of the 203 million tons of municipal solid waste collected in 1992 only 21% was recycled or composted. So far recycling has diverted a very small proportion of waste products from the conventional dumping site procedure.
*From the Wall Street Journal of Oct. 4th, 1994

Unfortunately this report lends support for increasing the establishment and use of landfills. There are 6,700 Communities now using Recycling Procedures, but these figures do not include the 6,000 Uncontrolled Incinerators that burn Hospital Waste Materials. This hospital waste material is a large volume percentage comprising millions of small plastic packages that contain the residuals of thousands of pharmaceutical chemicals plus used fabric and organic materials. The Chlorine-rich gases produced by these are dumped into the atmosphere as confirmed by an EPA report in three volumes entitled "Estimating Exposure to Dioxin-Like Compounds".

The concern here is Dioxin and Furans that are chlorinated pollutants that form during in the combustion of these wastes. These gas chemicals have an ability to bind with a protein in the human body and are classed as a "receptor". These enter cells causing them to turn genes on or off inappropriately. Emphasis has been placed on these as a source of cancer in humans, however there are questions about the function of the "receptors" so all human beings exposed are not necessarily affected in the same manner.

"Hot Spots" of Chlorinated pollutants occur near areas of industrial activity. A recent study has shown that landfill buried plastic waste generates Dioxin and other toxic gases released with Methane generated and taken from the landfills. New efforts to "percolate" or "bioreact" landfill by extracting and then irrigating, or reinjecting other dump areas with "Leachate Waters" or the liquid stew created at the bottom of the landfill mass has recently been described by the EPA of Cleveland, Ohio. When this is done it accelerates the decomposition and the landfill is more productive of methane gas, waste water and reclaimable solids.

If the price of Methanol rises sufficiently this may be the unfortunate choice of landfill operators and waste disposal authorities.

There is a negative side in this program because it would increase liquids in small sections of landfill areas that could create a new hazard of water penetration to lower levels and contamination of ground water. With surface irrigation the "Leachate Water" evaporates into the atmosphere with contamination. Aging landfills are frequently surrounded by housing established long after they have been closed for and these older ones are most attractive for revival in this program for making them "biactive".

In response to the glut of waste paper accumulating in community recycling yards, there has been a huge increase in waste paper processing plant capacity that has gone on stream in the period 1993/94. Most of these do not meet the standards of pollution controls like those at one such plant in North Carolina, which is a large paper producing state. Other paper processors turn out a 100 times the pollutants of The irony in all of this is the EPA Dioxin search turned up about 30 pounds of this chemical passing into the atmosphere annually, which is certainly a concern, but more importantly what is of real concern is the remainder of the report from EPA that points up millions of lethal tons in other chemical sources described above, like those associated with landfill operations that are far more significant than the minor human exposure to Dioxin.

This recitation is intended to show that Encapsulated Carbonization and Gasifying in Vacua to Extract Gases from these waste masses is better than any of the current conventional procedures that are aggravating the problem of the Environment. The Hospital Waste Plastics should be separated by the recycler using shielding barrier means for personnel using robotic arm manipulators to sort this plastic so it can be steam melted in vacua, cooled and then treat with the Sub-Sonic Shock Steam Reforming Process V of this invention to remove the Chlorine and prepare the resulting product as an alcohol for addition to low grade coal.

A part of the concept of this invention is to design and bring to a Waste Collection Site a Portable Processors. A service company and Portable Process Operator would purchase Waste Plastic for use in the process as feedstock and waste paper for the fuel for the energy needed to convert the waste. Electric Power from surplus steam generation would be given to the Recycler, so the sum of these benefits could provide cash for City or County recycling effort to offset collection costs that often are so excessive as to encourage the unhealthful practice of land-fill dumping and burying all waste products with the garbage.

SUPPORTING PROCESS DOCUMENTATION COAL FIRE REDUCTION

Production Capacity

At first it would be assumed that it would be impossible to provide coke production with this method in the volume required for charging steel furnaces and the like, but analysis of the procedure of this invention shows that a plurality of units like those proposed could indeed duplicate this volume and do so in a far more effective and efficient manner.

Coking Oven Sizes

The Kopper-Becker Coking Apparatus has channels that are 20 feet high and some 50 feet in length. Each fourteen-inch wide channel is flanked by ovens on each side and usually there are banks of these in parallel groups of thirty-nine channels. Production is about 35 short tons per chamber per 15 hours of furnace time before discharge. Daily production in 24 hours is 55.7 short tons per chamber. There are down-time factors for repair and cleaning so this rounds off to some 50 short tons per chamber day ×39 that equals 1,950 short tons per day.

Assuming coke at 30 lbs. per cubic foot, production is approximately 58,500 cubic feet of coke per day.

Continuous Operation rather than Batch Production

The Method and System Apparatus of this invention anticipates a continuous operation producing an extruded tube of coal for coking that has a 1¼ inch wall and an outside diameter of 18 inches. At one foot per second production speed this tube form of coke produced with this method produces 475 tons of coke per 24 hours—the time of the Kopper-Becker Equipment that produces 1,950 tons. Thus approximately four or five machines of the type of this invention would produce the equivalent or more than Kopper-Becker Equipment.

These production means are designed to produce clean uncontaminated chemical and gas constituents extracted from any combustible material in an entirely enclosed system, and use these processing procedures in any of a variety of combinations, or the ways described to separate gases, followed with highly efficient gas compacting means to create very high pressures and temperatures so these can be subjected to reaction or reforming hot or cold means to produce other gases in the reconstitution means of this invention.

COAL REDUCTION COMPARED WITH METHODS OF THIS INVENTION

The coal reduction processes are so well-known that a comparison here may be helpful in understanding the procedures used in these processes.

Gas and Oil Vapors usually leave the coke container at temperatures of 1,100 to 1,300 degrees F. and are shock cooled by spraying with "flushing liquor" in progressive steps. This "flushing liquor" has previously been condensed in the mains and collected and recirculated. It amounts to 800 to 1,200 gallons per ton of coal carbonized. This step removes sensible heat from the gases and condenses some of the vapor and the light tars.

Difference: In the I and II Processes of this invention this flash shock treatment of gas addition is at the top of the unit with reintroduction of the flushing or light ammonia liquor down against the rising hot gas, causing the liquor to flash into steam gas vapors. External to the unit the stack gases and vapors are subjected to an ancillary procedure for secondary recovery of light tars and a rework of the fume gases for molecular gas the III Process the gas temperature is kept very high throughout the process to minimize liquors.

The remaining dead steam vapors and gases pass from collection points to cross-over mains and then to a suction main. A pressure-regulating valve is located in each cross-over main. After the gases and vapor pass these, the temperature has dropped to 175 from 212 degrees F.

Difference: The gases from collection and cross-over mains are reintroduced at the base of the Gas Collection Chamber for ultimate Thermal Diffusion mole mass division.

In the I and II Processes of this invention the steam vapor from cooling coke is introduced with other fuels for heat. The liquid materials extracted from the gases fall through a downcomer to a flushing liquor decanter.

No Difference: This procedure is practiced in the Processes II and III.

Practice is to maintain a pressure differential between the cross-over mains and the collection mains which is controlled by a pressure regulator. (These are uses for the low vacuum provided by the steam ejectors.)No Difference: This procedure is practiced in the Processes I, II and III.

The flushing liquor decanter serves as the first point of tar collection and the gas scrubber as the second.

No Difference: This procedure is used in Processes II and III.

The liquor overflows the decanter lip and the tar flows from the bottom into a raised pipe within a seal at the bottom that can be raised or lowered. The tar contains 2% to 5% water and usually can go to storage from the decanter for subsequent distillation. Liquors and tars flow from the scrubber to this decanter function as well.

Difference: The liquor from the decanter is used as noted above for the shock spray in the fractionating chamber and as coolant for wash liquid in the stack gas scrubbing system prior to its reintroduction to the chamber as the spray in recirculations. Reduces Tar Production.

The remaining gas in the system must be cooled to about 90 degrees F. in a secondary operation so additional tar can be removed as well as more water vapor.

Difference: In the I and II processes of this method this expelled fractionated gas would be cooled to a temperature about half that of the Gas Collection Chamber temperature and after division in the thermal diffusion and electrostatic unit, cooled again, compressed, cooled again and bottled. In the III Process gases are passed through the ionization, collimation and spectro-cyclotronic systems at the highest temperatures possible short of destruction. This reduces tar production.

Two coolers follow in line, one the direct primary cooler and the next the indirect primary cooler. In the first, a cool liquor spray drops from the top of the tower over wood baffles as the gas rises from the bottom. This provides direct gas contact in a scrubbing action. Heat moves from the gas to the liquor to make a weak ammonia and water solution. In the indirect cooler heat exchanger, tubes over which this liquor flows remove about 25% of the total tar, and the remaining gas flows over more heat exchanger tubes to finally pass an electrostatic precipitator with a high potential between collection plates and many discharge points. The suspended particles are ionized and cooled on the large plate surfaces to be periodically removed with automatic wiping apparatus.

Difference: In the I and II Processes of this invention the system described above is the desirable system for all surplus or stack gas before reintroduction into the Gas Collection Chamber.

Ammonia Liquor Treatment

Phenol is recovered from the ammonia liquor with use of a scrubber and solvent extraction process in which the ammonia liquor is dropped down through benzene which rises as it mixes with the ammonia liquor to collect the light oils and phenol which comes to the top. The liquor ends at the bottom and passes to a dephenolized ammonia liquor storage tank.

The phenolized Light Oil then passes to a caustic soda treatment process of three steps in which the caustic soda gradually absorbs the phenol and becomes sodium carbonate. After removal from the tower, this chemical is boiled to remove moisture and solvent. It is then neutralized with carbon dioxide and crude phenols and homologues are released. The caustic soda is recovered and returned to the process.

The gas leaving the ammonia absorbers contains light oils with over a hundred constituents. It is a mixture of all the products of coal gas with boiling point ranging from 32 degrees F. to 390 degrees F.

There are olefin and diolefin hydrocarbons, some straight chain and cyclic paraffins, sulfur, nitrogen and oxygen compounds, all present in very small quantities. The principal stable constituents are benzene 60–85%, toluene 6–17%, xylene 1–7%, solvent naphtha 0.5–3%.

The light oil itself is approximately one percent of the total coal carbonized in this normal procedure.

The dense ammonia liquor produced with the I and II Processes of this method would be delivered to others for refining the above manner.

The inventor proposes that Process III and its very high temperature production of gases from a variety of material can eliminate most of the processing steps now used in conventional systems while extracting the same constituents with greater economy.

All of the foregoing is based on the movement of gases based on Gas Kinetic Theory and the various experimental data outlined in the following:

GAS KINETIC THEORY AS APPLIED TO THIS INVENTION

Molecules of gas even at rest are moving at high speeds and colliding. The impacts are elastic and there is apparently no loss of energy in such collisions. It is also known that molecules of different gases do not diffuse together or mix easily.

Mixing apparently requires time, and with fast transport through a given vessel, little blending of different gases occur.

According to Boyle's Law, gas at a constant pressure varies directly with density, or inversely with volume. Equal volumes of all gases at any given value of temperature and pressure contain an equal number of molecules.

The Maxwell-Boltmann Distribution Law shows that it is possible to determine the law according to which of the molecular velocities are distributed at any given temperature.

All suspensions of fine particles in gases or liquids exhibit "Brownian" motions. On the basis of the kinetic theory of gases Einstein in 1905 suggested that at least large molecules would be expected to behave in a like manner.

Chapman and Cowling showed conclusively that the viscosity of gases increased with temperature—just the opposite of what occurs in ordinary liquids. They also showed that molecules are centers of repulsive forces and are not like hard spheres.

M. Knudsen showed that molecules striking a hot surface not only increase translation, but also increase amounts of rotational and vibrational energy. (Translation: A function changing the coordinates of a point in Euclidean space into new coordinates relative to axes parallel to the original coordinates.)

T. L. Ibbs described Thermal Diffusion as follows:

If a temperature gradient is applied to a mixture of two gases of uniform concentration there is a tendency for the heavier or large molecules to move to the cold side and the smaller molecules to move to the hot side. The amount of thermal separation thus produced by a given difference in temperature depends upon the proportion of volume of heavier gas and the lighter gas. The separation is also influenced by the field of force operating between the unlike molecules.

In an experimental chamber devised by Clusius and Nickel this was shown to occur with heavier gases collecting at the bottom and lighter at the top of the vessel. In this experiment an electric current provided the heat and of course this was surrounded by an electric and magnetic field (a force field) which seems to have been ignored.

SUMMARY OF CONCLUSIONS

Partially based on the foregoing and without violation of any physical laws the inventor believes that a mix of very hot gases as produced in this apparatus will move with high velocity along such "mean free paths" as may exist between the molecules. This path depends upon diameter, viscosity, heat conductivity and diffusion of the gases.

The apparatus of this invention has been designed to take advantage of the Thermal Diffusion functions, the effects of Centrifugal Forces and the effect of a Uniform Magnetic Field on Ionized Gas Mlecules directed into such a field.

In addition the "elastic" molecular character, the "translation" and "mean free path" features tend in the inventor's mind to support one of the selection methods of this invention in which molecules are diffusely directed into a parabola bowl from their focal point so they "bounce" back into straight "mean free paths" to strike a 45-degree plane and then "bounce" again. In the new trajectory, that the inventor believes varies in proportion to the mass of the molecular projectiles transitional deflection, and under the influence of an applied Centrifugal Force in the plane of their path, they should have be directed to and be captured by a properly arranged stack of horizontal slits to thus provide Collimating Division means based on mole mass strata. Dependence for performance here is based on the mass dominance of the large molecules over those of lesser mass.

In Process III the extracted gas is at such high temperatures, 1,200 to 2,000 degrees F., that any gas in the mix is well above vapor pressure considerations. As these are introduced to ionization, parabola collimation, and the spectro-cyclotronic separation chamber, gas flow temperatures and pressure controls are critically maintained. During approach to the division functions the gas is mass bombarded with electrons from a renewable cathode of moving aluminum wire and a "getter" function using a sputtered coating of Zirconium spots along the wire.

Within the space of the Gas Collection Chamber in the I and II Processes as well as the collection chamber of the III Process there will inevitably be layers or stratas of gas molecules that are attracted or repelled by barriers of varied temperature. There are collisions or repulsion as large and small molecules approach one another. As viscosity increases the mean free paths must shorten. An analogy to a fluid bed of particles might be considered in which their vibration creates a separation of particles by size. The functions at work here are some of the most complex of chemical reactions and in a mass of mixed gases the collision, repulsion and attraction of molecules from one to another create chaos.

The weaker forces at work are the Van der Waal forces. Collectively the dipole, dipole forces, Hydrogen Bonding and London Forces. These are the reason for the use of the Thermal Diffusion and Electrostatic/Magnetic means in the final separation of molecules.

It would seem logical that the sweep of the rotating center member Absorber Retention Tubes in the fractionating and collection chambers will move the molecules in a circular path turning upon itself in a helical plane augmented by the high temperature steam jets directed across the surface of the absorber retention tube. As the gas molecules are swept around the annulus space of the chamber, the centrifugal force in this motion will tend to move the heavier and larger molecules to the outside wall. This wall has a cooler surface than that of the retention tube at the center of the chamber, so based on the thermal diffusion theory the heavier molecules are attracted to this outside wall.

The lighter molecules attract to the hot center and gradually rise to the top of the chamber. Holed annular collars or flanges extend a few inches inward from the outer wall where they are welded at midpoints between each level of an escape port to help create a boundary for strata formation of varied molecular size selection ranging from the light and small at the top to the heaviest at the bottom. The holes place close to the wall permit the drainage of liquors accumulating on the wall.

Concave cups are located at the end of each Tube Extension that reach into the Gas Collection Chamber from the pulsed gas escape valves. These are located a different heights around the the wall of the Gas Collection Chamber to produce a rough gas fraction. The convex side of these cups face upstream to the rotating sweep of passing gas current driven by Steam Jets scrubbing the surface of the Absorber Receiver Tube from which hots gases exude. These cups create eddy currents in their concave space and create a gas dwell at the tube opening. As the Valve is opened this gas is drawn into Raw Gas Receivers with a lower pressure and moves beyond to Cleaning, Ionization and Separation apparatus outside the Gas Collection Chamber of Processes I and II.

In the Process III the refinement described above is not used. The feedstock temperature is kept as high as possible without gas destruction in the Gas Collection Chamber's evacuated space so nearly every constituent can be reduced to carbon or a gas as the Liquors are drawn off and reintroduced as vapors. The gas is expelled en masse to the following cleaning procedures, et al.

ANTICIPATED COAL GAS CONSTITUENT PRODUCTION

Based on these Coal Characteristics
  Moisture Content 9.6 percent
  Volatile Matter Content 17.8 percent
  Ash Content 7.5 percent
  Operation Time Ingress to Eject 1 Minute
  Coking time 1 minute
  Center Fire Temperature 2,800 degrees F.
  Retention Tube Temperature 2,400 degrees F.
Coke Oven Gas Produced (These vary with coal quality)
  $CO_2$ Volume 1.3–2.4
  $O_2$ Volume 0.2–0.9
  $N_2$ Volume 2.0–9.6
  CO Volume 4.5–6.9
  $H_2$ Volume 46.5–57.0
  $CH_4$ Volume 26.7–32.1
  Illuminants 3.1–4.0
    *Includes $H_2S$
Coke Characteristics as Produced
Moisture Content 1.7 percent
Volatile Matter Content 1.2 percent
The gases separated with these methods and systems will be determined by analysis using GLC or Gas Chromatography. The gas from each separation level will be reduced to a temperature below 400 degrees C. and subjected to an Absorption Column analysis that produces a chart showing the prime constituents and the secondary impurities.

SUBSONIC SHOCK STEAM REFORMING OF GASES

The Sub-Sonic Shock apparatus of this Invention can be modified to function with high pressure steam for the propelling of the pistons while using the exhaust steam for addition to the $CO_2$ content of the steam plant stack gas. This is particularly true with the stack emission exhaust from the burning of natural gas, but with proper preparation of the stack gases in a coal burning plant, the $CO_2$ of coal exhaust can be reacted using this same process. To do this there is a change in the apparatus used because power plant high pressure turbine steam at 1,000 psia and 1,300 degrees F. supplants the combustion of natural gas for the piston drives. This is done with attemperation of the power plant steam for temperature control, but essentially the apparatus is another generic form of the basic method of this invention.

Steam reforming of carbon dioxide is in some ways more simple than reforming natural gas or plastics in that the process only requires a single reaction step without the need of a following reactor as is the case with natural gas. Here an ideal situation exists. Carbon Dioxide is a major constituent of the stack-gas from such a plant and great volumes of super-heated steam are produced. By using this steam source and conducting a relatively simple one-stage reforming process with the $CO_2$. Methanol can be produced in volumes at very low cost. The use of high pressure steam to drive the sub-sonic shock function is detailed elsewhere because there is no compression of the combustion fuel as with a natural gas drive and the apparatus is less involved to produce and therefore less costly.

Under conditions of constant temperature in a piston/cylinder arrangement, the change in energy will be equal to the work done on the system. The work will be a function of temperature and volume only.

$$E_1 - E_2 = (P_1 \times V_1) - (P_2 \times V_2)$$

This is a relationship that does not account for velocity and piston mass. It also does not consider chemical reaction and the increase in number of moles present nor does it account for the compressibility factor associated with the gas mixtures. It does, however, give a good approximation of the pressure needed and the volume reduction needed to achieve the type of energy required to initiate the desired reaction in the sonic shock process.

In the stack-gas reforming we need to raise the energy of $CO_2$ and $H_2O$ from 376.6 and 799.5 Btu/lb/mole to over 237,105.6 and 397,987.6 BtuAb/mole to produce $CO_2$ and $O_2$ from $CO_2$ and $H_2$ and $O_2$ from $H_2O$. Starting with low pressure and one $ft^3$ $CO^2$ or $H_2O$ we need to compress the volume to an order of magnitude of 0.001 $ft^3$ to arrive at a reasonable pressure. For $CO_2$ the required pressure would be 1,280 psia. For $H_2O$ the required pressure would be 2,150 psia.

In each case we are starting with pure $CO_2$ or pure $H_2O$ in the gas compacting space before compression. If starting with a mixture of components and operating at the higher pressure, methanol will be formed under these conditions. To maximize the yield of methanol the sonic shock force must be optimized.

WASTE PLASTIC AS A FEEDSTOCK

This piston/cylinder Sub-Sonic Shock Steam Reforming Apparatus can also be applied to the production of constituent gas separations from the waste plastic accumulated from waste recycling. These can be reduced to saturated hydrocarbons with a superheated steam reformed procedure using this method in the production of Methane, Propane and Ethane while Chlorines of the Polyvinyl Chlorides are removed separately. Using waste material as a feedstock in a process immediately implies economic advantage but this is not necessarily so. It is desirable in any process to have a feedstock of relative consistency so that performance is predictable and a product can result that is not contaminated by a material in the feedstock that occurs spasmodically. Also there must be an assurance of a supply to maintain an operation that will warrant the expenditure of funds for the type of plant required in processes like those proposed here.

Waste plastic that is properly handled is an excellent example with respect to these problems. The present recycling programs provide for the separation that could be extended to separate types of plastic into lots for purchase by processors who make a recycled plastic product. In some cases this is done now.

Taking advantage of this sorting procedure, it is possible to acquire a uniform waste plastic feedstock for the process proposed. Statistics show a very low volume of recycled waste plastic in the U.S. but this is because there is very little interest in reworking this material with the present processes. Consequently there are no buyers and the waste collectors resort to burying the material as they have for years.

If a responsible buyer were to come forward and offer to buy all the waste plastic that was available for $100 to $150 a ton, even with the separation done to specification by the buyer, indications are that the response would be in millions of tons. The fact is that there are now some 25,000,000 tons of plastic put in the urban waste stream annually, which does not include the plastics of Hospital waste that is nearly equal this amount. Waste plastics as presently separated in the recycling procedures can be lumped together (not including Hospital waste) without type separation and processed with the Sub-Sonic Shock Steam Reforming procedure outlined here, but the resulting product would be high Btu Alcohols suitable as a liquefying agent for low grade coal. Chlorine removal from this gross product is critical to provide the flammable properties suitable for combustion. When the production of pure products is the goal, the waste plastic should be classified before processing and worked as a specific type or combined in weight proportions to yield the gas chemicals desired in the process. When heated under air-free non-oxidizing high pressure steam conditions, the material in classified or unclassified form can be liquefied and cooled for space reduction in handling and transportation prior to final treatment.

GENERALLY, MOST OF THE PACKAGING PLASTIC CAN BE IDENTIFIED AND SEPARATED IN THE RECYCLING PROCEDURE AS IN THE FOLLOWING:

Polyethylene $(CHCH_2)_x$

Polystyrene $(C_6H_5 CHCH_2)_x$

Polypropylene $(C_3H_5)_x$

Polycarbonate $[OC_6H_4C(CH_3)C_6H_4OCO]_x$

Polyvinyl Chloride $(H_2CCHCL)_x$

Polyvinyl Acetate $(H_2CCHOOCCH_3)_x$

THE HYDROGEN ION

Chlorines must be extracted from the last two waste plastic products noted above because the Chlorine presence inhibits burning. To accomplish this, the process makes use of the + Hydrogen Ion or $H_3O+$. The fact that it does occur in a gas state has been confirmed. *"The existence of $H_3O+$ in the gas phase is supported by analysis of mass spectra. When water vapor is ionized, mass peaks for $H_3O+$ and also for H+ associated with two, three, or more water molecules $(H_5O_2+ H_2O_3+$ and so on) are observed." *Chemistry 2nd Edition, Bailor, et al 1984.

The H+ ion is a proton. No other positive ion is so small or has such a high concentration of charge. With the single electron gone, the charge of the proton is completely unshielded and the result is that the Hydrogen atom does not give up an electron to form H+ unless it can simultaneously share electrons with some other group. The bond disassociation energy of the H—H bond in $H_2$ is relatively high and the Hydrogen molecule is quite stable. A large amount of energy is needed to rupture the H—H bond. High temperatures and pressures or catalysts have been observed to split the molecule into atoms which is often required to carry out the reactions of Hydrogen effectively. Hydrogen atoms are highly reactive. The Chloride ends of the HCL molecules of the waste plastic are highly negative and, in aqueous solutions, strength of the water molecules is strong enough to break the Hydrogen-Chlorine to produce ions.

There is fluctuation demand for Methanol with highs growing out of certain states mandating the use of this alcohol as an additive to gasoline fuels. There was already a demand associated with chemical plant usage and there is a need for a relatively low cost process to overcome what will probably be a series of short-term situations of high demand over the foreseeable future. These would not warrant the construction of the very large plant facilities normally associated with this work while a plurality of small capacity, simple low cost units like those of this invention would maintain a supply and stabilize the market.

SUMMARY OF THE INVENTION

FIVE PROCESS MAKE UP THE INTEGRATED METHODS OF THIS INVENTION

Within each of these there are a group of apparatus and sub-apparatus forms that in most cases are generic in design. With some modification in each they are adaptable in each case to two or more of these processes as the functional elements.

The purpose and objective of the Invention is to teach a program using these several processes and apparatus forms in a progressive procedure that makes possible:

(1) Low cost fire reduction of poor ores and waste to produce chemical gases (2) That are heated to very high temperatures (3) Divided by Thermal Diffusion means (4) Cleaned by non-fouling means (5) Ionized by electron bombardment (6) Divided again into horizontal stratas by molecular mass selection (7) Divided again by exposure to an intense magnetic field (8) Reconstituted cryogenically as liquids (9) Treated with sub-sonic shock steam reforming means

(10) Optionally reacted in an unstable-state with catalysts

All of which produces a plurality of chemical gases and liquid products. The five processing methods and procedural groups include secondary systems and apparatus forms in each main process category.

PROCESS I

Process I is a basic method using an extruded dual tube feedstock inside which a running center-fire heats to gasify the feedstock with emphasis on driving off gases and liquors at relatively low temperatures so they can be accumulated and refined as with the processes of this invention, or with other existing operations. The primary purpose here is to improve a low grade coal and offset the enhancement process cost with sales of constituent chemicals derived incidental to the process. The associated apparatus forms comprise:

A Feedstock Extruder Capable of Dual Extrusion

Intermediate Drive Unit Apparatus

Rotating Absorber Receiver Retention Tube Apparatus

Fire Tube Injection Apparatus in Extruder

Fuel Injection Apparatus in Extruder

Gas Collection Chamber Apparatus and System
Center-Fire Spool Checker Brick Radiator
Ammonia Liquor Apparatus

PROCESS II

Process II method uses the same low heat procedure to perform a rough gas fractionating followed by thermal classification of the gases into light and heavy molecular weights for subsequent use in other processes. This process is essentially like first except for the incorporation of rotating apparatus functions to facilitate a substantial increase in production. The associated apparatus forms comprise:

Rotating Feedstock Extruder Capable of Dual Extrusion
Intermediate Drive Unit Apparatus
Rotating Absorber Receiver Retention Tube Apparatus
Rotary Fire Tube Injection Apparatus in Extruder
Rotary Fuel Injection Apparatus in Extruder
Gas Collection Chamber Apparatus and System
Center-Fire Spool Checker Brick Radiator
Raw Gas Collector
Thermal Diffusion Apparatus
Ammonia Liquor Apparatus

PROCESS III

Process III method comprises use of similar apparatus, but with added extruder adaptation for the injection of chemicals and gases. The use of maximum temperatures and pressures are applied. The equipment imparts high velocities to the gases produced, as well as providing means to drive a high velocity flame past multiple fuel injection points of the center-fire circulation fire loop system. This is accomplished with an auxiliary power input from a plurality of pulsing Ramjet Engine exhausts. After high temperature firing of the feedstock the emphasis is to provide gas cleaning and refining so a finite division of hot gases can be classified by molecular weight and mass using a series of separation means. The associated apparatus forms comprise:

Feedstock Extruder Capable of Dual Extrusion
Rotary Vacuum Apparatus at the Extruder
Chemical/Gas Injection Apparatus at the Extruder
Intermediate Drive Unit Apparatus
Rotating Absorber Receiver Retention Tube Apparatus
Rotating Fire Tube Injection Apparatus in Extruder
Rotating Fuel Injection Apparatus in Extruder
Gas Collection Chamber Apparatus and System
Center-Fire Spool Checker Brick Radiator
Ram-Jet Flame Drive Apparatus
Thermal Diffusion Gas Collection and Division Apparatus
Hollow Ball Dry Cleaning Apparatus & System
Renewable Cathode Gas Ionization Apparatus
Parabola/Centrifugal Collinmation Apparatus & System
Cyclotronic Molecular Division Apparatus & System While employing forms of generic apparatus the III Process emphasis is entirely different from that of I and II systems. The extrusion function is identical except for rotating features, but the heating system as noted earlier is augmented with a Ramjet that drives the heat and flame through the circuit at great speed and intensity. This creates higher heats and speeds the passage of the feed-stock in heat exposure as well as accelerates the generation of gases. The gas temperature is maintained at the highest levels possible without gas destruction throughout the process so there are no liquors and tar.

In the III Process a gas cleaning system uses a Hollow Ball of titanium or ceramic material is use as a form of media to provide a particulate collection method for cleaning the gas with dry means so there is no change of chemistry during the cleaning process. The III Process completes the gas refinement to an extreme in that every effort is made to reduce this large gas volume to finite parts by the use of massive electron generation for ionized bombardment of the gas volume to create molecular disassociation.

PROCESS IV

Process IV makes use of a single extrusion extruder moving a media through the annulus between a rotating absorber tube and an inner static tube shaped on each of their enclosing faces with means to chum the media in passage and thereby mix the gas content. The associated apparatus forms comprises;

Divided and metered gas volume recombined using a multi-port extrusion nozzle that conducts these individually into an inert mass of media or catalyst functioning as a carrier for the newly combined gas. The media and hot gas content rise in a column that churns in the annulus space between an absorption tube and a static internal supporting tube that is a conduit for high heats or intense cold liquid so the gas mix in the catalyst media reacts in the heat condition to reform, while in the cold condition of an inert media there is a fast temperature drop and liquefication of the chemical/gas/liquid mix.

Before the gas mix has reached the top level of perforation location in this absorption tube it has reacted with heat, or becomes a liquid if cold is applied, and in either case is collected as it flows from the top-perforations into an evacuated collection chamber which is physically not unlike the Gas Collection Chambers of the Processes I, II and III, particularly with respect to the hot reaction process. There is a greater difference in the cold application.

Control of metering or a form of titration to delivery gases and chemicals to the nozzle of the extruder is the critical factor in the success of this IV Processor. The controls for heat and cold, as well as the rotational speeds, seals and the like are relatively simple to achieve.

PROCESS V

Process V is a branch procedure that follows the generation of any of the gases growing out of these processes, or can be applied to natural gas, or coal or gas origin stack gas. Its primary function is to compress gas at very high temperatures and pressure, but with a novel shock impact against a captured increment of gas that is violently compacted and driven past a pressure relief value into a closely coupled hot catalyst tower that is pulsed by this impact and heated primarily by the heat generated in this Sub-Sonic Shock Steam Reforming function. The apparatus forms associated with these processes are:

High Compression Chamber Apparatus
Nucleate Bubble Piston Apparatus
Ram Impact Mechanism Apparatus
Increment Gas Compression Chamber Apparatus
Piston Shock Arresting Apparatus
Radial Multi-Cylinder Compression Apparatus
Steam Attemperation Apparatus Form
Free Energy Close Coupling of Compression and Reactor
Fluid Bed Effect in the Mounting of the Reactor The objective of this method is not to replace the normal reaction chemistry of natural gas reforming, but is introduced as a "tool" involving a relatively small and easily maintained "engine-like" apparatus that can compact molecular gas and fracture the molecules with subsequent passage to a conventional catalyst procedure and steam ejector jet-cycle condensing while reforming with procedures unlike those used now.

The apparatus for this purpose is a ported device in which the transfer of gases and steam is accomplished with minimum external piping so the heat generated is conserved within the compression body and the cooling function, using low temperature steam, creates saturated steam within the walls of the cylinders that converts to superheated steam which is then passed to compression and used in the hydrocarbon reforming function while exhaust steam provides jet-cycle refrigeration. Combustion ignition frequency or cycling is maintained by imbedded adjustable relief ball check valves that regulate the gas passage from point to point within the unit as it reacts to the rising and falling pressures within the cylinder wall storage areas, compression spaces and the combustion chambers while a control loop monitors piston speed with a laser light beam broken by the piston travel.

PROCESSING STEPS IN THE DUAL EXTRUSION OF A FEEDSTOCK

THE DUAL EXTRUDER

A dual feedstock tube is extruded ranging from six to eighteen inches in diameter with a wall thickness ranging from one-half inch to two inches. An Extrusion Means prepares a dual tube of feedstock of ore or waste material.

with Means at the extruder nozzle
to introduce a second fire resistant extrusion inside the first one.
Means at the extruder nozzle
to vacuum the ore or waste as it compresses in the extruder.
Means at the extruder nozzle to use a plurality of streamlined piping;
over which the extruded feedstock divides flows and closes. through which the extruding feedstock is vacuumed of air; through which gas is forced into the evacuated feedstock space; through which a liquid fuel is put inside the extrusion tube center; through which a gas fuel is put inside the extrusion tube center, through which heat and flame is injected inside the extrusion tube,
There are ancillary features of this extrusion technique;
Means can be provide in the extruder nozzle so it rotates The streamlined piping can be hard fastened to the nozzle; or be mounted to annular sleeves means on the nozzle that is provided with cooled mechanical/carbon/carbide seats providing rotatability.
All of which is intended to place intense heat inside the feedstock tube center

VACUUMING OF FEEDSTOCK MATERIAL

As it is extruded the feedstock is evacuated of air and Gas/Chemical Injections are made after evacuation of the feedstock as it moves through the nozzle. A second extrusion material is extruded simultaneously as a lamination Lining inside the Initial Feedstook Tube.

This lining comprises materials that melt and fuse into the inside wall of the feedstock tube to seal its inner surface with a "glaze" or non-permeable face affording an encapsulating gas seal while permitting efficient direct heat penetration.

The extrusion nozzle is attached to Streamline Piping that provides means to permit feedstock heat treating material, fuels, oxygin and fire and flame to enter openings reaching the center of the feedstock tube as it is flows over these pipes, closes after passes to reforms so the fuels and fire enter a complete and intact tube form. The feedstock and internally laminated tube are forced from the extruder nozzle through a die extension block that is an

THE INTERMEDIATE EXTENSION

This comprises an internal helical gear form that accommodates the transition from a static extruder to a rotational mode.

The Intermediate Drive Unit makes possible a speed change.

with means comprising a internal involute helical gear die;
that can be driven to rotate or remain static; into which the extrusion tube is force from the extruder nozzle; so its extrusion outside diameter engages the gear teeth; the helical form of which causes the extrusion to twist;
as means to accommodate the speed of the Absorber Receiver;
as the extrusion enters the large tapered end of this long tube; where the extrusion's heat treatment begins and ends.

This twist engagement accommodates speed change from static to rotation

ABSORBER RECEIVER TUBE.

The Rotating Absorber Receiver Tube is the primary support for the extrusion;

with entrance means comprising a large tapered opening;
into which the twisting extrusion telescopes and is compressed to wiring out the gear tooth outer surface; as it is forced in a slipping fit as the rotating taper reduces;
the means for joining the outside of the extrusion against the Absorber's
walls that have small perforations along its entire length; through which gases and liquors exude; as the heat and radiation of the tube's center-fire intensifies;
This Tube functions as an "Absorber" as it permits the exuding of constituents The tube is a metal or ceramic support that is perforated and ranges from fifteen to one hundred feet in length, or height. This tube rotates on a common axis with a rotating or stationary extruder at a speed ranging from 10 to 100 rpm.

With moderate rotation of the Absorber Retention Tube the Extruder Nozzle can be held stationary and all piping made "hard". The "slip" of the material provides a type of "potterswheel effect" as the extruded tubes are passed from the static end of the extruder through the end Intermediate Gear Extension that while static actually turns the tube as it moves across the helical gear teeth and moves into the rotating Absorber Retention Tube. Centrifugal forces in the rotation of the Absorber Tube help in holding this somewhat plastic hot material against the inside wall of this tube, particularly at the higher speeds.

Absorber Tube End Bearings and Mechanical Seals

The long Absorber Retention Tube is supported on proper thrust and radial bearings. It is perforated with slots, slits or normal round perforations and mounted to accommodate heat expansion and is equipped with rotary seals so its top and bottom so it can be mounted in a fixed stator-like enclosing.

Steam Jets Scrubbers

Inside the chamber are directed at the Absorber Retention Tube's outer surface to provide a temperature differential from that of the feedstock and glaze lining that interfaces the heat and encapsulates the feedstock on its opposite face. This cooler absorber retention tube outer wall is held in a range 200 to 400 degrees F. below that of the feedstock between it and the center fire heat. These jets also create a vortex of revolving gases.

As the extruded feedstock with its protective internal tube lamination move upward inside the Absorber Retention Tube and into the center-fire heat, the inner lamination's protective material fuses into the feedstock and forms the "glaze" that encapsulates its inside surface.

Absorber Tube Perforations

The perforated side of the Absorber Retention Tube provides a "muffling" heat condition in spite of the perforations because the chamber outside of the Absorber Receiver Tube is evacuated at the operation start and after filling with gas there is no oxygen to decrease muffling. As the feedstock moves upward it slides in the perforated Retention Tube because liquids are driven to the interface of the feedstock and the inner surface of the Retention Tube. The liquors bubbles through perforations with gases urged by centrifugal force, the movement of heat toward cooler surfaces and capillary action.

Coke or Soft-Char Delivery at Top End.

At the top of the Retention Tube the hardened feedstock is broken as a pyrolized material and falls under a cooling steam spray that produces a flammable "producer's gas" that is captured to provide a fuel. The heat required in this system is provided with a mix of natural gas, high pressure air/oxygen and "producer's-gas" or "water-gas" from cooling of near-incandescent coke or soft char by-product of the gasified feedstock as is broken to fall away at the top of the Absorber Receiver Tube. Heavy particulate products accumulate at the bottom and contribute to the liquor viscosity, while tars go to the decanter.

CENTER-FIRE

The Center-Fire Heat Regeneration System is the primary heating in which
- a radiation means as a holed fire brick hanging in the extrusion center into which oxygen is introduced at a plurality of levels;
- as Ram-jet exhaust means drive flame from gas ignition past these levels;
    - to intensify the flame with the radiator brick making them; incandescent and within inch fractions of the extrusion surface as its passage is insulated by the fire resistant line to provide a muffled firing of the feedstock content of the extrusion.
        - This provides a flame loop passing through the Extrusion Tube and Gas Chamber A high velocity flame is driven through the center of the feedstock extrusion as it moves in the Absorber Tube. The flame is augmented by the radiation of a long hanging firebrick radiator that is a holed apparatus into which oxygen is introduced in pulses at different level. This stimulates the passing flame and superheats this radiator that is close to the liner surface of the feedstock tube that is passing.

THE GAS COLLECTION CHAMBER.

The Gas Collection Chamber is evacuated of air as the process starts. In the low temperature type of operation this enclosure functions as a fractionating tower after heat builds in the Absorber Retention Tube and gases and liquors are expelled to this space.

The Gas Collection Chamber totally encloses the Absorber Receiver Tube.
- with means for evacuation as the process starts for elimination of air so the gases and liquor extruded from the Absorber Receiver do not become fouled as they are super-heated by
- means of finned fire tubes carrying the Absorber Receiver flame return; as gases pass these and vortex around the circular chamber; driven by steam jet scrubber directed laterally across the Absorber Receiver Tube Perforations to drive off gas and liquor as the latter moves to the base for collection; while the gases roughly stratify horizontally; divided by molecular mass/weight fractions on levels where
- means comprising cupped shaped tube ends create eddy currents so gases are tapped off by
- means for the pulsed opening of valves; that open to a plurality of Raw Gas Receivers mounted on the Gas Collection Chamber walls; at different gas fractionation levels Collection Chamber Pulsing In the high temperature processes a series of openings ranging from the top of the of the Gas Collection Chamber are uniformly spaced vertically and around its cylindrical form. A valve controls each opening. These are opened one at a time. The pause between openings is uniform and provides a modulated pulse of pressure in the Chamber.

Opening exhaust ports one at time permits time for gas strata accumulation.

THE RAW GAS RECEIVER

The Raw Gas Receiver's are vessels that attach to the Gas Collector's walls;
- with means to maintain them at a slightly lower temperature; than that within the Gas Collection Chamber while additional;
- means provide for intermittently opening valves that deliver hot gases to these Receivers in pulses so the gas can pass beyond to the Thermal Diffusion chamber that follows.

There is an ancillary feature in that these Raw Gas Receivers are placed at a number of different levels to accept rough gas fractions; with the input valves controlled by a remote modulating controller pulsing the output of the valve group that are opened one at a time.

Raw Gas Collection Tubes

Tubes extend Raw Gas Receiver valves two thirds of the Chamber's internal space between its outer wall and outer diameter of the Absorber Retention Tube. This reduces the collection of heavy liquor vapors condensing on the outer wall of the Chamber. The ends of the collection tubes are fitted with an eddy current device to cause gas dwell at these openings. As a valve is opened to a cooler chamber the dwelling gases go into these external Raw Gas Receiver Units.

Raw Gas Receivers at different levels deliver different rough gas fractions

Cleaned gases as delivered from the Raw Gas Receivers have come directly from the Gas Collection Chamber and require further cleaning of particulate before further refining.

Liquids and Tars

These accumulate by gravity in a main at the unit base and are pumped to a decanting vessel where heavy elements are removed, tar (in the case of coal) and ammonia liquor (in the case of coal) and are circulated back for the reintroduction of this liquor as jet sprays in the Gas Collection Chamber. This liquor flashes into gases to combine with other gases.

THE LIQUOR PROCESSOR

A liquor product of gas production accumulates in the Gas Collection Chamber as
- means comprising valve and pipe mains carry this liquid off to; an adjoining an tower process for use of the liquor as;
- means to wash stack-gas from the process in a tower scrubber;

means to pass it through settling and decanting to remove tars; circulate it continuously to create a dense ammonia liquor;

means to deliver it back to the Gas Collection Chamber top level; as spray feed to be reheated and degasified to further increase viscosity, and means to control take off based on specific gravity metering.

The Process produces Liquor and Tars with other By-products reworked nearby.

Stack Fume Gas

These gases are washed with liquors that are reintroduced to the bottom of the Gas Collection Chamber and the liquors are applied again as a top spray in the Gas Chamber as well. (Stack gases can be converted to commercial product with use of the Process V procedures).

All process derived gases must be cleaned at this point before further refinement or separation.

HOLLOW BALL CLEANING APPARATUS

The gases of Process III are subjected to a different non-fouling Media Cleaning System and separated with the intent to recombine these separations into a product on the site of the III Process with use of the IV Process that has not been described in the above material.

A Dry Cleaning Apparatus is used to separate particulate from gas employs;

means comprising Hollow Balls that are of a specific size with holes in a specific number and size in each ball through which the gases pass in an upward path as the particulate accumulates on the ball inner and outer surfaces so they can be conveyed to a position where means is provided for driving off the particulate as they rotate in the blast of carbon dioxide delivered from a long "Air Knife" Slit apparatus as they pass so;

means consisting of a vacuuming apparatus and carbon compactor can accumulate the discarded particulate carbon for further refining Roughly separated gases cannot be recombined so a plurality of Cleaning Processes are used.

IONIZATION OF GASES

Before division by the methods of this invention they require ionization with in this case massive electron beam bombardment.

Gas Ionization is critical to a finite molecular mass division and employs means to provide a renewable cathode of aluminum wire; with sputtered spots of Zirconium at intervals as a "getter" in thin deposits to inhibit water forming in the passing gas as the;

means for moving the wire over a cone-like cathode support and means comprising special metal bellows-form seals are pressurized by the passing gas pressure on one side; while an equal pressure is applied on the opposite side; with use of a circulating carbon dioxide gas; that passes over heat exchangers before returning to afford cooling to the chamber enclosed wire spools and drive.

A large diameter cathode wire support-cone provides a massive electron source.

THERMAL DIFFUSION GAS SEPARATION

Gases from the Raw Gas Receiver pass to an Electrostatic Accelerator and a Thermal Diffusion Apparatus employing a temperature differential to divide the gases into two classifications based on molecular weight. The Thermal Diffusion section of this unit has it its center a refrigerated and shaped vessel suited to the application of electronic space charges. This is enclosed in turn by a heated and grounded jacket, spaced uniformly on all sides in relation to the internal vessel. The exiting ports carrying the separated gases are fitted with electrically charged cathode type electron generator accelerators to help expel the gases to their respective cooling, drying and compression units. One of these combination units consisting of the Raw Gas Receiver and the Thermal Diffusion Unit, as described above, is located at each port level of the Gas Collection Chamber. They are arranged in a "pipe organ" fashion with the egress of each at the level of the port it serves. These ancillary chambers lend themselves to the use of selective catalysts on the inner surfaces. These would be of the heterogeneous type, Iridium, Osmium, Platinum, Rare Earth Elements, Rhodium and Ruthenium suited to the selection of specific gases. The renewable cathode is usable here also.

Vortexing and Molecular Mass Strata

The mass of gas varieties produced, regardless of the feedstock employed, do not combine effectively and as the internal vortex motion provide inside the Gas Collection Chamber and around the outside surface of the Absorber Retention Tube, in a direction opposite to its rotation scrubs the perforations as gases exude. Shaped fins are mounted on the center-fire return tubes and angled down to create some rough strata's of common size and mass. These provide some gross fractionating by molecular weight and mass at different levels.

A Thermal Diffusion Separator apparatus is based on hot/cold attraction means comprising a cold vessel within a hot outer one; with maintenance of a temperature difference between the two and with surfaces charged oppositely using high voltages so the gases are separated roughly by mole mass attraction to the different temperature surfaces as they pass means comprising two electron gun cathode emitters for acceleration of the gas delivery as two fractions.

Two rough gas divisions for a first refining stage is done with this process.

PARABOLA COLLIMATION AND DIVISION

A Parabola Collimation is used within a space under centrifugal force influence into which the gas flow is introduced. The traveling gas mass has been ionized and is driven against a parabola to reverse its direction 180 degrees, This parabola is part of an expansion chamber in which the gases are subjected to a centrifugal force as they are deflected in this way. All of these effects, expansion, deflection and path alteration tend to separate the gas mass into a horizontal gross molecular weight strata of classes. These horizontal series of bands of gas divisions moved through wave-guide horizontal slits in a rectangular piping to a following ending in the magnetic field of the Spectro-Cyclotronic Unit. It is in this last apparatus that the gases are divided into a possible 38 divisions.

A Parabola/Centrifugal Collimation form of apparatus provides;

means for directing the rough gas division into; horizontal collimation means with the use of;

parabola shape surface that reverses gas path direction to force a bounce from a right angle deflecting surface to; a plurality of radial paths emanating from a center influenced by means providing a centrifugal force the gas passes through to agitate the varied molecular mass so the heavier move to the bottom and the lighter to the top of the circular space surrounded by round means providing a series of horizontal slits with concave guide opening carrying the divided gases in wave-guide like slots in a rectangular tube that ends in the magnetic field of the cyclotron.

A preliminary treatment to place separate gases of into horizontal mass divisions

MAGNETIC FIELD MOLECULAR MASS DIVISION

The Spectro-Cyclotronic magnetic field separation apparatus receives this stream of horizontal stratified gases at the edge of a circular magnetic field, the force lines of which are perpendicular to the gas movement. Here this stream of varied mass or mole weight gas plains is caused to spin off to impact against an encircling barrier of vertical slit-like openings with razor sharp edge boundaries between each. These are the height of the space between the magnetic poles. The slits end openings are piped to an arrangement of manifold valving that serve for adjustment combining in areas of spectral fallout of common gas when this occurs and also provide a final selective means of finite mole-mass division.

A Cycotronic Magnetic Molecular Mass Separation apparatus in which;

- means comprising round faced magnetic poles creating a magnetic field of 1,000 to 10,000 perpendicular to the path of a gas stream delivery into the field from the wave-guide-like multi-plane nozzle
- with chamber means comprising a circular walled chamber in which finite vertical razor edged slits open to widening passages ending
- at manifold/valving means for control of the gases that are divided as they cross the magnetic field to spiral out in a spectrum of division at different areas of the circular wall enclosure
    - This is the final gas division means of this invention providing 38 possible divisions

SUB-SONIC SHOCK STEAM REFORMING

A mechanical gas compacting means comprising a plurality of free pistons moving against zero pressure inside a cylinder driven by steam or combustion that impacts at once against two or more ram pistons located at their stoke terminus to close the said ram's opposite faces against a gas increment retained in a confined area under heat and pressure conditions to drive this gas thus compressed over a check valve series ending in an;

Sub-sonic Shock Steam Reforming is a branch process for reforming the gases produced by Processes I, II and III with;

- means comprising special friction-free unattached pistons in a long cylinder axially arranged the pair move toward one another;
- and means between them consisting of a chamber holding gases as;
- other means comprising rams close/telescope into the chamber space; as the said pistons strike these at once with a shock force as as the strokes ends after their propulsion against zero pressure; to create a sub-sonic shock condition in the chamber gases and
- drive these gases over relief valve means into the presence of catalyst to reform these gas as other forms of chemical gases.
- There are ancillary features in the perforated surface of the pistons; through which steam is driven to form nucleate bubbles that serve to support the pistons in the cylinder without contact and provide the means for high velocity movement.
- Other ancillary features are the ability to use steam expansion; or combustion of fuel gases for propelling the pistons.
- Another is the use of optical, Doppler or sonic means to determine the pistons position and speed of movement in its cylinder travel.
    - For reforming of Process I, II and III gases, or Natural Gas, Stack Gas, Naphtha, etc.

UNSTABLE-STATE CATALYTIC REFORMING REACTION

Most of the heat required inside the tower reactor is supplied by the Sub-sonic Shock Steam Reforming apparatus that is located directly beneath it. The gas pulses of the shock and created a fluid bed condition in the volume of catalytic beads held in the tower which helps in the gas reforming function.

An Extruder with Media Catalyst and Gas Injection Means receives the gas prepared for reforming in the Sub-Sonic Shock Steam process with

- means comprising an extrusion and nozzle to drive a single extrusion;
- means comprising a catalyst media bead or carrier form that passes out of the nozzle into the annulus path in a rotating Absorber Tube
- with mixing means comprising convex forms on the tube surface arranged in a helical form that closely passes like forms on the outer Stator Inner Tube wall that forms the annulus enclosure through which high temperature flame and heat is driven
- as means for heating the catalyst beads in their churning upward passage in the said annulus space though which pulsed gases pass from the static extruder nozzle as delivered from the Sub-Sonic Shock Steam unit to move through
- means comprising streamlined pipe that passes through the moving media inside the extruder nozzle and beyond to the annulus space between the rotating Absorber Receiver Tube and the Static Inner Tube center space that carries
- the flame introduced here by means comprising streamlined pipe passing across the nozzle and annulus feed to the rotating Absorber Receiver Tube that provides heat for the moving and churning catalyst through which the reforming gas is moving.

The ancillary features of this processing step involve:

- means for vacuuming the catalyst beads as they pass through the nozzle with use of hard pipe connection to this static nozzle and
- means for special added gas injection to the catalyst beads with use of hard pipe connection to this static nozzle placed to add this gas after vacuuming and exhausting air content of the media.
    - The Extruder and Nozzle are stationary here and provide for all the feeds required.

HOT CATALYST MEDIA ROTATING ABSORBER RECEIVER TUBE

The Hot Catalyst Media Churning Rotating Absorber Receiver Tube is not unlike the others in Process I, II and III accept that the

- perforation means is only provided at the top of the unit and the inner surface has the convex forms that facilitate the media churning.
- Means comprising bearings and seals are mounted at each end of the tube to accommodate the rotation and connection with the
- means for gas collection that comprises a total enclosure into which the reformed gases flow from the top perforation openings for expansion and cooling so they can be compressed and stored.

This rotating tube turns around the Static Stator Tube to mix and heat the catalyst

CRYOGENIC LIQUEFICATION OF GASES

This cold reforming system is based on extruding an inert media containing injected metered gas volumes upward in an annulus space between a rotating top perforated absorber tube and a static center tube through which cryogenic fluids are driven to cool these hot gases to a liquefication state in the compounding of a chemical.

The Extruder for Inert Media and Gas Injection Means comprises means comprising an extrusion and nozzle to drive a single extrusion;

means comprising a inert media bead or carrier form that passes out of the nozzle into the annulus path in a rotating Absorber Tube with mixing means comprising convex forms on the tube surface arranged in a helical form that closely passes like forms on the outer Stator Inner Tube wall that forms the annulus enclosure through which liquid nitrogen is pumped and cold is applied as means for cryogenically cooling the inert beads in their churning upward passage in the said annulus space though which gases pass that are mixed as received from the Cyclotronic Magnetic Molecular Mass division apparatus.

Means for injection of gas in this Extruder Nozzle involves a very large number of gas input ports that follow the means for vacuuming the media as in the extruder used in the hot system with the same apparatus means comprising streamlined pipe that passes through the moving media inside the extruder nozzle and beyond to the annulus space between the rotating Absorber Receiver Tube and the Static Inner Tube center space that carries the flame introduced here by means comprising streamlined pipe passing across the nozzle and annulus feed to the rotating Absorber Receiver Tube to provide heat for the moving and churning inert media through which the gas is moving.

The ancillary features of this processing step involve:

means for vacuuming the catalyst beads as they pass through the nozzle with use of hard pipe connection to this static nozzle and means for high plurality of ports for add metered amounts of gas injected into the inert media with use of hard pipe connection to this static nozzle placed to add the metered gas increments after vacuuming and exhausting air.

APPARATUS FORMS

The following list is comprised of the various apparatus forms that are used in connection with the Processes I, II, III IV and V of this invention. In many cases these are essentially the same apparatus forms but with slight modification to accommodate the particular functions of the Processes in which they apply. For example in the case of hot versus cold there are differences in construction with respect to the coefficient of expansion factors, but they can be constructed of the same metals and be generally the same design.

In the description that follows these are individually described as to design and function in the order set forth below with the applicable processes in which they apply indicated by Roman Numerals I, II, etc. This same division and ordering with respect to these apparatus forms is used in the "Objects of the Invention" and the "Claims". It is hoped that this may be helpful in the ultimate division that will be required in this work.

1. A Feedstock Dual Extrusion Apparatus, I, II, III.
2. Rotating Feedstock Extruder Dual Extrusion Apparatus I, II.
3. Static Vacuum Apparatus at the Extruder I, II, III.
4. Rotary Vacuum Apparatus at the Extruder I, II.
5. Fire Tube Injection Apparatus in Extruder I, II, III.
6. Rotary Fire Tube Injection Apparatus in Extruder I, II.
7. Fuel Injection Apparatus in Extruder I, II, III.
8. Rotary Fuel Injection Apparatus in Extruder I. II.
9. Multi/Gas Injection Apparatus at the Extruder IV.
10. Reconstitution Media Extrusion Nozzle Apparatus IV.
11. Static Intermediate Drive Unit Apparatus I.
12. Rotary Intermediate Drive Unit Apparatus II, III, IV.
13. Rotating Absorber Receiver Tube Apparatus I, II, III, IV
14. Center-Fire Spool Checker Brick Radiator I. II. III.
15. Ram-Jet Flame Drive Apparatus II, III.
16. Ammonia Liquor Apparatus I, II.
17. Gas Collection Chamber Apparatus and System I, II, III.
18. Raw Gas Collector I. II. III.
19. Thermal Diffusion Gas Collection and Division Apparatus I, II.
20. Hollow Ball Dry Cleaning Apparatus & System. I. II. III.
21. Renewable Cathode Gas Ionization Apparatus II. III.
22. Parabola/Centrifugal Collinmation Apparatus & System II, III.
23. Cyclotronic Molecular Division Apparatus & System II. III.
24. Static Support Tube Hot Extruder Injection IV.
25. Rotating Static Support Tube Hot Extruder Injection IV.
26. Static Support Tube Cold Extruder Injection IV.
27. Rotating Static Support Tube Cold Extruder Injection IV.
28. Reaction Tower Hot Catalyst Media System IV
29. Reaction Tower Cold Inert Media System IV.
30. Steam Attemperation Apparatus I, II, III, IV, V.
31. Nucleate Bubble Piston Apparatus V.
32. Ram Impact Mechanism Apparatus V.
33. Increment Gas Compacting Chamber Apparatus V.
34. Piston Shock Arresting Apparatus V.
35. Radial Multi-cylinder Apparatus V.
36. Fluid Bed Effect in Bottom Connection to Reactor V.

(The patent illustrations and the descriptions submitted here are very detailed and should be helpful in a full understanding of the methods and apparatus.)

PROCESS I

A Feedstock Extruder Capable of Dual Extrusion
Intermediate Drive Unit Apparatus
Rotating Absorber Receiver Retention Tube Apparatus
Fire Tube Injection Apparatus in Extruder
Fuel Injection Apparatus in Extruder
Gas Collection Chamber Apparatus and System
Center-Fire Spool Checker Brick Radiator

PROCESS II

Rotating Feedstock Extruder Capable of Dual Extrusion
Intermediate Drive Unit Apparatus Rotating Absorber Receiver Retention Tube Apparatus
Rotary Fire Tube Injection Apparatus in Extruder
Rotary Fuel Injection Apparatus in Extruder
Gas Collection Chamber Apparatus and System
Center-Fire Spool Checker Brick Radiator
PROCESS III
Feedstock Extruder Capable of Dual Extrusion
Rotary Vacuum Apparatus at the Extruder
Chemical/Gas Injection Apparatus at the Extruder
Intermediate Drive Unit Apparatus
Rotating Absorber Receiver Retention Tube Apparatus
Rotating Fire Tube Injection Apparatus in Extruder
Rotating Fuel Injection Apparatus in Extruder
Gas Collection Chamber Apparatus and System
Center-Fire Spool Checker Brick Radiator
Ram-Jet Flame Drive Apparatus
Thermal Diffusion Gas Collection and Division Apparatus
Hollow Ball Dry Cleaning Apparatus & System
Renewable Cathode Gas Ionization Apparatus
Parabola/Centrifugal Collinmation Apparatus & System
Cyclotronic Molecular Division Apparatus & System
PROCESS IV
Reconstitution Media Extrusion Nozzle Apparatus
Rotary Vacuum Apparatus at the Extruder
Multiple Chemical/Gas Injection Apparatus at the Extruder
Intermediate Drive Unit Apparatus
Rotating Absorber Receiver Retention Tube Apparatus
Static Support Tube for Hot and Cold Transit
Rotating Fire Tube Injection Apparatus in Extruder
Rotating Cryogenic Tube Injection Apparatus at Extruder
Reaction Tower Hot Catalyst System Apparatus
Reaction Tower Liquid Nitrogen Cold System Apparatus
PROCESS V
High Compression Chamber Apparatus
Nucleate Bubble Piston Apparatus
Ram Impact Mechanism Apparatus
Increment Gas Compression Chamber Apparatus
Piston Shock Arresting Apparatus
Radial Multi-Cylinder Compression Apparatus
Steam Attemperation Apparatus Form
Free Energy Close Coupling of Compression and Reactor
Fluid Bed Effect in the Mounting of the Reaction

DESCRIPTION OF THE INVENTION

When the original patent application was filed on this work it was apparent that a means to enhance the Btu values of low grade coal and perhaps liquefy it for convenience in handling would be significant and if waste plastic offered a source for Hydrogen for addition to this coal as part of the liquefication process the economics might prove very favorable.

Waste Collection

The processing of coal involves train-load tonnage and the processing of the needed volumes of waste plastic to enhance this coal would involve the collection of material from urban locations scattered nationwide. Ideally this lightweight highly air-entrained product should be reduced to a liquid at each site so it could be easily transported to a processor for addition to the coal, as for example at the coal mine.

In view of this a mobile or portable process could be a major contribution in overcoming the capital requirements in reduction of plastic waste to a liquid at the collection site.

The processing of the entire garbage mass is incredibly involved in that some form of compression must be employed for the removal of substantial amounts of the entrained liquors and water. The remaining mass can be handled with the gasification of this mass of organic and inorganic polyglot material in the fire reduction system of this invention.

Plant Size

There are three elements involved in this type of program: (1) several substantial sized plants for the processing of the garbage mass would have to be located strategically and nationally; (2) plants suited to the processing of low-grade coal with locations at or near the mines or the power plants; and (3) small preliminary processors that can be taken from one collection site to another in a rotational program.

The processes of this invention address these varied problems with the individual systems and apparatus elements that are a part of the overall integrated process.

Combining Coal and Plastic

The overall solutions to the upgrading of a low-grade coal and the disposition of waste materials is only possible with use of a system like that of the Vacuum-enclosed Encapsulated "Feedstock" subjected to an intense heat source to produce very hot gases, as in this invention. This comprises the "front-end" of this overall process, followed by cleaning, ionization, separation and molecular division as preliminary steps to the final "back end" of the procedure comprising gas reconstitution by Cryogenic Liquefication Media Mixing in production of usable Chemicals that are the product of this process and invention.

Plastic waste materials can initially be reduced with a simple high temperature steam system and cooling in vacua to form a brick-like product for storage or shipment to a main processing facility for Sub-Sonic Shock Steam Reforming to extract Chlorine so this can convert to the highly flammable liquid for addition to the coal in its liquefication.

Marketable Gas Products from Coal

The gases extracted from the coal in this enhancement procedure become the cash products of this process. There are a series of ways to approach the problem of handling the extracted gases. These comprise Thermal Separation, Centrifugal Parabolic Impingement Collimation and finally selection Ionization and delivery to a Magnetic Cyclotronic Separation System of gas strata sectioned by molecular mass into as many as 35 or 40 divisions. After all the useful gases have been extracted from low-grade coals the residual char product can be combined with the waste plastic from which the Chlorine has been removed by dispersion of this pulverized char in a mix with the plastic enmass.

Liquefied Coal or a Pipe-line Fuel

This processing plan takes advantage of the recycling procedures presently in existence that are used to divide the waste plastic from the garbage mass. These plastics provide a cross-section of pure Hydrocarbons and, as noted, with Chlorine removed an effective liquefied coal can be produced if properly mixed using high performance dispersion means to produce a thixotrophic combination with the powdered coal char residual from the gas extraction process.

All of the units proposed as parts of this process can be constructed with far greater economy than normal chemical facilities.

Ancillary Steam Production with Waste Newsprint

Steam production is a critical part to these processes so a supporting boiler system has been invented as a means to provide the very high temperature and pressure steam required at low capital and operational cost. This is designed to make use of another waste as fuel. Newsprint waste paper. The inventor is familiar with the fine shredding of this paper in the production of a "fiberized" cotton-like material as accomplished with a hammer mill. The product is explosively flammable. Newsprint reduced in this manner, with Ramjet forced draft system, recirculates flame past a large plurality of single uncoupled vertical boiler tubes that enclose hollow stainless steel balls filled with mercury providing a flash-steam source. These balls move up and down in the tubes as steam is generated below them. As they are forced upward, water is drawn in beneath them through check valves. Heat is provided by fire passage in two directions. The balls have a loose fit required to allow some by-pass of steam and to iron out the nucleate bubbles formed on the tube walls inhibiting steam generation. "Nucleate" bubbles are well-known in steam generation. Their elimination can provide a highly efficient high temperature boiler with less space, simpler and fewer tubes. The fast ball excursion and introduction of cooler water in each cycle prevents the overheating normally associated with nucleate bubbles. The effect of nucleate bubble is a melt-down of the boiler tubes. In this invention the single vertical tubes with the constant introduction of new water prevent this from happening. Steam from this system is suitable for operation of a steam turbine coupled with an electrical generator. There can be ample capacity to handle all the power and steam needs of the processes while providing surplus capacity to add to the public utility power grid.

The urban recycler has three benefits from this energy source . . . the steam for the processing, co-generated power to put on the utility grid, and a very high quality carbon by-product (if newsprint is the exclusive fuel) that is salable at a very high price.

Cryogenic Gas Reconstitution

The Cryogenic Gas Mixing system of this invention is a large scale plant facility and the final step in handling the Gases produced and separated by various means so they can be Reconstituted as usable Chemical Liquids. This plant would probably be located in one location as a large "Hydrocarbon Refinery" comprising the Encapsulated Fire Reduction and Gasification processor. The Cryogenic Gas Reconsitituion operation would be here too.

The Current Processes for Coal Reduction

There are three fundamental ways currently known for converting coal into desirable liquids and gaseous fuels: (1) removal of carbon to alter the hydrogen-to-carbon ratio—known as Pyrolysis; (2) the addition of hydrogen to alter ratio of hydrogen to carbon—known as Hydroliquefaction; and (3) the Synthesis of Hydrocarbons from carbon monoxides and hydrogen using the Fisch-Tropsch technology. Raw coal has a carbon-hydrogen ratio less than unity while 2 parts of carbon to 15 or more of hydrogen are needed for a proper liquid fuel.

The Fire-Reduction Process of this Invention

The process of this invention for Vacuum-Encapsulated Fire Reduction or the atmospherically controlled carbonization of coal as briefly described in this invention and in my prior U.S. patent application Ser. No. 08/190,754 can function to qualify under all three of the conditions described in above procedures.

The Sub-Sonic Shock Steam Reforming of this Invention

With the Hydrocarbon gases derived from the Sub-sonic Shock Steam Reforming of Waste Plastics using the process of this invention, liquefication can provide the additives required for raising the Hydrogen levels in a Soft-Char by-product taken from Low-Grade Coal.

Opportunities in Coal Products

Thousands of products can be derived from coal. These exist in the low-grade coal as well as the coals approved by EPA for consumption. The processes of this invention teach methods for the reduction of low grade coal to separate the chemical constituents as gases, liquor and tars, leaving a soft char residue. Using the very low cost waste plastic as feedstock in a secondary Sub-Sonic Shock Steam Reforming facility, an array of Hydrocarbons are provided for use as additives to enhance the burnability of this soft char. The Btu levels of a liquefied coal with these additions can be made equal to a fuel oil or natural gas so the liquid-soft-char mix converts to an effective liquid coal fuel. The low-grade coal residue also converts with this procedure into an easily transported power plant pipe-line coal liquor. Other products growing out of the waste plastic conversion, together with the gas chemicals derived from the coal reduction process, provide the basis for an entire spectrum of marketable items, making these integrated processes and the variable and cross-tie relationships within them, what is in effect the basis for the establishment of a Hydrocarbon Refinery that functions totally unlike a Petro-Chemical Refinery which has total dependence on crude oil as a feedstock.

Coal Refining Products

Two forms of "carbonization" are used in coal reduction processing: (1) high-temperature procedures (900–1,200 degrees C.) and (2) low-temperatures (500–750 degrees C.).

Unlike coking, the processing of low grade coals to extract the sulfur, water and chemicals is conducted with a low temperature procedure, but this is followed with super-heating of the extracted gases to very high temperatures so that almost all the material extracted as solids or liquors can be converted to gases. The Fire Reduction process of this invention comprises both of these carbonization forms.

Crude Tar

This is the gross tar after separation from the ammonia and other gases that are distilled away in a procedure called "topping". This drives chemicals out and leaves a high-boiling viscous tar. Typically the distillate from this operation has an upper boiling point of 250 degrees C. and contains, (1) phenols as tar acids, (2) naphthalene, which is most prevalent (6–10%), (3) pyridine-type bases (tar bases) and (4) neutral oils.

Tar Acids

These represent about 1.5 to 3% of the coal tar and are recovered using a caustic solution to extract the chemical oils. The aqueous layer is separated from the dephenolized (acid-free) oil. The phenols are recovered from the crude form of acidification (springing) of the aqueous solution, usually by injecting carbon dioxide, followed by gravity settling. The crude phenols then are fractionated to obtain phenol, creosols and the higher boiling phenols (mostly as xylenols).

Tar Bases

Aqueous solutions of mineral acids are used to extract these from the dephenolized oil. In the European practice, topping is carried out so that several fractions are obtained:

carbolic oil that yields phenols and lower-boiling bases and naphthalene oil from which napthalene is recovered by crystallization. The Tar Bases form water-soluble salts with mineral acids which are separated from the oil. They are recovered from their salts by contacting with aqueous alkali (springing) and separating the crude bases from the salt solution. The lutidines constitute the major part of the lower boiling bases.

Solvent Naphtha

The lower-boiling fraction of the neutral oil is a very powerful solvent, particularly coatings containing coal tar and pitch. The material is also a source of unsaturated compounds such as indene and, in a small amount, coumarone and the homologues of these compounds. Resins are formed in situ from these when solvent naphtha is treated with Friedel-Crafts type catalysts. These are resins used in inexpensive floor tiles and coatings.

Naphthalene

This compound is marketed principally for the production of phthalic anhydride. It is sometimes concentrated by distillation, and the oil is worked up by crystallization. It can be isolated by careful fractionating and the product is usually measured for purity based on freezing point (80.3 degrees C.).

Topped Tar

This is a tar used for highway construction. It is the residue remaining from the topping operation to remove oils.

Creosote

This product is derived from a distillation process in the refinement of topped tars. It is largely used as a wood preservative. A number of products can be extracted from creosote with great difficulty but the fractions are so small as to make the processes unprofitable. One of these, Anthracene, is the exception and is a colorless, crystalline tricyclic hydrocarbon obtained in distillation of the coal tars. It is obtained from a coal tar fraction that is a heavy green oil and, when pure, is luminescent.

Pitch

This product is a black shiny tar that is hard when cool and has a variety of melting points, so it is usually evaluated based on a "softening point". It is the tank bottom in Creosote distillation.

It is noteworthy that most of the processing procedures described here with respect to coal refining products could be produced by the hot gasification, molecular weight selection and cryogenic liquefication methods and apparatus of this invention without the involvement described.

The exception is the initial extraction of liquor and tar from the front end process. The difference in the existing processes and the one of this invention is the emphasis upon intensifying the liquor by continuous recirculation and progressive evaporation so the vapors and gases can be driven off to the gas process phase, leaving a minimum of liquor and tar to be handled in the conventional manner as described. Ideally almost full distillation would be the final goal.

*Data taken from Van Nostrand's Scientific Encyclopedia, Sixth Edition, 1983

Coal Processing Detail

Low grade coals are usually high in sulfur content and water, but the heat energy required to reduce this coal and extract the constituents is prohibitively expensive with the present coking or other pyrolizing systems as now practiced.

The method described in my copending U.S. patent application Ser. No. 08/190,754 is a process method series with forms of apparatus that can be economically used for such extractions.

In the reduction portion of this process the feedstock of low grade coal is pulverized and extruder fed as a large tubular shape into a long perforated tube. The inside diameter of the coal tube form is lined with a second thin clay/silica extrusion coat that serves as the encapsulating flame insulator and heat conductor. This permits direct flame exposure. An intense fire is driven through the center of this tube by Ramjet means to provide flame circulation and heat a holed ceramic radiator in the tube center. Sulfurs are captured in a high specific gravity liquor topping a tar product. A soft-char-carbon residue is the final "by-product", unlike the usual coke, which is the "prime product" associated with normal coal reduction. This hot coal-char tube is broken up and cooled with water jets to produce a "water-gas" or "blue-gas" which is primarily

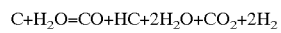

$$C+H_2O=CO+HC+2H_2O+CO_2+2H_2$$

This is used to augment the natural gas/oxygen fuel combination used in the system.

Chemical gases driven off the heated coal tube-form as it is rising in the column of this process escape through openings in the perforated support tube into a super-heating chamber from which they pass in turn to a dry cleaning procedure. This gas mass is then separated by molecular weight division using a variety of optional means. These include thermal, centrifugal, cyclotronic and magnetic processes. A cryogenic liquefication means provides a way to combine this variety of separated gases into various chemical compounds using metered measuring procedures. These processes and the associated apparatus are described in some detail in my co-pending U.S. patent application Ser. No. 08/190,754.

The Ammonia Liquor as produced in the coal reduction process is handled in a relatively normal manner, but with emphasis on recirculation through the heat and stack scrubber until a very intense high specific gravity liquid is produced.

*Ammonia $NH_4$ is recovered in a variety of ways, including a Direct Method in which the vapor form above the liquor is captured from downcomers and trunks to pass through a saturator containing Sulfuric Acid for absorption. A so-called Indirect Process comprises scrubbing with water and distilling in recovery of ammonia which can be used, or a system called a Semi-indirect Method can also be employed.

The weak ammonia liquor accumulated at the top of the bottom tar tank, when heated, provides disassociation and creates "free ammonia". "Fixed ammonia" requires a strong alkali for displacement and this operation is carried out in an Ammonia Still to take ammonia from this source as well.

A constant head tank provides a supply and uniform flow at the top of the still's "free-leg". Flow is down through bubble-cap plates against a steam stream providing heat for vaporization of the ammonia and some acidic gases. Liquor leaving the Still base passes to a calcium hydroxide "milk-of-lime" tank where the "fixed" ammonia salt has the following reaction:

$$2NH_4Cl+Ca(OH)_2=Heat=2NH_3+2H_2O+CaCl_2$$

Vapors leaving the Still are added to the venting gas stream and recovered in Ammonia Absorbers. Here, dilute sulfuric acid sprays the rising gas to form ammonia sulfate.

Crystals form and a slurry is pumped to a tank where the salt settles. The liquid overflows back to the ammonia absorber and the ammonia sulfate is dried to about 0.1% or less water fraction.

Weak ammonia liquor also yields a Phenol or Carbolic Acid when scrubbed as it flows down against an upward flow of Benzene or light oil. The latter rises to the top carrying the Phenol, and the remaining ammonia liquor passes out the bottom and back to reservoir.

The Phenol bearing oil or Benzene is passed through ceramic ball packed tower tanks of a caustic (Sodium Hydroxide) which reacts with the Phenol acids.

After a period of time a Sodium Carbolate product results which is boiled to remove entrained solvent and moisture. It is then neutralized with $CO_2$ to free crude Phenols and Phenol Homologues.

The Benzene or light oils are released and returned to the process where they are processed separately. They represent about 20 pounds per ton of coal processed. The Benzene represents about 60 to 85%, Toluene 6 to 17%, Xyene 1 to 7% and Solvent Naphtha 0.5 to 3%. There are about 100 minor constituents that require extreme processing procedures to extract by conventional means. However, with the hot gas extraction process of this invention followed by division based on molecular weight and reconstitution as liquids with cryogenic means, these recoveries should be significantly greater and the processing greatly simplified.

The intense Ammonia Liquor process and piping is illustrated as a part of the recirculatory function of this invention. The subsequent ammonia liquor and light-oil processing is described above to demonstrate a normal follow-on process to produce these products which would be largely supplanted with gas extraction procedures of this invention.

*Data from The Shaping and Treating of Steel, USS Corp. 1971

The intent of my invention is to create a dense liquor above the tar reduction and to continually recirculate this so the vapors are constantly accumulated and driven into the super-heated gas stream. In this way virtually all of the constituents can be recovered with far less complication using the means for gas molecular weight division and reconstitution as liquids with the Cryogenic means as described in my co-pending U.S. patent application Ser. No. 08/190,754.

Waste material of all types, as well as coal, can be treated in this process and subjected to the same high temperatures. The feedstock must be pulverized or otherwise reduced so it can be extruded. The clay/silica insulator would require formulation adjustment for different types of feedstock, rubber, garbage, waste carpet, hazardous material and the like.

Chlorine Extraction from Waste Hydrocarbons

With a minimum temperature of 1,000 psi steam at 544.61 degrees F. a threshold of saturated steam high enough in thermal value to convert readily and intermittently a super-heated steam with the high compression needed to reform a waste plastic using a detonated fuel gas to drive two or more special high velocity pistons against two or more rams located between the pairs of said rams to compact this isolated increment of the said super-heated steam and a waste plastic feedstock. At the starting saturated steam temperature of 544.61 degrees F., this sub-sonic shock force can overrun the injected saturated steam to reach a potential of 3,000 psi, 695 degrees F. in the steam/gas held in the space between the rams to reform and gasify the waste plastic.

Some waste plastics contain chlorine. During the shock process the chlorine present converts to HCL liquid.

As this shock happens a +Hydrogen Ion $H_2O+$ or "Hydronion Ion" momentarily captures the negatively charged Chlorine Ion and then dies, with the result that the Chlorine gas is broken free from the Polyvinyl Chlorides and like plastics that make up the polyglot waste plastic mix when the unseparated material is used. In this way the Hydrogens are freed from Chlorines which inhibit burning. The by-product would be HCL gas initially and with condensation would become liquid HCL acid. An adjustable high pressure relief valve at the bottom of the cylinder permits the flow of Hydrocarbons, HCL gas and other gases to a secondary pressure chamber and through an orifice into a larger space. A Nickel or other catalyst presence is provided in this pressure chamber and following chambers as required. The orifice into the expansion tank provides a cooling function to bring temperatures down to those associated with normal reforming processes. The following tower chamber is a conventional apparatus comprising a tall tube with gases entering at the bottom. It can function as a fractionating tower with bubble caps at ten to twelve levels in a range of three to four feet in height space. Taps at these levels permit testing of the fractionated gases so that the tap levels can be determined for a respective feedstock for recovery of the desired fractioned product.

Gases can be converted to a simple hybrid alcohol liquid with the only fractions deleted being $CO_2$ and HCL gas which, because they are heavy, can be readily separated. The gross hybrid gas when condensed as a liquid is a mix of alcohols quite suitable for the addition to mix with the soft-char of the low grade coal fire reduction process. This additive can provide the Hydrogen Btu enhancement needed to match combustion performance of fuel oil.

Fractionated, this hybrid gas separates into the saturated Hydrocarbon Alcohols present in these plastics.

Selective use of proportioned amounts of specific waste plastic material make this latter type of processing much more effective in developing an alcohol series with minimum of reprocessing requirements. This overall process is dedicated to the use of waste material and creates products that can be profitably converted from that waste.

It will be noted that the sum of these processes uses the Waste Glass (silica) for the liner inside the extruded coal or waste material tube. This is ground to a powder and with the addition of No. 6 clay forms the conductive insulation that prevents total burning of the feedstock materials. Use is made of the Waste Plastics for the alcohol production and the Waste Newsprint paper for the fuel for the steam and electrical power generation. The Water-gas from cooling the Soft-Char residue, from whatever feedstock is used, provides most of the fuel for the Encapsulated Fire Reduction Process with some augmentation using natural gas and oxygen. Finally the Soft-Char and the Alcohols are combined to make a liquefied Coal Fuel.

Feedstocks other than the Hydrocarbons of waste plastic can be used in this process as well. The reforming function described here can apply to any material that will lend itself to chemical change under the conditions of pressure and heat in the presence of steam as described re the Sub-Sonic Shock.

This type of Steam Reforming can be applied as part of a process for reforming Stack Gas, Natural Gas or Naphtha to a Methane, as an example. It can also be used for the very high pressure "squeezing" as applied to $H_2$ and $O_2$ for the formation of a rocket fuel.

SUBSONIC STEAM REFORMING APPARATUS

In the preferred apparatus form of the piston, a ball approximately ⅓ the diameter of the piston is trapped inside the piston and it functions not unlike a piston itself as it moves almost the length of the piston in either direction along sealing surfaces. It is driven against the stop seals after moving in either direction as driven by gas combustion or steam expansion. Its opposite holed end drives over a smaller diameter piston or ram to amplify the force of the combustion, steam or explosive charge. The said smaller ram-piston opposite ends are shaped and fit within a second smaller cylinder space or chamber containing a sealed in chemical gas increment against which all the force is applied from two or more directions. Depending upon the size variations in these pistons, this ratio of compression increase is limited only by mechanical considerations.

Piston/Cylinder and Ram Shock Compression

The piston/cylinder forms can have multi-annular planes that engage to provide a plurality of compression spaces, one for air, another for pre-pressurizing feedstock and another for steam if desired. The piston's return stroke against a small ram piston at the opposite end of the cylinder can provide the means for compression of an isolated increment of fuel gas in the combustion system. The speed of piston impact is critical to the shock required in creating a hydro-cracking condition which is the reason for opposed pistons and their simultaneous impact. The addition of each piston pair multiplies the shock. One pair opposed provides a 2× factor. Six pair, radially arranged around a common center, provide a 12× factor, and the plurality of compression impacts can reach the equivalent of a projectile moving at 5000 feet per minute.

The large outside diameter of the piston is the area against which combustion or steam expansion pressure is applied for its drive against relief ball checks that control movement of gases from one position to another as pressures change in response to piston motion.

The Nucleate Bubble Piston Float

To achieve this high velocity, perforation holes in the piston wall are used to allow high pressure gas or steam to be delivered from the piston interior to the annular space between the piston and the cylinder. This space is normally a close slip-fit, but here it is approximately twice that of a normal piston/cylinder tolerance so a sufficient area is provided for nucleate bubble formation and expansion.

"By-pass slip" has always plagued piston cylinder designers. Great effort is made to achieve very close tolerances. Piston rings are employed with overlapping sections and other means have been tried, but largely to no avail. The slip persists because hot surfaces are hard to lubricate and wear develops that aggravates the problem. Here, the Inventor is using the inescapable by-pass phenomena to advantage with elimination of lubrication needs and wear.

With piston cylinder temperatures at or near superheat levels in the body of the unit as created by the driving force of steam or the combustion gas, as well as the heat of compression at the reforming center, this combination of heat sources create a heat-machine. The use of this heat and its control, as it affects the interfacing temperature of the piston and cylinder surfaces, is critical to the generation of annulus space condensation between the piston and the cylinder walls as required for bubble formation and explosive expansion associated with the capillary type of steam feed to the perforations on piston surfaces.

The pressure is used on either end of the piston to feed a minute volume of steam through a plurality of small ports that deliver from the piston center or rims to the outside diameter. Tiny nucleate bubbles of steam gas emerge from the piston outer diameter ports or perforations to form elongated bubble shapes as they expand and are drawn out from their normal spherical shape because of the piston motion.

Explosive Support

The effect of these expanding bubbles is that the pressure exerted in this space causes the piston to be held at the center of the fit. As the bubbles try to escape to the piston ends, they tend to roll or be drawn toward the trailing end of the piston. A slight taper on the piston end of 2° to 5° provides a light driving force adding to the piston movement in the direction that the piston is driven.

Friction is eliminated as the free piston, unencumbered with rods or cranks, glides on these gas bubbles in this laminar film that is in a changing state. The minute laminar film volume at these temperatures break apart into discreet spheres that close against one another and try to move through the finite gap at the piston ends. They also tend to seal the perforations intermittently against further gas escape before each one breaks off at a perforation.

It is well-known that when superheated vapor is exposed to a cold surface below the steam saturation temperature surface, condensation takes place. This water formation helps to seal the perforations against escape, but as noted they separate into pressurized ball bearing-like bubbles. These nucleate steam bubbles form because of a difference in temperature between the cylinder wall and the piston surface. This difference is critical and maintained with use of water-mist fed attemperation means.

A simple demonstration of this phenomena is shown by placing a short 1" round of steel on a flat end in the bottom of a water kettle. As the water reaches the boiling temperature, the confined space under the billet reaches a boiling state of nucleate bubble formation before the rest of the water boils. A slight push sends the billet "skittering" across the kettle bottom.

There has been considerable study of Nucleate Boiling growing out of attempts to eliminate this bubbling in boiler tubes. In the course of this, it has been found that bubbles occur over openings and even scratches or minor surface imperfections. The bubbles grow in proportion to the size of the imperfection or hole. The openings or perforation used in this invention must be large enough to be produced with conventional machine tools (chemical procedures have drawbacks) and with holes as small as possible. Here the range should be in the order of 0.020 thousandths of one inch to 0.050 thousandths of one inch in diameter.

Piston Check Valve "Ball" for Shock Control

As the piston stroke ends against the ram extension of the smaller ram mentioned above, it moves through a slip fit opening in the piston center against the internal movable ball backed by the gas driving force which is expelled through a small orifice. The ball has an excursion almost the length of the piston between two ball-seat seals at opposite ends of the bore. This impact against the ball moves it along its path against the gas pressure to cushion the contact with the seal at the bore's opposite end. This absorbs some potentially destructive shock, but the main piston's motion continues as the ball is held between the seal and the ram face as the small ram piston reverses direction so its opposite shaped end telescopes into the feedstock/steam volume space finally to arrest the main piston's travel. This force is compounded by a like opposing ram piston functioning in an identical manner on the opposite end of this said feedstock/steam compression space. If the radial assembly form is used, the force is multiplied more and the newly compacted gas is expelled past the pressure relief valve at the center that opens to a catalyst reactor above.

Like the primary piston, the smaller ram or piston has the perforated surface fed by pressurized steam from center porting. These perforated surfaces in both piston/ram forms are provided in a sleeve that encloses the piston periphery and is supported by a finely threaded surface on the outside diameter of the piston body. These threads have longitudinal cuts through their land tops that open to bored cross-holes, meeting one or more axial parallel bores that receive the delivery of the pressurized steam from the piston ends. The linear grooves across the supporting threads run parallel with the axis of the piston as well.

This does create a potential for minor additional by-pass, part of which must occur in any event, depending upon the piston/cylinder fit. This is particularly true when very high temperatures and pressures are involved, even when all the material is of a like alloy. However, in this case, some by-pass of steam or a combustion gas is not important because the piston is totally isolated from the feedstock material.

As noted earlier, the procedure eliminates the need for delivery of lubrication common in such devices.

The primary objective in the design of this apparatus is to achieve the utmost in self-contained design simplicity; therefore the preferred circuitry and electrical controls are remote to the apparatus which is too hot for such attachment.

The monitoring and control of the free piston travel is critical. Primary control in the preferred method of this invention is use of an optical system that passes a light beam delivered from a laser through the cylinder and across the piston path to impinge on sensing equipment placed a short distance from equipment and behind heat shields.

Optical Control

A laser or strobe light beam can pass directly through the cylinder wall with use of very small and aligned platinum/kovar mounted quartz rods used as windows.

Ceramic windows could serve in sonic applications. This remote monitoring means eliminates heat exposure to the sensor and control apparatus. Saturated steam is transparent and the inventor believes the thin veil of combustion gas as burned using natural gas is also nearly a clear medium when fired. With gas combustion, a polished piston body reflects light back through the same window, or doppler sensing can be employed with a piston moving at these speeds and breaking the light with hundreds of minute holes breaking the polished surface's reflections as dark non-reflecting voids that can work as a multiplexing function.

At least three stations are required for each cylinder enclosing a piston. The number depends upon the length of stroke. Interruption of these beams or reflection from piston velocity provide means to measure speed and position as pulses are generated when the piston passes in either direction. These are used to time the opening and closing of conventional electrical circuits that in turn control valves, the ignition in a combustion unit, and maintain a clock function. The plurality of pistons are controlled by valves with a remote computer circuit so the pistons receive the ignition or steam burst driving force stimulus simultaneously, and the exhaust in either piston direction is done with progressive valve opening ahead of the piston on the driving stroke for maximum velocity and on its return stroke as well.

Mechanical Control

Mechanical spring-loaded and direct mechanical contact means can be employed with a sacrifice in piston velocity because of the slow spring reaction and the complexity of apparatus. However some of these are described and illustrated.

Several port positions are also provided for instruments in each module (it is anticipated that four would be located on a common circular line at 90 degree intervals in each module) so temperature and pressure data can be sent to a remote computer to trigger automatic ignition cut-off or steam injection if readings exceed settings. There is no need for ignition control parts integral with the combustion unit other than a form of high temperature sparkplug.

Steam Throttle

In the steam drive, a four-way valve on the steam input is used to control the speed of a separate unit housing a rotor driven by the steam passage. An extension of the rotor incorporates a rotary valve that intermittently allows steam to pass in simultaneous bursts to the two opposed pistons. Here the computer circuit control loop monitors the piston return to the starting position and adjusts the steam input that controls the speed of the rotor to open and close flow in maintaining synchronization. Bursts of steam are timed and counted for synchronization and integrated with the reading of piston speed and position by the computer.

The exhaust ports can be opened and closed by the sliding fit of shaped rods passing the length of the cylinder and actuated by external air controls driven by the optical means described. Or the piston moving against return springs at the ends of the cylinders can be used. These can have slot openings that open to the ports desired when moved for the exhausting or delivery of pressurized steam and for gas to the positions desired. Optionally spool valve rod extensions can be attached to the pistons themselves and also serve to keep the piston keyed or timed at one radial position while opening and closing the exhaust ports. Two spool valve shafts can be optionally attached to the piston permanently, or are spring returned against the piston end as it moves away. Again these are subject to the spring return time factor and the potential for leakage under the extreme heat conditions and essentially awkward to use.

Therefore the optical timing with the laser beams is preferred, but Sonic and even Magnetostrictive devices may effectively be employed for piston position and speed determination.

Velocity

A prime factor in the success of this system is achieving maximum velocity in the piston and a sharply defined impact against the feedstock/steam. To do this, the feedstock must ideally be pre-pressurized to be equal to that of the injected steam and be isolated in a chamber outside that of the cylinder space in which the piston is moving. If feedstock is injected directly ahead of the piston, the velocity is lost. A free-piston lacks the constant crank rod push of a conventional compressor and is dependent for velocity upon the explosive force or the drive of expanding steam to propel with a single push. With the elimination of friction using the said nucleate bubble-bearing means and almost zero back pressure with use of progressive exhaust valve opening, the free piston can exceed the velocity achievable by any other mechanical means and impact with great force.

Piston Moves Against Zero Pressure

If this were done using rotary port valving means with varied sizes in porting and variations in port positions with a rotary means, it would be possible to adjust the feedstock volume progressively as the piston moved against it. However there would still be an increasing volume of feedstock and back-pressure impeding the velocity. Ideally as the energy imparting piston is traveling it should move against zero pressure.

With sacrifice of the "zero" piston velocity, air, gas and steam pressure can be maintained and delivered with a different main piston and cylinder geometry. This is done using both opposing pistons, and the three pumping functions are accomplished by the closing of annular planes telescoping over one another as the pistons move with each drive stroke. Compressed air for valve control and the like is better provided with a dedicated compressor and not to involve the feedstock compacting, so the benefit of the zero back pressure feature is retained.

It is apparent that the power and energy requirements to drive a piston with minimum friction, mounted horizontally in a cylinder with little pressure impeding its travel, will require a fraction of that required in driving a normal compressor. In this method, the power delivery is in the piston weight and velocity as it impacts with iother shock obsorber ram pistons of smaller or larger diameter depending upon the function.

Treated water is introduced as a mist in the flash steam generating system using attemperation injection means that provide temperature and pressure control of this steam system encasing the cylinder and reactor adjoinment. In the steam system this jacket of saturated steam cools the cylinder walls so condensation can occur on these surfaces for facilitating the slip nucleate bubble formation and the slip function.

In the gas combustion driven unit, flash-generated steam from the two exhaust manifold coils is driven into cylinder jackets to add heat and, while very hot, its temperature is a marked change from the superheated steam that has just been passed to the feedstock section. This creates a lower temperature steam addition that controls heat build-up. A temperature between 650 and 1,000 degrees F. is to be maintained in the overall body of the unit with a pressure in the range of 1,500 psia to 2,000 psia.

In the steam-driven version the exhaust steam return functions in a like manner.

The center portion of this apparatus comprising the ram receiver assembly and feedstock/steam collection or High Pressure Receiver Chamber is a massive structure because of shock impact and the violent compacting and compression of the gas at this center point.

Delivery of volumes of gas, steam and air are orifice- and pressure-controlled as the piston moves to drive the high pressure gas/steam combination through the main high pressure relief valve that serves all of the units and beyond to the steam reformer and catalytic reaction means. All of this close coupling of apparatus is done in an effort to conserve free energy.

The escape of the high pressure gas lowers pressure momentarily in the feedstock space. As this pressure drops, steam and gas move in from the higher pressurized storage spaces through a pressure relief valve series, working in the opposite direction of the first, to re-charge this compression space. Valves are changed with openings and closures as steam is injected to finish the stroke cycle with the main piston return. Control of pressures using imbedded relief valves to monitor gas pressure, steam pressure, and feedstock gas pressures are mechanical and constructed of a metal that can withstand the unit's internal heat. The imbedding feature eliminates pipe radiating surfaces and helps in the close coupling free energy conservation.

Speed of firing is controlled by air delivered through needle valves which normally have a permanent setting and, with a constant controlled pressure at the fuel source, an optimum operating speed is maintained.

As noted earlier, the steam-driven unit receives modulated steam bursts from a steam-driven rotary valve controlled by the computer/laser reading of the piston positions in the cylinders. In summation: The method and apparatus of this invention provides a high energy input to build high pressures in close-coupled apparatus that adjoins a reactor that it supplies with heat and steam plus shock pulses transmitted directly to the reactor content providing a fluid-bed stimulating exothermic heat that is recovered and converted to steam as the compacted gas pulses are driven through the reactor at high temperatures and pressures for continual heat generation in the creation of an "unstable state gas reaction" followed by cooling, liquefication and division of the reacted product into parts of different molecular weight.

The preferred apparatus form of this invention comprises opposed cylinder/piston pairs axially aligned with a common but isolated center compression space. The pistons are propelled by a hydrocarbon fuel combustion like natural gas, or producer's gas.

Also high pressure steam expansion can be employed for this driving force.

In the multiple compression form of this invention, the piston geometry has a plurality of diameters, one an inside diameter approximately one-half to one-quarter that of the other which is at the combustion or driving diameter of the piston. This small inside diameter is forced over a ram form that is fixed, or movable and backed against gas pressure. These rams extend oppositely as a pair on the common piston/cylinder axis from both sides of a large hexagonal form that houses porting and pressure-responsive adjustable relief ball checks that control movement of gases from one position to another as pressures change in response to piston motion. This center unit, because of its six sides, can service six piston/cylinder units working simultaneously to deliver feedstock to a common chamber at its center.

In the preferred apparatus form of the piston, a ball approximately ⅓ the diameter of the piston is trapped inside the piston as described previously.

The piston/cylinder form can have multi-annular planes that engage to provide a plurality of compression spaces, one for air, another for pre-pressurizing feedstock and another for steam as described earlier.

OBJECTS OF THE INVENTION

HIGH PRESSURE EXTRUDER

An object of this invention is a Dual Extrusion High Pressure Extruder for the extrusion of a feedstock material into a direct flame/fire reduction process for reduction of a pulverized mass tubular content to extract gases and liquors for subsequent gas processing.

An object of this invention is a Dual Extruder Nozzle Form for placement of an Inner Tube Fire Resistant Insulation Extrusion inside a Feedstock Tube for the protection from the direct flame/fire application in a reduction process used for reduction of a pulverized mass tubular content to a carbonized product to extract gases and liquors as by-products.

An object of this invention is a Dual Rotary Extruder Nozzle form for placement of an Inner Tube Fire Resistant Insulation Extrusion inside a Feedstock Tube for protection from a direct/flame fire application in a reduction process for reduction of a pulverized mass tubular content to a carbonized product to extract gases and liquors as by-products.

An object of this invention is a Static Extruder and Nozzle for the extrusion of a feedstock material into a direct flame/fire reduction process for gasifying of a pulverized mass tubular content to extract gases and liquors for subsequent processing.

An object of this invention is a Rotating Extruder and Nozzle for the extrusion of a feedstock material into a direct flame/fire reduction process for reduction of a pulverized mass tubular content to extract gases and liquors for subsequent processing.

An object of this invention is Multiple Extruders Feeding One Common Nozzle for the extrusion of a feedstock material into a direct flame/fire reduction process for reduction of a tubular pulverized mass content to extract gases and liquors for subsequent processing.

An object of this invention is a Vacuuming Port for the Feedstock at the Extruder Nozzle for the air evacuation of an extrusion of a feedstock prior to injection of chemicals or gas into this evacuated interstices of the said feedstock as it passes through the nozzle into a direct flame/fire reduction process for gasifying of a pulverized mass tubular content to extract gases and liquors for subsequent processing.

An object of this invention is a Rotary Vacuuming Port for the Feedstock at the Extruder Nozzle for the air evacuation of an extrusion of a feedstock material prior to injection of chemicals or gas as the said feedstock is passed into a direct flame/fire reduction process for reduction of a pulverized mass tubular content to extract gases and liquors for subsequent processing.

An object of this invention is a Gas Injection Port for input to Feedstock at the Extruder Nozzle as an addition to the feedstock material prior to the said feedstock passage through a direct flame/fire reduction process for gasifying of a pulverized mass tubular content to extract gases and liquors for subsequent processing.

An object of this invention is a Rotary Gas Injection Port for input to Feedstock at Extruder Nozzle as an addition to the said feedstock material prior to the said feedstock passage through a direct flame/fire reduction process for gasifying of a pulverized mass tubular content to extract gases and liquors for subsequent processing.

An object of this invention is a Fuel Injection Port for input to Extrusion Center at Extruder Nozzle of a fuel for the Center Fire inside the feedstock as the heat source in the fire reduction process for gasifying of a pulverized mass tubular content to extract gas and liquors for subsequent processing.

An object of this invention is a Rotary Fuel Injection Port for input to the Extrusion Center at Extruder Nozzle of a fuel for the Center Fire inside the feedstock as the flame heat source in the direct flame/fire reduction process for gasifying of a pulverized mass tubular content to gas and liquors for subsequent processing.

An object of this invention is a Fire Tube Flame Injection for input to Extrusion Center at Extruder Nozzle for the fuel ignition at the Center Fire inside the feedstock as the heat source in the direct flame/fire reduction process for gasifying of a pulverized mass tubular content to gases and liquors for subsequent processing.

An object of this invention is a Rotary Fire Tube Injection to Extrusion Center at Extruder Nozzle for the fuel ignition at the Center Fire inside the feedstock as the heat source in the direct flame/fire reduction process for gasifying of a pulverized mass tubular content to gases and liquors for subsequent processing.

An object of this invention is use of Streamlined Piping over which the extrusion passes in the preforming of the tube followed by full closure provided by diameter reduction in the die form so the feedstock fully compresses as the extrusion is reshaped after moving over the Streamlining of the Pipes or Tubes that have passed the Fuel and Flame for the ignition and sustaining of the Center Fire inside the feedstock as the heat source in the fire reduction process for gasifying of a pulverized mass tubular content to gases and liquors for subsequent processing.

An object of this invention is that a Rotary Extruder Nozzle with multiple ports be enclosed with annular rings on the ends of which are mounted to the Nozzle body using Rotary Carbon/Carbide Faced Mechanical Seals providing intermittent access through a single port in this said annular ring as the plurality of transversely aligned ports in the rotating nozzle pass this opening providing the access with minimal leakage.

VACUUMING A FEEDSTOCK MATERIAL

An object of this invention is that Porting Shape and Form for Vacuuming Extrusion be of a louvered form with slats or slots arranged so the rectangular openings to the vacuum are placed at right angles to the axis of the extruder and with the slat divisions separating the plurality of slots arranged so they are placed at a 30° to 45° trailing angle to the direction of the extrusion so the feedstock material cannot be plowed or drawn into the vacuum system.

An object of this invention is that Hard Pipe Connections be the mounting means of preference even when the Extruders are of rotating design in which case piping is to an external annular static ring as the prime mounting means supporting the internal nozzle on rotating seals and bearings held in this mounting.

THE INTERMEDIATE EXTENSION

An object of this invention is that an Internal Involute Helical Gear Form Die be mounted inside a short extension tube that is powered to rotate at a low speed while axially mounted on rotary or static extruder nozzle delivery end so this die encloses the extrusion briefly in its passage from the extruder nozzle, forcing it over the helical gear teeth form that causes it to twist and turn in this passage as the teeth impress their form into the outside diameter of the extrusion before it enters the wide tapered opening of the faster rotating Absorber Receiver Tube, so the slower rotation of the Intermediate Extension and the gear tooth tops gradually engage this taper to be compressed back into the extrusion body as this taper reduces; all of which provides a clutching action to bring the extrusion up the high speed of the Absorber Receiver Tube.

An object of this invention is that with use of a Static Intermediate Extension that contains the Internal Involute Gear Form mounted inside a short extension tube that is not rotated but is axially mounted on a rotary or static extruder nozzle delivery end so it encloses the extrusion briefly in its passage from the extruder to forcing it over the helical gear teeth to twist and turn it in this passage as the teeth impress their form into the outside diameter of the extrusion before it enters the wide tapered opening of a slowly rotating Absorber Receiver Tube, where the gear tooth form gradually engage this taper and is compressed back into the feedstock body by the taper reduction which provides a clutching action to bring the extrusion up to the speed of the Absorber Receiver Tube's slow rotation.

An object of this invention is a Rotary Intermediate Extension that is powered to rotate at a medium speed while axially mounted on the extruder nozzle delivery end so the Internal Involute Helical Gear encloses the extrusion briefly in its passage from the extruder, to force it over the helical gear teeth, the helical angle of which causes it to twist/turn in this passage as the teeth impress their form into the outside diameter of the extrusion before it enters the wide tapered opening of the faster rotating. Absorber Receiver Tube, so the slower rotation of the Intermediate Extension and the gear tooth tops gradually engage this taper to be compressed back into the extrusion body as this taper reduces all of which provide a slipping engagement of the slower moving extrusion in a "potter's wheel" effect as it is shaped to finished tube form and comes up to the high speed of the Absorber Receiver Tube.

An object of this invention is that Speed Range Accommodation be a function of pressing the extrusion through an Internal Helical Involute Gear Tooth Die form so the tooth angle causes the formable extrusion mass to twist in the commencement of a turn, after which it enters the wide tapered opening of the faster rotating Absorber Receiver Tube where the gear teeth tops are squeezed back into the body of this malleable extrusion form with more twisting of the tube wall so this slower rotation is imparted to it by passage over this said die after which the gradual reduction of the reducing taper compressing the tooth form back into the extrusion body bringing the said extrusion up to the speed of the Absorber Receiver Tube.

ABSORBER RECEIVER TUBE

It is an object of this invention that a Reducing Taper Entrance for an Extrusion cause the formable extrusion mass that has previously made a partial turn as it moved over the helical gear die, now slips as it enters into the wide tapered opening of the faster rotating Absorber Receiver Tube but reforms as the extrusion's gear tooth outer surface is squeezed by the reducing taper to compress the teeth back into the extrusion body with the final production of a compacted feedstock tube form preparatory to fire reduction.

It is an object of this invention that a Friction Drive Effect for Speed Change be provided by the clutch-like friction imparted to the extrusion by the reducing taper of the Absorber Receiver entrance opening into which the extrusion is forced so the gradual friction increase created by the crushing of the gear tooth form on the outside diameter produces a twisting reformation of the extrusion wall in the accomplishment of the final feedstock tube form compacting with matching of the rotational speed of the Absorber Receiver.

It is an object of this invention that the Absorber Receiver Tube be a long tube in a range 50 to 100 feet and tube diameter be 12 to 24 inches with mounting usually vertical or steeply angled with retention in bearings and seal so it can be rotated at speeds ranging from 30 to 150 rpm while held in a stator-like Gas Collection Chamber, with the described taper opening at the bottom to receive the extrusion input and a top opening for expelling the carbonized product into a space with rotary bottom traps so gases and heats are retained at the top as produced with cooling of the carbonized product with steam sprayed producing a "water or producer's gas" suitable for use in the process as fuel while the broken coke or soft char carbon is dropped through intermittently opened traps to storage and further gas extraction below.

It is an object of this invention that the Absorber Receiver Tube be a long and large diameter tube usually vertically or steeply angled in bearing and seal mounts so it can be rotated at speeds ranging from 30 to 150 rpm in a gas collection enclosure and perforated for its entire length between these mounts and seals so that gases and liquors can exude from these said perforations when heat is applied at the center of the enclosed extrusion that is forced to pass the length of this Absorber Receiver Tube in the gasification of the said extrusion feedstock to a carbonized form to extract from it the gases and liquor by-products using this Absorber Receiver Tube.

It is an object of this invention that the Absorber Receiver Tube be constructed of a plurality of short thin wall Titanium tube sections weld connected with external collars, the upper planes of which are angled down in respect to the vertical or angular placement of the Absorber Receiver Tube, so that Liquors can flow over these and be thrown off the edges by the rotation to fall to the bottom of the Gas Collection Chamber.

It is an object of this invention that Absorber Receiver Tube Perforations be of small size and on close centers in the range of 1/8 inch to 1/4 inch diameter and spaced on 1/2" to 3/4" centers with the metal structure a thin wall high temperature corrosion resistant type as for example Titanium.

It is an object of this invention that Gases and Liquors Exude to a Gas Collection Chamber through perforations to the surrounding space enclosed by a large cylindrical holding the said Tube within this annulus space that is at least equal to twice the diameter of the said Tube held at each end with bearings and seals at the top and bottom of the said Chamber so the said Tube is freely rotated inside this stationary said Chamber as the fire driven by-products gas-out through the perforations as partly influenced by the centrifugal force of the rotation imparted to the Absorber Receiver Tube.

It is an object of this invention that Absorber Receiver Tube Bearings and Seals Mount provide adequate means for support of this Tube when driven to speeds as high as 150 rpm so there is a centrifugal influence on the liquors and gas exuding from the perforations as driven from the Extruded Feedstock held against the inside of Absorber Receiver Tube enclosing walls by the centrifugal forces of this rotation.

It is an object of this invention that injected Carbon Dioxide Gas Cool Seals and Bearings be utilized to prevent damage to these components with means to inject compressed $CO_2$ into bearing and seal spaces as provided in these while the whole assembly is enclosed with means to capture and recompress the spent hot gas for recompression.

It is an object of this invention is that an Absorber Receiver rube Variable Speed Drive be a "silent chain" form used with a cold water/oil coolant used to flow across its return length for cooling the chain links followed with added means to air-knife blast the excess coolant from the chain to prevent carbon formation and in this way prevent heat build-up in this driving member.

It is an object of this invention that a plurality of Steam Jet Scrubbers Nozzles be mounted and directed to blow a plurality of thin wide lines of steam at saturated temperature across the two sides of the outer wall face of the Absorber Receiver Tube and in a common clock-wise direction so these blow off and cut away the accumulating gas and liquors exuding from the perforations while at once reducing the perforation wall temperature several degrees below that of the feedstock on its opposite side.

It is an object of this invention that a Temperature Difference Serve as an Attraction means for the hot gases migrating out of the feedstock in that generally heat moves to cold and here the Steam Jet Scrubbers maintain a cooler perforated outer face to attract the hot gases and liquors of the higher temperature extrusion interface with the Absorber Receiver Tube wall.

It is an object of this invention that a Soft Char or Coke Top Delivery be done by breaking the extrusion tube carbon off in specific sizes as it extrudes from the top end of the Absorber Receiver Tube where it is caught in an enclosed chamber equipped with a bottom trap means so it can be steam-cooled for producer's gas recovery and vacuumed off alternately with timing when the bottom trap openings are closed after dropping a batch of steam-cooled carbonized product to storage and further gas recovery below.

CENTER-FIRE

It is an object of this Invention that a Regenerated Fire-Flame Loop be maintained with a plurality of natural gas fired Ram-jet systems pulse driving the heat and flame from this tower top ignition point through a plurality of finned tubes standing inside the Gas Collection Chamber after which these said tubes join at the tower bottom inside the extruder's streamlined piping over which the extrusion passes so the said heat and flame is introduced inside the said extruded tube's opening center as its walls close after moving from the extruder nozzle where a new injection of water gas from the process is introduced followed by intermittent injection of oxygen into the flame's passage as it moves upward through holes in the suspended fire brick radiator hanging in the center of the extruded tube after which this Fire Flame Loop reenters the Ram-jet drive units at the process top to complete the Center Fire Loop Cycle.

It is an object of this Invention that Fuel Injection at Extruder Nozzle occur at ports providing egress to Streamline Piping over which the extrusion passes to reclose so it can serve as the conduit for this flowing flame and heat that is reenergized at this point with an injection of the process produced Water Gas.

It is an object of this invention that a Flame Passage to the Extruded Feedstock Center be continuous as passed through a loop of piping and tubes driven in pulses from natural gas fired Ram-jet engines mounted at the top of the system.

It is an object of this Invention that the Flame Loop Return be In Finned Tubes that stand in the internal space of the Gas Collection Chamber as means for heating the gases and liquors collected.

It is an object of this Invention that a plurality of Natural Gas Ram-jet Pulse Driven Hot Exhaust means serve to drive the Flame and Heat in the Fire Loop of this system.

It is an object of this invention that a Flame Down Delivery Path Move in Finned Heat Exchange Tubes that provide the heat for the space inside the Gas Collection Chamber.

It is an object of this Invention that a Holed Spool-Checker Fire Brick Radiator of long dimension hang in close proximity to the passing extrusion tube's inner wall surface so heat transfer from this radiating surface can be transmitted as directly as is possible.

It is an object of this Invention that Oxygen Injection of the Fire Brick Radiator occur at closely spaced intervals along the length of this member so the passing flame is intensified and this injection source be a Titanium metal tube that serves as a center support hanger and the manifold for hot oxygen delivery.

GAS COLLECTION CHAMBER

It is an object of this Invention that a Sealed Round-Tower Gas Collection Chamber be slightly shorter than the height of the absorber Receiver Tube so while enclosing a major center portion of this said tube it extends out the top and bottom of the enclosing chamber for input of feedstock at the bottom and output of the carbonized end product at the top.

It is an object of this Invention that a Totally Enclosing Absorber Receiver Tube be heated by the Center Fire means described to cause the feedstock passing through it to exude gases and liquors through the perforations of this said Tube and into the surrounding sealed space of the Gas Collection Chamber.

It is an object of this invention that the Spacing between Absorber Receiver Tube and the Gas Collection Tube Outer Wall not exceed twice the diameter of the Absorber Receiver Tube.

It is an object of this Invention that air be Evacuated from the Gas Collection Chamber as the process begins and thereafter it becomes pressurized by the hot expanding gases that are captured in this space.

It is an object of this Invention that as Gas Heat Expansion Pressurizes the Chamber it be permitted to reach a moderate pressure of approximately six atmospheres or less with maintenance of this level so the outward movement of gas and liquors through the perforations of the Absorber Receiver Tube will not be inhibited by excessive pressure notwithstanding every effort to raise the temperature to the highest possible level.

It is an object of this Invention that pulsed individual opening of a plurality exhaust valve ported to the Raw Gas Receivers Control the Gas Pressure at low levels in this Gas Collection Space.

It is an object of this Invention that a plurality of Fire Loop Finned Tube Flame Return Lines pass through the space of the Gas Collection Chamber for the heating of the gases in this space with these heat exchanger means.

It is an object of this Invention that Bearing and Seal Mounts Top and Bottom support the Absorber Receiver Tube in a manner permitting a rotational speed of at least 150 rpm while holding the gases and pressure with carbide/carbon rotary mechanical seal faces of common design.

It is an object of this Invention that this Gas Collection Chamber be mounted directly Above the Extruders so the extrusion travel is minimized and free energy is conserved.

It is an object of this Invention that internal Annular Wall Collars be placed to Aid in Gas Strata Formation at 12 to 18 inch levels and extend into this inner space 4 to 6 inches with a hole pattern circle of 1 inch holes within ¼" of the wall on 3" centers around the entire flange to permit the passage of liquors flowing down the walls while the horizontal plane of the flanges aid in some stratification of the vortexing gases by molecular weight fractions.

It is an object of this Invention that a Vortexing Hot Gas be created by Steam Jets using minimum saturated steam volumes to drive fan-shaped knife jets across the face of the perforations of the Absorber Receiver Tube to shear away the exuded gases and liquors and these be located in at least two positions to drive in a common horizontal direction on opposite sides of the said Tube.

It is an object of this Invention that extracted Liquors Flow to the Chamber Bottom for collection in downcomers and mains to be transferred to liquor treatment that follows.

It is an object of this Invention that Gases Exhaust to a Plurality of Raw Gas Receivers that are slightly cooler and at a lower pressure to readily receive these higher pressure exhausts when valves are opened individually.

It is an object of this Invention that the Intervals of Exhausting of Gas from the Gas Collection Chamber be done progressively at different height levels for each valve opening so gas from different strata has a uniform time interval to accumulate before the next exhausting of gas from that level.

It is an object of this Invention that the chamber Pulses be Derived with "One at a Time" Exhaust Valve Opening in the creation of this pulsing condition inside the Gas Collection Chamber.

It is an object of this Invention that Liquors Return From Processors to Spray in from Top of the Gas Collection Chamber to vaporize the Liquors as gases for addition to the gas mass and reduce the volumes of Liquors and also to maintain the temperature control in the Gas Collection Chamber space with cooling of these liquors before their return.

It is an object of this Invention that Liquors are Pumped to the Liquor Processor after attempts at re-evaporation so they can be relieved of tars and accumulated as Ammonia Liquor.

THE RAW GAS RECEIVER

It is an object of this Invention that a Plurality of Raw Gas Receivers be mounted at evenly spaced height levels around the periphery of the Gas Collection Chamber.

It is an object of this Invention that the Raw Gas Receivers be Arranged in Pipe Organ Fashion around the Gas Collection Chamber periphery so they have a minimum of interference and minimize piping to conserve free energy loss.

It is an object of this Invention that Valve Controlled Means automatically exhaust gas individually to each Raw Gas Receiver at a uniform time interval to create a pulse modulation of pressure in the Gas Collection Chamber.

It is an object of this Invention that a lower Temperature in the Raw Gas Receiver be maintained versus that of the Gas Collection Chamber Space.

It is an object of this Invention that a lower Temperature Difference in the Raw Gas Receiver function as an attraction means to aid in the transfer of gas from the hotter collection chamber space based on heat moving toward cold.

It is an object of this Invention that a Raw Gas Receiver Extension Gas Tube reach across the space of the Gas Collection Chamber to a point within 2 to 4 inches of the outer wall of the rotating Absorber Receiver Tube.

It is an object of this Invention that this Extension Tube of the Raw Gas Receiver function to avoid the Liquors and Tars that are closer to or on the outer wall of the Gas Collection Chamber.

It is an object of this Invention that this Extension Tube of the Raw Gas Receiver have mounted on its extreme end and close to the Absorber Receiver Tube outer wall a cupped or concave shaped part, the concave face of which faces downstream in the gas flow to create an eddy current stall or dwell on its opposite side and at this Extension Tube end so the gases can be more readily drawn into the Raw Gas Receiver.

It is an object of this Invention that the gas out of the Delivery End of the Raw Gas Receiver connect to a means for cleaning these gas divisions either with a scrubbing procedure commonly practiced or with the Hollow Ball Dry Cleaning of this Invention.

THE LIQUOR PROCESSOR

It is an object of this Invention that the Stack Fume Gas and vessel fume gas off of this process be scrubbed with the liquors of the process after tar decanting to remove particulate and liquor vapors in these gases so they can be recirculated in the top sprays of the Gas Collection Chamber.

It is an object of this Invention that a plurality of Liquor Decanters for Tar removal be employed prior to the scrubbing functions.

It is an object of this Invention that Viscosity or Specific Gravity Metering be used to control the expelling of the recirculated liquors from this ancillary Ammonia Liquor Process so the maximum intensity is achieved in this fluid before it is returned to the top spray in the Gas Collection Chamber.

It is an object of this Invention that final recirculated liquors be Returned to Gas Collection Chamber as a Top Spray for further reduction to gases in these high temperatures at the top of the said Chamber.

HOLLOW BALL CLEANING APPARATUS

It is an object of this Invention that a Ball Size OF ⅝ inch to 1 inch be the diameter of the balls of this cleaning means.

It is an object of this Invention that the Ball Hole Size be small enough in relation to ball diameter that it does not create a significant flatness at its location on the ball which occurs when the hole is large in respect to the curvature of the ball face.

It is an object of this Invention that the Number of Holes in the Ball should be such as to permit visual alignment through one hole and another in a direction across the ball diameter.

It is an object of this Invention that a thin wall high temperature resistant Ball Size and Hole Pattern permit Gas Passage when stacked in a conical vessel so gases driven through from the bottom to the top can be relieved of their particulate carbon with attraction to the inner and outer surfaces of the balls.

It is an object of this Invention that The Hollow Ball be Circulated with a gear-like driving means to move in closed tubing from their cleaning function to the top of a conical container vessel to settle slowly as the raw gas is blown upward at low velocity, after which the balls drop into a driving means again to move upward so they can fall again through the Air Knife $CO_2$ Cleaning means to complete the circuit.

It is an object of this Invention that a thin wall high temperature resistant Copper Plated Balls when stacked in a conical vessel so gases driven through from the bottom to the top can be relieved of their particulate carbon with attraction to a copper plated inner and outer surface of the balls.

It is an object of this Invention that a thin wall high temperature resistant Titanium Balls when stacked in a conical vessel so gases driven through from the bottom to the top can be relieved of their particulate carbon with attraction to the inner and outer surfaces of the balls.

It is an object of this Invention that Cleaning with Air Knife using $CO_2$ Gas be the means for cleaning these balls as they pass in single file on an open track so the particulate blown off can collect in an adjoining vessel.

It is an object of this Invention that a Particulate Accumulation and Recovery means be used to compress and briquette this material for use as a fuel.

IONIZATION OF GASES

It is an object of this Invention that a Renewable Cathode be used in the Ionization of the gases in this process because of the potential for contamination of the Cathode so an expendable wire is used in a coiled face confronting the anode for the generation of a mass of electrons.

It is an object of this Invention that an Aluminum Wire be used for the Cathode metal.

It is an object of this Invention that a Finite Coating of Zirconium Sputtered in Spots as "Getters" be employed to inhibit the formation of water in this part of the process.

It is an object of this Invention that a Cathode Wire Cone means be employed so the cathode wire can be closely wound on this cone in a wrap with one coil against another on the cone face so the wire surface is exposed to the anode and the passing gases as the wire is wound on the said surface that must be highly polished so the wire can slip in response to the varied speeds of the cone surface diameter versus the common speed of the cone on which the wire is wound.

It is an object of this Invention that the Cathode Wire Cone Feed be a carefully controlled versus take-up because of the surface speed variations of diameters on the cone face and the need for slip in all of these winds which is a function of the speed of wire feed and take-up as in a "capstan/slip" relationship between capstan surface and loose turns of a line sliding on the capstan diameter until the take-up tension is increased.

It is an object of this Invention that the Cathode Wire Cone Feed be carefully controlled versus take-up because of the surface speed variations of wind turn diameters on the cone face and the need for slip of all of these which is facilitated by the short sections of slightly larger wire diameter where the sputtered spots of zirconium interrupts the continuity of surface contact between cone face and wire surfaces that simplifies the control of wire feed and take-up speed.

It is an object of this Invention that the Cathode Wire Cone be assembled from discs that free to turn on a common axis, but with each disc capable of turning on this axis at a different speed, so that surfaces on the disc's outer periphery that carry the cathode wire can turn at speeds related to speed of the wire and a constant tension on the wire can be maintained with the wind and unwind reels.

It is an object of this Invention that a carbide metal Wire Die Holed Button be used for passage of the wire from the wind/unwind reel and drive chamber to the gas exposure side that supports the cathode for use as a sealing means because of a close tolerance fit of the die hole to the wire.

It is an object of this Invention that a Pressurizing $CO_2$ Gas in Winder and Drive Chamber provide a wash of gas around the wire in movement through the seals which are not leak proof and that this minute amount of gas join the hot gases of the process in this by-pass.

It is an object of this Invention that the Cooling of the Drive Chamber be with $CO_2$ Gas input through an orifice from a pressure source so the fast gas expansion into the chamber offsetting the seal leakage provides a cooling condition to maintain the drive and wind/unwind apparatus at a reasonable temperature.

THERMAL DIFFUSION GAS SEPARATION

It is an object of this Invention that a gas receiver comprise a Hot Chamber Surrounding Inner Cold Form with a temperature variation of 300° to 500° F. between the inside wall of the enclosing chamber and the outside wall of the internal form.

It is another object of this Invention that gases introduced in the Hot Chamber Surrounding an Inner Cold Form pass through a means for Ionization of the gases that also provide some acceleration of motion to these by moving through an Electron Gun Configuration before entering the Thermal Diffusion Gas Separation Chamber.

It is an object of this Invention that an Electron Beam Gas Acceleration means comprising a cathode electron source (as in the Renewable Cathode Apparatus) be employed to receive ions driven from a torus source that is at the end of an electron gun configuration into which the divided gases flow with some increase in speed as the molecules of gas are bombarded with electrons in this passage and move through the gun with the electron beam that impinges on the ion source torus while the gases pass through the torus center hole to further size and mass selection means.

It is an object of this Invention that a Uniform Spacing Between Walls be 2 to 3 inches across and permit the easy flow of high gas volumes which volume would dictate the diameter of the structure and the total area of this passage for such accommodation.

It is an object of this Invention that Electrical Charges on the Inner Wall and Outer have a potential difference of 2,500 Electron Volts to 10,000 Electron Volts D.C.

It is an object of this Invention that Two Rough Gas Divisions as drawn from two Raw Gas Receivers at different levels of the Gas Collection Chamber and subsequently cleaned with Hollow Ball means be mixed and introduced to this Thermal Diffusion Gas Separation Means so they would divide one from another with a more accurate separation by Molecular Mass as influenced by the temperature difference in the walls of the passage and the electrical potential in this space so they pass an annular sharp edge dividing the gas passage into two parts, one representing the inner wall attracted gases and the other the outer wall attracted gases.

PARABOLA COLLIMATION AND DIVISION

It is an object of this Invention that ionized gases be diverted to a downward direction as a Vertical Flow into a 45° Perforated Cone the point of which rests at the center of a parabola form so the gases flow through the perforations to impinge against the parabola face.

It is an object of this Invention that the Gas Path be Reversed as Flow Strikes the Parabola Face to rebound oppositely against the direction of flow to strike the 45° angle side of the cone against the unperforated areas to deflect into a horizontal path with a direction radially away from the center of the apparatus.

It is an object of this Invention that the Gas Path Deflected Horizontally move radially toward the sides of the parabola bowl and division means in that surface.

It is an object of this Invention that the Gas Space be in a Centrifugal Force Field created by high speed rotation at speeds of 3,000 to 5,000 rpm as the parabola bowl and the cone assembly turn on a common axis.

It is an object of this Invention that Horizontal Gas Divisions by Mole Mass be achieved by the changes in gas molecule paths as effluence by the deflection means and movement across the centrifugal force area so gas cloud within this space divides horizontally by mass and weight into stratas.

It is an object of this Invention that the Parabola Face be divided into horizontal levels comprising concave forms with finite slits at the inner surface of these which constitute collection means for the strata of common molecular mass at a specific level of the Parabola Face.

It is an object of this Invention that a large plurality of Horizontal Slits in the Parabola Face provide openings in circular planes around the optical axis of the said parabola with each said slit bottoming in concave guides functioning as funneling means for the said slits that then terminate in wave-guide like thin plane rectangular slots, each of which is one of a plurality of these in a rectangular tube that carry the thus divided horizontal molecular gas weights for delivery to other division means.

MOLECULAR MASS MAGNETIC DIVISION

It is an object of this Invention that Horizontal Gas Divisions produced in the Parabola Collimation Apparatus and confined in the wave-guide like compartment tube deliver its contents immediately to the Cyclotronic Magnetic Division means.

It is an object of this Invention that gas delivery be at the very Edge of the Intense Perpendicular Magnetic Field of the Cyclotronic Magnetic Division means.

It is an object of this Invention that the perpendicular magnetic field Emanating from Round Pole Pieces have a Gauss measurement of 4,000 to 10,000 gauss.

It is an object of this Invention that this circular magnetic field be completely sealed and Enclosed by a Circular Wall divided vertically by Fine Slits with a height equal to the space between the poles of the magnet.

It is an object of this Invention that Each Slit's Vertical Boundary be a razor sharp edge so there is no barrier to gas passage into these slits except this sharp edge.

It is an object of this Invention that Each Slit Opens to a Port Valve opening and in turn to a circular manifold tube encircling the wall of the Cyclotron unit and is divided by two valves each side of a slit valve so several of these gas division sources can be combined or isolated as a means for controlling collection of varied spectrum width of a common gas fallout to the circular wall over a plurality of slits that represent the spectral display of the gases produced.

It is an object of this Invention that this port Valve Control and Manifold Valves provide the means for isolating or combining a single or plurality of slit port valve inputs so the spectral fallout of a gas can be captured as it occurs.

It is an object of this Invention that gas delivery into the Magnetic Field Edge provides a plurality of rough horizontal gas divisions that begin to spin in their specific planes as they enter the magnetic field that is perpendicular to their paths after which they turn in the field, as influenced by their common injection speed and commence to separate in their individual horizontal planes as they divide by molecular mass to fall out into the slit making up the enclosing wall as spectral areas of impingement to complete the grid-like division of the horizontal strata of gases.

It is an object of this Invention that a possible thirty-eight Gas Mass Weight Divisions can be accommodated with this apparatus, but the gases will normally divide as noted above into spectral areas involving more than one or two slits, perhaps as many as ten to twenty representing a single gas which can be isolated and collected with use of the valving means on the manifold.

SUB-SONIC SHOCK STEAM REFORMING

It is an object of this Invention that this Sub-Sonic Shock Steam Reforming Process be applied to A Variety of Feedstocks Selected for Subjecting to Events that in combination comprising;

pressure injection of a said feedstock into cylindrical pressure vessel;

sealed at both ends by a pair of moveable rams;

all of which is at the center of a long cylindrical body;

supporting two nucleate bubble friction free pistons at the extreme ends;

each with a stroke potential at least three times each piston's respective length;

which said cylinder has porting at the extreme ends to admit steam or explosive fuels gas that are ignited to drive the said pistons against the rams;

with porting at the cylinder stroke ends to exhaust these driving gases;

and a plurality of ports located along the pistons' travel that are held open until the pistons pass after which they are closed so the pistons move the length of the cylinder bore against zero pressure and maximum piston velocity can be achieved;

and which pistons contain a moveable internal ball that absorbs the shock of the said piston's impact against the rams;

and which impact creates a momentary superheated a sub-sonic shock steam reforming condition in the isolated steam/gas increment;

so its pressure overcome a heavily spring-loaded release valve;

and the said feedstock steam as combined with the gases;

moves to an immediately adjacent reaction chamber above;

that contains a catalyst to cause reforming of this shock steam/gas vapor;

in the production of a combination of gases exhibiting the presence of Methane, Propane, Ethane, Pentane, Cyclopentane, Butene-1, Pentene-1, Amylenes, n-Hexylene, Cyclopentadiene-1,3, Butadiene-1,3, Carbon Disulphide, Hydrogen Sulphide, Hydrogen Cyanide, Carbonyl Sulphide, Methyl Mercaptan, Dimethyl Sulphide, o-Xylene, m-Xylene, Ethyl Benzene, n-Octane, n-Nonane, Cyclooctane, Octylene, SGN gas, Thioxene and Picolines as products of this process.

It is an object of this Invention the Reforming Process in which the feedstock comprise Liquefied Waste Plastic Materials subjected to the treatment in combination as described in production of any one or more of the products named.

It is an object of this Invention that the Reforming Process in which the feedstock comprises Hydrocarbon Materials Generally that are subjected to the treatment in combination as described in production of any one or more of the products as named.

It is an object of this Invention that the Reforming Process in which the feedstock comprises Vaporize Ammonia Liquors Derived from the Processes of this Invention may be subjected to the treatment in combination as described in production of any one or more of the gas products as named.

It is an object of this Invention that the Reforming Process in which the feedstock comprises Naphtha subjected to the treatment in combination as described in the production of any more of the products as named.

It is an object of this Invention The Reforming Process in which the feedstock comprises Natural Gas subjected to the treatment in combination as described in production of one or more of the products named.

It is an object of this Invention that the Reforming Process in which Vaporized Liquid Waste Rubber as a feedstock material and subjected to the treatment in combination as described in production of one or more gas products.

It is an object of this Invention that an Unattached Free Piston move in a cylinder at high velocity as a kinetic energy deliver means.

It is an object of this Invention that the Unattached Free Piston be Supported on Nucleate Gas/Steam Bubbles to move in friction free state as propelled by steam expansion or explosive force.

It is an object of this Invention that the Unattached Free Piston have a Surface with a Plurality of Small Openings fed from the piston center by the propelling steam/gas or explosive force gases that move this porting to these minute openings in the piston surface interfacing the cylinder bore.

It is an object of this Invention that the temperature of the Unattached Free Piston Surface have a Temperature Differential with that of the Cylinder Bore so an explosive bubble formation can occur as created by condensation formation and steam expansion.

It is an object of this Invention that the piston movement be Controlled by a Laser Light Break caused by the piston passing a Laser Light Beam that is directed through two quartz windows aligned and mounted in the cylinder wall opposite one another at right angles to the piston travel and axis of the cylinder.

It is an object of this Invention that the piston Move Against Zero Pressure after it is propelled by steam expansion or combustion of gases driving against the opposite side end of the piston.

It is an object of this Invention that the piston Move at High Velocity to Strike a Ram/Piston at the end of its stroke to deliver a maximum kinetic force produced with the piston propellant and its mass is combined as it strikes the Ram to move a piston extension of the Ram to close against gas in an isolated chamber.

It is an object of this Invention that the Free Piston Impact the Ram/Piston to close a pre-pressurized gas in an isolated chamber at the piston stroke end to drive the said gas over a pressure relief valve to other vessels for use in extensions of the process.

It is an object of this Invention that One or a Plurality of Gases be Isolated in this closed pre-pressurized chamber at the piston's stroke end to drive the said gases over a pressure relief valve to another vessel for use in extensions of the process.

It is an object of this Invention that a Second Piston Cylinder be Opposed to the First to Double the Shock and close a prepressurized gas filled chamber at the piston stroke end to drive the said gas over a pressure relief valve to another vessel for use in extensions of the process.

It is an object of this Invention that a Plurality of Pistons to Multiplex the Shock be used to close a pre-pressurized gas-filled chamber at the piston stroke end to drive the said gas over a pressure relief valve to another vessel for use in extensions of the process.

It is an object of this Invention to Use this Piston Cylinder Apparatus in Association with Steam Reforming and Catalyst Reaction with placement of the impact shock chamber mounted directly below a catalyst containing reaction tower so the shock pulses are transmitted into the catalyst bed with minimum loss of free energy.

It is an object of this Invention that compression function work as a Replacement for a Semipermeable Membrane in which the gases are compressed and released for endothermic reactions.

that specific gases be treated with this shock means and be immediately injected into Cryogenic Inert Media Gas Liquefication means.

It is an object of this Invention that this shock treatment be applied as a preliminary step in the compression of Stack Gas and Steam Reforming for the Conversion of the Stack Gas to Methanol.

It is an object of this Invention that The Reforming and Reaction Process be practiced with the use of apparatus comprising in combination:

- a source of high pressure steam;
- a source of natural gas or coal stack fumes;
- an isolated cylindrical pressure vessel with relief valve means and sealed on its ends by moveable rams that close this space;
- with location of this said vessel at the center of a cylinder length so two enclosed pistons can stroke to drive against and impact the said rams to close this space;
- stack gas is injected into this isolated center space;
- after which steam is injected into this same space at a minimum 1,000 psi 544.61 degrees F.;
- after which superheated steam or an ignitable explosive fuel gas is injected in both ends of the cylinder simultaneously, which action drives both pistons toward the cylinder center to impact against the rams closing the isolated space containing the pre-pressurized Steam and Stack Gas Fumes;
- to compress these gases;
- creating a superheated steam condition in the isolated space and;
- combining with the feedstock causing both to;
- release these combined gases through a pressure relief valve;
- so the gases can move into a reaction catalyst chamber above;
- in modulated pulses as the pistons move in compression strokes;
- creating a fluid-bed condition in the catalyst materials;
- as the gases reform to emerge;
- as one or more of the gas products derived from the particular feedstock used.

It is an object of this Invention to use the shock procedure to Free $H_3O+$ for Reforming Chlorine to HCL (liquid) in the processing of a waste plastic mass.

It is an object of this Invention to use this means to Combine $H_2$ and $O_2$ to produce $O_2/H_2$ Alloy at 76.000 atmospheres and 76° F. with piston/cylinders:

- 72" dia. Piston×6" Stroke with 6 Cylinders 1000 psia each Steam Drive=$4,071^2$ in. area ×1,000 psia drive=4,071,000 psia per cylinder 6 radial cylinder unit=24,426,000 total psia divided by 1,140,000 psia for Alloy= 21.42631579" total permissible Ram area divided by 6 Ram Drives =3.5720" Permissible Ram Area or 2" Ram diameter.
- 6 foot Ram Length to make heat remote Yield=128 cu. in. per stroke×13 strokes per minute=ONE CUBIC FOOT $O_2/H_2$ ALLOY PER MINUTE

UNSTABLE-STATE CATALYTIC REFORMING REACTION

It is an object of this Invention to create an UNSTABLE-STATE CATALYTIC REFORMING REACTION.

HOT CATALYST MEDIA IN ROTATING ABSORBER RECEIVER TUBE

It is an object of this Invention that a Rotating Absorber Receiver Tube Enclose a Stationary High Temperature Tube for the transfer of heat to the Absorber Receiver Tube that has a media content through which gases are passed as the said media is churned to mix the gas content in passage.

It is an object of this Invention that a Top Holed Absorber Receiver Tube Have Bearing and High Temperature Seal Support for Rotation while held at the center of a collection Chamber.

It is an object of this Invention that the Rotation of the Top Holed Absorber Receiver Tube have a speed range of 25 to 200 rpm.

It is an object of this Invention that Annulus Space Between Tubes with Convex/Concave Wall Forms create a loose shear condition as they conflict in rotation to churn the media content.

It is an object of this Invention that Opposed Shapes Provide Mixing/Churning and the helical arrangement of opposing shapes provide an upward force direction to augment the low pressure drive of the extruder that moves the media content upward in the vessel so it can be expelled at the top for cleaning and return to the extruder at the bottom of the process.

It is an object of this Invention that a Static Inside Hot Tube provide Heat to Catalyst Media for the reforming or reaction of gases and liquid chemicals introduced into the extruder at the bottom of the process.

It is an object of this Invention that Gases Move through Catalyst Coated Beads or Media for reaction as the media is churned or stirred to increase octane reaction.

It is an object of this Invention that Media be Moved by Low Pressure Single Extrusion Means so the media is not damaged by the force involved in pushing it through the system.

It is an object of this Invention that a Catalyst Passes to a Cleaning Phase and is Returned to Heat so contamination coating can be removed with various cleaning means common to the art.

It is an object of this Invention that after Gases Reform they Pass Through Top Perforations collection means.

It is an object of this Invention that an Air Evacuated Gas Collection Chamber fully enclose the upper portion of the holed part of the Absorber Receiver Tube so the gases move into an area that is uncontaminated of air that could cause unwanted oxidation or water formation.

CRYOGENIC LIQUEFICATION OF GASES

It is an object of this Invention that a Rotating Absorber Receiver Tube Enclose a Stationary Cryogenic Tube for the transfer of cold to the Absorber Receiver Tube that has a media content through which gases are passed as the said media is churned to mix and liquefy the gas content in passage.

It is an object of this Invention that a Top Holed Absorber Receiver Tube Have Bearing and Cryogenic Seal Support for Rotation while held at the center of a collection Chamber.

It is an object of this Invention that the Rotation of the Top Holed Absorber Receiver Tube have a speed range of 25 to 200 rpm.

It is an object of this Invention that Annulus Space Between Tubes with Convex/Concave Wall Forms create a loose shear condition as they conflict in rotation to churn the media content.

It is an object of this Invention that the Opposed Shapes Provide Mixing/Churning and the helical arrangement of the said shapes provide an upward force direction to augment the low pressure drive of the extruder that moves the media content upward in the vessel so it can be expelled at the top for cleaning and return to the extruder at the bottom of the process.

It is an object of this Invention that the Static Cryogenic Tube provide Cold to the Inert Media for liquefication of gases after introduction into the extruder at the bottom of the process.

It is an object of this Invention that Gases Move through a mass of Inert Media as support for the gases as they are churned and mixed during conversion to a liquid by the Cryogenic cooling.

It is an object of this Invention that the Media be Moved by Low Pressure Single Extrusion Means so the media is not damaged by the force involved in pushing it through the system.

It is an object of this Invention that a Catalyst Passes to a Cleaning Phase and is Returned to the Cold Condition so the chemical coating caused by the mixing action can be removed with various cleaning means common to the art before return to the process.

It is an object of this Invention that the Liquids Produced pass off Through Top Perforations to the enclosing Liquid Collection Chamber.

It is an object of this Invention that an Air Evacuated Gas Collection Chamber fully enclose the upper portion of the holed part of the Absorber Receiver Tube so the chemical liquids produced move into an area that is uncontaminated of air that could cause unwanted oxidation or water formation.

NUCLEATE BOILER STEAM GENERATION

It is an object of this Invention that High Pressure Steam for these various processes be produced with a high velocity Ram-jet driven newsprint waste-paper fueled, flame circulation system.

It is an object of this Invention that heat for steam generation be created with a steam boiler system with use of Uncoupled Vertical Boiler Tubes which receive a controlled input of hot feedwater from a source within the boiler body.

It is an object of this Invention the uncoupled vertical boiler tubes have two or more Controlled Openings Into Steam Collection Spaces in the boiler body.

It is an object of this Invention Two or More Pressures and Temperatures be sustained in separate spaces within the said boiler body.

It is an object of this Invention that the said flash boiler tubes have within them Loosely Fitted Hollow Steel Balls that are sealed and filled with mercury so their weight can partly overcome steam pressure and facilitate a rise and fall excursion.

It is an object of this Invention that the movement of these said balls provide means to Draw In Feedwater to the inside of the tubes.

It is an object of this Invention that the movement of these said balls Drive Steam Out of the Tube Space into the steam storage areas of the boiler body.

It is an object of this Invention that the said ball motion functions to Iron Out the Nucleate Bubbles on the inner walls of the boiler tubes which said bubbles normally inhibit boiling functions.

It is an object of this Invention that the apparatus of this invention can be substantially varied with respect to the boiler body geometry because the essential feature is the Anti-Nucleate Balls Ironing the Inside Walls of the Uncoupled Boiler Tubes to break up Nucleate Bubble formation that inhibits steam formation.

It is an object of this Invention that the individually uncoupled flash boiler tubes Use Two Check Valves, one a common valve on a pipe to the water reservoir and the other a ball-check valve seating on the water receiver opening in the said uncoupled flash boiler tube bottom.

The most important element is The Traveling Nucleate Ball that moves up and down to time water injection and cause temperature reduction and steam pressure changes.

It is an object of this Invention that In operation the Nucleate Ball Begin its Movement by Falling on Top of the Bottom Ball Check because there has been an influx of water.

It is an object of this Invention that the ball check with the Nucleate Ball weight on top of it, as well as steam pressure above the Nucleate Ball Holds the Water in the water receiver below.

It is an object of this Invention that the newly trapped water volume in the water receiver body that is twice the diameter of the tube diameter flashes into steam and Drives the Ball Check up to Strike the Nucleate Ball starting its travel upward and as it goes the steam below expands and is being subjected to more of the heat surrounding the tube surface.

It is an object of this Invention that as steam beneath the Nucleate Ball expands the rising ball pushes steam out through openings above, which reduces resistance to its rising, and As it Passes the Last Opening the External Steam Pressure Balances Against the Pressure in the Tube Space at the same time that the feedwater pressure is being maintained slightly above normal steam pressure to push through the check valve of the water receiver.

It is an object of this Invention that as The Nucleate Ball Begins to Fall Back, partly pushed by the momentary steam pressure trapped at the top of the tube, the hot water pushes past the Water Receiver check valve and moves into the said tube bottom providing a cooling function As the Cycle Repeats Itself.

A SUMMARY OF THE PRIOR DESCRIPTION AS A PREFACE TO A BETTER UNDERSTANDING OF THE DETAILED DESCRIPTION OF THE DRAWINGS

Five Primary Processes make up the Integrated Methods of this Invention.

Processes I, II and III are fire gasification and reduction procedures that involve extruding a tube of feedstock continuously into and through a rotating perforated metal or ceramic retention tube held within an evacuated chamber while the feedstock tube's bore is used as a conduit for heat and flame to drive gas and liquor chemical constituents out its tubular wall and through the retention tube perforations into the enclosing chamber for collection, while a by-product carbon residual of the feedstock's extruded tube top end is broken away and gases collected go to further processing.

Variation in Processes I, II and III:
Gas Chamber Internal Steam Applications
Gas Fraction Takeoff
Rotational Speed
Multiple Drives to Increase Absorber Receiver Tube Speed
Extrusion Feed Rates
Secondary or Dependent Systems of these Primary Processes I, II and III.
Waste Plastic Hydrocarbon Recovery Process
Ammonia Liquor System for Tar Removal
Ball Cleaning System for Gases
Gas Ionization Process
Parabola/Centrifugal Gas Collimating Process
Cyclotronic Molecular Gas Division Process
Anti-Nucleate Newsprint Fuel Steam Boiler System Process IV is a procedure in which a media in particle or bead-like form is circulated into and through an extruder screw drive system to be forced upward continuously by this means inside the containment of a long annually telescoped tube inside an outer tube with interfacing walls between them that have contours and protuberances that interpose the media flowing between them in this annular space to provide a directional force and churning action in the media so that a plurality of metered chemical gas inputs held in the spaces between the media elements are mixed and chemically or reacted by the application of intense heat or cold driven through tube center or against the outside tube walls in the causation of this reaction or liquefaction of these gases as means for a compounded chemical formula from this said metered input. (There is a strong generic relationship between the apparatus forms of Processes I, II, III and IV in the use of same extruder nozzle geometry, perforated absorber receiver retention tubes and the application of hot and cold means to cause a chemical reaction.)

Variations in Process IV:
Reaction Heat or Cryogenic Liquefaction
Media Type: Catalyst in Heat or Inert in Cryogenic Conditions
Quantity of Gas Input
Rotational Speed
Extrusion Feed Rate of Media
Continuous Media Cleaning Systems for Media Restoration before Reuse Processor V is a procedure in which a pulse of high temperature and pressurized mixed gases are injected into a hot isolated chamber between a pair of moveable piston-like rams, each annually supported on a stream of nucleate bubbles around their outer surfaces caused by steam expelled from peripheral perforations and bursting into superheated steam against the enclosing cylinder walls, as this ram pair stand at some distance from one another to enclose the isolated chamber that they seal. A pair of larger diameter free pistons with a like nucleate bubble support and peripheral geometry inside a larger diameter extension of the same cylinder provided means at the cylinder ends to drive these pistons with combustion or a steam pulse at exactly the same instant toward one another along a stroke path to cause them to impact against the standing rams in the shock compression of the increment of gas held between the rams in the creation of a said shock/compression effect causint the reforming of the isolated gas content as the rams close this said isolated space completely to drive the contained gases over a progressive series of relief valves into another pressure vessel or a reactor outside this assembly.

Variation in Processes V:
Gas Increment Input Temperature
Gas Increment Input Pressures
Piston Drive Pressure
Stroke Length
Piston's Speed
Ram Stroke
Ram's Speed
Ratio Piston vs. Ram Diameter
Piston's Internal Ball Diameter
Secondary or Dependent Systems of this Primary Process
Reactor Type Interface Requirements

BRIEF DESCRIPTION OF THE DRAWINGS

FIG. 4 illustrates another application of the extrusion procedure in which the generated gases are introduced into an inert particle media form that is circulated under Cryogenic cold conditions to Cryogenically Liquefy and Mixed—M as held in an inert media so they can be combined as a chemical. Also illustrated is a special straight tube Anti-Nucleate Boiler System—N that uses "cottonized" waste newsprint for fuel in the generation of high temperature steam for these various processes. (Full descriptions of all these various apparatus forms is provided in the FIG. 5 through FIG. 101 that follow.

FIG. 17-C is a cross-sectional schematic drawing of the extrusion tube firing procedure showing the fractioning in the gas chamber and soft-char production.

FIG. 18-C is a cut-away of the center absorber receiver tube and fire-tube functions illustrating the gas flow spiral circuit responding to the steam injection for circulation of gas within the gas chamber and the reinjection of the ammonia liquor at the system top in the creation of more gas.

FIG. 19-C is a like illustration showing the fractioning levels for gas take-off to the peripheral conditioning apparatus through the lower temperature gas receivers, together with the steam injection scrubber used in the lower temperature Processor I with liquor and tar takeoff to the Ammonia Liquor Processor.

FIG. 20-C is an enlarged cross-sectional view of the "cup-like" device that serves to aid in capturing a gas pulse as it flows over the convex side of this apparatus to create a dwell or pause in the gas flow at the lower pressure opening at the cup's center.

FIG. 21-L is a cross-sectional view of an extruder assembly in a like generic form but here the extruder functions to move a catalyst mediain a path enclosing a center-fire heat source. At the extruder nozzle one or a plurality of gases are introduced to flow upward through this catalyst media in a reaction function that can be endothermic or exothermic depending upon the prior compression functions.

FIG. 22-L is a cut-away view of the center portions of the receiver-tube into which the catalyst media is pushed upward as the gases are driven through. The shape and placement on these tube walls serve to rotate and raise the catalyst media in a screw type action while creating a churning force. Like all the receiver tube forms of this invention in various processes the receiver-tube has perforations to permit the out-flow of product—in this case the perforations are at the top of the tube so a maximum period of exposure to the catalyst occurs prior to escape of the reformed gas.

FIG. 23-L is a cross-sectional illustration of a plurality of the heat transfer radiators through and around which the center-fire flows and in which oxygen input enhances the heat and sustains the flame in passage through the holed form of this high temperature ceramic hanging part that is suspended in the center of the absorber receiver tube.

FIG. 24-L is a cross-sectional enlarged inset view of the vacuum trap at the top of a high molecular weight fluid through which the media passes so a vacuum ran be maintain in the system.

FIG. 25-M is a cross-sectional view of a complete extruder/absorber receiver tube tower assembly in which an inert media is circulated with exposure to an extremely cold source so gas content within the space surround the media is reduced in temperature to a level to reduce the gases to liquid. These tubes supporting the media rotation as the content of liquefied gases are mixed and churned to finally be expelled as a chemical formulation.

FIG. 26-M is an enlarged cut-away view of the internal tube structure in a generic form like that serves to churn the media content as it rises.

FIG. 27-M is an enlarged view of the vacuum trap as in FIG. 24.

FIG. 28-E is a cross-sectional view of gas cleaning apparatus in which small hollow perforated balls are circulated through a hopper like apparatus so that gas is driven through clean balls so particulate can accumulate on their surfaces as the gas passes upward for delivery to other treatment.

FIG. 29-E is a cross-sectional view of the ball cleaning apparatus through which the particulate loaded balls pass and are blasted clean with a sharp line of pressurized gas that is driven against them as they move in a restricted path on rails permitting them to spin under the urging of this jet pressure impact that blow the particulate off for collection as a usable carbon.

FIG. 30-E is a pattern form of a disk, a plurality of which are arrayed in a horizontal stack with close space so the stream of particulate as driven from the balls accumulates on their surfaces. This accumulation is shaken free by the operation of a vibrator that causes the particulate to fall to hopper where an extruder screw compresses it into a tube form that is broken as it drops into a cooling liquid.

FIG. 31-E is a cut-away illustration of the rail section of FIG. 26-(36) used to support the rolling balls as they pass the gas blast cleaning apparatus.

FIG. 32-E a series of drawings of ball perforations illustrate the reason for a particular perforation pattern and hole size that avoids the flattening of the ball surface caused by larger openings.

FIG. 33-F a view of a renewable cathode apparatus as seen from the point of view of a passing gas flow that shows the winding of an aluminum wire on a conical form.

FIG. 34-F is a cross-sectional illustration of the apparatus for driving and rewinding an aluminum wire cathode material on a cone form that is held in an air evacuated space through which the gas is driven. The mechanism chamber is charged with carbon dioxide that serves as a cooling medium as well as means for exclusion of air.

FIG. 35-F is a magnified view of the wire seal that is a tightly wound spring form that providing a tortuous leak path for the pressurized carbon dioxide as the wire is drawn through these.

FIG. 36-D is a schematic view with partial cut-away sections to illustrate the application of particular tar separation and specific gravity sensing apparatus that determines the release of ammonia liquor at a desirable density for return to the gasification chamber after use as a scrubbing liquor for stack gas from the system.

FIG. 37-D illustrates the form of the valving apparatus associated with the specific gravity liquid control.

FIG. 38-D is a cross-sectional view of the tar separation apparatus of this invention.

FIG. 39-A is a detailed schematic of a processing plant for handling chopped waste plastic with shock steam reforming of this feedstock to produce a flammable liquid that when combined with a powdered low-grade coal can be mixed mechanically and sonically with the plastic hydrocarbon liquid to achieve a thixotropic liquefied coal fuel for power plant use. The shock treatment removes the chlorine content in the waste plastic material that would inhibit burning.

FIG. 40-A is a cross-sectional view of a hammer mill apparatus used in pulverizing the soft-char by-product of the fire reduction process.

FIG. 41-A is a ribbon/shear mixer that serves to combine coal powder and hydrocarbon liquors prior to treatment in a sonic mixing apparatus as a final combining step in the process for a liquefied coal.

FIG. 42-A condenser apparatus for cooling vacuum effluent with gas takeoff compression and storage.

FIG. 43-A a cross-sectional profile of the compression chamber in which the shock is applied by opposed pistons. In this illustration the space is evacuated.

FIG. 44-A a like profile in which chopped plastic feedstock is charged.

FIG. 45-A an end view of the shock compression chamber.

FIG. 46-A a like profile showing the start of compression created by combustion at the opposite ends of the pistons causing them to be propelled to shock compress the space between them containing the chopped plastic feedstock.

FIG. 47-A a like profile showing the shock stroke completion and the liquefied plastic material ready for discharge.

FIG. 48-G is a cross-sectional view of gas flow into a parabola form that is rotating at high speed with the parabola face divided into horizontal finite planes or slit openings adjoining like stationary slit openings that serve to collimate and divide the planes of gas into a rough molecular size selection.

FIG. 49-G is a plane profile drawing of the slit openings of the parabola face showing the concave guide surfaces at the entrance to the slit openings.

FIG. 50-G is a plane drawing of the parabola form calculation as used in this configuration.

FIG. 51-G is a cross-sectional view of the wave-guide like tube of horizontal slit openings that serves as the conduit from this apparatus to those treatment steps that follow.

FIG. 52-M On the outer edges the end of the circular manifold valves can be seen leading to piping that ends in a hot reaction or cold liquefication extruder apparatus. This is a cross-sectional view of the cold liquefication system and the inert media extruder into which a plurality of gases are directed so the rotational means can provide churning and mixing of the gases as they liquefy.

FIG. 53-I is a cross-sectional side view of the magnet of the cyclotronic molecular mass division apparatus of the invention, in which a direct current coil serves to energize the iron core magnet and poles between which the gas flows as seen in FIG. 55-(55).

FIG. 54-I is a perspective illustration showing the magnet pole pieces, the gas movement and the vertical slit opening around the periphery in cut-away.

FIG. 55-I a top view of the open magnet bottom pole with tubes radiating from the magnet edge around the periphery of which are closely spaced vertical slits that lead into each tube. Gas is introduced to the magnet edge by a nozzle and circles under the influence of the magnetic field to finally fall out in one or a series of vertical slits that represent the molecular weight of a given gas within the mass.

FIG. 56-I at the ends of the tubes of FIG. 55 a group of three valves control the entrance to a circular manifold that surrounds the magnet and serves to collect a bandwidth of gas fall out into a group of tubes. Two valves serve to open or close a pathway to the circular manifold and the remaining valve is closed so only one around a spectrum of gas fallout will be selected to represent the gases flowing to the manifold from a plurality of slits representing that area of magnetic influence.

FIG. 57-I is a perspective illustration of a possible geometry and positioning of the gas input pipe, followed by the renewable cathode ionization means that the gas flows past and finally a representative perspective sketch of the turning gas molecules in the magnetic field and fallout to three representative slit openings in the enclosing periphery. An electrical charge difference is shown as supporting an adjustable D. C. voltage potential between the ionization station and the peripheral slit enclosure.

FIG. 58-K is a cross-sectional view of the components of a simple form of sub-sonic shock impact piston cylinder assemble on one side only (normally two pistons oppose one another and this drawing shows only one). This form is a diesel or gas driven unit with a free piston and actuation of combustion created by impact of the piston at the cylinder terminus.

FIG. 59-K is a cross-sectional view of a piston within the cylinder showing the nucleate steam bubble formation at the perforations that support the piston in a floating support as in an air-bearing, but with the added impetus of a force imparting motion in the direction in which the piston is impelled.

FIG. 60-K is a cross-sectional view of a piston of this invention in which the porting is shown with cross-drilling to provide a manifold condition at the surface under the perforated sleeve that encloses the cylinder outside diameter.

FIG. 61-K is full view illustration of the piston of this invention in which the nozzle end tapers are shown that provide a driving force to move the piston when impelled in one direction or another in the piston. The pattern of perforations is also shown.

FIG. 62-K is a cut-away and cross-sectional view of a part of the cylinder with the piston at rest in a piston between ports usable for determination of piston position or for input or output of driving forces. The chambering of the piston affords the generation of low pressure steam in the cooling maintenance of the cylinder walls.

FIG. 66-J a cross-sectional view of a reaction chamber standing on the hexagonal mounting block so that the product of the compression is delivered directly into the reactor. The pistons and cylinders of FIG. 62 are not shown mounted on this block.

FIG. 67-J a cross-section of the reactor of FIG. 63 showing the vertical tubing that provides heat transfer to the catalyst media at the center.

FIG. 68-J & K a cut-away illustration of an attemperation unit that is employed throughout this system of processes as the means for water addition to the steam generation equipment and also means for temperature control.

FIG. 69-K is a top cross-sectional view of the hexagonal mounting block of FIG. 60 showing the mounting flange for attachment to the reactor and the conjunction of porting for transfer of hot exhaust and the control components.

FIG. 71-K is an enlarged cross-section view of the nearly closed position of the pistons, ball arresting part of the piston, the rams and relief valves that function to control the passage of feedstock to the impact space. Emphasis here is on the use of the perforated surfaces on all moving elements in the cylinder, pistons and ram.

FIG. 72-K a cross-sectional illustration of the rod-valve component that moves in and out of the piston body to provide an arresting function as well as provide the final closing of the seal on the compression space as the gas increment is driven out through the pressure relief valve into the reaction chamber or collection vessel.

FIG. 73-K like FIG. 71 this is a cross-section taken through the piston wall showing the supporting thread-like grooves holding the perforated shell and serving as a manifold for steam passage out of the perforations.

FIG. 74-K is another enlarged view of the piston/cylinder assembly in the near closed position of FIG. 72 and FIG. 74, but here the emphasis is upon the valving unit that maintains a high pressure in the feedstock chamber until the pressure overcomes the spring retention so the gas can be expelled.

FIG. 75-K view of one cylinder end showing the arresting gear used at each end to arrest the velocity of the piston after the isolated gas increment is impacted, using orifice controls of escaping air or steam plus the large spring at the cylinder end as well as the springs within the rod-valve unit that impacts the ball inside the piston. This prevents this force from being destructive mechanically.

FIG. 76-K is an enlarged view of the spring assembly retaining the ball check at the upper or high pressure relief side while holding to a lesser pressure restraint at the lower or low pressure side that admits gases to the compression chamber.

FIG. 77 is an enlarged end view of the spring/valves assembly.

FIG. 78-K is a cross-section illustration showing the piston approaching the impact.

FIG. 79-K is a cross-section illustration showing the piston commencing impact with the action of various elements.

FIG. 80-K is a cross-section illustration showing the piston in a mid-position of impact with other element positions.

FIG. 81-K is a cross-section illustration showing the piston in full contact with ram pushing to complete closure.

FIG. 82-K is a cross-section illustration showing the impact closure.

FIG. 83-K is a cross-section illustration showing the piston in bounce retraction commencing the return stroke.

FIG. 84-K is a cross-section illustration showing the piston in departure.

FIG. 88-K a cross-sectional illustration of a critical element in the control of the operation of the steam driven sub-sonic shock compression unit. This is a rotary throttle valve that is driven by a pressure volume regulated constant steam stream passing over an impeller that turns a cylindrical valve on the same axis to intermittently open to high pressure steam that is delivered in pulses to the series cylinder/pistons assemblies simultaneously to achieve a synchronous drive in the piston pairs that oppose one another. The holed cylinder surface is supported by the steam pressure without weight or resistance to the rotational force using the nucleate bubble principle of this invention.

FIG. 89-K a cross-sectional end view of the rotor/cylinder assembly of FIG. 88 showing sections along the axis.

FIG. 90-K a cross-sectional view of the rotor impeller that is driven by steam input.

FIG. 91-K a cross-sectional view of the portion of the rotor/cylinder unit that is the valve that intermittently opens in rotation.

FIG. 92-K cross-sectional view showing the steam escape port for the steam return from the application of steam to the perforations of the rotor assembly.

FIG. 93-K a cross-sectional view through the rotor edge showing the perforated surface overlying a grooved surface that serves as a manifold beneath these perforations serviced by porting to the center of the rotor.

FIG. 94-K is a cross-sectional illustration showing the use of a reflective light beam deflected by the surface of the piston in passage. A long focal length lens is shown in use to remove the optical equipment away from the heat of the apparatus.

FIG. 95-K is an illustration like FIG. 94 but employing the passage of a laser beam across the piston path for the same purpose.

FIG. 96-K an enlarged cross-sectional view of the lens element use.

FIG. 97-K an illustration like FIG. 95 in variation.

Figure 1:
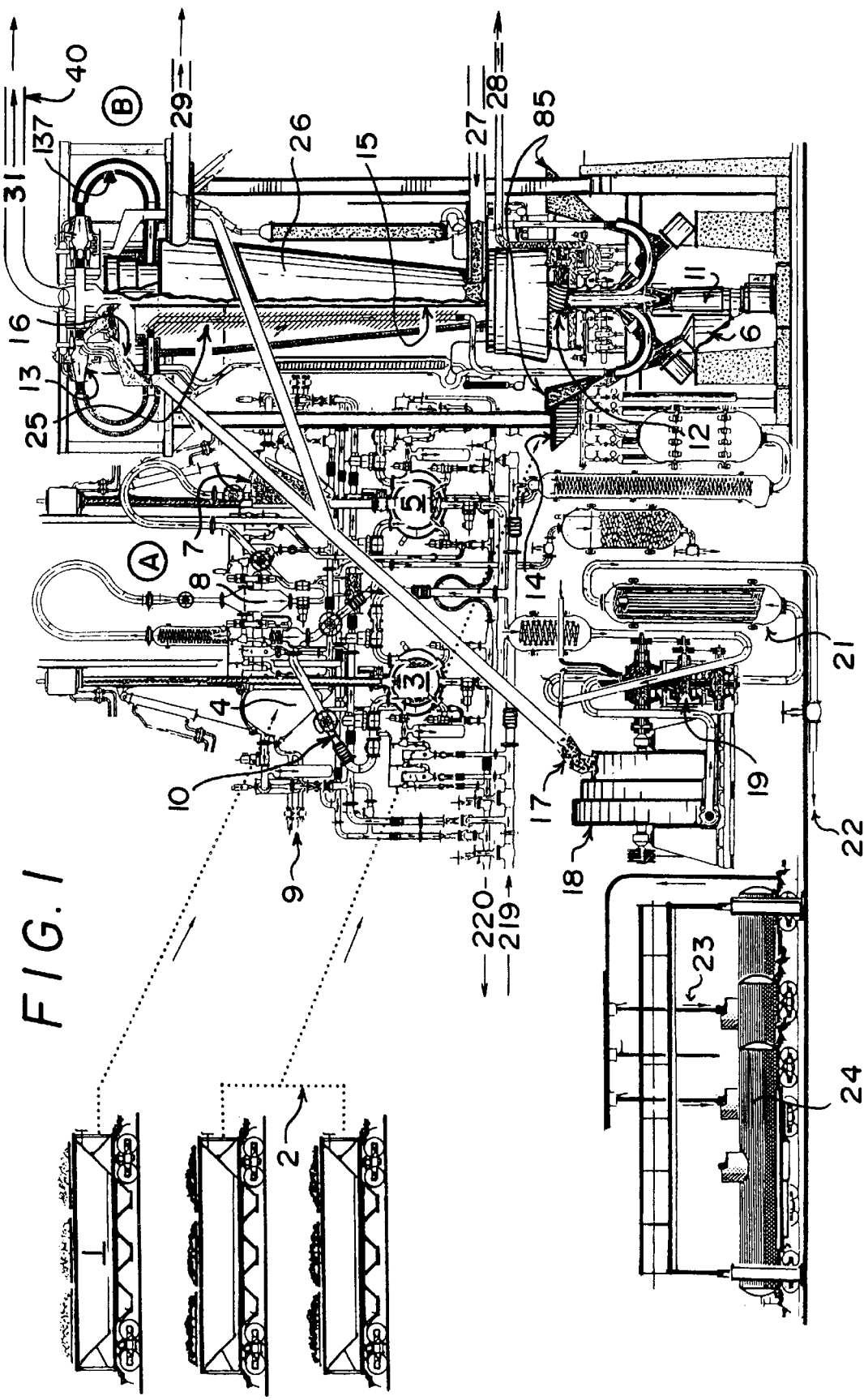
FIG. 1 illustrates the introduction of low grade coal and waste plastic as feedstocks in a Plastic Waste Recovery Process—A, in which this product is treated and combined with a coal by-product of the Fire Reduction Process—B treatment to produce a thixotropic liquefied coal product usable as a power-plant fuel.

ALPHA-NUMERICAL INDEX USED IN DRAWINGS OF SPECIFICATION (Unused Numbers Are Shown)

A Waste Plastic Hydrocarbon Recovery Plant (Extension Process of Processor I)
B Encapsulated Fire Reduction Gasification Plants (Processors I and II Configuration)
C Fire Reduction and Gasification Fractioning Type Plant (Processor III)
D Ammonia Liquor and Tar Recovery Plant (Ammonia Liquor Plant for Processors I, II and III)
E Ball System for Dry Gas Cleaning (Gas Cleaning—Non-contaminating System)
F Renewable Cathode Gas Ionizer (Essential Gas Treatment Prior to Molecular Division Procedures)
G Parabola/Centrifugal/Collimator (Rough Gas Division Method)
H Gas Condenser/Recompressor and Tank Storage (Conventional and Essential Gas Handling Apparatus)
I Cyclotron Gas Division Magnetic Field Apparatus (Molecular Mass Gas Division Method)
J Hot Static State Catalyst Reactor (Close Coupled with SSS Compressor for Free Energy Steam Conservation)
K Sub-sonic Shock Compressor (Free Piston Fuel or Steam Driven Compressor)
L Hot Gas Catalyst Transport Steam Reactor (Hot Process IV Catalyst Media Loop Cleanup, Rework and Return)
M Cold Media Input Cryogenic Liquefication Mixer (Cold Process IV Inert Media Circulation System of Gas Liquefication and Mixing)
N Anti-nucleate Boiler Tube Steam Generator (Ancillary Steam Production Method Using Newsprint as Fuel)
O Optical Piston Position Sensing System (Optical Visual Means to Determine Piston Position, Speed and Direction)
1. Waste Plastic Rail Gondola Car Load (1)
2. Coal Rail Gondola Cars (2)
3. Sub-sonic Shock Charging Tank for Waste Plastic (3)
4. Bellows Compression (Plastic Receiver) (4)
5. Second Charging Tank (Plastic) (5)
6. Extruder Hopper (6)
7. Second Bellows Compression Receiver (7)
8. Steam Ejector Vacuum Unit (8)
9. Compressed Air Input (9)
9a. Ditto (9a)
9b. Ditto (9b)
9c. Ditto (9c)
9d. Ditto (9d)
9e. Ditto (9e)

10. Vacuum Line to Charging Tank One (10)
10*a*. Vacuum Line (10*a*)
11. Feedstock Extruder (11)
12. Drive Gearing (12)
12*a*. $CO_2$ Cooled Bearings
13. Ram-jet Engine (13)
14. Coal Input Hopper (14)
15. Absorber Receiver Tube (15)
16. Soft Char Output (16)
17. Feed into Coal Hammer Mill Pulverizer (17)
18. Hammer Mill Pulverizer (18)
19. Ribbon/Shear Mixer (19)
20. Unused
21. Sonic Mixer (21)
22. Transfer pipe to Tank Car Loader (22)
23. Tank Car Loading Hose (23)
24. Liquefied Coal Tank Car (24)
25. Heat Radiating Vanes on Center Fire Return Conduit (25)
26. Internal Space in Gas Chamber (26)
27. Scrubbed Wet Liquid Ammonia Gas from Ammonia/Tar Plant (27)
28. Ammonia Liquor from Processors I, II or III (28)
29. Prime Gas Output from Processors I, II or III (29)
30. Unused
31. Stack gas (31)
32. Steam Ejector Vacuum Equipment (32)
32*a*. Ditto (32*a*)
32*b*. Ditto (32*b*)
32*c*. Ditto (32*c*)
32*d*. Ditto (32*d*)
32*e*. Ditto (32*e*)
33. Vacuum for Condenser (33)
34. Vacuum for Chemical Tank (34)
35. Vacuum for Extruder (35)
36. Vacuum for Extruder (36)
37. Vacuum for Catalyst Trap (37)
38. Gas Fractioning Output from Processor II (38)
38*a*. Rough Gas Fractions to Tankage (38*a*)
39. Pressure Storage Tank (39)
40. Stack Gas Pipeline to Scrubber (40)
41. Gas Scrubber Tower Using Ammonia Liquor Wash (41)
42. Ammonia Liquor Circulating Loop (42)
43. Flow Switch Valve/Sensor for Density Control (43)
44. Ammonia Liquor Output Line (44)
45. Tar Output Line (45)
45*a*. Tar Tank 1 (45*a*)
45*b*. Tar Tank 2 (45*b*)
45*c*. Tar Tank 3 (45*c*)
45*d*. Tar Tank 4 (45*d*)
45*e*. Tar Tank 5 (45*e*)
46. Gas Input Pipe to Gas Cleaner (46)
47. Gas Cleaning Ball Hopper (47)
48. Gas Cleaning Tank (48)
49. Ball Blaster Cleaning Station (49)
50. Gas 29 Conversion to Gas 50 after Ionization (50)
51. Wave-guide Collimation Gas Conductor Tube (51)
52. Gas Passage Collimator (52)
53. Feedstock (53)
54. Liner Feedstock (54)
55. Structure of Magnet and Coil (55)
56. Vent to Exhaust
57. Vent Shield
58. Magnetic Field Center in Cyclotron (58)
59. Inset-Top View of Cyclotron Magnetic Field Plane and Divisions (59)
60. Multi-Gas Division Output from Cyclotron (60)
60*a*. Manifold Divisions (60*a*)
60*b*. ditto (60*b*)
60*c*. ditto (60C)
60*e*. ditto (60*e*)
61. Gas Selection to Processor IV Hot Catalyst Reactor (61)
62. Gas Input to Cold Liquefication
63. Unused
64. Catalyst Cleaner (64)
65. Cold Media Liquefication Chemical Formation (65)
66. Hot Catalyst Media Reactor (66)
67. Media Cleaner (67)
68. Inset Media Churning Shape in Absorber Receiver Tube Assembly (68)
69. Perforations at Top of Absorber Receiver Tube (69)
70. Reacted Gas Control Valve HCMR (70)
71. Chemical Product Pipe Line from HCMR (71)
72. SSS Compressor Assembly (72)
72*a*. Ditto (72*a*)
72*b*. Ditto (72*b*)
73. Catalyst in Reactor Tower of Reactor SSS Compressor Combination (73)
74. Gas Takeoff Port from Catalyst (74)
75. Methanol Output of SSSCat/Reactor Plant (75)
76. Chemical Mix Tank (76)
77. Chemicals from Cold Liquefication System (77)
78. Reacted Gas to Condenser (78)
79. Flame Passage in Boiler (79)
80. Flame Loop (80)
81. Boiler Tubes (81)
82. Saturated Steam (82)
83. Near Super-heated Steam (83)
84. Superheated Steam (84)
85. Clay/Glass Hopper feed for Extruder (85)
86. Extruder for Liner (86)
87. Unused
88. Stack Damper (88)
89. Flame/Fuel Combining Point in Nozzle (89)
90. Detail of Streamline Piping Form Change (90)
91. Nozzle Input for Feedstock (91)
92. Feedstock Channel in Nozzle (92)
93. Nozzle Input for Liner (93)
94. Top Taper to Break Char (94)
95. Feedstock/Liner Crossover Point in Nozzle (95)
96. Involute Gear Form for Extrusion Speed Change Accommodation (96)

97. Involute Cross-section Sketch (97)
98. Liquor Downcomer (98)
99. Condenser (99)
99a. Dry Gas Condenser (99a)
100. Soft Char Receiver Pit (100)
101. Soft Char Pile in Pit (101)
102. Pit Fume Blower System (102)
103. Drain and Heavy Gas Duct (103)
104. Rotary Base Support and Drive (104)
105. Extruder Vacuum Port Vacuum Louver Guard (105)
105a. Vacuum Louver Guard (105a)
106. Gas Input Port on Extruder (106)
107. Producer's Gas Input Port (107)
108. Natural Gas Input Port (108)
109. Compressed Air Input Port (109)
110. Oxygen input (110)
111. Center Fire Spool Checker Radiator (111)
112. Bead Catalyst (112)
113. Stack Flash-Steam Heat Recovery Coil (113)
114. Perforated Flue Uptake Tube (114)
115. Dry Inert Media (115)
116. Expelled Inert Media (116)
117. Media Wash Treatment (117)
118. Auger Lift for Drying Media (118)
119. Water Recovery Tank (119)
120. High Speed Gear Drive (120)
121. Rotary Gas Cooled Mechanical Seals (121)
122. Two-Speed Static Body Extruder (122)
123. One-Speed Rotating Body Extruder (123)
124. Two-Speed Static Body Multi Port Extruder (124)
125. Water Pump Return from Condenser (125)
126. Unused
127. Soft Char Chute Trap (127)
128. Chute to Storage (128)
129. Unused
130. Oxygen Output Point in Spool Checker Radiator (130)
131. Oxygen Hanger Pipe for Center Fire Radiator (131)
132. Chemical Reservoir (132)
133. Rotary Valve Closed for Ram Jet (133)
134. Rotary Valve Opened for Ram Jet (134)
135. Sliding Bearing for Ram-Jet Recoil (135)
136. Hydraulic Pistons for Recoil Pressure Generation (136)
137. Center Fire Loop (137)
137a. Center Fire Return in Close Position Against Absorber Receiver Tube
138. Water Gas Vent (138)
139. Pulsing Valve on Raw Gas Receiver (139)
140. Top Water Reservoir (140)
141. Water Spray Cooler for Soft Char (141)
142. Producer's Gas from Soft Char Cooling (142)
142a. Water Gas Pressure Line (142a)
143. Soft Char Rotary Gate (143)
144. Soft Char Moving Down Chute to Storage (144)
145. Dried Soft Char Water Gas (145)
146. Venturi Drawdown of water gas into Center Fire Course (146)
147. Gas Pickup Tube (147)
148. Natural Gas Reservoir at Top (148)
149. Ram-Jet Spark Plug (149)
150. Gas Collection Cup (150)
151. Ammonia Liquor Spray into Gas Chamber Space (151)
152. Low Temperature Pulsed Gas Receiver (152)
153. Flame in Center Fire (153)
154. Chamber Steam Jets for Absorber Receiver Tube (154)
155. Steam and Water Jet Gas Rotational Jet (155)
156. Gas Rotational Path (156)
156a. Gas Eddy Path at Cup (156a)
157. Tar (157)
158. Gas Expelled from Absorber Receiver (158)
159. More Gas Expelled from AR (159)
160. Expelled Catalyst (160)
161. Catalyst Wash Treatment (161)
162. Wash Manifold (162)
162a. Media Wash Pump (162a)
163. Auger Lift for Drying Catalyst (163)
164. Wash Recovery (164)
165. Dry Catalyst Return (165)
165a. Catalyst Media Wash Pump
166. Vacuum Trap (166)
167. Dry and Cleaned Restored Catalyst Returned to Extruder (167)
168. Catalyst Hot Gas Space (168)
169. Vacuum Tank Receiver for Catalyst Gas (169)
170. Reactor Steam System (170)
171. Hot Compressed Air System for Catalyst Drying (171)
172. Cold Fluid Input (172)
173. Cold Fluid Return (173)
174. Static Convoluted Wall of Outer Cold Tube (174)
175. Convex Half Ball Shapes on I.D. of Absorber Receiver Tube (175)
176. Cold Delivery Tube (176)
177. Cold Return Tube (177)
178. Dry Media Nozzle Input (178)
179. SSS Steam Attemperation Unit 72 (179)
180. Perforated Ball Funnel in Ball Cleaner (180)
181. Ball Drive (181)
182. Ball Delivery Tube to Gas Cleaner (182)
183. Ball Cleaning Tank (183)
184. Ball Delivery Tube to Ball Cleaner (184)
185. Blaster Tube Retainer (185)
186. Air Knife Form and Final Manifold (186)
187. Carbon Dioxide Manifold (187)
188. Air Knife Slit (188)
189. Slot for Blow Off (189)
190. Ball (190)
191. Ball Rails (191)
192. Holes in Balls (192)
193. Undesirable Flattening with Larger Holes (193)
194. Tube Ball Line from Gas Cleaner to Ball Cleaner (194)

195. Discs (195)
195a. Disc Stack (195a)
196. Disc Vibrator (196)
197. Hopper Vibrator (197)
198. Dust Extruder (198)
199. Extruded Carbon Briquette Cylinders (199)
200. Gas Ionization Unit (200)
201. Aluminum Wire Wrapped on Cone (201)
202. Zirconium Plated Aluminum Wire (202)
203. Cone Spool End Cap (203)
204. Torque Driven Capstan Drives (204)
205. Idler Pulley (205)
206. Wire Vacuum Seals (206)
207. Spring Wind in Seal (207)
208. Compressed $CO_2$ Input from Compressor (not shown) (208)
208a. $CO_2$ Exhaust from Chamber
209. Ionization Chamber (209)
210. $CO_2$ Pressurized Gas Input for Bearing Cooling (210)
211. Steam Pump (211)
212. Scrubber Tower (212)
213. Steam Input to Tar Separator (213)
214. Ammonia Liquor Spray Head on Scrubber (214)
215. First Stage Tar Separator (215)
216. Check Valve to Ammonia Liquor Loop (216)
217. Tar Discharge Valve (217)
218. Discharge Pipe End in Tar Tank (218)
219. High Pressure Steam Input (219)
220. Steam Return (220)
221. Tar Pump (221)
222. Ammonia Liquor Intensifying Loop (222)
223. Transfer Valve and Density Sensor for Loop Discharge (223)
224. Steam Heated Tar Trap Baffles (224)
225. Ammonia Liquor Viscosity Sensor (225)
226. Valve Actuator (226)
227. Liquor Pump (227)
228. Gas Fumes (228)
229. Gas Fume Topping Ammonia Liquor Tank (229)
230. Gas Fume Trunk (230)
231. Emergency Vent (231)
232. Fume Transfer to Scrubber (232)
233. Input Steam Line to (3)-(233)
234. Input Steam Line to (5)-(234)
235. Steam Valves to (3) & (5)-(235)
236. Vacuum Pipes to (3) & (5)-(236)
237. Lower Parabola Face (237)
238. Plastic in Bellows Loader (238)
239. Bellows Loader Lid Open (239)
240. Bellow Loader Lid Closed (240)
241. Bellows of Loader Deflated (241)
242. Bellows of Loader Inflated (242)
243. Cylindrical Compacting Chamber Closed (243)
244. Hydraulic Ram Drives (244)
245. Fast Thread Ram Lead Screw (245)
246. Moyno Form Threaded Ram (246)
247. Ball Valve Open (247)
247a. Ball Valve Closed (247a)
248. Chill Coils for Hydrocarbon Liquid Receiver (248)
249. H/C Liquid input to Ribbon Mixer (249)
250. Chemical Additives to Coal/H/C Mix (250)
251. Second Chemical Additive to Coal/H/C Mix (251)
252. Mix delivery to Sonic Mixer (252)
253. First Acid Reservoir (252)
253a. Second Acid Reservoir (253)
254. Acid Discharge Valve (254)
255. Liquid Shield on Gas Takeoff (255)
256. Pressure Tank Recovery (256)
257. Top Gas Recovery (257)
258. Assist Vacuum for Shock Chamber 3-(258)
259. Assist Vacuum for Shock Chamber 5-(259)
260. Right Piston (260)
261. Left Piston (261)
262. Discharge Valve on Cylinder (262)
263. Compression Begins on Plastic (263)
264. Compression Completed (264)
264a. Ditto (264a)
265. Combustion Driving Left Piston to Impact (265)
265a. Combustion Drive for Opposing Right Piston to Impact (265a)
265b. Ditto (265b)
265c. Ditto (265c)
265d. Ditto (265d)
266. Rotating Parabola Tube Input Assembly Receiving Gas—(266)
267. Supporting Structure (267)
268. Finite Space Between Rotating Disc Rotor and Static Disc Stator (268)
269. Static Leg to Foundation Anchor (269)
270. Rotating Parabola (270)
271. Bearing Support for Rotating Tube (256)–(271)
272. Height of Thin Disc Stated to Provide Slits 0.020" to 0.030"—(272)
273. Face of Upper Parabola Disc Stack with Curvature Shown (273)
274. Actual Collimating Slit Opening (274)
275. Center Line of slit opening in Concave Gas Guide (275)
276. Entrance Tube directing gas (50) into the Parabola (276)
277. Sketch of Parabola Profile (277)
278. Perforated Gas Cone Collimator (278)
278a. Focus Impact Apex of Perforated Cone (278a)
278b. Tungsten Point at Focal Point (278b)
279. Slot Divisions (279)
280. Cut through Gas Planar Divisions of Wave-guide-like Conduit (280)
281. Cyclotron Gas Tube Divisions at the Manifold Valves (281)
282. Cyclotron Gas Tube Divisions at the Magnet Edge (282)
283. Spectrum Division Valves (283)
284. D.C. charge between Ionization and Cyclotron (284)
285. Gas output port for Single Division (285)

286. Piston of SSS Cylinder Unit (286)
286a. Piston of SSS Cylinder Unit Closed (286a)
286b. Piston of SSS Cylinder Unit Opened (286b)
286c. Piston of SSS Cylinder Unit Closed (286c)
286d. Piston of SSS Cylinder Unit Opened (286d)
287. Cylinder Shock Compression Space (287)
288. Steam Temperature Control Space in Cylinder Walls (288)
289. Heat Exchanger Bellows (289)
290. Ball Check to Reactor (290)
291. Combustion Fuel Input (291)
292. Compressed Air Input (292)
293. Spark Source (293)
294. Fuel Valve Actuation Air Piston (294)
295. Air Control Cell in Hexagon Block (295)
296. Hot Exhaust port in Cylinder for Reactor Input (296)
297. Input for Piston Return (297)
298. Air control lines (298)
299. Cylinder Mounting and Control Block (299)
300. Bubble Forming Holes in Piston Wall (300)
301. Port to Peripheral Manifold (301)
302. Nucleate Bubble Shape (302)
303. Cross holes in Piston (303)
304. Bernoulli Taper on Piston End for Nozzle Effect (304)
305. Exhaust input to Reactor (305)
306. Exhaust tubes in Reactor (306)
307. Input Steam Tubes in Static State Reactor (307)
307a. Steam Return Tubes in Static State Reactor (307a)
308. Steam Modulating Valve (308)
309. Water input to Attemperation Natural Gas SSS 72 (309)
310. Unused
311. Piston Impact Spring in Control Cell (311)
312. Spool Valve Cylinder (312)
313. Spool Piston (313)
314. Piston Collar (314)
315. Secondary Spring (315)
316. Piston Collar Pin (316)
317. Larger Air Port to Control Valve & Cylinder (317)
318. Air Port to Valve Control Cylinder (318)
319. Individual Piston Surface Groove (319)
320. Slot cut across threads of Piston Manifold Grooves (320)
321. Piston Rod Left Hand (321)
321 a. Piston Rod Right Hand (321 a)
322. Representative Porting for Peripheral Steam Holes (322)
323. Piston Rod Release Taper (323)
324. Piston Rod Spring Assembly (324)
325. Piston Rod End Plunger (325)
326. Taper Seat of (331) Back Ram for Piston Rod Taper (326)
327. Back Pressure Against Collar from Piston Rod Center Port (327)
328. Back Ram (328)
329. Center Ram Spool (329)
330. Ram Collar (330)
331. Front Ram (331)
332. Progressive Gas Pressure Relief Valve to Reactor (332)
333. Input Gas/Steam Feedstock Valve (333)
334. Center Port in Piston Rod Taper End (334)
335. Stroke Relief Valve (335)
336. Stroke Return Input Valve (336)
337. Steam Input from a Boiler (337)
338. Axial Port in Piston or Rotor (338)
339. Steam Input Drive Pocket in Rotor Impeller (339)
340. Gas Isolation Space (340)
340a. Bounce Force (340a)
341. Impact Stroke End Cylinder Space
341 a. Cylinder Shoulder Stop
342. Space between Front and Back Rams (342)
343. Direction of Steam Drive Clockwise (343)
344. Piston Drive Pressure Pulse Burst from Throttle (344)
345. Throttle Pressure Expansion Chamber (345)
346. Piston Rod Cross Porting to Axial Center Hole (346)
347. Piston Return Stroke Pressure (347)
348. First Exhaust Port A (348)
349. First Exhaust Port B (349)
350. Spring Center Support (350)
351. Shock Spring (351)
352. Spring Striker Plate (352)
353. Optical Port Quartz Window (353)
354. First Exhaust Port Left Hand—(354)
354a. First Exhaust Port Right Hand—(354a)
355. Second Exhaust Port Left Hand—(355)
355b. Second Exhaust Port Right Hand—(355b)
356. Piston End Holes (356)
357. Piston Center Ball (357)
358. Opposing Piston Gas Input Pressure (358)
359. Gas Exhaust to Reactor (359)
360. Feedwater Reservoir (360)
361. Main Pressure Exhaust Relief and Input Spring Assembly (361)
362. Spring Pair Used for Both Functions (362)
362a. Ditto (362a)
363. Unused
364. Unused
365. Ball Check for Relief (365)
366. Ball Check for Steam Input (366)
367. Neutralized Force (367)
368. Vent Port for Chamber (345)(368)
369. Shock Impact Orifice Restraint (369)
370. Steam Pressure Input Port to Pressure Chamber (370)
371. Isolation Pressure Chamber (371)
372. Unused
373. High Pressure Steam Line (373)
374. High Pressure Steam Line (374)
375. Gas input to 72 SSS Compression Unit (375)
376. Ditto input to 72a Steam SSS Compression Unit (376)
377. Ditto input to 72b Syngas SSS Compression Unit (377)

378. System Gas Input (378)
379. Gas Heater Coil (379)
379a. Water Heater Coil (379a)
380. High Pressure Steam Line from Main Expansion (380)
380a. High Pressure Steam Line to 72b (380a)
380b. High Pressure Steam Line to R1 and R2 makeup (380b)
381. Steam Standpipe (381)
382. Medium Pressure Steam to 72a Attemperation Circuit (382)
383. Medium Pressure Steam to 179 Attemperation Units (383)
384. Water Loop for Attemperation Circuit (384)
385. Water Drain from S2
386. R1 and R2 Steam Jacket Piping (386)
387. Natural Gas Input for Reforming at input 72 Gas SSS Unit (387)
388. Low Pressure Steam Return (388)
389. Check Valve (389)
390. Check Valve (390)
391. High Temperature Steam Makeup for Syngas Reactor Input (391)
392. High Temperature Steam Makeup for Natural Gas Reactor Input (392)
393. Steam from 72 Temp Control (393)
394. Steam from 72a Temp Control (394)
395. Steam from 72b Temp Control (395)
396. Spark of Gas SSS Unit (396)
397. Spark of Steam SSS Compressor (397)
398. Spark for SynGas SSS Compressor (398)
399. Gas Output at SSS 72 (399)
400. Gas Input at Reactor R1-(400)
400a. Mounting Flange on Block 299 for Reactor (400a)
401. Gas Leaves Reactor Catalyst Top (401)
402. Gas Enters Condenser (402)
403. Top takeoff from Condenser (403)
404. Selected Gas Fractions from Condenser (404)
405. Top Fractions (405)
406. Middle Fractions (406)
407. Bottom Fractions (407)
408. Line to Reheater from Condenser Fractions (408)
409. Pressure Water Tank (409)
410. Water Pump (410)
411. Gas Enters Condenser (411)
412. Top Takeoff From Condenser (412)
413. Fractions From Condenser (413)
414. Top Fraction (414)
415. Middle Fraction (415)
416. Bottom Fraction (416)
417. Unused
418. Line to Finish from Condenser Fractions (418)
419. Line to Finish Processing (419)
420. Line to Finish Processing (420)
421. Line to Finish Processing (421)
422. Effluent Tank (422)
423. Effluent Drain (423)
424. Effluent Drain (424)
425. Crude Tank (425)
426. Cold Source (426)
427. Cold Source (427)
428. L P Steam to 463 Jacket (428)
429. Ditto (429)
430. Pulsed Heat Blast from Ram-jet (430)
431. Cottonized Newsprint Input (431)
432. Ignition Point of Paper Fuel (432)
433. Flame in Passage (433)
434. Water Supply Tube (434)
435. Tube Bottom Reservoir (435)
436. Vertical Boiler Tube (436)
437. Impact Ball (437)
437a. Check Ball (437a)
438. Flame Turn (438)
439. Return Flame Trunk (439)
440. Flame Travel Return (440)
441. Flame Travel Return (441)
442. Flame Overlap Ram-jet Input (442)
443. Exit to Flue (443)
444. Boiler Tube Servicing (444)
445. Water Check Valve (445)
446. Bottom Water Feed Reservoir (446)
446a. Steam in Reservoir 435 (446a)
447. Check Ball Seat (447)
448. Check Ball Seat (448)
449. Lower Tube Port Saturated Steam Vent to Reservoir (449)
450. Lower Tube Port Saturated Steam Vent to Reservoir (450)
451. Sealer Ball Traveling Upward (451)
452. Impact Ball Passes Steam Ports as it Rises (452)
453. Upper Boiler Superheat Steam Vent to Reservoir (453)
453a. Upper Boiler Superheat Steam Vent to Reservoir (453a)
454. Superheated Steam Boiler Tube Vent to Steam Reservoir (454)
455. Low Pressure Steam Output (455)
456. Supersteam High Pressure Steam Output (456)
457. Saturated Steam Low Pressure Steam Tank (457)
458. Unused
459. Super-heated Steam Tank (459)
460. S2 Accumulator (460)
461. Water in S2 (461)
462. Steam in S2 (462)
463. Steam Jacket for S2 (463)
464. Compressed Steam from Accumulator (464)
464a. Steam from 72a to S2 (464a)
465. Modulating Valve Set (465)
466. Separator Tank (466)
467. Flash Tank (467)
468. Unused
469. Unused
470. Unused
471. Steam Blow Down (471)
472. Flash Gas (472)

473. Methanol Output (473)
474. Unused
475. Topping Tank (475)
476. Refining Tank (476)
477. 72 Exhaust to R1 (477)
478. 72a Exhaust to R1/R2 Loop (478)
479. 72b Exhaust to R2(479)
480.
481.
482. Exhaust Loop (482)
483. Unused
484. Condenser Gas to Reheater (484)
485. Condenser Gas to Reheater (485)
486. Output from Reheater (486)
487. Syngas Pipe (487)
488. Syngas Pipe (488)
489. Input to 72b (489)
490. Output of 72b (490)
491. Output Dotted Line (491)
492. Gas Enters Reactor R2(492)
493. Unused
494. Unused
495. Main Gas Line (495)
496. Gas Wash Tank (496)
497. Combustion Gas Input to 72(497)
498. Ditto to 72a(498)
499. Ditto to 72b(499)
500. to
551. Unused
552. Laser Light source (552)
553. Laser Beam (553)
554. Mirror (554)
555. Deflecting Laser Beam (555)
556. Hole in Lenses of Telephoto Lens (556)
557. Telephoto Laser Lens System (557)
558. Beam after Passing Lens (558)
559. Focal Point on Piston's Surface (559)
560. Quartz Lens (560)
561. Kovar Mounted Quartz Window (561)
561a. Kovar Mounted Quartz Window (561a)
562. Returning Light Beam from Piston Reflection (562)
563. Unused
564. Telephoto Optical System (564)
565. Photocell or Light Pulse Sensor (565)
566. Unused
567. Kovar Mounting without Light Reflective Barrel (567)

DETAILED DESCRIPTION OF THE DRAWINGS

Five Processes make up the Primary Integrated Methods of this Invention (The first four Figures and the Letter Designations are a form of Index showing the relationship between the Primary Processes I, II, III, IV and V, the supporting or secondary processes and the various apparatus forms that apply to these.)

FIG. 1 is a schematic illustration showing the combining of two processes.

One of these is the;

Process I of this invention (A) (at the left of the FIG. 1 illustration) that is designed to operate at a temperature level suited to convert low grade coal into constituent gases that are marketable products. A by-product of soft-char carbon also results which in cooling produces a "water or producer's" gas used in the system as a fuel. In addition this residual carbon product retains a charcoal-like flammability and when pulverized and mixed with a spectrum of alcohols as derived by use of the Subsonic Shock Steam Reforming means or the;

Process V(B) (at the right of the FIG. 1 illustration) which is another primary process of this invention, the resulting product is a thixotrophic liquid coal fluid that can be used in a power plant fuel with its adjustable Btu level that depends on the mixing procedure. The use of these two processes together provides a profitable array of coal chemical gas constituents and a tank transportable liquefied coal fuel using a cheap low grade coal and waste material. Part of the function of the Process V is the extraction of Chlorine's from the waste plastic that would inhibit burning. In Process V the plastic feedstock is generally chopped plastic bottles and containers of all types as they occur in waste. To reduce shipping volume and long distance transport expense this plastic can be pre-melted in a vacuum and cast into an ingot form that can then be pallet-shipped on trucks and rail flat cars. It can be remelted, also in a vacuum and processed as a hot liquid or simply chopped into small parts and processed in that form. A gondola car of chopped waste plastic is shown here at (1) and coal cars are shown unloading at (2). The chopped waste plastic goes to a receiver (4) in the plastic reduction plant and the coal to a hopper (14) in the coal reduction processor.

Process I of this invention takes pulverized coal into the extruder at (6) and through its dual function (114) provides an insulating liner on the inner wall of the coal tube as it is extruded. This feedstock tube of extruded coal slides inside a Perforated Absorber Receiver Tube (15) as it is pushed upward in this unit that is rotating and driven by drive (12). A circulated fire is driven by Ram-jets (13) to travel in a looping Center-Fire path (137), a portion of which is entirely inside the extruded coal tube for its entire vertical length. The return path heats radiators (25) that heat the gas inside the Main Gas Chamber (26). The intense heat inside the tube of coal forces the chemical content out through the Absorber-Receiver Tube's perforations and into an air evacuated hot chamber or Main Gas Chamber (26) that is entirely enclosed. An Extruder Nozzle delivers the feedstock into the Absorber Receiver Tube at its top and the feedstock begins its travel upward in the Absorber Receiver Tube. To achieve this heat is delivered to the center of the feedstock tube with introduction in a porting arrangement in the Extruder Nozzle as the feedstock is being formed. This is a critical part of this invention. The Nozzle construction is such that it affords paths internally for the movement of extruded material delivered through the three admitting ports and through its structure. One path provides for the forming of the feedstock tube and the other two provide a division of porting internally so an outer extrudate lamination of fire-resistant material can cross over the feedstock tube and find its way to become the internal protective lining for the feedstock. In addition to the feedstock and its liner this special nozzle has porting and path provisions to receive the heat and flame of the Ram-jet as driven through the Center-Fire Loop, the fuel gases, compressed air and possibly oxygen when needed. Also in its upper section the outer surface of the feedstock is subjected to Vacuuming as it passes and a series of ports beyond that provide for Chemical Additives if they are required in the fire reduction of the feedstock so these changes are reflected in the gas products produced. These Nozzles have many variations as they relate to various processing factors involved in Processors I, II and III, all of which are common in principle but vary in forms. At the top of the Absorber Receiver tube the residual carbon extrusion is broken into pieces (16) that fall down a chute (17) below to a hammer mill (18) that pulverizes it prior to combining with the hydrocarbon alcohols (19) derived from the plastic plant (A). A volume of gases are taken off the coal reducer, these are held and circulated briefly in the Main Gas Chamber (26), taken off at (29) and ammonia liquor at (28). The stack-gas (31) goes to a scrubber, is cleaned and returned to the Gas Chamber for combining with the original gases and final takeoff with these at (29). The Process V plastic reduction plant (A) operates by moving plastic from a bladder like chamber (7) presses the material into a cylindrical form (4) to reduce air content and facilitate introduction to a vacuum chamber (3) that is in an isolated space between two pistons. Steam (219) is injected into this chamber with the plastic (3) and the two pistons (not shown here, but perpendicular to the plain of the illustration) are driven together violently in the shock reduction of the plastic. A like chamber is shown at (5) in a stage after the shock in which a liquid is shown as having been formed. In loading the feedstock plastic for this operation a high pressure air is supplied at (9) and a series of steam ejector vacuum units (8) cycle to pull vacuum on the chambers (3) and (5) as needed in sequence. One such line is shown at (10). The plastic liquor is freed of chlorine by the shock treatment that combines during the brief life $H_3O$ with Chlorine to create a salable volume of Hydrochloric Acid. The alcohols flow from the unit and after mixing with the powdered char in the ribbon/shear mill (19) and the sonic unit (21) move through (22) to loading lines (23) and tank cars (24).

Figure 2:
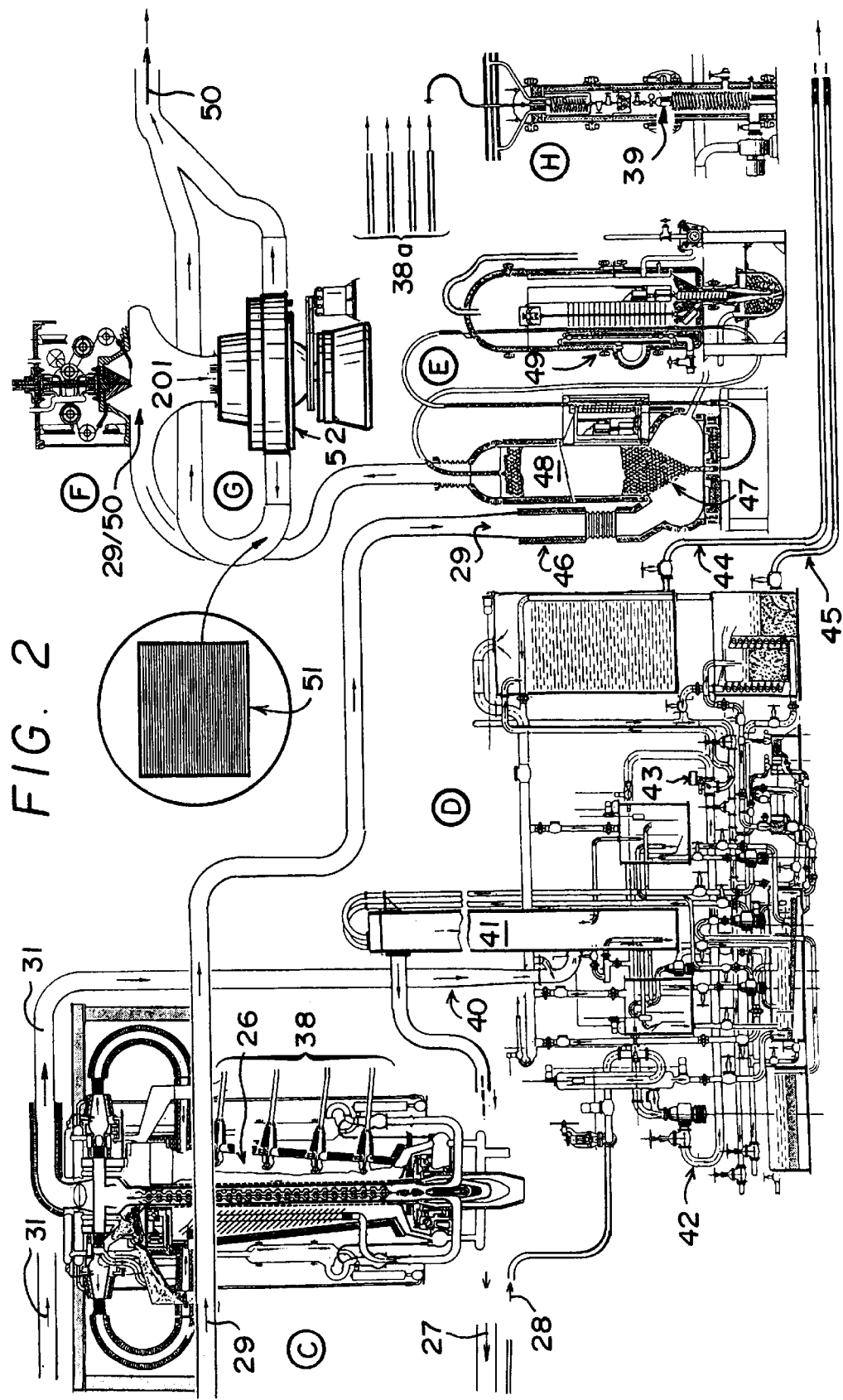
FIG. 2—illustrates another form of Coal Fire Reduction Process—C in which gas fractioning occurs, followed by stack gas scrubbing and Ammonia Liquor Treatment—D, of gases from both process forms, followed in turn by Gas Ball Cleaning—E and introduction to Gas Ionization—F means and Parabola/Centrifugal Collimating—G procedure to divide the gas constituents by molecular mass and weight. A Compressor Condenser Tanking Unit—H is shown for the raw gases derived showing tankage rather than applying subsequent treatment.

FIG. 2 comprises several of the different Processes of this Invention and these are designated as C, D, E, F G and H respectively.

This is a plant schematic illustration showing a continuation of processed gas (29) stack gas (31) and liquor (28) as handled from Processor I in the FIG. 1 as it passes or moves into the processes illustrated here.

Processor II(C) (at the left side of FIG. 2) is identical to Process I except it is operated at a higher temperature and is equipped with some exotic metals and material to withstand the higher heat. In addition it has the capability to make a rough fractioning of gases by molecular mass. Thermal diffusion is used as a means for gas division in the Raw Gas Receiver attached that gather these fractions because they are attracted to a lower temperature and pressure opening that occurs in pulses with each receiver opening briefly, one at a time. This creates a pressure modulation in the main chamber. Rough raw gas fractions (38) are attracted and taken off the main chamber (26) in this way. All emphasis in Process II is to extract gas to the maximum extent from whatever the feedstock and the liquor as well after scrubbing with further reduction of tars by recirculating the ammonia liquor gases into the main gas chamber to produce additional gas for division. There are additional internal features to facilitate this purpose described in detail in the following.

An Ammonia Liquor Plant (D) (in FIG. 2) is basically of conventional design with improvement in tar extraction and piping simplification to provide a stack gas scrubber and tar collection equipment for the Processes I, II and III. As shown here in FIG. 2 gas (31) from either type plant moves through pipe (40) to pass through the scrubber tower (41) down which ammonia liquor, as derived from the process itself, is used to scrub the gas (31) so it can be returned to the Main Gas Chamber. As the liquor intensifies in the recirculating loop (42) the control at (43) that has been set for a predetermined viscosity and Centipoise value, opens its valve to pass a specific amount of liquor to the storage as this level is reached. (44) is the liquor product line and (45) the tar product line. The gas product (29) of Processor I is shown moving past (C) to the Ball Cleaning that follows.

Ball Cleaning Process (E) is a cross-section view in which thin wall perforated hollow balls are the cleaning media at (47) which is a perforated funnel form that they move through from chamber (48) as the gas flows upward through the space between the ball and through the holes leaving the particulate to accumulate on the ball walls and openings. After this passage they are moved through tanks and lines with a ball cleaning means at (49). After this cleaning the gas (29) moves beyond to ionization as the balls pass through their own cleaning process at (49) and are then returned to the gas cleaning side of the operation to repeat the operation.

Ionization Treatment (F) (in FIG. 2) is a cross-sectional view showing a renewable cathode (201) that changes the gas to an ionized state as it passes through this equipment (50) as it moves to further division means. Fractioned gases from Processor II(38) can be optionally cooled, compressed and tanked as raw divisions (39) with use of a condenser compresser (H)(39) or the gases (29)/(50) ionized as shown at (201) and then moved to further treatment.

Parabola/Centrifugal Collimation Division (G) (in FIG. 2)-(52) Here in this cross-section view the focusing feature of a parabola is used to cause a deflection and bounce of gas molecules for maximum agitation as they reverse molecular direction and apply the high speed of a centrifugal force inside the chamber that briefly holds and spins the gas cloud molecules as they are forced to churn induced by the friction between the gas and the parabola face as well as other effects (52) on their mass as they move away from the center toward the surrounding parabola face that is divided into finite horizontal slits for collimation division. The gas is carried off by circular collection means that is also divided into horizontal divisions in a conduit piping that connects directly to the collimation divisions of the parabola. This presents something visually like a wave-guide in form as shown in the Inset at (51).

(Process III apparatus is not shown here.) It is very similar to Process I, but has no fractioning features. It is operated at the highest temperatures possible and features all exotic metals in its construction. There is no steam injecting means for gas circulation and is entirely dependent upon heat stratification occurring in the Gas Chamber. Little liquor is produced, but what is generated is not returned. Stack gas is taken to another unit for disposition. Efforts here is to maintain a high level of purity in the gas generated.

Condenser/Compressor/Tankage (H) shows the gas storage option (38a)(39).

Figure 3:
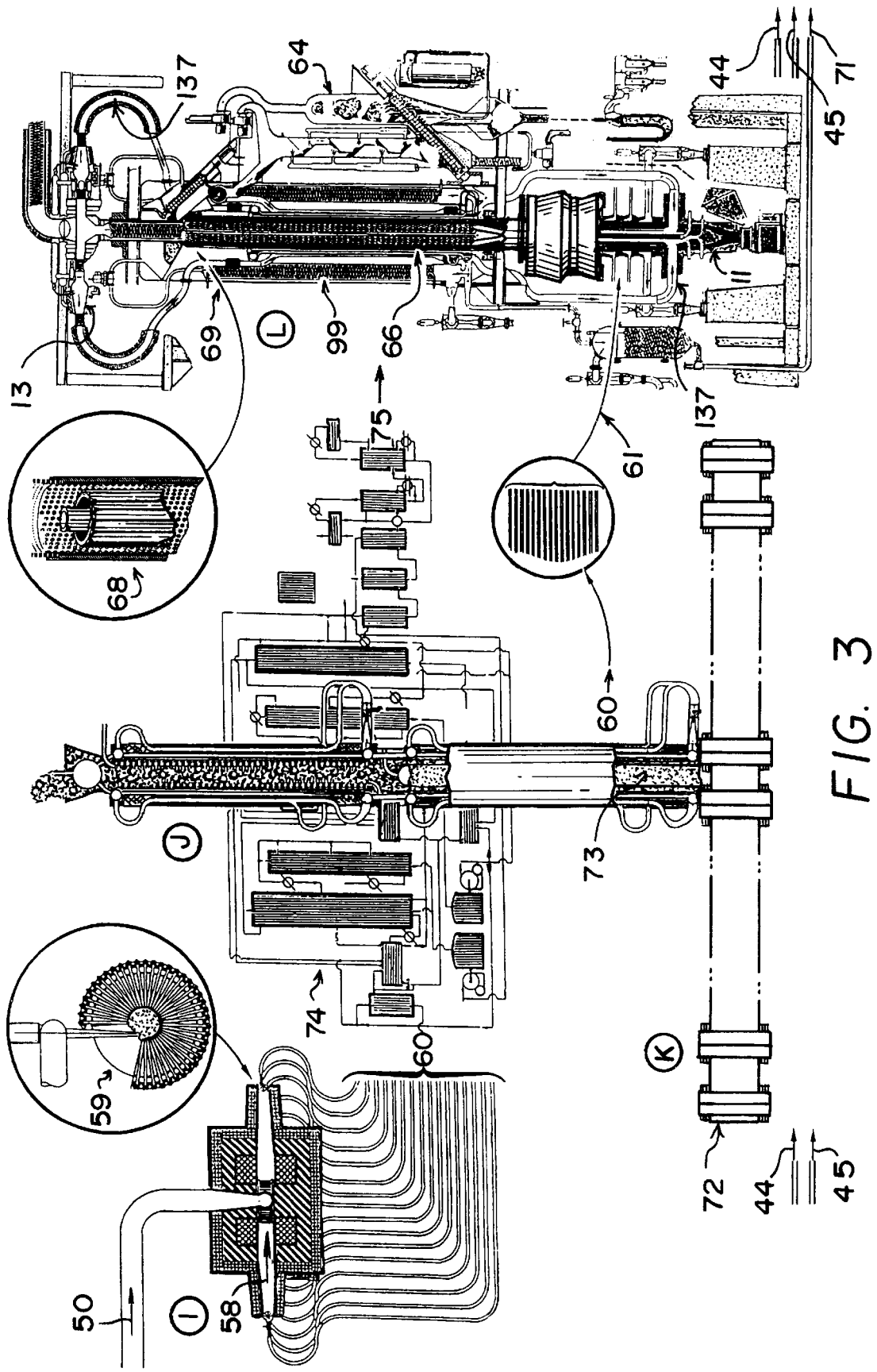
FIG. 3—illustrates a number of steps applied to the gases derived in FIGS. 1 & 2 in which Cyclotronic Magnetic Field—I is employed to divide the gases after which they can be selected for Reaction Treatment—J, or subjected to initial treatment with Sub-sonic Shock Compression—K coupled with Steam Reforming Reaction as is illustrated here and introduction to a conventional Syn-gas recovery system, or after division the gases can be introduced by metering means to a reaction chamber in which a catalyst media is moved by extrusion means of the invention, cleaned and recirculated for reuse as the gases are combined in a heated reaction and converted into another gas form. The final illustration shows a Hot Catalyst Reaction Plant—L in which a catalyst used as a gas supporting reaction media as it is driven by an extruder means to transport it through a system generic to those mentioned before so the catalyst can be processed in a side operation to clean and restore it before it recirculated to the extruder for reintroduction to the hot processing tower. This also affords an opportunity to makeup catalyst in a continuous process.

FIG. 3 is a continuation illustration of the integrated processes of this invention in which the gas from Processors I and II or III is divided by various means and reconstituted as a product using the Processes IV and V with the input of various secondary processes. These are indicated as I, J, K, and L in this illustration. The gas transit is shown (50) moving into a;

Molecular Division Cyclotronic Unit (I) with a magnetic field (58) that divides the gas into a possible thirty-eight fractions by molecular weight as shown in inset (59).

Divided gases (60) move to inputs of (74) which is a conventional Gas processing plant but augmented with the use of a Sub-sonic Shock Units (72) to produce alcohols at (75).

Processor V Sub-Sonic Compressor (K) (center of FIG. 3) is shown with a steady state Catalyst Reactor (J) closely coupled by mounting directly on top of the Sub-Sonic Compressor (K) in which any of the gases from the Processors I, II and III, (60) including stack gases, natural gas and Syngas can optionally be input individually or combined in parts to the Sub-sonic Shock Steam Reforming function of (K) as a compressor for input to a coupled reactor (J), as shown, or optionally for better use of the catalyst and protection from catalyst poisoning the coupling of the Shock Steam Reformer (K) with the (L) Processor IV Circulating Catalyst Media Reactor. An individual unit or a plurality of Shock units can be used here using the extrusion features of this invention to move the catalyst through cleaning and refurbishing procedures continually as the chemical reaction takes place and the cleaning function occurs in an adjoining unit (64). The catalyst media churning is a function of the form and shapes of the annular passage it moves through as shown in the inset (68). The derived gas product is taken from a perforated section at the top of the Absorber Receiver Tube (69) and can then be used as a gas or liquefied with the condenser system (99) There is the similarity of the extruder system (11) to that of the Fire Reduction Means of Processes I, II and III. Gases for processing are injected at the nozzle after vacuuming and a Center Fire means is used as at (137), however here there are a plurality of Fire Tube return lines from the Ram-jets which are closely held near the outside of the rotating Absorber Receiver Tube. There is no gas chamber, just an insulated enclosure to retain the heat of the Tube Loop returns and the Absorber Receiver Tube and its moving catalyst content. The catalyst is moved upward in the outer annular space of (68) and the Center Fire moves upward in the middle tube for a maximum draft and also inside and around the three spool checker radiators that are set in the surrounding annular space to provide the heat. The center tube of (68) is perforated. (This inert media handling and cleaning procedure is used in a like manner in a Processor IV Cold Inert Media Mixing/Liquefying (M) (FIG. 25) procedure that is the counterpart of Processor IV Hot Catalyst Media Processing.)

Process IV Hot Catalyst Media Processing (L) is applied with the use of an extruder and the course of the hot catalyst is through the rotating channel of the Absorber Receiver Tube with internal shaping (68) to churn the media to mix the gas or liquid content in passage through this channel. A plurality or selection from the gases (61) are introduced at the extruder nozzle into this traveling catalyst media heated in the reaction chamber (66) and passed off through the absorber receiver tube's top perforations (69). Many of the heating features used in the Fire Reduction Processes function here identically. Examples of some of these are the Spool Checker Radiator, the Ram-jet pulse heat drive (13) and the Center Fire circulation (137) described later. The media is cleaned in section (67) with a reduction in losses of catalyst poisoning. The gas output is reduced to a liquid at (99) the condenser is taken off through pipeline (71).

FIG. 4 is a continuation illustration of the integrated processes showing;

The Cryogenic Mixing/Liquefying of Processor IV(M) in which the gas feed is shown at (62) as a plurality of metered gases intended as a formula for a chemical liquid. These enter a like extruder nozzle system to that of all the processors (11) which for this inert media is cooled by flowing liquid nitrogen or other cold liquid means through central piping inside the moving media mass in a manner not unlike the feedstock passage in the retention tube of the hot processes. This is essentially the same form of Absorber Receiver Tube (68) as is employed with the Process IV (L) Hot Catalyst Media Processor with the liquid derived from the gas taken off at top perforations (69) that combine as a chemical formula with the churning by the shaped tube interiors (inset 68) of the resulting liquids produced from metered amounts of gas as introduced at (62). Chemical accumulates in tank (76) and is taken off for delivery at pipe (77). The media cleaning is conducted at (67) before return to the extruder drive for reinsertion into the system. These processes require steam at high pressure that must be provided economically using an:

Anti-nucleate Boiler Tube System (N) illustrating a type of individual vertical boiler tubes (81) that functions to admit water and expel generated steam based on the movement of one or a plurality of heavy balls that have a specific fit within the boiler tube so their movement "irons" out the nucleate bubble formation that inhibits proper boiling. This boiler has a unique shape to provide a fire loop that is fed with a "cottonized" hammer mill to produce newsprint fuel (17) prepared in this beater device (18) and injected into a bowl firebox with compressed air to augment ignition and a hot air blast drive provided by a Ram-jet Engine (13) that is natural gas fired. The tubes are heated by the flame passage in two directions (80) and (81). A volume of water held between steam banks (82) and (83) form an part of the boiler enclosure and afford further heating means with a close relationship to the passing flame. The entire system is enclosed in a fire brick insulated structure. Gases derived from the processes are shown at (61), (71), and (38) being loaded on pressure gas tank trucks. Liquid chemicals are shown being loaded in tank trucks at (44), (45), (75), (22) and (77).

Figures 5, 6:
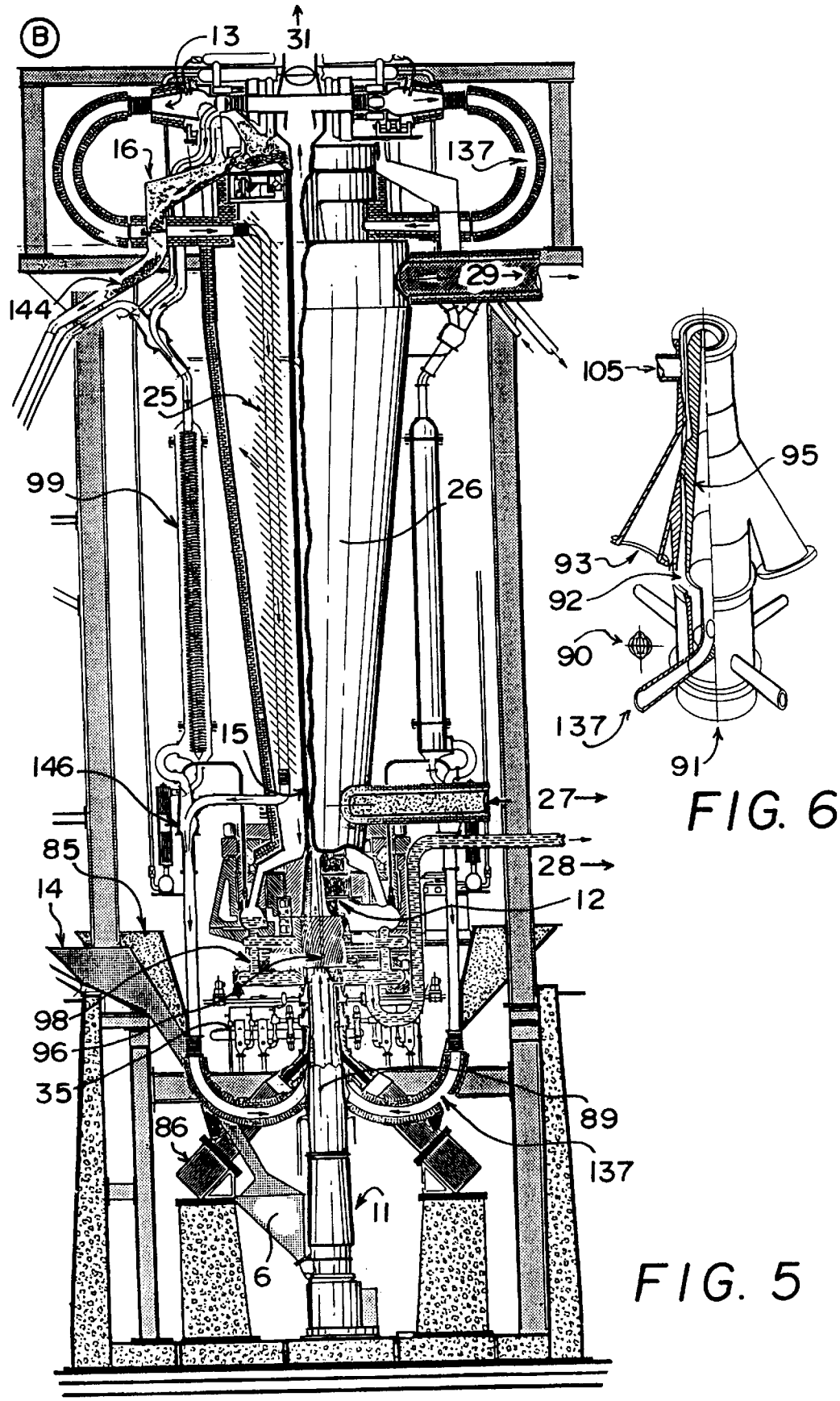
FIG. 5—B is a cut-away and cross-sectional view of the ore or Hydrocarbon Fire Reduction System employing the mass extrusion means of this invention showing some detail of the fundamentals of the Extruder, Absorber Receiver Tube, the Center Fire Source, Main Gas Chamber and its heating means.
FIG. 6—B shows the basic extruder nozzle form internally that directs the flow of the two extrusions that originate from three inputs, the streamline piping of the inside the extruder that affords passage of vacuum extraction, gas and flame input as well as the cross-over point where the lining extrusions move to the inside of the feedstock tube for its protection.

FIG. 5-(B) is a cut-away and cross-sectional view of the ore or hydrocarbon mass extrusion means of Processor I. This is a substantial structure of some height in which the feedstock extruder apparatus is located at the bottom (11) fed by hopper (14) to extruder input (6). The secondary or liner extrusion is introduced inside the first extruded feedstock tube form and delivered from hopper (85) to the (86) extruder unit that feeds a common extrusion nozzle Other features explained in detail in the following comprise the Center-Fire Circuit (137) driven by a plurality of Ram-jet Engines (13) mounted at the processor top to draw off the flame and heat that has been driven up through the center of the feedstock extrusion tube protected on its surface by the insulated lining. This extreme heat on the inside of the feedstock tube drives the gases and liquors out of the feedstock tube wall and through the perforated wall of a supporting Absorber Receiver Retention Tube (15). These gases and liquors are expelled as the feedstock is pushed upward and caused to rotate by the turning of this said Absorber Receiver Tube driven by the drive unit (12) in a change from the static extruder to the Absorber Tubes rotation that is accommodated by the means (96). The turning tube is surrounded by an enclosing gas chamber (26) that has been evacuated in startup by steam ejection vacuum means (35) and is heated by heat radiating plates (25) mounted on the fire-tube (137) return conduit, the hot gas velocity of which causes a low vacuum as it passes through a venturi (146) that vents the space to a condenser enclosure (99) to draw off a fuel gas generated by cooling a soft char by-product of the process as the feedstock tube top is broken away as a residual carbon product (142) to move through a chute (16). This "producer's gas or water gas" fuel augments the natural gas, compressed air and oxygen input at (89) burning in the center inside of the feedstock extrudate. Gases are taken out of the gas chamber at (29) and moved to other treatment and liquors and to be collected at (98) with direction to a well at the bottom and pumped beyond (28) to the ammonia liquor processor. This liquor is intensified, cleared of tars and cleaned to be returned to the gas chamber (26) at (27) to be regasified for extraction of constituent chemical gases derived from the feedstock liquors. Stack gases are expelled at (31).

FIG. 6-(B) shows the basic extruder nozzle and feedstock/liner introduction with vacuum and gas combining features in a single unit. The feedstock input port to the nozzle bottom is shown at (91); the detail of streamlined piping form (90) that minimizes the flow of feedstock that passes over it is shown at the small inset. The feedstock channel in nozzle is at (92); the liner extrusion input port is at (93); the vacuum pipe opening to feedstock passage in the nozzle at (105) and the flame input to the extrusion tube center at (137). The encapsulating liner materials are introduced in two port locations (93). There is a cross over point at (95) where the liner extrudate is delivered through a plurality of passages to move across and inside the feedstock extrusion so that it is applied as an innertube liner that serves to insulate and protect the feedstock from actually burning in the heat of the center fire the liner softens and ablates in the heat.

Figure 7:
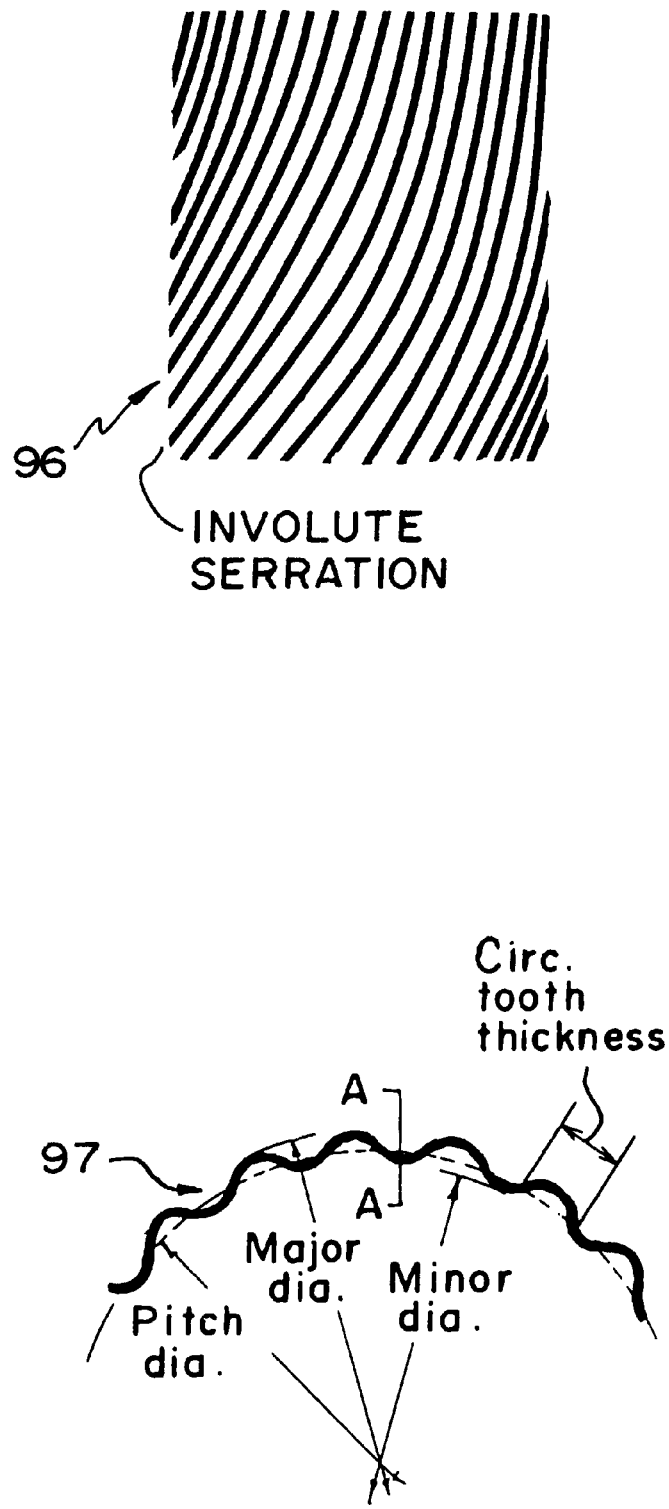
FIG. 7—B these two sketches illustrate the involute gear form imparted to the outside diameter of the extrusion as a friction clutching means for the speed conversion as the extrusion passes from a static extruder nozzle into the rotating absorber receiver tube in the heat treatment tower.

FIG. 7-(B) illustrates the involute gear form (96) die-imparted to the outside diameter of the extrusion as a varied friction means for the speed conversion as the extrusion passes from a static extruder to the rotating Absorber Receiver Tube heat treatment tower. (97) is a sketch of the cross-section of the die form illustrating the tooth shape, pitch diameter and minor diameter that is a function of imparting this form to the outside of the extruder wall in the accommodation of the speed change in the unit.

Figure 8:
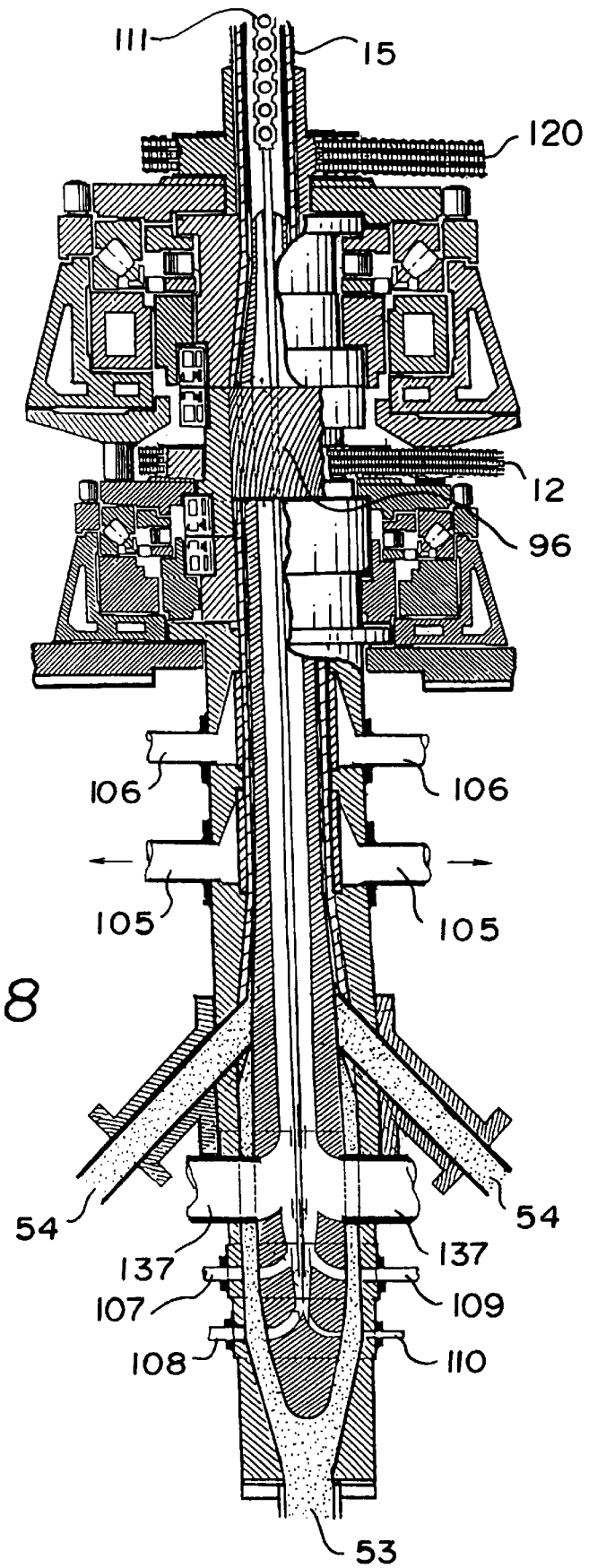
FIG. 8—B is a cross-sectional view of the extruder nozzle workings showing the drives, the intermediate connection of the extruder with the Absorber Receiver Tube and the extrudate path with the paths of various inputs.

FIG. 8-(B) is a cross-sectional illustration of the extruder nozzle unit that forms the basis for the extrusion functions of this invention. The material to be extruded is introduced at the bottom (53) as a feedstock and (54) the input of the protective liner material. The heat input is at (137) and the vacuuming ports are at (105) gas additive input option port (106) is above that and the fuel inputs are at the bottom where the producer's gas input is (107); natural gas input (108); compressed air input (109) and oxygen input (110). The convolute speed function is shown at (96) between the two drive components (12) and (120). The Center Fire Radiator is shown at (111) and the perforation of the Absorber Receiver Tube is shown at (15).

Figure 9:
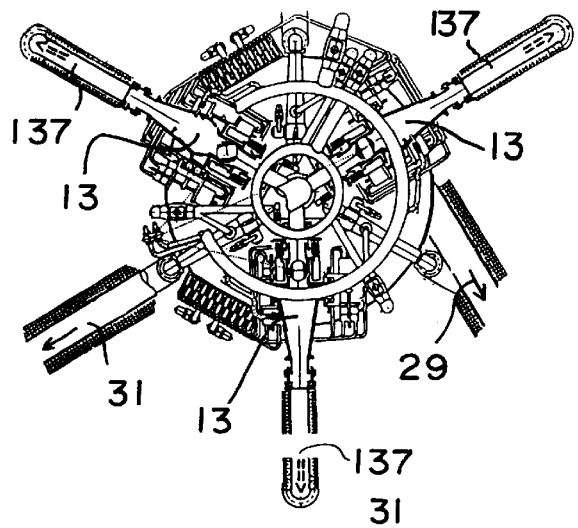
FIG. 9—B is a top view and cut-away of the ram-jet engines employed for the center fire circulation loops that provide the heat within the feedstock tube.

FIG. 9-(B) is a top view and cut-away of the ram-jet engines employed for the Center Fire circulation loops (137) and the Ram-jet units (13) that provide the heat drive. Gas delivery is shown at (29) and stack gas take off at (31).

Figure 10:
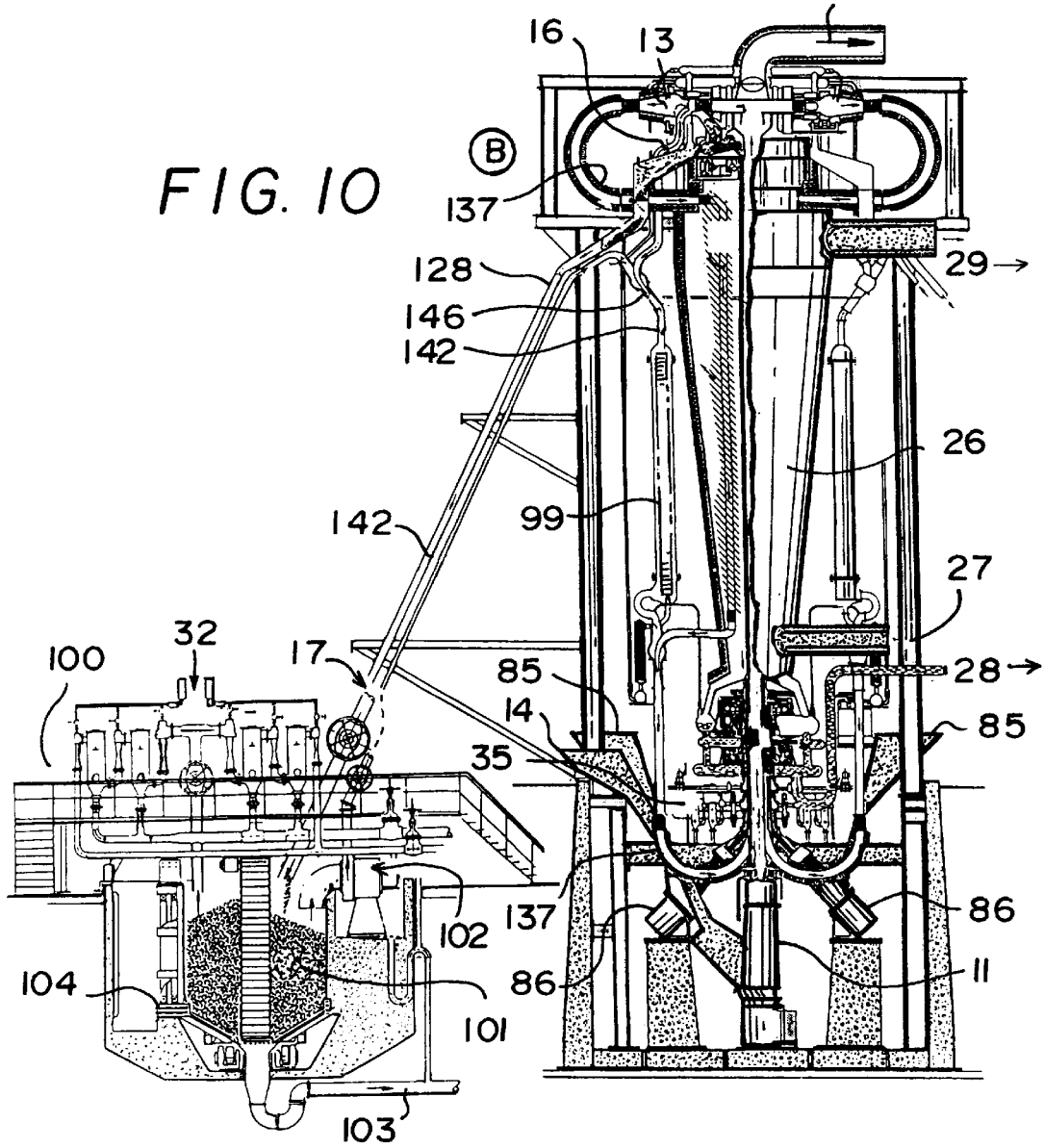
FIG. 10-B is a smaller view of the Fire Reduction Plant of FIG. 5 showing the delivery of the soft-char or fire by-product carbon to a storage below ground level that controls the gas taken from this material at it is cooled.

FIG. 10-(B) is a smaller scale view of the extruder of FIG. 5 showing the delivery of the soft-char or by-product carbon down the chute (17) to a below ground storage level or soft char receiver pit (100) where it accumulates in a pile (101) that is on a rotating perforated conical support member (104) driven by power unit that provides for drainage of water accumulating from the steam application in cooling this pile to prevent ignition. A drain cares off water (103) and a heavy gas duct is driven as a large volume pressure blower (102) forcing the gas fumes (142) back to the unit top to join other producer or water-gas all of which is dried in the condenser (99) before use as the water-gas fuel. The gas flow past the venturi (146) serves to assist the blower (102) in the pit in the retrieval of the gas (142) from these several locations so it can be accumulated at the bottom of the system for introduction to the extruder for ignition. A large steam ejector vacuum system (32) is a part of this pit storage system to minimize air presence. The other operational features have been described in FIG. 5.

Figure 11:
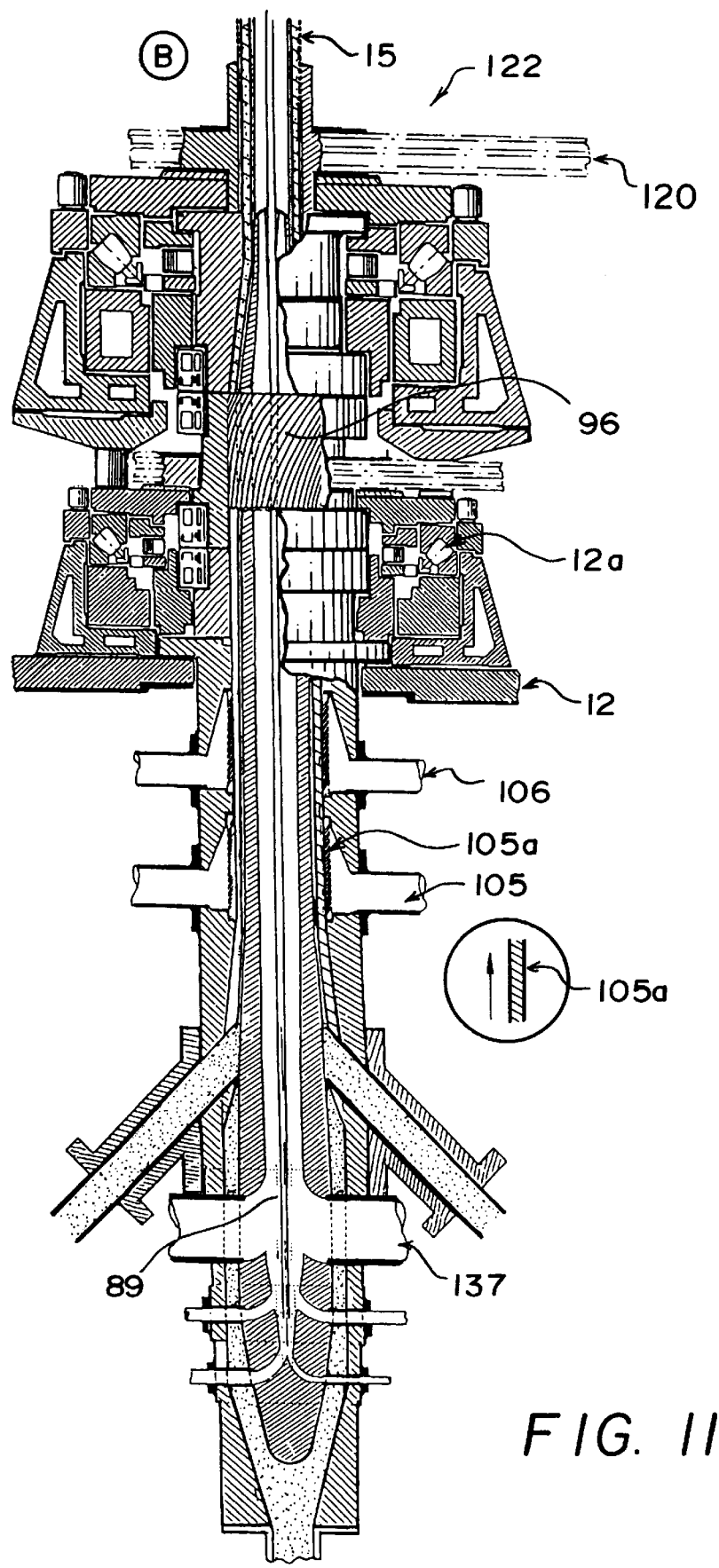
FIG. 11-B is a cross-section view of the extruder nozzle showing a dual drive to provide a double increase in the speed of the absorber receiver retention tube that carries the extrudate mass upward as the center-fire is driven through its center. An inset shows the louver means for allowing feedstock passage as it is vacuumed of air.

FIG. 11-(B)(122) is a cross-section view of the extruder nozzle like that of FIG. 8 shown here in comparison to other extruder forms (123) and (124). The (122) form has dual drive (12) and (120) with the speed change accommodation unit at (96). This provides for the required speed change to that of the Absorber Receiver Retention Tube (15) that carries the extrudate mass upward as the Center-Fire (137) is driven through its bore. The feedstock is vacuumed of air at (105) and gases can be added if required at (106). A steam ejector FIG. 14-(35) provides a 500 micron vacuum for air and moisture removal as the feedstock passes the angled louvers (105a) which angle favors the direction of the extrusion flow so the surface of the extrusion passes smoothly under the trailing edges of these without plowing or digging up the surface. In this way the porous body of the feedstock can be vacuumed of some air and moisture content. A seal assembly used with the drive systems (12) and (120) provides for the introduction of compressed $CO_2$ (12a) with an added oil mist that serves to cool the support bearings and provides lubrication. (89) is the ignition point in the extruder.

Figure 12:
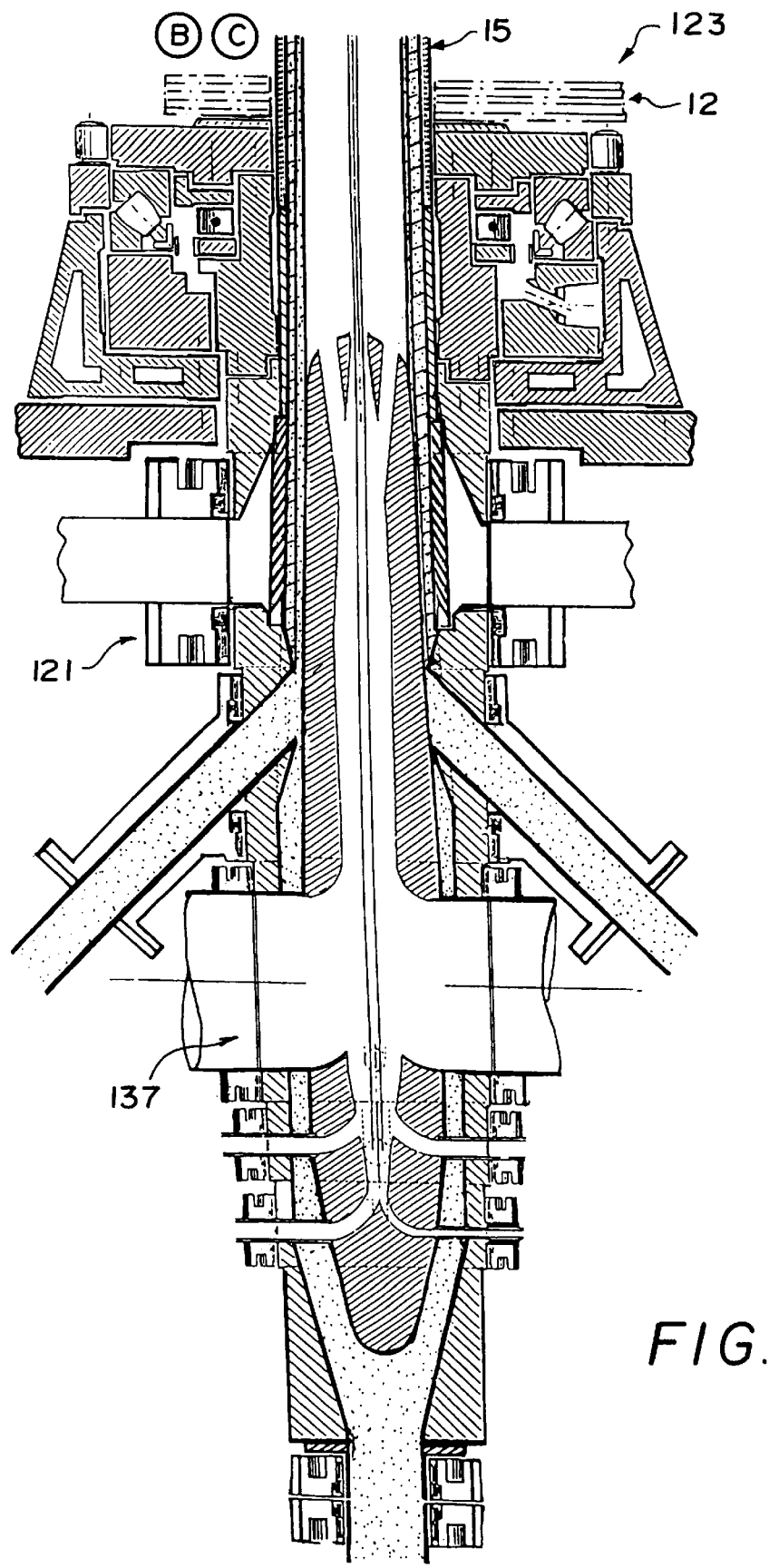
FIG. 12-C is a single drive extruder form in which seals on various ports are of rotary form so the nozzle itself can be turned on an axis as it supports the extrusion rising in the receiver tube.

FIG. 12-(B)–(C)(123) is a single drive (12) extruder form in which seals on various ports are of rotary mechanical form (121) that are stationary as the nozzle body is turned on a vertical axis by drive (12). The nozzle has a plurality of internal ports that intermittently serve the single port as the nozzle turns. The ports in each seal are hard fastened and stationary with the piping of the system. In this way the rotating nozzle section can be fixed fastened to the Absorber Receiver Tube (15). Center-Fire input (137) and the Vacuum Ports (105) are in pairs opposite one another in the rotating seal assembly to deliver maximum volumes. A plurality of ports are in the nozzle body so that passage of these serves the input or output ports intermittently.

Figure 13:
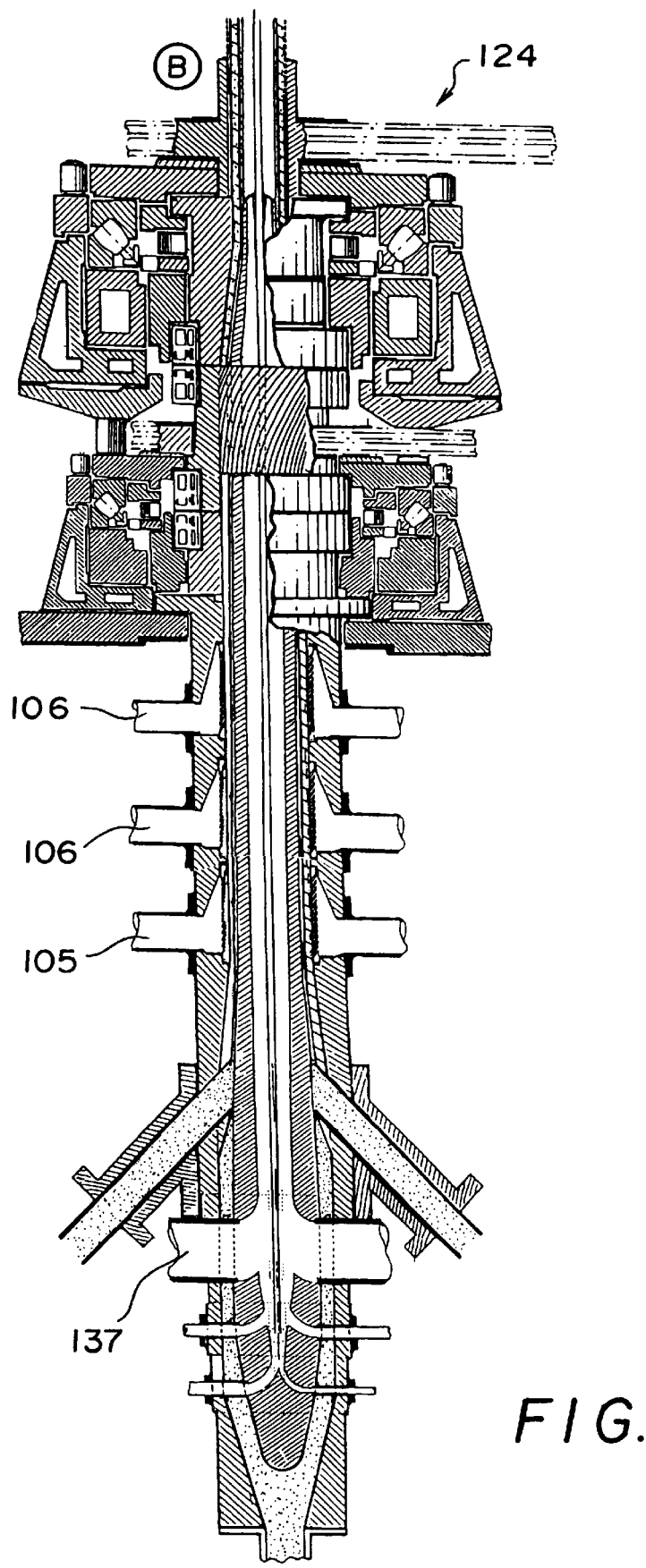
FIG. 13-B is an extruder nozzle like that of FIG. 11 but illustrating that a plurality of gas inputs can be employed to inject chemical into the extrusion itself as it is driven through the nozzle.

FIG. 13-(B) is an extruder nozzle form (124) that is a more elaborate form of the two-speed drive of FIG. 11 illustrating that a plurality of gas inputs (106) can be employed to inject chemical gas or liquids into the extrusion itself as it is driven through the nozzle. The Center Fire Input is at (137).

Figure 14:
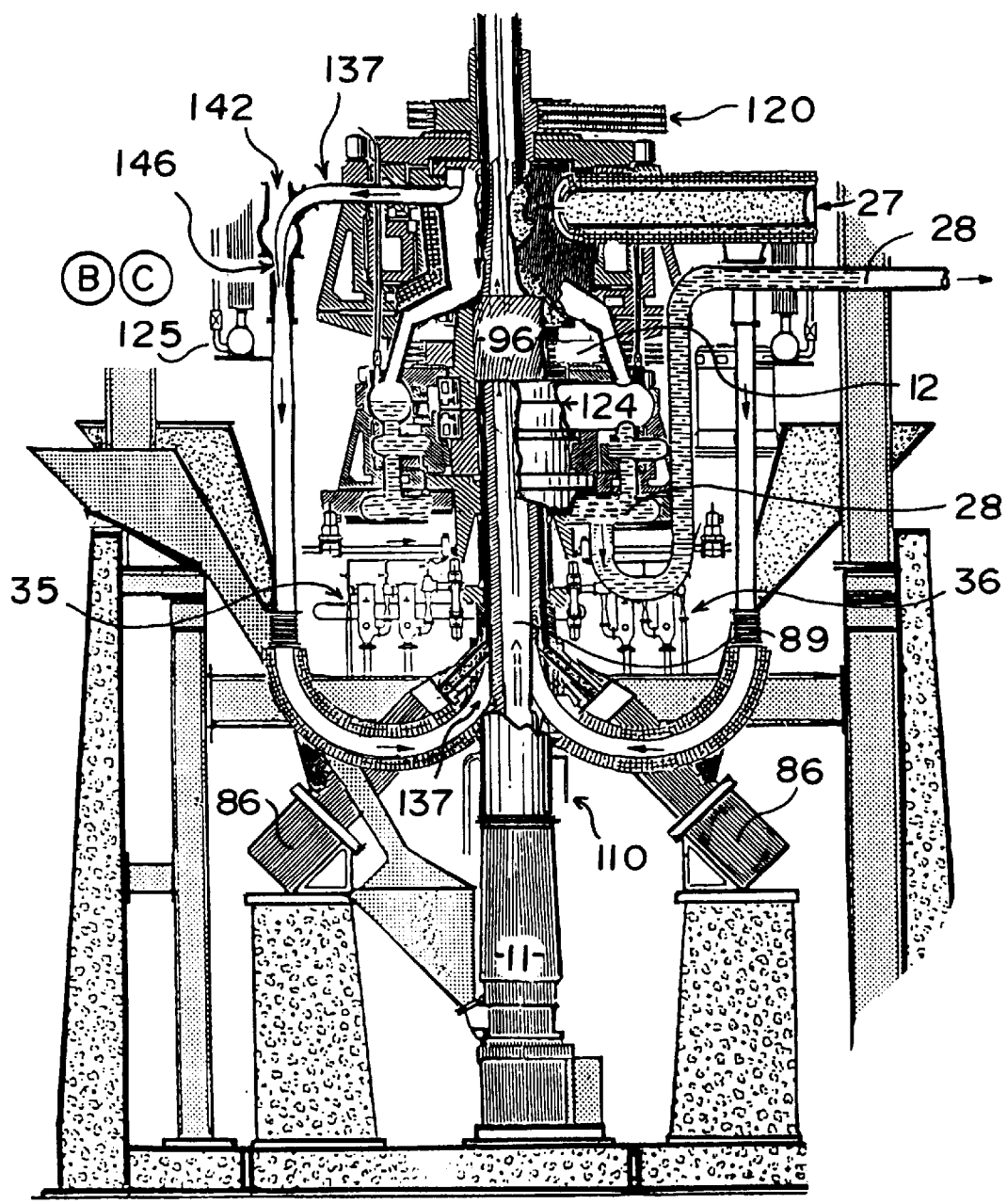
FIG. 14-B is an enlarged view of the basic functional parts of a multiple extrusion capacity united mounting with the dual drive, the speed control involute gear apparatus, vacuum equipment, feedstock input, flame input, liquor takeoff and gas return to its main gas chamber from stack gas scrubber.

FIG. 14-(B)–(C) is an enlarged view of the multiple extruder of FIG. 11 mounted with the dual drive (12) and (120), the involute gear speed adaptive apparatus (96), vacuum equipment (35)–(36) oxygen input (110), flame circuit (137) and gas return input to the Main Gas Chamber at (27) from the Ammonia Liquor Processor. The two extruders are at (86). The reason for two is that this liner must ablate and have a proper melting temperature so the blend of silica and clay is critical to accomplishing the mix characteristics required in this type of heat environment. The Feedstock Extruder at (11) brings these input elements together generally in the area (89). Water from the cooling steam of the producer's gas is taken from the condenser and returned to the top of the system with pump (125). The producers gas (142) is added to the Center Fire system (137) at the venturi (146). Liquor and tars accumulate in downcomer and takeoff to the Ammonia Liquor Process at (28). This illustration shows the use of Extruder Form (124).

Figure 15:
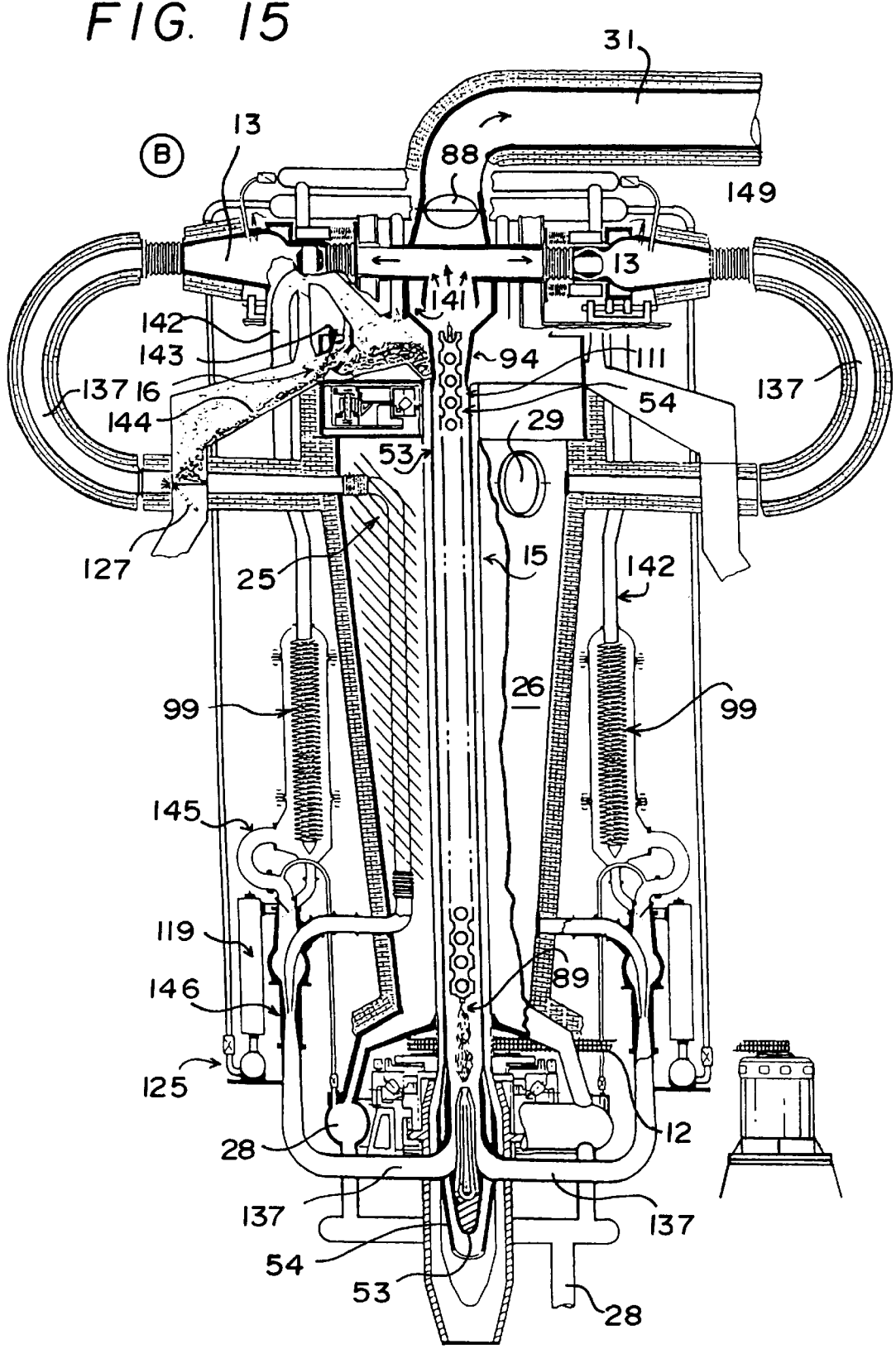
FIG. 15-B is a cross-sectional view of the Medium Temperature Processor I showing the fire circulation driven by a plurality of Ram-jet engines, the center fire circuit, the radiator, extrudate column, the steam cooled soft char, producer's gas output, the condensers for water recovery from the producer's gas cooling steam and water reintroduction at the system top as driven by a water pump. Water or Producer's gas is drawn down by venturi for inclusion in fuel for the center fire together with Natural Gas, compressed air and oxygen introduced at the extruder. This a slowly rotating unit that does not require means conforming the extrusion from the static state of the extruder to the slow rotation of the absorber receiver tube. Process III is identical in structure but its contruction comprises exotic metals that permit very high temperatures and it fundamentally more simple in that the emphasis is on total reduction of the feedstock to gases for reconstitution. It operates at the highest possible speed in RPM of the Absorber Receiver Tube.

FIG. 15-(B) Processor I Fire Reduction Unit shows a cross-sectional view of the fire circulation driven by a plurality of Ram-jet engines (13), with spark plug ignition means at (149), the Center Fire circuit of the system (137), the Center-Fired oxygen fed spool checker Radiator (111), extrudate column (53) combined with the liner (54) as retained in the perforated Absorber Receiver Tube (15), the steam-cooled soft char (144), producer's gas output (142), moving to condensers (99) for water recovery from the producer's gas cooling steam water with reintroduction at the system top as driven by water pump (125) taken from accumulation tank (119). This slowly rotating single drive unit (12) does not require means conforming the extrusion speed with that of the static state of the extruder because of the slow rotation of the Absorber Receiver Tube (15). Three or more Ram-jets engines (13) are used in combination with ignition of each fired from a common commutator control so they pulse in synchronization to combine their exhaust bursts as one in the middle at the extruder (89) where they all join one vertical fire column pushing a volume of heat and flame upward through the Extruder Nozzle at the base of the unit. This is the common Center Fire (137) reduction system that is applied in Processes I, II and III. The feedstock tube as extruded is formed to fit closely inside a perforated Absorber Receiver Tube (15) that supports the extrusion as it is pushed upward, while the Center Fire is driven with high velocity through the feedstock tube bore that serves in this portion of the Center Fire loop as the conduit for this fire and heat. The radiator (111) becomes incandescent in this trapped heat condition and the feedstock heat exposure causes it to outgas through the wall perforations in the enclosing Absorber Receiver Tube (15) so these products can flow down the outside of this holed supporting member that is delivering a dry brittle red-hot char (144) at the top end of the extrusion. This rising hot tube end is broken away here as it is pushed against an internal tapered form (94) and the char carbon accumulates in three declining trays (16), each inside a sealed top chamber where the char (144) is sprayed with water (141) to provide cooling and at once produce the water-gas (142) or water or producer's gas that is passed through condensers (99) in the system to recover water for reuse at the top where it is pumped by pump (125). The steam creates a low pressure condition in the tray area that rises and falls as a rotary trap device (143) scoops char out of the tray content and delivers it into the first chamber (16) that is closed at the top end by the rotary trap (143) and a spring loaded flapper valve (127) that is opened by the weight of falling soft-char that goes down the chute to storage as at FIG. 10(100) or the hammer mill of FIG. 1(18). Steam pressures accumulate in condenser (99) water released drops through a bottom trap and dry gases go off at (145). The gas which is a satisfactory fuel for the process is delivered into the Center-Fire stream by the draw of a venturi at (146). Stack gases go off the top at (31) to the over damper (88) to scrubber. The coal chemical constituent gases as generated by the process are removed from the Main Chamber (26) in duct (29) and moved to further treatment as the liquors and tars move off from a downcomer at (28) to the adjoining Ammonia Liquor Processor. Gas content in Gas Chamber (26) is partly provided by radiator plates (25) mounted on the return tubes of the Center Fire.

Figure 16:
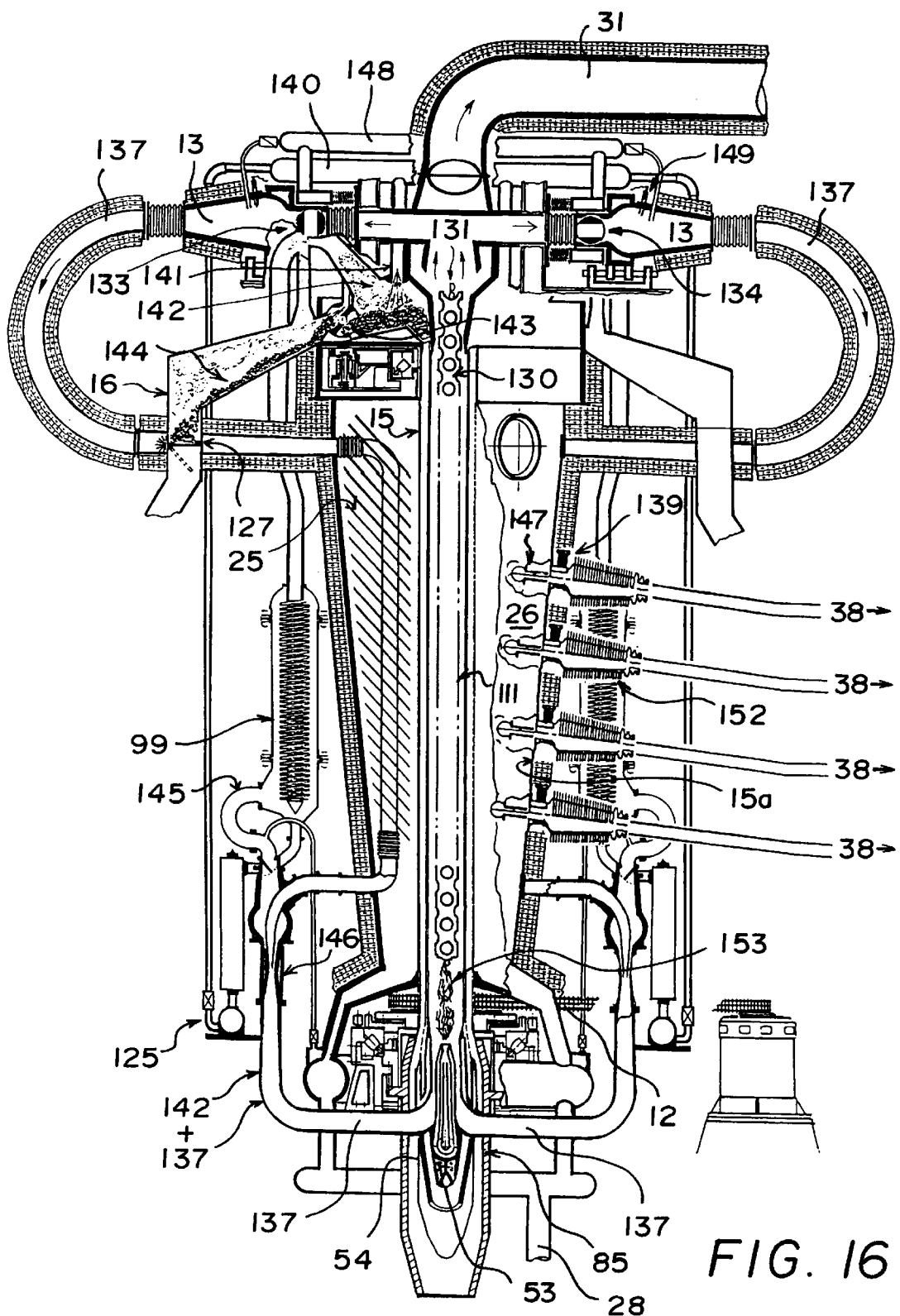
FIG. 16-C is a cross-sectional detail almost identical to that of FIG. 15 except for the addition of the Processor II features that involves rough fractioning of gases taken off to a plurality of cooler gas receivers set at different levels in the wall of the main gas chamber in which extension tubes reach into the chamber to avoid wall flow of tars and waste products.

FIG. 16-(C) Processor II Fire Reduction Unit. This is a cross-sectional illustration of a structure that is almost identical to Processor I as shown in FIG. 15 except for the addition of the features that involve rough fractioning of gases (38) taken off in draft pulses to a plurality of cooler, lower pressure Raw Gas Receivers (152) set at different levels in the wall of the main gas chamber (26). Also steam is introduced as jets to reduce the temperature of the inner perforated surface of the Absorber Receiver Retention Tube (15) as at FIG. 17-(155)/(156). Here the rising and falling gas pressure in an enclosure at the top of the unit (16) is used to venturi/vacuum additional gas from the steaming char at different conveying points. Recovered water from this gas/steam is reintroduced to the char cooling function again with a pump (125). It also delivers water to a high pressure fine stream nozzle inside the Main Gas Chamber that results in a steam jet that draws a portion of the hot gas (142) that is also fed into this stream from the top source of this gas. This jet is directed upward and angularly so it creates a gas spiral around the absorber receiver tube column. Other steam introduction is done with hanger-injectors as shown in FIG. 19(154). In all of these processes the emphasis is to intensify the liquors and reinject these so added gas can be created. Extension tubes (147) reach into the chamber to avoid the flow of liquor and tar running down the wall of the Main Gas Chamber (15a). Pulsing valves (139) open one at a time to create a regular pressure pulse in the main Gas Chamber. This unit operates at a low to moderate temperature and at slow speeds so it makes use of a rotating nozzle with mechanical seals at the extruder that is fixed and attached directly to the Absorber Receiver Tube so the extrusion does not need a provision to accommodate a speed difference as is the case in the high speed Processor III that has a static extruder and nozzle. The Center Fire feed and the vacuum function are hard piped to the seal assembly that is a massive static body within which the nozzle rotates like the nozzle illustration of FIG. 12(123). A 500 micron vacuum for air and moisture removal is provided by a steam ejector vacuum unit like that shown in FIG. 10-(35) and as the feedstock passes the trailing slat-type louvers set in the ports to prevent pickup of the feedstock particulate in passage. All of the bearing assemblies used with this beading/seal arrangement permits the introduction of compressed $CO_2$ with an added oil mist that serves to cool the support bearings and provide lubrication. Compressed air is provided by ancillary requirement for the process and is used in many locations, not the least of which is in the Center-Fire drive at the nozzle. To overcome the pressures of the fire-tube delivery it is necessary that each of the gas systems be pressurized for feed to the nozzle. The Ram-jet engines use water-gas or natural gas as a fuel which is intermittently ignited by spark plugs (149). The pulsing valves (133)(134) control the Ram-jet Engines in synchronization with the ignition pulses. A jet pulse valve is shown closed at (133). Gas is injected with an air mix and as ignition occurs as the valve opens as at (134) to pass this burst of flame and heat to the center-fire circuit (137) and then closes instantly so new fuel can be introduced. These pulses have a rate of 100 to 500 per minute. There is substantial thrust produced and with the unit mounted to slide on linear bearings parallel to the thrust and between opposed piston cylinders of a pumping arrangement the shock recoil delivers pressure to an accumulator to provide the energy to drive ancillary apparatus. The design and assembly of Processors I, II and III is essentially identical except for differences in alloys, insulation, seals and the like that are affected by temperatures. Different forms of drive for the extruders and nozzles are adaptable to the same basic configuration, again with different metals and material to accommodate higher temperatures and pressures. Various forms of apparatus are added as internal modules used inside the Main Gas Chamber of Processors I and II to provide additional functions depending upon the selection of feedstocks. The intent of the design is to serve Encapsulated Fire Reduction of any ore, or waste product for recovery of constituent chemicals including the firing for soils that have been contaminated with chemicals so they can be cleaned and returned to a condemned site. The extruder nozzles as described all perform the same basic functions, some providing a minimum drive pressure and others a maximum force in moving the extradate through the systems. At the unit bottom the feedstock (53) is introduced from the screw drive of the extruder FIG. 1-(11) and the feedstock protective lining at (54) from side extruders. Fire, gases and vacuum piping is streamlined to permit passage of the extrusion over these as the extradate moves through the nozzle and then is reformed after moving beyond these pipes. The nozzle is provided with size reductions to accomplish this passage. The destination of these high temperature hot gases and actual flame (153) as driven downward on the return path by the Ram-jet engine (13) is this plurality of streamline piping entrances to the extruder nozzle's middle where the single Center Fire riser begins. There the water or producer's gas now mixes with compressed air, oxygen and natural gas to provide the fuel blend for the entire system. A water reservoir (140) and a natural gas tank is shown at (148). Just beyond the meeting point of (142)+(137) an intense flame is generated at (153) that moves upward into and around the center-hung Radiator (111). This Radiator is also fed with oxygen (130) at its center and at different levels to enhance the heating of its ceramic spool-checker holed wall that is suspended in close proximity to the inside wall of the feedstock extrusion tube (53) hanging on the oxygen supply pipe (131) fastened to the inside of the exhaust stack above.

FIG. 17-(C) Modular Accessories for Processors I and II. Several of these are used with the processor together or individually to facilitate the use of different feedstock. These accessory devices are not used in the III Processor where all emphasis is placed on total purity of the gas extracted and minimization of water input. In the other processors these high pressure steam injection means create jet streams for gas direction in the Main Gas Chamber and scrubbing the perforated surface of the Absorber Receiver Tube. Valving means in the rotor/scoop device (143) functions to close off the major gas generation source when water is applied to the hot soft char. Hanging in this space where the broken feedstock tube is cast off at the top of the process are a plurality of vertical water pipes (141) with jet nozzles arranged to spray this carbon residue (144) or soft-char to cool it as it moves in chamber (16). As described earlier this creates the water gas carried off at (138) that is partially used for fuel in the process. This gas is drawn down to lower treatment by the velocity pressure of the steam expansion in the top chamber that moves out of vent (138) to be delivered across a venturi device at (146). Some of this gas is delivered in pipe (142a) to be captured here and directed into the chamber with steam jet created by nozzle (155) with input from water pump (125). This causes a gas current (156) around the Absorber Receiver Tube (15) containing the extrusions inside of which the Center Fire is moving. Some ammonia liquor from the adjoining processing plant pumped through pipe (27) into the Main Gas Chamber at (26). A plurality of spray heads make a liquor mist application at the top of the system (151) where it flashes into gas.

FIG. 18-(C) illustrates a section of the interior form of the Main Gas Chamber (26) in which the Center-Fire return line (137) is shown with attached radiator plates (25) that are heated by this connection. The hot plates surfaces heat the gas moving over them. They are angled in this way so the gas will move in an upward direction and toward the outside of the Chamber. This tends to draw gas away from the rotating Absorber Receiver Tube at the center. The tube carrying these angular plates exits the chamber and enters a venturi (146) which provides a low vacuum to draw down water-gas (142) and gas from the downcome (28). The gas in condenser (99) courses through a perforated tube at the center of the condenser. This tube is enclosed in cold fins over which the gas driven condenses the moisture content to remove the water of the char steam cooling. (This is an optional gas handling apparatus to that of FIG. 17.) The water drops from the bottom of the condenser to a tank (119) and is pumped (125) to return the water to the top reservoir of FIG. 16(140). Here there is no water/gas injection as in FIG. 17.

FIG. 19-(C) is a schematic illustration of the gas delivery apparatus consisting of Raw Gas Receiver (152) mounted on the side of the Gas Chamber enclosure (26). The Center-Fire tube (137) is shown delivering fire and heat into the extrusion (53)(54) with the addition of water-gas at (142). Natural gas mixed with compressed air combines with these at (153). Spaced openings to expel oxygen in the oxygen pipe hanger (131) that holds the spool checker brick Radiator (111) as suspended inside the extrusion tube from above. This delivers modulated pulses of oxygen to create new flame bursts at each point where this infusion is delivered from these ports. The spool checker Radiator (111) hangs very close to the passing extrusion's internal wall as it is being forced to slide upward in the rotating Absorber Receiver Tube (15). The steam jet (156) delivered from nozzle (155) causes the gases in the Gas Chamber (26) to spiral around the Absorber Receiver and gases are expelled through its perforations as are ammonia liquors (158) and tars (157). Steam jet (154) scrubs the perforated surface of the Absorber Receiver Tube. The entire Absorber Receiver assembly is rotated at moderate or high speeds by the drive (12). Fractioned gases (38) are taken off at different height levels of the Gas Chamber through the Raw Gas Receivers ports (152) the valves of which are opened one at a time to provide a pulse pressure change within the main chamber as the gas bursts are released. The rotating gas current (156) sweeps past the extensions (147) attached to the ports of these Raw Gas Receivers. They reach into the chamber beyond the inner wall surface to avoid liquid and tars running down these walls. At the end of the collection extensions a cup-like shaped part (150) provides an eddy dwell in the gas as it passes over the port and around this extension and cup. When the pulsing valve (139) is opened this dwell aids in taking off a burst of gas efficiently. The liquors and tars stream down the absorber tube walls (158)(159) and accumulate at (157) draining finally to reservoirs and downcomer lines (28) for pipe delivery to the Ammonia Liquor Processor. The recoil of the Ram-jet engines cause reciprocating action (135) in an assembly in which pistons (136) provide pumping pressure to an accumulator for ancillary power input.

FIG. 20-(C) is an enlarged cross-sectional view of the "cup-like" end of the extension tube (147) device that serves to aid in capturing a gas pulse as it flows over the convex side of this apparatus in the creation of a dwell or pause in the gas flow at the lower pressure opening at the cup's center. This view of the cup shape (150) is shown looking down from the top of the chamber (26). The port extension is (147) and the gas (38). The arrow path (156a) represents movement of the gas as it eddy-spins above the Raw Gas Receiver port before being exhausted in a draft pulse delivering it to this lower pressure, cooler Raw Gas Receiver (152).

FIG. 21-(L) is a cross-sectional view of an extruder assembly Processor IV in a like generic extruder form of (B), but here the extruder functions to move a catalyst media in a minimum force mode instead of the high pressure applied to a feedstock. However both of these direct the extrudate in a path enclosing a Center-Fire heat source. In this firing procedure the Ram-jets (13) are at the top and the fire return is shown here (137a) as moving in tubes placed as close as possible to the rotating Absorber Receiver Tube (15)/(68) carrying the catalyst. The reason for this is that there is no Main Gas Chamber in this form. The space usually used for a gas chamber is used here for a plurality of condensers (99) and the Center Fire return tubes. At the extruder nozzle one or a plurality of gases (61) are introduced to flow upward through this catalyst media in a reaction function that can be endothermic or exothermic depending upon the prior compression of the gases involved, the temperatures and pressures, etc. The function of the Hot Process IV is to provide a transport of a catalyst media through a channel in which gas is injected for reaction in the presence of the catalyst. The object is to provide means to circulate a catalyst bead or other form continuously in this system so that it can be taken from the hot portion of the process and subjected to cleaning and chemical restoration before returning to its normal hot functions. This would be done continuously so a renewed catalyst was always being introduced to the new gas as it is injected. The catalyst bead is shown at (112) entering the extruder that serves to push rather than exert great pressure. The Center Fire common to these systems is shown entering the extruder nozzle at (137). A vacuum is pulled on the beads as they pass at (105) and oxygen is introduced into the nozzle Center Fire at (110) feeding pipe risers to reach the array of spool-checkerbrick Radiators (111) as seen in FIG. 23. A pair of drives are illustrated here. At (12) the single slow speed drive of the extruder unit is shown and it can use the nozzle with the seals and a rotating center part as in FIG. 12 adapted to have the gas input features, or it can be the more elaborate form of fully rotating Nozzle like that of FIG. 13. Here the coupling of the Extruder Nozzle Drive (12) to the second Absorber Receiver Drive (120) is accomplished with a planetary gear arrangement because the function is not to provide a speed adjustment as in the case of the feedstock extruder, but rather simply a means to maintain a constant ratio speed relationship between the two. The Absorber Receiver Tube (15) Drive (120) is adjustable in speed and synchronized with (12) with constant speed using the gearing (96). The steam heating system (170) is detailed in the Reactor system drawing in FIG. 66. The Center Fire return is shown at (137a) with its close placement of piping beside the rotating Absorber Receiver Tube (15) in the center of a plurality of these conduits from the Ram-jet heat drive (13) above. The product chemical gas of the process is taken off at the top of the Absorber Receiver Tube (15) at the perforations level (69). A pressure condition exists in the top gas collection chamber (168) and control valves (70) to vent this gas along line (78) to the condenser (99) at (169). It is cooled and liquefies here to drop out as the product of the system at (70). After the product is expelled at the perforation level the churning of the gas has ended and the catalyst is moved out of the Absorber Receiver Tube (15) top into the closed gas chamber (168) where it is taken down for rework with the screw drive (160) and a rotary trap that keep air out of the system so it can be delivered to the washing system (161) as fed by the liquid manifold (162) with its spray heads. The auger system (163) draws the catalyst up where it can be dried in a baffled chamber (67) with a gas blast delivered from compressor and tank (171). The restored catalyst drops to the extruder level from the hopper (165) to pass through heavy metal vacuum trap (166) and along path (167) to reenter the extruder nozzle at the bottom of the system. Liquor used for the washing of the catalyst drop out at (164) and is recovered and recirculated by a pump (165a) to the spray heads of manifold (162). Vacuums are maintained throughout the system at different places. The condenser (99) has a vacuum unit at (33). The extruder is serviced with two at (35) and (36) The top of the product tank is maintained air-free by unit (34). At (113) is a flash steam coil for stack gas heat recovery for use in the steam system of the Reactor Heater. The secondary power source from recoil of the Ram-jet is shown at (136).

FIG. 22-L(68) is a three dimensional cut-away view of the center portions of the Absorber Receiver Tube. The perforated portion is shown at (69) and the tube assembly as a whole is referenced as (15). The annular space between the inner wall of (15) and the static perforated center tube (114) is the space in which the catalyst media and gas content is pushed upward. This is described in more detail in FIG. 26-(68). The shapes on these tube walls serve to rotate and raise the catalyst media in a screw type action while creating a churning force. Like all the receiver tube forms of this invention in various processes the Absorber Receiver Tube (15) here has perforations to permit the out-flow of product—in this case arranged at the top of the tube so a maximum period of exposure to the catalyst and the mixing functions occur prior to escape of the reformed gas carried up in the body of the churning catalyst. The center tube FIG. 22-(114) in this assembly is perforated with large opening It functions as a through draft flame path FIG. 23-(31) for the Center Fire Heat and Flame that move through this conduit. The outer tube of this illustration (68) is the lower portion of the Absorber Receiver Tube (15) that is turning as the two inner tubes stand still.

FIG. 23-(L) is a plain cross-sectional view of the heat transfer radiators (111) which in this case are used in a group of three or more. These are disposed in the annular space between the center tube (114) and the inside wall of the second convoluted tube FIG. 22-(68). The catalyst media feed is inside the Absorber Receiver Tube (15) directly against its inner wall with the half-sphere shapes. The convoluted tube wall is directly against the catalyst media on its opposite side. The center tube (114) vents to the stack (31). Oxygen is fed to the Radiators (111) from the source FIG. 21-(110) and up the pipes in the center of the Center Fire conduit, all of which is radiating heat outwardly to the catalyst media. Outside the catalyst media held in the Absorber Receiver Tube (15) is the bank of vertical steam lines and beyond these the Fire Tube return lines. All are enclosed in an insulated column so the heat within the catalyst space is intense which permits relative fast movement of the media and its gas content in the annular space (112) between the convoluted wall tube and center tube (114) in a manner similar to that of the Processes I, II and III.

FIG. 24-(L) is a cross-sectional enlarged view of the trap (166) at the top of a high molecular weight fluid through which the media passes so a vacuum can be maintained in the system.

FIG. 25-(M) is an illustration of the servicing features of Process IV respecting the application of cold temperatures to a media with gas content as opposed to the heat application to a catalyst media as in FIG. 21. An inert media is introduced from the nozzle structure at the bottom of a tower. Unlike the center-fire that is carried in the feedstock extrusion tube of the hot system, a center tube member (176) of this cold operation functions to carry the cooling gas or liquid that moves in contact with a metal tube wall against which the media (115) is moving. This cold contact extends to a point just below top perforations of the Top Perforated Absorber Receiver Tube (69) where gases that have liquefied can overflow. The upward cold flow ends here under a cap on the outer tube and the cooling fluid overflows the center tube (176) top edge and returns in the annular space (177) between the center tube outer wall and the inner wall of the enclosing tube. This provides the return conduit for the cold fluid flow exit at (173). Gases (60)(61) have been introduced at the nozzle at high temperatures. This has occurred just after the space between media elements has been evacuated (35)(36). The gases are in effect "leaked" into the voids or the interstices of the media which is under this partial vacuum. After they are introduced to the media there is a mixing action in the transition from the static nozzle to the top of the rotating absorber tube which in this case is rotating slowly. The way this is accomplished is described in FIG. 26. The newly-formed mixed liquid, growing out of the liquefication effect of cold exposure, now passes out of the perforations at (69) and captured in a stationary tray (132). The space outside the perforations is a vacuum in a chamber evacuated by steam injectors (33) and the liquids extracted are briefly retained within this space in an outgassing function in the tray (132) and then are siphoned from the tray into a heated coil (379) that brings the chemical to a desired temperature for handling. The liquid flows from the bottom to an outside storage vessel for delivery (77). The media, (115) that has carried the gas in its conversion to a liquid now reaches the open top of the absorber receiver tube and flows out over the top into a large hopper area with a perforated bottom (116) and residual liquid leaks out of these perforations drop to the fluid tray (132). An auger-like flight-screw (56) draws the wet media (115) down to a rotary trap that limits vacuum loss and the media progresses at sliding down a chute within a vented space from which fumes are drawn off by exhaust blowers. This vapor passes to a condenser (not shown) and the liquid is added to storage. The media falls down a series of inclines (117) where a plurality of solvent sprays from fluid manifold (162) washes it in passage and assists its movement. This manifold is supplied by pump (162a). The media and wash mass falls into a hopper containing a second flight-screw (118) that draws and wrings the wet media as it is moved up into the drying chamber (67) where a high pressure hot gas blast (171) blows the material upward in a drying phase. The vent (56) is guarded by a shield (57) so the dry media is forced to fall back to a hopper and out the bottom (165). A trap (166) containing mercury or an equal characteristic fluid is to maintain a flow of material while holding the low vacuum conditions in the circuit above. The media (115) returns to the nozzle via path (167). The hot air comes from a compressor/heater tank and air blast nozzle system (171). The wash fluid (164) as recovered is filtered and returned to the manifold (162) by the pump (162a). The product tank is evacuated by ejector steam vacuum system (34).

FIG. 26-(M) is an enlarged cut-away view of the internal tube structure in a generic form like that of FIG. 21-(68)/(15) that serves to churn the media content as it rises. This shows what follows in this procedure that provides a rolling or churning of the media as it is pushed upward between the turning Top Perforated Absorber Receiver Tube (69) and the stationary center tube (174). The inner surface of tube (175) and along its whole length, until it reaches the perforations at the unit top, has convex half-ball like features (175) in a size 3/16" to 1/2" diameter on its entire inner surface. These half-sphere shapes match in size the grooves of longitudinal corrugation (174) in the stationary tube (177) that carries the coolant inflow in the annular space between it and the center tube (176). The half-ball surfaces (175) are spaced clear of the corrugation surfaces (174). The media, the elements of which can be balls or another shape is forced to move upward by this screw-like pattern of sphere shapes. The convex ball alignment and their surfaces in are in a helical pattern and the screw-like rotation is turned in a direction to force the upward-traveling media downward in opposition to the extruded direction. This accomplishes a rolling action and a mild shear condition when the center tube land highs pass the half-ball tops, and the opposing forces of the helical screw and the extruder pressure cause one complete rotation of the media mass in the space of one helical diameter turn. This then is a gentle mixer and the material captured within this mass is churning and cooling until it becomes a liquid and reaches the perforations at (69a) to overflow.

FIG. 27-(M) is an enlarged view of the vacuum trap described in FIG. 24.

FIG. 28-(E) is a cross-sectional illustration of a gas cleaning system that performs without liquids. It is based on the use of a ball media as shown in FIG. 32. Forms of these sphere shapes are shown in FIG. 32. These are hollow with a thin wall and holed to a specific size in respect to diameter so the flattening effect of holes can be avoided as shown occurring in all but the FIG. 32-(190) configuration which is the preferred form used in this apparatus. The apparatus itself as shown in FIG. 28 as it admits gas (29) and moves downward through pipe (46) to the bottom where it passes up through the perforated sides (180) of a funnel-like shape (47) that holds the balls that are slowly settling from above. These balls are drawn out at the bottom of the funnel and forced upward through pipe (194) by screw unit (181) to enter the ball cleaning unit at FIG. 29(184). When returned from the cleaning function the balls move along pipe (182) into the top of chamber (48) FIG. 28. The gas (29) as it moves upward through this array of hollow, holed balls (47) slows and the particulate from the gas is attracted to the ball surfaces, holes and the ball interior by accumulated static charges on these surfaces. The clean balls are being introduced at the top where the clean gas (29) exits for final treatment.

FIG. 29-(E) The balls enter cleaning apparatus (183) at (184) and drop past the manifold and past the "gas" knives as shown in the enlarged perspective drawing FIG. 31(49) where the tube carrying them opens up and they are held as they spin against the rails supporting them for a considerable distance opposite the knives and vibrating trays FIG. 30(195) and FIG. 29(195a). Vibrators (196) and (197) provide this energy. The balls are blasted free of the particulate that now accumulates in a bottom funnel in the center of which there is a small extruder screw (198) that drives and compresses this very hot powder to recover the trapped gases and $CO_2$ in a small extrusion form (199). The extruded cylinders (199) drop into water for cooling and further gas is released to be carried off for storage. Gases (229) captured at the base of the unit are taken off the unit compressed and returned to the system via the stack gas collection line (230) just ahead of the scrubber not shown here. Finally all of this gas is returned to the bottom of the Main Gas Chamber for a return to the process. If dangerous internal leakage is detected, steam purging is done.

FIG. 30-(E) Tray disks like the sketch (195) are mounted loosely in a close spacing of less than 1/4 inch on a center rod support that is control-vibrated (196) FIG. 29. These slow the gas carrying the particulate so it can settle and drift to the bottom of the unit.

FIG. 31-(E) is an enlarged three dimensional view of this ball cleaning operation comprising a type of "air-knife" blasting of individual surfaces as the balls pass shaped edge slits (188) through which pressurized $CO_2$ delivered from manifold (187) is driven against the balls (190). In this passage they are held against a pair of rails (191) in a chamber (185) and the accumulated carbon particulate streams past these as it is driven off through a gate slot (189). Slit pressure is maintained uniformly using manifolds (187) and (186).

FIG. 32-(E) illustrates the various hole patterns for a ball form (190) that might be usable in the cleaning apparatus of this invention. As noted, flattening (193) occurs when the ratio of hole size to ball diameter is too large therefore the ball and hole pattern of (192) is that selected as the preferred form of this invention.

FIG. 33-(F) a view of a renewable cathode apparatus gas ionization unit (200) as seen from the point of view of a passing gas flow FIG. 34-(29)–(50) that shows the winding of a zirconium plated aluminum wire on a conical form (202) wire take-up (201) and cone spool end cap (203).

FIG. 34-(F) is a chamber (209) that is evacuated and pressurized with $CO_2$ (208) and exhausted at (208a) in a pressure-controlled gas circulation procedure. This $CO_2$ wash prevents possible gas contamination of the working parts in this unit which comprise a motor unit and gearing to drive a wire with a capstan (204) taking wire from an unwinding reel at a very slow speed (1/50 to 1 rpm) so a renewable wire cathode is provided to interface the gas stream of the system. This comprises a small gauge metal zirconium plated wire that is drawn from a reel and rewound on another reel inside this unit. The wire (201) is pulled through a tightly wound spring (206) of some length that provides friction control and also a limited leak seal because of its form. The exhaust vent for (208a) for $CO_2$ leaving the chamber is shown but not the compressor. The bearings are $CO_2$ gas cooled with gas input axially in shaft at (210). The drive is a torque driven capstan (204) and idler pulleys are shown at (205). An octal-type vacuum oil mist is driven into the unit with the $CO_2$ lubricating all these functions. FIG. 35-(F) is a magnified view of the wire seal device that is tightly wound spring (207) form that provides a tortuous leak path for the pressurized carbon dioxide as the wire (201) is drawn through these coils.

FIG. 36-(D) a schematic view with partial cut-away sections to illustrate the application of particular tar separation and specific gravity sensing apparatus that determines the release of ammonia liquor at a desirable viscosity or density suitable for return to the gasification chamber after its use as a scrubbing liquor for stack gas from the system. The liquor from the Process I, II or III enters this system at (28) and moves to the first stage tar separator (215) which has a steam input at (213) for the heating of tar trap baffles (224) that the tar runs down to be dropped by the tar discharge valve (217) through line (218) to tank (45d). The partially tar cleared liquor passes a check valve blocking return to the tar separator (216) so it moves into the ammonia liquor intensifying loop (222) liquor pump (227). Liquor from this loop goes to the top of the scrubber tower (212) to a spray head in scrubber (214). The stack gas (31) has entered the scrubber (212) at the bottom and rises over baffles that slow the flow of the falling liquor. The scrubbed gas exits the scrubber at (27) to return to the Main Gas Chamber of the Processors I, II or III for rework and gas conversion. The high pressure steam input (219) provides the heat for this process and the steam return is (220). A tar pump (221) is driven by a steam pump (211). The ammonia liquor passes around the loop (222) and as tar and solids are removed it changes in specific gravity value that is sensed by the ammonia liquor viscosity sensor (225) that actuates a transfer valve to discharge liquor from the loop at (223). The ammonia liquor discharge accumulates in storage tank (44) and the tar in tank (45e). Fumes from the ammonia liquor at (229) and accumulated from vents (228) go into gas fume trunk (230) with fume transfer to scrubber with the stack gas at (232). An emergency pressure vent is at (231). Tars accumulate in tanks at (45a) and (45b) in the loop system (222). At the bottom of the system there is the final tar deposit tank (45c) which supplies the liquor drawn off the top for the scrubber function at (214). The tank (45d) is final and here takeoff goes to the tar pump (221) operated by steam pump (211). This tar is pumped to the storage tank at (45e) which is heated with the return steam line.

FIG. 37-(D) illustrates the form of the valving apparatus associated with the specific gravity liquid control. This is in the termination point for the liquor loop (222) that is continually passing the density sensor at (225) which when triggered operates the valve actuator (226) and mechanical system (223) to open the valve for a predetermined period to discharge the liquor at (44).

FIG. 38-(D) is a cross-sectional view of the tar separation apparatus of this system in which the liquor enters at (28) and passes the liquor loop (222) to run through the tar separator (215) and its baffles at (224) heated by the steam (213) which causes the tar to flow down these to point (45) and the discharge valve (217). The liquor runs over the top of the viscose tar in the bottom of this separator at (45) and goes out the check valve (216) to the loop (222).

FIG. 39-(A) is a schematic illustration of an entire plant facility providing means to process waste plastic to recover the hydrocarbon content and hydrochloric acid residual. The process is based on Process V application of Sub-Sonic Shock to a mass of plastic chips together with high temperature steam in a steam reforming function. The vessel charged with the plastic waste is evacuated and steam is added at high temperature and pressure. Immediately the space in which the feedstock is placed is reduced to a small fraction of its original volume by two opposing pistons that are driven together against the feedstock at a high speed. The shock effect is described elsewhere in the description of Process V.

In this illustration the feedstock is shown as charged through an open cover (239) into a collapsible vessel at (238). The cover is controlled by an automatic four-way air valve from an air supply (9c) A second cover is shown closed at (240) which is done compressed air from source (9b) and the air cylinder above it. An air bladder (242) is used to compress the plastic feedstock into a confined vertical cylindrical enclosure by inflating this bladder from air source (9) as air is evacuated from the plastic mass by vacuum equipment (32a). At (242) the bladder shown fully inflated and the half cylinder (243) has closed against its mating half to compress the feedstock. As this occurs a hydraulic motor (244) supplied form source (9d) begins to turn a long-thread screw member (245) that turns inside the threaded bore of a Moyno rotor (246) form that rotates through a lubricated female Moyno rubber die that holds a vacuum condition in the chamber (3) previously pulled by the prime vacuum unit (32) through line (10) and valve (236). The Moyno rotor shaft constitutes a ram device that pushes the compressed plastic from the two-part tube through an open ball valve (247) that loads the shock cylinder space (3). The valve (247) is then closed. (Its counter-part on chamber (5) is shown in an open position.)

The prime vacuum pump valve (236) is again opened and the vacuum is boost-assisted by a secondary adjacent vacuum pump at (32c). Two Valves (258) connecting (32c) accomplish this evacuation quickly. Two similar valves (259) connect with vacuum pump (32d). The vacuum valves to chamber (3) are closed. The steam injection valve (233) charges steam through port (235) to chamber (3) containing the plastic feedstock. High temperature/pressure steam derives from source (219). This valve is then closed too so the chamber (3) is sealed with all valves closed. The shock closure function is shown and described in detail in FIGS. 43, 44, 45, 46 and 47 in illustrations that follow. As this occurs a high temperature Chlorine Gas forms above the liquid hydrocarbon alcohols that is shown at (5) which is the alternate vessel in the dual processor. (The operational cycle would actually differ here, but moving to (5) affords a means for understanding one complete cycle). The air pressure and vacuum operations associated with chamber (5) are a duplicate of (3). As for example: The air bladder supply is shown at (9a) and the vacuum for evacuating the plastic before bladder inflation is at (32b). The assist vacuum apparatus is shown at (32d). For this illustration in which the reformed liquid is shown in (5) all its valve connections (236), (235) and the pair (259) are closed. The prime vacuum valve (236) is now open to line (10a) and the pressurized Chlorine gas on top of the liquid is vacuumed off and up through the chill condenser (99) that has a bottom drain to a liquid reservoir (253) that overflows to a storage tank (253a). This is Hydrochloric acid. Vacuum Valve (236) is then closed. Steam valve (235) is now opened to pressurize chamber (5) and drive reformed hydrocarbon liquid off to tank and cooling coil (248). This product of the process is a combination of alcohols. Another drain at the base of the vacuum tank of (32) has a similar drain that takes off the Hydrochloric acid. Other gases move over a loop to the secondary condenser at (255) and the gases are drawn off by a pump (256) and transferred to portable cylinders at (257). The effluent is drained at (255) and the acid takeoff is (254). The prime product of alcohol hydrocarbons are taken from shock chamber (5) to a tank with a chill coil before entering a ribbon-shear mixer at (19) through pipe (249). The soft char from the coal fire reduction and gas recovery of Processes I, II and III can be introduced into a hammer mill for pulverization at (18) through pipe (17). The pulverized soft-char product moves to the ribbon mixer (19) for premixing with the derived alcohols to end in (250) pipe to a Sonic mixer (21) of conventional design that prepares a thixotropic pipe-line transportable fluid of liquefied coal free of chlorines delivered at (22) The steam system of this process receives high pressure steam (219) that moves to two vertical trunks (234), then two valves (233) serving the chambers (3) and (5) as well as supplying steam for vacuum ejector (32), (32a), (32b), (32c) and (32d) with the ultimate return at (220).

FIG. 40-(A) is a cross-sectional view of a hammer mill apparatus used in pulverizing the soft-char byproduct of the fire reduction process. The broken char falls in to the mill at (17) and is worked by the hammer apparatus at (18) to be driven out the bottom in a pipe to the ribbon mixer at (19).

FIG. 41-(A) the alcohol liquor drops out of the processor into a cooling coil at (248) down pipe to the top of the mixer at (249) and enters with the carbon output of the hammer mill (17). Chemical additives are provided with piping (250) and (251). The mixer output is at (252) and moves to the Sonic mixer (21) and beyond at (252) as a carbon/alcohol product. HCL (liquid) is collected in a tank (253a) and discharged at (254).

FIG. 42-(A) a condenser apparatus (99a) for cooling vacuum affluent with gas takeoff compression and storage (257). A shield at (255) delivers liquid to flow directly over coils so gas rises and is taken off from the top by the pump. Discharge is at (256).

FIG. 43-(A) a cross-sectional profile of the compression chamber as seen from the side view rather than the end as in FIG. 45 in which the force is applied by opposed pistons to bring them together in an impact against a feedstock. Here at (238) the chopped plastic is poised above ball valve (247a) ready to be driven into the space of (5) The space has been evacuated and the pistons (260) and (261) are in the open positions. The dump valve (262) is closed.

FIG. 44-(A) a like profile view of FIG. 43 in which chopped plastic feedstock is charged into space (3) through the open ball valve (247) by the Moyno Ram (246). The high temperature/pressure steam is introduced as shown in FIG. 39(235) and (233) valves. The pistons and dumping valve are standing in the position of FIG. 43.

FIG. 45-(A) an end view of the shock compression chamber like that described in FIG. 39-(3). showing this position of FIG. 44. Steam has been introduced and the vacuum valves (258) and (233) are closed as is the drain valve (262). The ball valve (247a) is closed. Valves for ports (235) and (236) are closed.

FIG. 46-(A) a like profile showing the start of compression created by combustion at the opposite ends of the pistons (260) and (261) causing them to be propelled by this combustion (265) and (265b) of gas input at (265a) and (265c) at their extreme ends so they shock compress together against the feedstock and steam in the space between them (263). The ball valve (247a) is shown closed as is the drain or dump valve (262).

FIG. 47-(A) a like profile showing the shock stroke completion and the liquefied plastic material ready for discharge (264) as the bounce return of pistons (261) and (260) begins their return stroke. The ball valve (247a) remains closed and the dump valve (262) can finally be opened to drain the product (264).

FIG. 48-(G) a cross-sectional view showing the working elements of a flywheel-like unit used for the gross separation of the various gas masses in this near-plasma gas cloud of various molecular weights that are in the gas stream (50) as it enters this gas molecular mass weight separation system. The gases move from a fixed piping system (276) mounted on mechanical seals and a bearing assembly (266) that permits the rotation of a flywheel-like apparatus mounted in turn on mechanical bearings and a shaft support of great strength and mass resting on a foundation base. It is driven by a prime-mover source (12) and through a speed increaser planetary gearing not shown. The central shaft of this unit supports a large diameter parabola shape (270) which in turn supports the upper surface of the parabola form or armature (273). The upper face parabola portion (273) is shown in cross-section. The upper portions of the parabola surface interfacing the gas have finite openings as shown in the enlarged view of FIG. 49-(273) which space is centered at (275) in each of a large plurality of horizontal disc-like components (273) each of which has a large varied size center hole, the edges of which, when stacked, represent the inner diameter contour of the parabola bowl. The outside diameter periphery of these meet slit-like openings in a 360-degree stator FIG. 48(272) so the slits align at a mechanical adjoinment (268) comprising a precise spacing and alignment of the slits in the two components. The stator unit is supported with a bridge unit held on stantions (267)–(269). The gas (50) is driven downward into this system to impinge upon and pass through a perforated 45 degree sided cone (278) the bottom of which represents the focus point of the parabola. After passing the perforated 45 degree angled conical screen the gas molecules strike the parabola surface of (237) and rebound as the gas mix comes under the influence of a strong centrifugal force as the whole gas body swings around a center with a total diameter in the order of twelve to fifteen feet. As the molecules strike the parabola's surface (237) they rebound in a direction opposite to their original path directed primarily to the focus point (278a) that is opposite side of the apex of the perforated cone. This small area space is unperforated and presents a convex face to the rebounding gas a short distance above a tungsten point on a steeply sided cone (278b). There is an intense bombardment of molecules at this point and the cone bottom shape scatters the gas. The molecule's velocity and direction is influenced by the centrifugal force and the rebounding from a common deflection point at (278a). The greater mass molecules dominate in this motion moving to the top edge of the parabola (273) and those of lesser mass gravitate to the lower portion of the parabola face. Those molecules with new free paths that do not strike others (minimized by the extreme expansion occurring) bounce again from this surface and are redirected to the exit area. It is the inventor's belief that, while infinitely small, some influence of the centrifugal force will be felt by these molecules held captive in a large moving space. This effect should be proportional to their individual mass and weight. This then implies that the heavier molecules will accumulate at the outer diameter, and the lighter ones distribute themselves proportionately closer to the center as shown in the illustration.

FIG. 49-(G) the gas (50) exits through the appropriate slits (274) in the parabola bowl (237) to create a strata of gas separation. In the preferred form of the apparatus of this invention thirty-eight ½" concave surfaces (273) flanking the openings (274) which are 0.048" wide slits (275) in the center of ½" spacing between discs. These slit openings provide an area greater than that of the 12 inch diameter pressure gas line intended to feed this system so the volumes of gases as received in the expansion area can pass effectively through these openings without creating a back pressure.

FIG. 50-(G) is a drawing of the focus point of the parabola (273) that is of a deep-bowl configuration with the focus as shown at (278a) and the contour of the parabola bowl ranging from (273) to (237).

FIG. 51-(G) is a view (277) of the final tube-end appearance at the parabola exit from the parabola bowl slits of FIG. 46. The gas divisions are so collimated at the parabola that they accumulate in a wave-guide like tube with horizontal slot openings (279) or divisions for each representative gas mass selection. Together these are carried in this tube of separate channels (280). These serve to gather the separated gas strata for suitable positioning and delivery into the magnetic field of the cyclotron that follows.

FIG. 52-(M) In this illustration in which the extruder and gas handling apparatus of Process IV is shown the description is minimized and detailed elswhere. The purpose in its inclusion here is to show an application of the gases after division using the Cyclotronic Magnet Molecular Division means as illustrated in FIG. 53 and as shown here as the source of the gases that are applied in the extruder/mixing and liquefying in this process in the preparation of a chemical product. This is shown in detail in FIG. 25. The cross-section here is to illustrate the relationship between the two processes. The (L) features of FIGS. 53, 54, 55, 56, and 57 illustrate in cross-section and sketches the operation of this Cyclotron Magnetic Gas Division by Molecular Mass.

The assembly of FIG. 52 shows the rotational drive of (12) and (120) as previously described turning a nozzle containing an inert media input at (172) as to move through rotating and churning tube forms (68) (not shown), to mix the gases of (61a), (61b), (61c) and (61d) as delivered through an array of piping to stationary ports in rotational seals (121). A cold liquid source delivers the cold treatment through the piping means of (172) with return at (173). The vacuum source (35) clears the feed stock before the gases are injected at (61).

FIG. 53-(I) is the source of the gases that are applied for liquefication as in FIG. 52. Here is shown a cross-sectional side view of the magnet of the cyclotronic molecular mass division apparatus of the invention, in which gas divisions from the prior treatment (50) enter a magnetic field produced by a direct current coil (55) and iron core magnet structure. The magnetic field between the poles through which the gas flows causes it to fall out at differing molecular weight point on a circular target of slit opening (58) also as shown in the magnetic field produced as seen in top view of the assembly FIG. 55-(58). On the outer edges of the magnetic structure (55) the circular manifold valves (281) can be seen leading to piping that ends in a hot reaction or cold liquefication extruder apparatus of FIG. (52).

FIG. 54-(I) is a perspective illustration showing the magnet structure (55) pole pieces (58) the gas movement (50) and the vertical openings to the manifold valves (282) around the periphery of the magnetic field in cut-away.

FIG. 55-(I) a top view of an open magnet (55) the poles of which are exposed to show a periphery of closely spaced vertical slits are provided (282) that lead into each molecular division tube. Gas (50) is introduced to the magnet field edge (58) by a nozzle and the gases injected circle under the influence of the magnetic field to finally fall out in one or a series of slits (282) that represent the molecular weight of a given gas within this gas mass. The manifold end (281) is shown where it begins the encirclement of the tubes ends that extend from the magnetic field and the collimating slots (282). These are shown as divided into groups of common weight gases (60a), (60b), (60c) and (60d) that correlate to those pipettes introduced to the Cold Liquefication Processor IV of FIG. 52. (61a), (61b), (61c) and (61d). The gas (50) must have prior treatment in an ionization unit as at (200).

FIG. 56-(I) illustrates the complexity of the gas valve array in the manifold at the tube ends as in FIG. 55(261) A group of three valves control each of the ports of a circular manifold that surrounds the magnet. The reason for three is that the gas fallout has a width that is unpredictable and not unlike a color band of a spectrum from a prism. Several slots at the magnetic field peripheral edge may serve to collect a bandwidth of comprising a dozen tubes, so two valves in the manifold edge serve to open or close the connection to the circular manifold pipe controlling any selected group. One at each end of this dozen tubes can then be selected to open and the rest remain closed. Then one or a whole group of the outer valves in that section ran feed a spectrum of gas to the treatment that follows. This is partly shown here. Two sections different gases here. In the middle of the illustration is the control point for the two. Number 1 gas is represented by ports (281) so the two valves between it and Number 2 gas are closed at (283). Gas Number 2 can be expelled from port (285) for all the tubes of that section without mixing with Number 1 which is not shown being expelled.

FIG. 57-(I) is a perspective illustration of a possible geometry and positioning of the gas input (50) after passing through a laminar flow means, followed here by the renewable cathode ionization (200) as the gas flows past and finally a representative perspective sketch of the gas molecules turning in the magnetic field and the fallout to three representative slit openings in the enclosing periphery (281). A Direct Current source is shown supporting an adjustable voltage potential (284) between the ionization station and the peripheral slit enclosure. A direct current electrical potential can be a part of the apparatus to provide this condition between the ionization means and the magnet (284).

FIG. 58-(K) is a cross-sectional view of the components of a simple form of Sub-Sonic Shock Compression piston cylinder assembly (72) which view is only one side of this apparatus (normally two pistons oppose one another and this drawing shows only one). This form is a diesel or natural gas driven unit with a free piston (286) and actuation of combustion created by impact of the piston at the cylinder terminus that is shown in detail in FIG. 65. The hexagonal center block that will accommodate six of these single piston assemblies is shown at (299). The source of the ignition is the spark plug at (293) and the combustion force against the piston is at (301). The compression space of the stroke is (287) where compressed feedstock gas is delivered through the center ball check (290) upwardly perpendicular to the drawing into a Catalytic Reaction Chamber standing above for close coupling not shown. Exhaust gases are delivered into the Reactor Heating system from port (297) and return stroke pressure for the piston is delivered through controlled valve port (296). (288) is a temperature control space or jacket around the cylinder that is injected with low temperature steam. A bellows form (289) encloses the cylinder sleeve as a heat radiating source for heat exchange to this space. (295) is a compressed air control cell with pilot valving means actuated by the piston closure to deliver pressure signals through line (295) to the cylinder (294) for control of fuel and compressed air valving from ports (292) and (291) that provide combustion means for driving the piston. (561) is a quartz window port for the visual tracking of the piston by laser beam means interrupted by the piston passage.

FIG. 59-(K) is a cross-sectional view of a piston (286) within the cylinder showing the nucleate steam bubble formation at the perforations (300) on its outer surface that support the piston in a floating mode as in an air-bearing (302), but with the added impetus of a force that imparts motion contributing to the drive force in the direction that the piston is propelled by combustion or other means.

FIG. 60-(K) a cross-sectional view of a piston (286) of this invention in which the porting for gas or steam admission is shown at (301), cross-drilling to provide a manifold condition in a longitudinal slot (303) where the slot cuts across and opens threaded or grooved lands that support a perforated sleeve in which the perforations (300) align with the threads or grooves so gases and steams efficiently escape from these grooves to the perforations and the space that encloses the piston's outside diameter.

FIG. 61-(K) is a normal view of the piston (286) of this invention in which the nozzle-like ends taper as shown at (304) with the taper based on the Bernoulli Principle using a proper nozzle angle to provide a driving force for moving in a recoiling function as gas expands, or particularly as steam forms nucleate bubbles over the perforations (300) and which are then subjected to the high temperature contact of the cylinder wall bursts into an explosive propelling force escaping over this nozzle taper expansion form. When the piston is moved in either direction the tendency is for the gas or steam to go to the trailing tapered end of the piston giving it the nozzle like recoil push in the opposite direction. When impelled in one direction or another by combustion or otherwise, the piston tends to move in that direction as propelled by this additional force.

FIG. 62-(K) is a cut-away and cross-sectional view of a part of the cylinder with the piston (286) at rest between ports (561) and (561a) that have quartz windows usable for determination of piston position. The chambering of the cylinder (288) affords a hot space for the generation of low pressure steam with water mist attemperation cooling of these not shown here, but described in detail elsewhere. A bellows of convoluted form slips over the inner cylinder sleeve (289) and serves as a heat exchange surface or radiator for the space (288). This steam is directed to the Reactor for heating.

Figure 63:
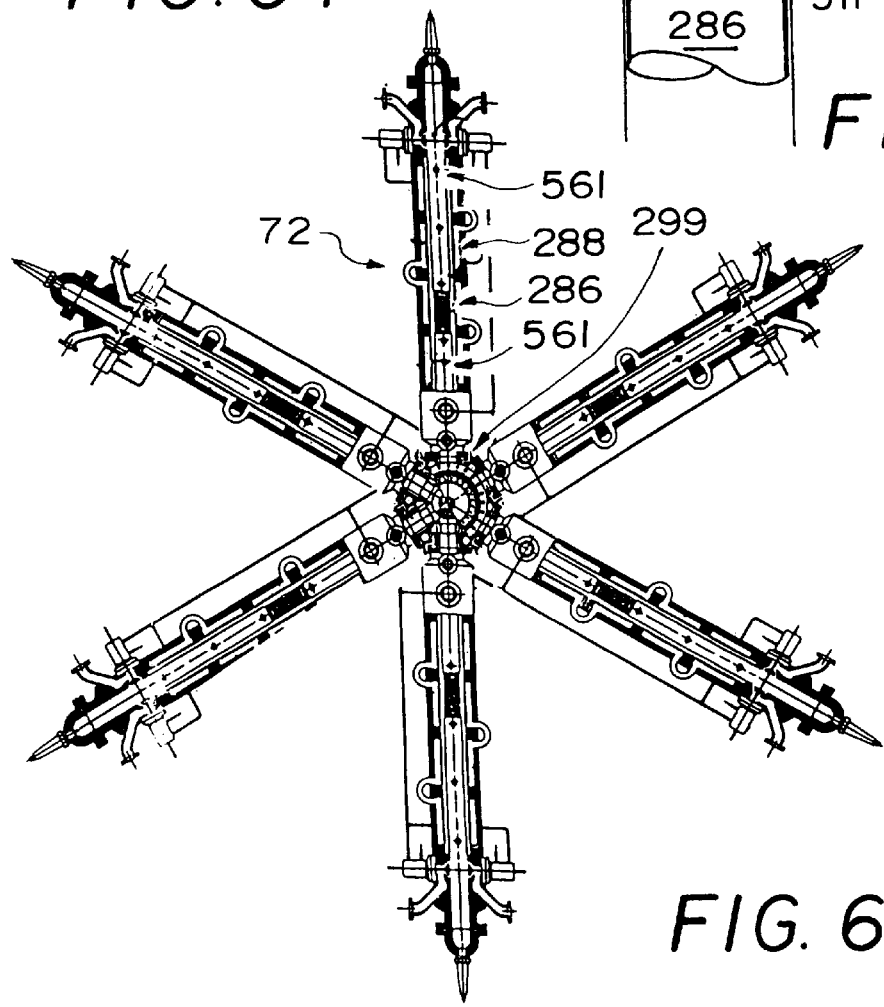
FIG. 63-K illustrates the placement of six cylinder assemblies around the center of the hexagonal mounting and control block of FIG. 60 so that three assemblies can be used as compression units with two pistons opposed in each.

FIG. 63-(K) illustrates the placement of six single cylinder/piston assemblies (72) mounted to the center hexagonal control block of FIG. 58-(299) so that three can be used as compression units with two pistons opposed in each and work together progressively or individually depending on the requirements of the process. In this view the observation position lens ports are shown at (561). The steam generating and temperature control space at (288). The piston is shown at (286) and the center block at (299).

Figure 64:
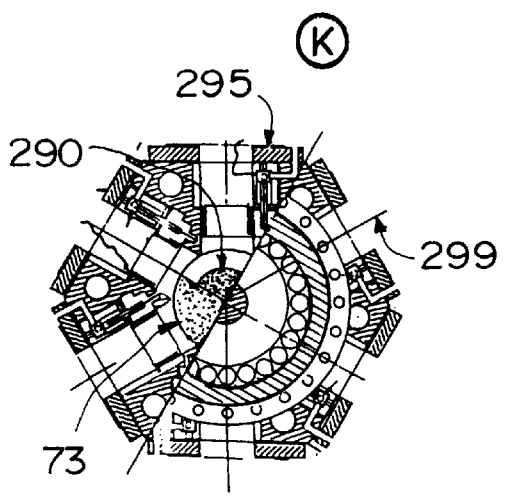
FIG. 64-K is a cross-section top view of the piston mounting that is a hexagonal block machined in detail from a single piece for maximum strength to resist the very high pressures generated by this system. The unit incorporates an assembly that is compressed air actuated with small pilot pistons to move control elements in triggering of combustion of opening or closing of air pistons attached valves at the opposite end of the cylinder assembly.
Figure 65:
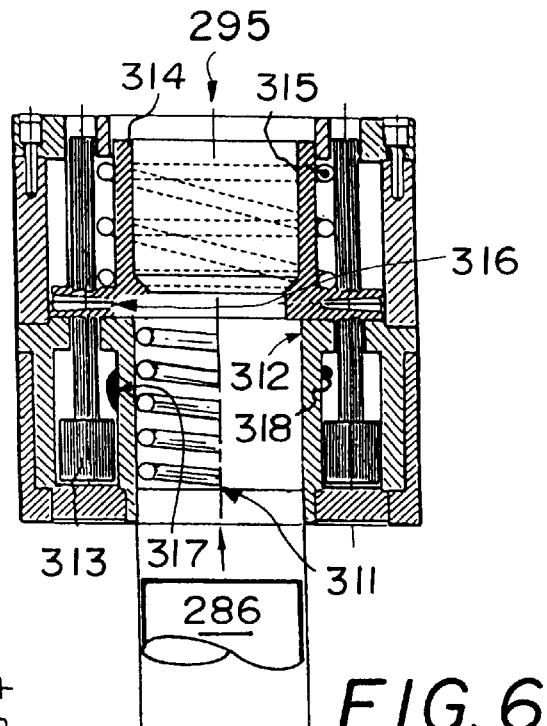
FIG. 65-K is a cross-sectional view of the compressed air control mechanism that impacted by the piston at the stroke end with small auxiliary piston movement that opens porting to open and close valves at the opposite ends of the cylinder.

FIG. 64-(K) is a cross-section top view of the piston mounting that is a hexagonal block (299) as machined in some detail from a single forging of maximum strength to resist the very high pressures and shocks generated by this system. The unit incorporates an assembly (295) that is compressed air actuation of small spool valve pistons to move control elements in triggering of combustion of opening or closing of air pistons attached valves at the opposite end of the cylinder assembly the detail of which is shown in FIG. 65. The ball of the check valve to the Reaction Chamber mount above this unit is shown at (290) the port of which opens to the column of catalyst (73)

FIG. 65-(K) is a cross-sectional view of the compressed air control mechanism (295) that is impacted by the piston at the stroke end to actuate a small auxiliary spool piston pilot movement that opens porting to control the opening and closing of valves at the opposite end of the cylinder assembly. In this apparatus the piston (286) impacts a spring (311) in a sleeve (312) that in turn moves a second sliding sleeve member (314) compressing another spring (315) and at once the sleeve shoulder of (314) as pinned (316) to a spool piston rod (313) moves by this action to close porting (as shown) in a one shape for a longer action as at (317) or a shorter action small port as at (318) for a quick response. Optionally by positioning of one or both of these ports (317) and (318) so the piston movement opens rather than closes them the control can be reversed. The movement of this air to pilot control with compressed air the remote piston/ cylinder controls and valve inputs provides means for the automatic operation of the system.

FIG. 66-(J) is a cross-sectional view of a reaction chamber standing on the hexagonal mounting block (299) that is the connect to the piston/cylinder compression apparatus of this invention so that the product of the compression from the Sub-sonic Shock Unit below is delivered directly into the reactor as described in the foregoing. The pistons and cylinders of this unit are the form of FIG. 63 and are not shown here. Exhaust from the combustion gases as fired in the cylinders move into the Reactor heating spaces at (305)

that surrounds the catalyst column (73) in vertical piping (306) extending to the top level of the catalyst where the exhaust flows into the open stack around coils containing a gas of the system requiring reheating that enters the coil from pipes (408) or (484) to exit at (486). Vertical Steam pipes (386) surround the pipes (306) containing the exhaust which tends to add heat to one side of the exhaust piping as the catalyst absorbs heat from the exhaust piping on its opposite side. Thus the exhaust gas is still very hot as it moves through the coils in the reheater above. The catalyst can also deliver exothermic heat to this exhaust passage as well. Gas reformed in the catalyst Is taken off to the system at (401). A final globe shape expansion tank with check relief valve control adds a final steam generating point in the stack exhaust to the scrubbing of cleanup system. High temperature steam makeup for the Reactor is either introduced at the modulating valves (308) attached to the attemperation units (179) or at a high pressure line steam makeup point (392). A exhaust and steam manifold encircles the bottom of the reactor and the compressed gas input from the Sub-Sonic Compression Units high is driven into the catalyst at (400). The vertical pressure pipe jacket the Reactor are provided with water makeup using the attemperation mist water to specifically generate new steam for the Reactor. The steam temperature and pressure in the (307) steam loop is controlled by the attemperation units (179) as shown in detail in the FIG. 68 illustration. The modulation valving (308) passes excessive steam to the return line, not shown.

FIG. 67-(J) has two views, the upper is a top cross-section of the reactor of FIG. 66 showing the vertical tubing for exhaust (306) that is the container for the column of catalyst standing inside it and surrounded in turn by the steam tubing bank for (307) intended to jointly provide heat transfer to the catalyst media (73) via the exhaust while conserving and holding its heat with the steam piping enclosure for the reheater coils at the top. This outer third vertical pipe layers (307a) consist of only two or three conduits for high temperature steam held in insulating brick work of the wall of the reactor. These supply the top and bottom manifolds (400). The objective here is to supply new steam to the Reactor Center and at once heat the Reactor Walls. The lower illustration portion of this FIGURE shows a side view of the catalyst (73) the exhaust piping at (306), the inner steam piping (307) and the outer three pipe system (307a).

FIG. 68-(J) a cut-away illustration of an attemperation unit (179) that is employed throughout this system of processes as the means for water addition to the steam generation equipment and also to provide the means for temperature control. Steam flow (397) is left to right in the illustration. The venturi part (309) is where a water mist is introduced.

FIG. 69-(K) is a top slightly larger cross-sectional view of the hexagonal mounting block of FIG. 66 showing the mounting flange (400a) for attachment to the reactor and the conjunction of (306) porting for transfer of hot exhaust and the control component (295) with the pilot valving (316).

Figure 70:
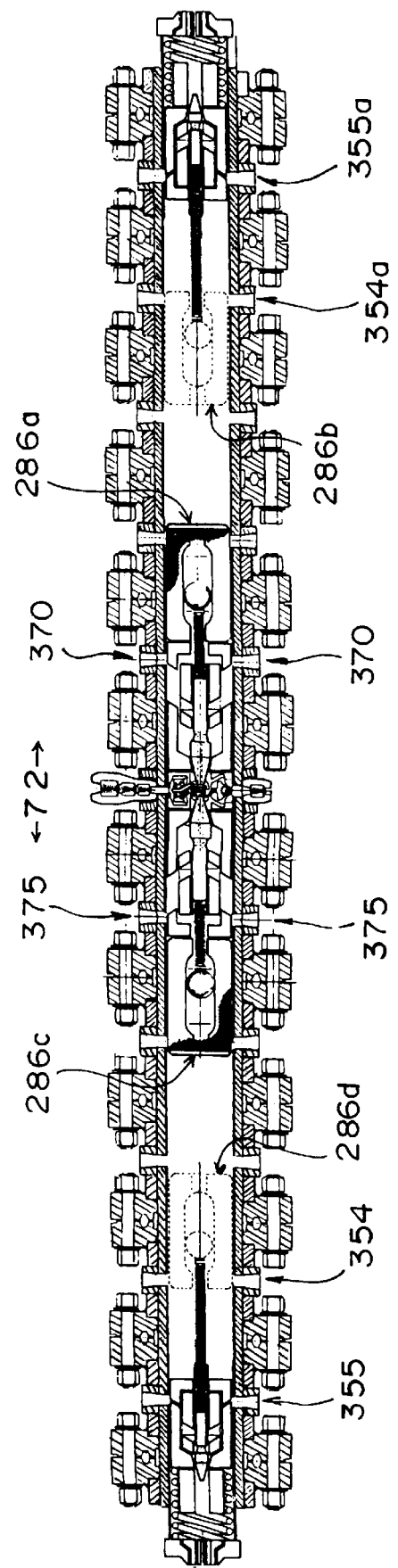
FIG. 70-K is a cross-sectional illustration of an entire piston/cylinder assembly showing the opposed pistons in an ending impact position against the rams that hold the feedstock between them and the return stroke position (dotted lined) illustrating the adjustable arresting apparatus employed to avoid damage in impact while still closing with shock force against the feedstock held in the space between the pistons.

FIG. 70-K is a cross-sectional illustration of an entire piston/cylinder assembly (72) intended to show the opposed pistons impact position (286a) and (286c) against the rams that hold the feedstock between them and the return stroke position (dotted lined) (286b) and (286d) illustrating the adjustable arresting apparatus employed to avoid damage in impact while still closing with shock force against the feedstock held in the isolated space between the rams. Progressive exhaust ports are shown at each end. On the left is (354) and (355). On the right is (354a) and (355a)(370) and (375) are gas and steam input to the isolation chamber for shock compression.

FIG. 71-(K) is an enlarged cross-sectional view of the nearly closed position of the pistons, the internal ball arresting partly inside the piston and the rams and relief valves that function to control the passage of feedstock to the impact space. Emphasis here is on the use of the perforated surfaces on all moving elements in the cylinder, pistons and rams. The pistons (286) as in FIG. 70 in a virtually closed position at the center of the unit (72). The balls (357) inside the pistons have closed against the piston rods (321) and (321a) and the piston rod release taper FIG. 72(323) has nearly sealed against its seat (326) of the front ram (331) as the ram collar (330), center ram (329) and the back ram (328) have nearly closed too. The point of this illustration is not operational, but to show the use of the grooved or threaded surfaces on all of these elements as at (320) for the purpose of minimizing friction and creating the easiest movement possible. The longitudinal hole to input this steam or gas to the peripheral ports or perforations FIG. 73(300) in all of these can not use a center bore, but has to use displaced holes and shallow lateral hole connections like (322) and (301) so the manifold problem can be served and the grooves or threads filled with gas or steam under the porting except perforations (300). Part of the arresting function is shown here. As pressure building in the compressed space (371) gas backs into the port FIG. 72(334) of the piston rod (321) and out of cross-holes (346) causing back-pressure against the collars (327)(330) that must be overcome as the final stroke position of the piston is achieved. A series of ball check relief valve forms release the compressed gas from the isolated space beginning at ball (365) and the series of valve checks of (332) to release at (359). New Gas feedstock input enters through ball check valve (333)(366).

FIG. 72-(K) is a cross-sectional illustration of the piston rod-valve component that moves in and out of the piston body to provide an arresting function as well as means for the final closing of the seal (323) that engages the seat FIG. 71(326) for the compression space as the gas increment is driven out through the pressure relief valve into the reaction chamber or collection vessel. This part comprises its body (321) in which an end bore (334) reaches to cross holes (346). The piston rod spring assembly (324) and piston rod end plunger (325) are shown. Spring (324) works between flexing bellows on a shaft that permits everything to slide inside the tubular bore of the piston rod.

FIG. 73-(K) like FIG. 72 this is a cross-section taken through the piston wall showing the supporting thread-like grooves (319) holding the perforated shell and serving as a manifold for steam passage out the perforations (300) in that sleeve or shell. (320) shows a groove axially parallel that serves to connect the threads or grooves so gas can pass between them from the cross bore manifold connection.

FIG. 74-(K) is another enlarged view of the piston/ cylinder assembly in the near closed position of FIG. 71, but here the emphasis is upon the valving unit (361) at the compression isolation center FIG. 76(371) on which is mounted the relief ball checks (332) and the input check valve (333). This assembly of valves maintains a high pressure in the feedstock chamber until the pressure overcomes the several spring retention means so the gas can be expelled.

FIG. 75-(K) is a view of one cylinder end showing the arresting gear used at each end to slow the velocity of the piston after the isolated gas increment is impacted. Here orifice controls of escaping air or steam, plus the large spring at the cylinder end as well as the springs within the piston valve unit that impacts the ball inside the piston all contribute to arresting the piston stroke. This prevents this force from being destructive mechanically. The piston is (286) and the piston rod (321) with its arresting spring assembly (324). At the ends the impact is used to pressurize and send to the middle of the unit steam and gas for input to the isolation space FIG. 76(371). Pressurized steam and the gas feedstock is introduced at both piston return ends at (349). The valves to input these are opened and the material introduced just as the piston reaches the point of closing this end space. This provides an effective way to stop the piston and at once use the stoke energy for pre-compression of the feedstock gases and delivery to isolation space FIG. 77(371). A large spring is the last resort for stopping (351) as the back ram (331) hits the striker-plate (352) against the spring and its center collar (350). But the pre-compression of the injected gases catches this force first with the closing of the piston and all the ram spaces driving this gas and steam over orifices to an auxiliary pressure chamber serving (371). This results in the gas going through the orifices at (348) and finally (369). A four way valve (not shown) serves to provide the feedstock as well as the high pressure steam to the respective ports from two separate reservoirs.

FIG. 76-(K) is an enlarged view of the cylinder center spring assembly retaining the ball check at the upper or high pressure relief side while holding to a lesser pressure restraint at the lower or low pressure side that serves to admit gases to the compression chamber. This two valve assembly uses a common pair of springs with extension that differ in force retention. The spring side view is shown at (361) and (362) with the ball check retainer for gas output at (365) and the ball check retainer for input at (366). A final small portion of the isolation space is shown at (371).

FIG. 77-(K) is an enlarged end view of the spring/valves assembly in an end as seen on the axis of the assembly showing the isolation space at the center (371) and the two springs as seen from the end (362) and (362a).

FIG. 78-(K) is the first of a series of cross-sectional sketches showing the one-half of the cylinder (72) and one piston (286) of the two opposed as the one approaches the center section of the cylinder. The piston is driven by combustion or expanding steam as shown by arrows (344). Residual steam ahead of its travel is released by an open series of valves so it is moving against zero pressure. (347) is open as representative of these. This force (344) also is passed inside the piston through an end opening and presses against a free internal ball (357) that is then moved the full length of the piston to seat against a seal at the opposite end. This seat is provided at both ends of the piston. The inside surface of these piston end openings (356) has a slip-fit finish (RC 7 ASTME) to match the outside diameter of the piston rod (324) so it can closely fit in this opening as it moves. The bore inside of the piston that supports the ball has a like finish providing a minimum of bypass slip. The end of a telescoping piston rod (321) is, in this illustration, pressed by retained gas pressure in space (340) toward the traveling piston against two ram parts (331) and (328) that shoulder (341a) against a smaller cylinder sleeve (341) opening in which the piston travels. The existing (340) gas pressure has pressed the two rams (331) and (328) against one another wringing the gas between them in space (342) out through ports (346) and (334) of the piston rod to equalize the force in the isolation space (340). The low pressure set blow-by relief-valve (335) allows residual steam or air in space (341) to escape ahead of the piston (286). The piston rod (321) is at rest as is the closed check valve (336). The opposing piston gas pressure (358) is equal to that of space (340). The valves to the reactor (332) the input (333) to the isolation space are closed.

FIG. 79-(K) in this view the piston (286) has now moved so the piston rod shaft (321) has entered and closed the end port of the piston (356) as piston rod's spring and bellows shock absorber assembly FIG. 72-(324) telescopes and presses the ball (357) back against the driving force (344). Check valve (335) is still exhausting air or residual steam from space (341) ahead of the front plane of the piston. Check valve (336) is closed. Pressure is building between the back-ram (328) pressed against the front ram (331) and the moving face of piston. The piston rod (321) is at rest as is the closed check valve (336). There is no gas movement through port (346).

FIG. 80-(K) illustrates the first reaction of the piston rod (321) impacting the piston ball (357). The ball (357) has reversed directions against force (344). Checks (335) and (336) are closed. The piston (286) is about to strike the back face of back-ram (328). Some shock is taken by the remaining residual steam or gas that moves into space (342) because the piston has passed the opening of checks (335) and (336). With the piston-rod spring assembly FIG. 72-(324) fully closed and the ball (357) takes up some shock as it applies a reverse pressure against the force (344). The (344) force is still great enough now that the tapered end of the piston-rod (321) seats in the front-ram (331) taper seat. This action drives it away from back-ram (328) opening space (342) that fills with gas passing through piston rod ports (334) and (346). Pressure is now great enough in space (342) that this gas joins that from the opposing piston drive at (358) where the action just described is being duplicated by the opposing piston. Now begins the compression force in space (340) against the pressure relief valve at port (332). Check (333) is closed and a vacuum is starting in space (341) which provides the bounce for piston return.

FIG. 81-(K) illustrates the second reaction, which is that of impact of the piston itself (286) against the back ram (328). The ball (357) has still not completed its travel and front ram (331) slows as back ram (328) catches up to nearly close the space (342) between them as its gas pressure moves through the cross hole piston rod ports (346) and (334) in the piston-rod (321) into space (340). There is some low pressure residual gas or steam remaining space (342). Check valves (335) and (336) are closed. Compressed gas continues to move out of port (332) through relief check valve to the Reactor. Input valve (333) is closed. The vacuum increases in (341).

FIG. 82-(K) is an illustration of the final closed position of all the elements involved in this reaction to the piston (286) force and impact. The final gas at the relief valve set pressure is exhausted at (332) and passed to the Reactor. The space (340) is totally closed and all gas is exhausted as is the source from the opposing piston (358). The (332) relief valve now closes. Spare (341) has created a maximum vacuum. The (357) ball has completed its travel and is seated against the back seal. The space around the piston-rod (321) inside the piston bore (356) is also in a low vacuum state. The driving force behind the piston has been exhausted through a plurality of ports to create a zero pressure (344a) for the piston return. With piston closure an impact bounce occurs augmented by some residual pressure in (340) but mostly the vacuum in (341) provides the commencement of the return force. Check valves (335) and (336) are closed.

FIG. 83-(K) illustrates the start of the return stroke that follows the "bounce". Pressurized steam is now introduced at (336) filling space (341) and creating drive force (347). The back-ram (328) opens space (342) between it and the front ram (331) as the feedstock gas is introduced at (333) for the next compression and gas flows through (334) port of (321) and out ports (346) to space (342). (328) is now backed against the shoulder (341a) at the end of space (341). This occurs as feedstock gas pressure from (333) builds in the isolation chamber (340). The piston-rod's (321) telescoped compressed spring parts are beginning to expand against the ball (357) which is now being drawn to the seat at the piston's impact end by the piston's return velocity. The check valve (336) remains open to admit the maximum steam pressure (348) into space (341) for the piston's return.

FIG. 84-(K) illustrates the commencement of the piston (286) return as the piston-rod (321) is freed and the pressure at (340) equalized with introduction of feedstock gas and all gas has been transferred out of space (342) The (328) back-ram has closed against the retaining shoulder and the maximum return pressure and volume (340a) has been applied through valve (333) providing some return force (340a) pressure condition in (340) finishes the closing of the rams. Check valve (335) which is behind the piston's movement is closed but similar valves ahead of the piston's travel not shown are opened so it moves against minimum or zero pressure. The ball (357) which has been pulled back by the vacuum force is shown in the back position. This will suddenly change as the force propelling (286) drives the ball in the direction opposite the piston's travel to seat in the return stroke position.

Figure 85:
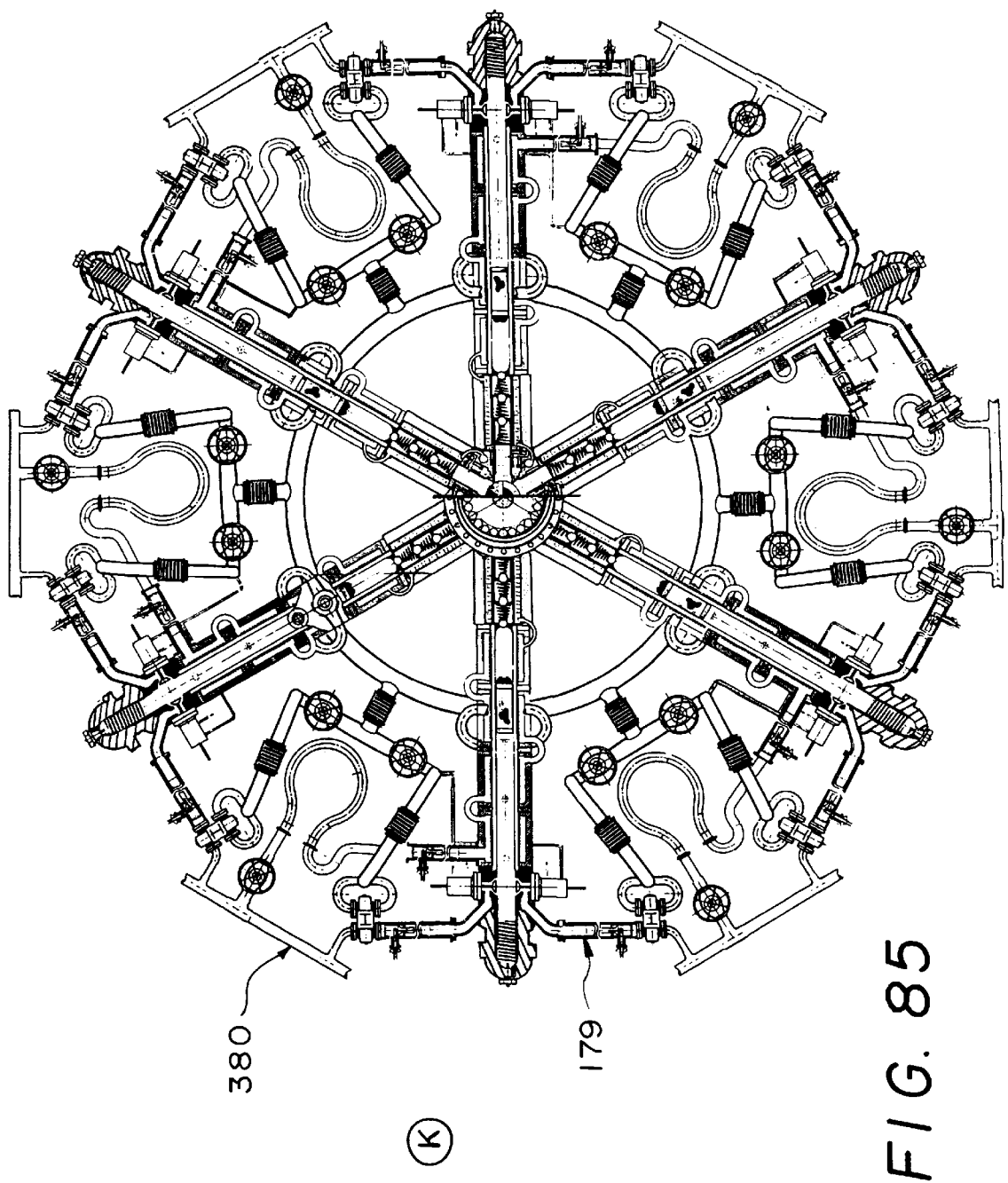
FIG. 85-K is a sketch in cross-section of the connection of steam supply and return to drive an array of assembled piston cylinder units in radial form as used in connection with reforming of stack-gas in a power plant application.

FIG. 85-(K) is a sketch in cross-section of the connection of steam supply and return to drive an array of assembled piston cylinder units in radial form as used in connection with reforming of stack-gas in a power plant application. The steam supply is shown at (380) and the typical attemperation unit at (179).

Figure 86:
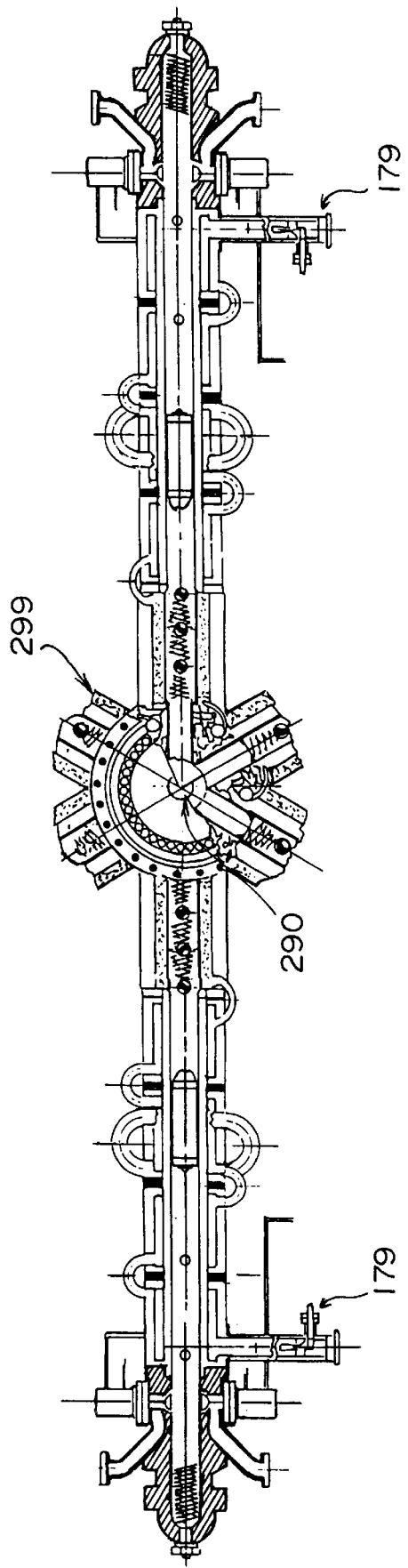
FIG. 86-K is a section of FIG. 88 showing a single cylinder dual piston assembly illustrating the use of attemperation units for temperature control and water addition to the chambers with the cylinder.

FIG. 86-(K) is a section of FIG. 88 showing a single cylinder dual piston assembly illustrating the use of attemperation units and water addition to the chambers within the cylinder for temperature control. The attemperation units are shown at (179), the hexagonal mounting block for the standing Reactor is shown at (299) and the ball check (290) for release of shock compressed gas to the Reactor which is also shown. Pistons are at (286). Here the ram arresting system is omitted to simplify understanding.

Figure 87:
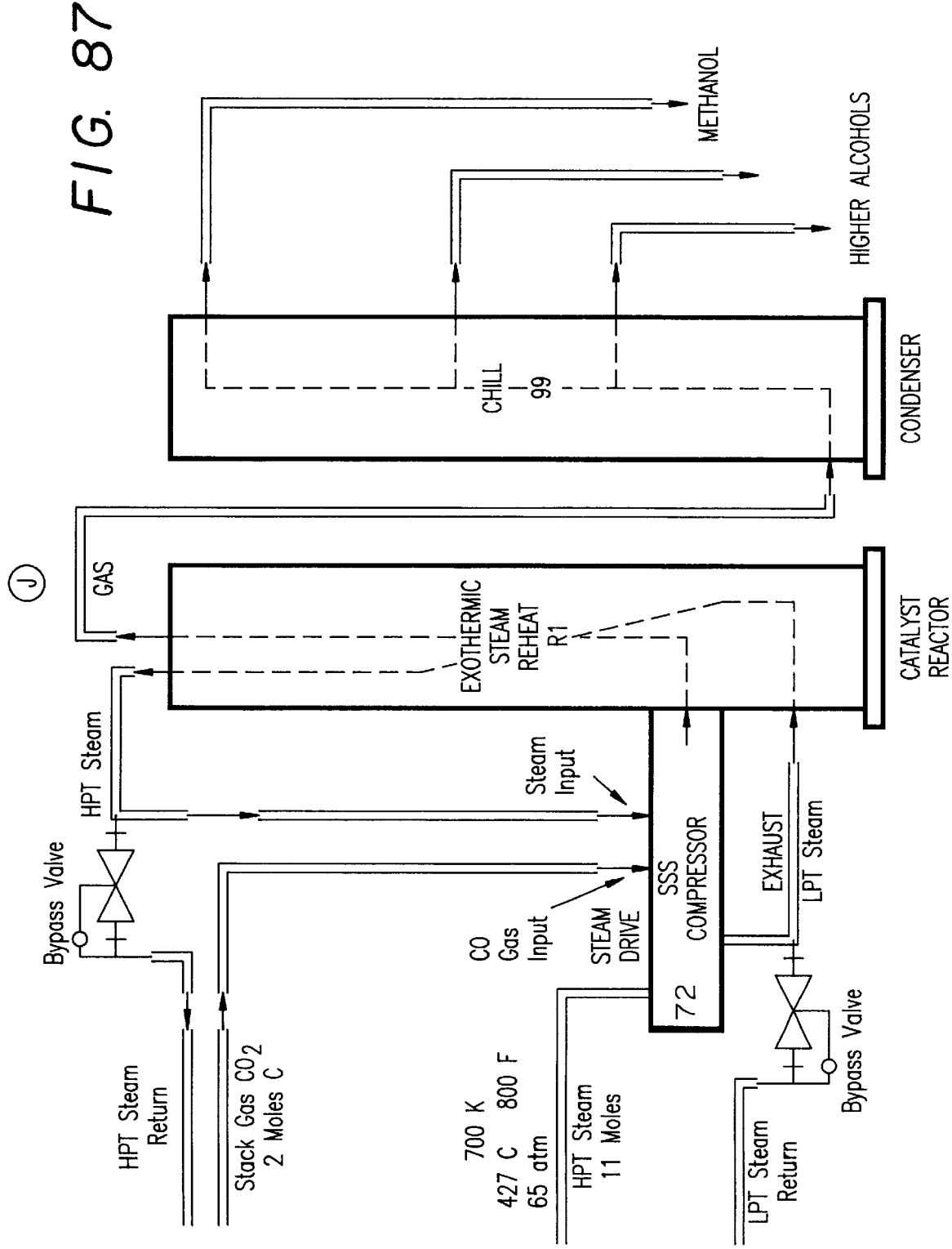
FIG. 87-J is a simplistic sketch of the application of a single piston cylinder assembly to the production of methanol from stack gas.

FIG. 87-(J) is a simplistic annotated sketch of the application of a single piston cylinder assembly to the production of methanol from stack gas in which (72) is the piston/cylinder unit and (56) is a Reactor and (99) a Condenser.

FIG. 88(K) is a cross-sectional illustration of a critical element in the control of the operation of the steam driven Sub-Sonic Shock compression unit. This is a rotary throttle valve that is driven by a pressure/volume regulated constant steam stream passing over an impeller on a common axis with a cylindrical valve that intermittently opens a high pressure steam port to deliver pulses to the series' cylinder/pistons assemblies simultaneously in achieving a synchronous drive in the piston pairs that oppose one another. The holed cylinder surface of this throttle rotor is supported by the steam pressure without weight or resistance to the rotational force using the nucleate bubble principle of this invention. These bubbles support the journal within the space tolerance between all the journal surfaces and the inner surface of the cylinder to achieve full flotation on this explosive nucleate bubble stream. A pressurized space (345) provides a constant pressure to an axial port (338) that reaches via lateral paths the perforations on the outer periphery of the rotor. The cross-sectional view shows the rotor in some cut-away sections to illustrate the perforations (300) on the surface and on each end to maintain the centering of the rotor with the like nucleate bubble technique there as well as on the peripheral sleeves. Steam output (344) is shown from the expansion chamber (345) and the driving input to the rotor/impeller is shown at (337). Steam to pressure control valves (not shown) is at (348).

FIG. 89-(K) is a cross-section illustration in four sections. The steam input ports are shown in one cross-section at (337). The upper left quadrant shows the peripheral perforation of the journal at (300). The lower left quadrant shows the center axial port (338) that is fed by the rotor steam feed at one end, closed in the center and fed with the pulse steam feed at the opposite end. The lower right quadrant shows the pulse pressure chamber at (345). The upper right quadrant shows steam feed channels (320) that cut through the threading under the perforated area sleeve that delivers steam from the axial port using this as a manifold. The steam input is at (137) and the output at (344).

FIG. 90-(K) is a cut cross-section through the rotor which in cut-away shows the steam pockets (339) and lateral steam channel to axial port (338) that provide passage of steam to other channel feeding the peripheral perforations (300). (343) indicates the steam drive direction.

FIG. 91-(K) is a section through the steam valving portion of the journal in which (337) is the steam input to chamber (345) with a small bypass port (344b) which assures full steam input to the (345) space. Both of these are closed with rotation and when port (344) is aligned with the pressure chamber outer opening of (344a) a pulse of steam is discharged. The exhaust port (344) then passes the small vent port (368) that clears the chamber (345) of latent pressure before alignment with the charging port (337).

FIG. 92-(K) is a section of center showing the expansion chamber (345) without porting or peripheral perforations and the axial port to perforations (338) for nucleate bubble formation as in other sections.

FIG. 93-(K) is a cross-section showing the individual V grooves or threads cut in the outside diameter of the rotor that are not unlike those of the pistons in the Processor units. The cross-section represent the rotor of the steam throttle, the grooves are shown at (319) and the dotted line is the cross-cut (320) made through the grooves so steam can flow freely to all of the grooves as they are made to function like a manifold beneath the perforated outer sleeve of tube that fits around the rotor. These perforations (300) provide the opening on which the pressurized nucleate bubbles form to support the rotor so it can turn freely on this support. (374) is a cross lateral port to serve steam from the axial port.

FIG. 94-(K) is a cross-sectional illustration showing the use of a reflective light beam deflected by the surface of the piston (286) in passage inside the cylinder assembly (72). A long focal length lens is shown in use to remove the optical equipment away from the heat of the apparatus. A laser light source (552) provides a laser beam (553) deflected by a mirror (554) causing the beam (555) to pass through holes (556) in lenses of telephoto lens (557). The beam after passing lens (557) on path (558) moves to the focal point on piston's surface (559). The beam passes through a quartz lens (560) in a Kovar mounting with a light reflective barrel (561). The reflected returning light beam from the piston (286) reflection (562) passes straight through the telephoto lens system (557) to reach a photocell or light pulse sensor (565).

FIG. 95(K) is an illustration like FIG. 94 but employing the passage of a laser beam across the piston path for the same purpose. Here two aligned quartz lenses (560) in the cylinder wall make this possible. The sensor (565) receivers directed light through a telephoto optical system at (564) and through a non-reflective Kovar barrel (567) supporting a quartz lens (560) in cylinder (72) that passes across the path of the piston (286) or is interrupted in this passage as it originates at the quartz lens (560) on the opposite side of the cylinder (72) in the beam (553) originates from the laser light source (552).

FIG. 96(K) an enlarged cross-sectional view of the lens element used with the light reflective Kovar barrel (561) showing the light bounce inside this member and as reflected from a polished sleeve of the quartz lens (560) as it is returned from the piston (286) reflection (559) due to the polished surface of that member.

FIG. 97(K) an illustration like FIG. 95 in variation showing the non-reflective Kovar barrel (567) supporting a normal non-reflective quartz lens (560).

FIG. 98(J)–(K) is a complete detailed schematic of piping and controls for application of three Sub-Sonic Shock Compression units as illustrated in FIG. 84 applied to a pair of reaction chambers and a high temperature water/steam compression accumulator mounted in close-coupled relationship with one another to produce alcohol from natural gas. The emphasis here is on the use of every means possible to conserve heat energy by maximum use of the heat generated with the system elements themselves including capturing the exothermic heat of the Reactor. Finally the mechanical compression of high temperature/pressure steam with this apparatus is virtually an Isentropic function, but it is estimated that some water will occur with this compression. The frictionless compression apparatus should be recovering heat dissipated to low temperature steam jacketing around all the apparatus that provides a maximum recovery from virtually all hot surfaces. Operating at 1,800 psia and 625 degrees F. would provide the conditions we are seeking here. Any water recovered is passed to the Attemperation units that serve to bring new water to the system and at once provide means for control of temperature in the enclosing jackets. This illustration shows the configuration of a Natural Gas steam reforming plant using three individual dual piston gas and steam Sub-Sonic shock high compression units.

To aid in understanding this drawing the following should be noted:

High Temperature Steam piping has a line in the pipe.
Medium Temperature Steam piping has small circles in the pipe.
High Temperature Exhaust Gas has small dots in the pipe
Natural Gas Piping is plain.
First Reaction Gas has a single line of dots in the pipe
Second Reaction Gas has a single line of dashes in the pipe.
Water and Effluent Lines are solid.

The first Unit (72) introduces natural gas to a catalyst reaction chamber R1 to produce Syngas. The second (72b) to shock compress this Syngas and a steam addition with delivery to a second catalyst treatment R2 Reactor is followed by the conventional treatment of such reformed gas to produce a range of alcohols. A unique system for compressing high pressure steam mechanically (72a) with large pistons driving smaller rams against the steam to create this Isentropic drive across check valves to a pressure accumulator (S2) where the water is taken off the bottom for reuse in the process while the high temperature/pressure steam is used as the major steam source. Steam input from an external boiler system is provided when makeup is required. At the stack top a small spherical boiler receives the last heat of the exhaust. This boiler is fed by steam input from the reactor vertical steam tubes that stand within this stack tube adjacent to the catalyst in the lower section providing a maximum heat conservation condition within the unit.

The system consists of a High Temperature Steam Supply at the center and looping around the system. There is a medium temperature loop that services the seven Attemperation Units for Steam Makeup in the System and to maintain temperature control. A water recovery system including effluents from Condensers is used in a high pressure water system and loop to the Attemperation Units. The Combustion Gas Exhaust is circulated through the Reactor walls before moving past coils carrying the Reacted Gases in a reheater function following the Condensers. Finally the Natural gas input moves in a looping arrangement to serve the compressor combustion needs. The exhaust gases inside the stack portion of the reactor envelop a double pipe coil carrying reacted gases that require reheat after condenser cooling. The water makeup for this entire system is supplied by a plurality of Attemperation units that inject mist directly into the jacketed steam piping In this way the maximum amount of heat energy is captured for work without loss to the atmosphere. Compressed gas handled in Unit (72) is conducted in a like manner in Unit (72b) except in this case the feedstock is Syngas from the R1 Reactor after passing the condenser (99), and reheated for recompression before introduction to the R2 Reactor.

Natural gas for reforming enters the system at (378) is heated with passage through a coil (379) heated by high temperature steam. The hot gas moves down line (495) to enter the bottom of a wash tank (496). Here effluent water from a condenser (99) through pipe (423) bypasses to a steam heated coil (379a) that is a feedwater heater to tank (496). The water is maintained at 260 degrees F. The gas from this tank is used in the refining system at the end of the process passing to a staging tank (466). In addition, gas from this tank moves to SSS Unit (72) at (387) for combining with high temperature steam input at (375). Gas from line (395) bypasses to serve as combustion gas with input to the SSS Unit (72a) at (498). This gas line continues to SSS Unit (72b) inputting at (499) for combustion. Directly below the gas heater (379) a take-off of gas line (495) goes to the combustion input of SSS Unit (72) at (497). Water for this system makes up from an external supply as required which is not shown. The condensation effluent from the two condensers (99) to pipes (423) and (424) provide a reservoir of water at (422). In addition, water that accumulates in the compression accumulator at (461) is taken off to a loop (384) that supplies the entire bank of seven attemperators (179). This loop (384) receives water under pressure from tank (409), as pumped from pump (410) to include condenser effluent as the water supply for the system. Heat for this system is supplied by heat of compression in the SSS Units as product is forced over progressive relief valves (332) in each SSS Unit. Heat is also supplied by combustion exhaust escaping after combustion in each SSS Unit. This exhaust (477) (478) and (479) is delivered to a bank of vertical tubes with entry to a circular manifold at the base (305) in each of the Reactors R1 and R2 that in each case is provided with direct contact enclosure of the column of catalytic material (73) by this exhaust piping. Combustion ignition of the gas for drive in the SSS Units is achieved with a spark device (396)(397) and (398) incorporated in each SSS Unit. Part of this exhaust from combustion is carried to loop (482) for delivery to the reactors. In each SSS Unit an attemperation apparatus (179) injects water mist into a space (288) that is a jacket enclosing the tube in which the piston (286)

functions. The combustion generates heat in the range of 2000 degrees F. that radiates into this mist injected steam that forms and expands in the area (386). This steam as generated in these jacketing spaces is expelled from this space in each of the SSS Units at (393)(394) and (395) to enter a steam loop that is back of a check valve and pressurized steam line (383). The primary steam generation for the system is dependent upon start-up steam from a boiler (337) and with the commencement of operation the isentropic function of SSS compressor (72a) that compresses steam with a piston to compression area ratio of three or four to one. In operation, the steam from SSS compressor (72a) moves with close coupling rather than piping as illustrated at (464a) into an accumulator (460) of very high pressure design consisting of a vessel in which jacketing of vertical tubing in appropriate insulation provides enclosure (463). This vertical piping (463) receives an input of steam from the medium temperature steam as generated in the SSS Units and delivered to the steam trunk (383). As the pressure builds in the accumulator (460) water accumulates at (461) below the steam (462) until an isentropic condition exists. This water is taken off (385) and added to the water system (384) that services the attemperation of the SSS Units. The high temperature steam (462) moves with control equipment to pipe (464) and modulating valves (465) with a direct feed to an expansion chamber (370). This is very high temperature steam carried off in line (373) and with a pressure stopping input from boiler (337). This steam moves from (373) to (374) after the bypass point of supplying heat to preheat gas at (379), bypasses to supply gas for reforming at (375) at the SSS Unit (372) and ends at (376) steam input for compression at (72a). This completes a steam generation loop and return. At the top of the (460) accumulator unit, a bypass at the two modulating valves (465) provide intermittent medium pressure steam in lines (380). The left line goes to a low pressure standpipe (381) which is the makeup steam source moving against the check valve of the medium temperature pressure attemperation loop (383). This is checked and called intermittently if the pressure drops below permissible level. This pressure in line (381) moves against an opposing pressure in line (382) that is the feed for the attemperation unit of SSS Unit (72 a). In the reactor R1 and R2 provisions are made in the enclosure of the catalyst outside the tubing that is retaining the catalyst and carrying the exhaust fumes for two additional vertical banks of tubes. These are heated by chemical reaction or exothermic conditions of the catalyst and are injected with a group of attemperation mist devices that are effectively self-generating in that the outer side of the exhaust tubes which on its opposite side is against the catalyst radiates heat to these mist-containing flash steam generating pipes system generally shown here as (386). Makeup steam for this piping system in both reactors is supplied from a high temperature source (380c) to input the piping systems (386) in R1 at (392) and R2 at (390). Check valves (389) and (391) control back-up. This reactor piping arrangement is shown in some detail in FIGS. 66, 67, 68 and 69. Steam generated in this system accumulates in a standpipe used for both reactors at (388). Some steam from this source contributes to the attemperation loop (383). Assuming the steam sources and water pressure with the gas input required the operation functions in the following order. The SSS Unit (72) compresses the combined gas steam driving it over the relief valves (332) to exit at (399) and enter the reactor (400) passing through catalyst (73) to then exit the reactor (401) entering condenser (99) at (402) exiting the condenser at (403). Normally the reformed gas goes to the reheater immediately but optionally the gases can fraction (404) directly from different levels of the condenser (99) with a top fraction (405) middle fraction (406) bottom fraction (407), or again optionally these combined fractions can move to the reheater with cutoff of the whole gas body (403). (Two chill unit Condensers (99) serve to cool the reacted gas from R1 and R2 that flows around cooling coils in these. The coils are cooled by steam ejectors serviced with high pressure steam sources to evacuate these via piping (426) and (427). If the combined fractions are used, they move through line (408) to the reheater. If the whole gas is used, it delivers through line (484) to the reheater. It exits the reheater (486) through line (487) line (488) to input SSS Unit (72b) at (489). This is Syngas. Steam is input with this Syngas (377) and compressed by the piston (286) driving the gas across checks (332) out at (490) along dotted line (491) to enter R2 reactor at (492) move through catalyst (73) exit the reactor and enter condenser (99) at (411) to exit the condenser at (412). Optionally as before in the R1 reactor fractions can be taken off the condenser (413) at (414) in a top fraction (415) middle (416) bottom. Again optionally the combined fractions (418) can be delivered to refining instead of the whole gas as delivered to refining from (412). The whole gas, however, passes through line (485) after exiting the condenser at (412) to move through a reheater at the top of R2 reactor. The reheated gas exits the reactor (486) to move down the line to (419) and (420) to enter the refining equipment (421) in staging separator tank (466). This is followed by the Flash Tank at (467), the Crude Tank (425) a pipe from which is shown moving to the Topping Tank at (475) followed by the Refining Tank at (476). Thereafter a Methanol and Alcohol is derived.

Figure 98:
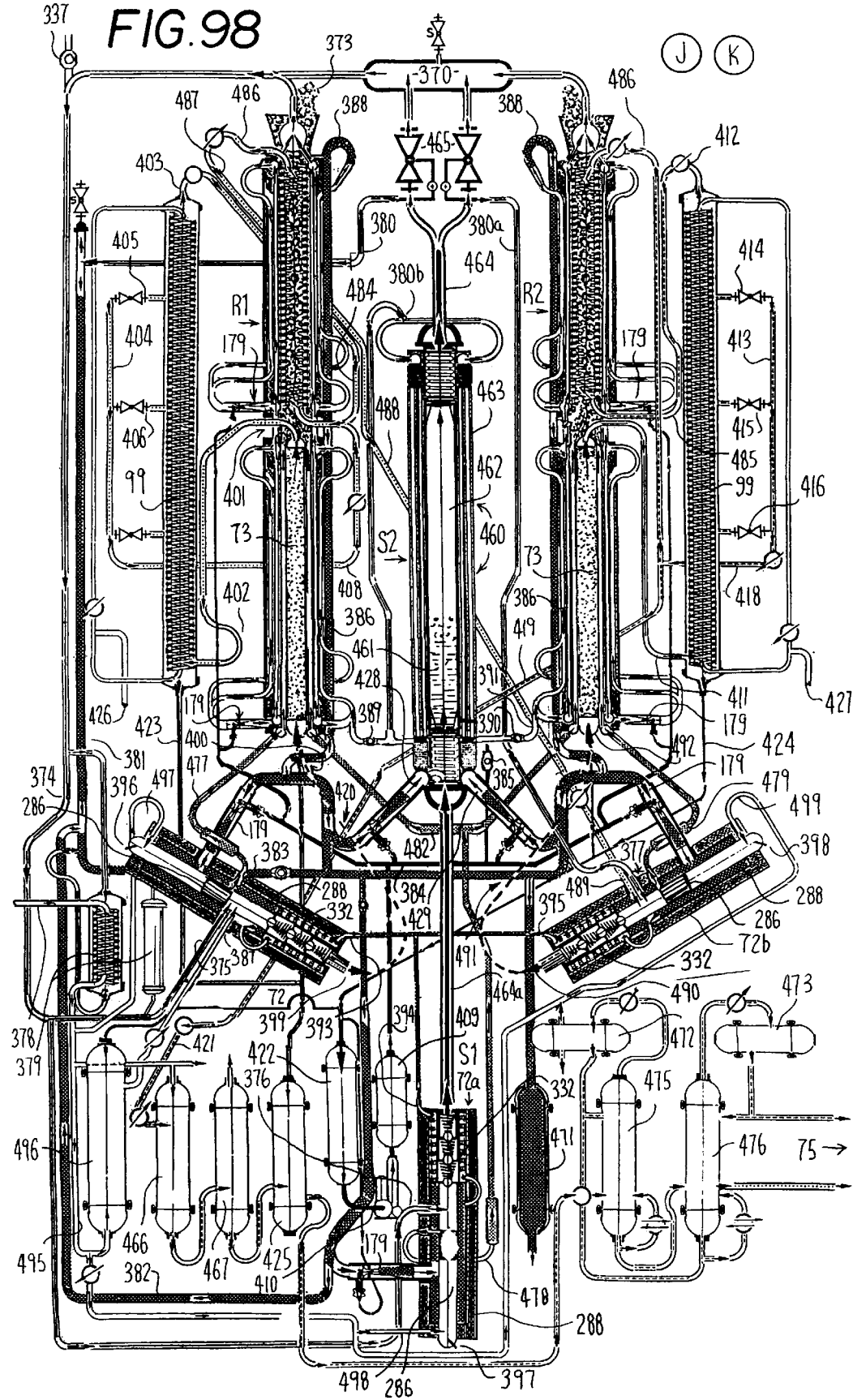
FIG. 98-K & J is a complete detail schematic of piping and controls for the application of three sub-sonic compression units as illustrated in FIG. 87 applied to a pair of reaction chambers and a high temperature steam accumulator mounted in close-coupled relation with one another to produce alcohol from natural gas. The emphasis here is on the conservation of steam energy by maximum use of the heat generated with the system elements themselves.
Figure 99:
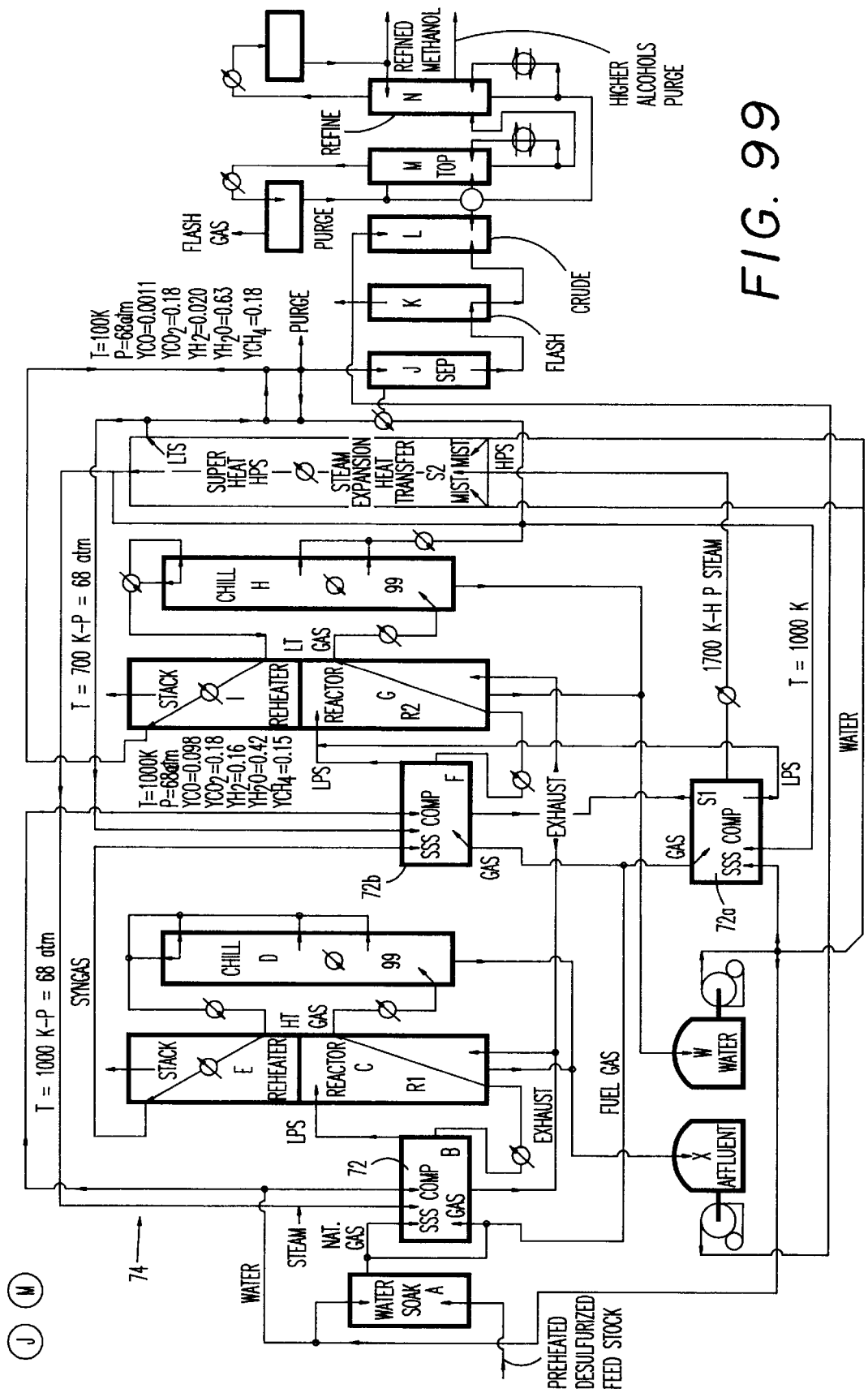
FIG. 99-J an annotated schematic illustration of the system of FIG. 98.

FIG. 99(J) & (K) is a schematic plan or block progressive diagram with alphabetic labeling as an annotated schematic illustration to aid in following FIG. 98. The SSS Gas Compressor is shown at (72) serving the first Reactor R1, followed by the SSS SynGas Compressor (72b) as shown serving the Reactor R2. The SSS Steam Compressor is S1(72a) serves a high compression expansion steam chamber (S2). The compression functions are followed by conventional refining procedures to obtain alcohols.

The ordering is (A) representing the treatment of gas feedstock followed by (B) the SSS Gas Compressor, the R1(C) Reactor, a Condenser at (99)(D), a Reheater above the Reactor (E), return to recompression at (72b)(F) the Syngas SSS Compression Unit, then into the second Reactor R2(G), again followed by a Condenser at (99)(H), the Reheater (I), then to a Separator Tank (J), the Flash Tank (K), the Crude Tank (L), the Topping Tank (M) and finally the Refining Tank (N) after which a Methanol and Alcohol product can be taken off the system. Effluent from the Reactor R1 and R2 is drawn off to tank and pump (X). Water is taken from Condensers (99) to tank (W) and pump that delivers water back to the system for steam.

FIG. 100(N) is a cut-away schematic of the newsprint fired steam boiler of this invention that employs the "cottonized" newsprint input (431) created by use of a hammer mill (18) that reduces bundles of newsprint (17) to a cotton like fiber that is very inflammable. This serves as the fuel for the boiler fire which is driven by pulsed heat blasts from a Ram-jet engine (13) creating a hot pulse (430) that passes a point (431) where finely shredded newsprint paper is blown into bowl-like firing area that is the ignition point of the paper fuel (432) as the new flame joins the return loop path of the flame at the end of a return loop circuit (442) creating a flow of heat and flame in passage (433) past boiler tube water reservoirs (435) of vertical boiler tubes (436) turning around at (438) to reverse course in the flame trunk (439) passing boiler tubes again at the upper level to arrive at the starting via (440) and (441) overlapping the Ram-jet input (442). The banks of vertical water tubes are closed on both ends and hold heavy balls that have a rolling fit in the tubes so they actually "iron out" the nucleate bubbles from the tube walls as they cycle up and down within each tube, but their function is to totally fulfill the needs of the boiler operation automatically. The bottom end of each tube has a bottom water feed reservoir FIG. 101(446). new stuff The enlarged view of the two-tube section of this illustration is shown in operational detail in FIG. 101 that follows. In the initial flame path at the bottom of the boiler system, the tubes extend from the steam and water reservoirs above with apparatus attached to their ends that is exposed to the passing flame. These tubes (436) have at their bottom end small water reservoirs that are staggered in arrangement to maximize passing flame exposure. Inside the tubes (436) are two balls, one is the "ironing" ball that wipes nucleate bubbles from the tube's innerwalls in an excursion up and down. This movement is caused by a check valve ball (437a) which, when at rest, closes a check on the reservoir (435) that is holding water (446). This water flashes into steam opening the check and flinging upward to strike the "ironing" ball that we hereinafter call the impact ball. A supply water tube (434) is a part of the reservoir structure (435) and extends upward into the boiler to reach a feedwater source. As the ball (437) moves upward in its excursion, it functions to deliver steam to reservoirs and finally compresses steam against headcaps on the tubes (444) which provides the return drive "bounce" to send the impact ball on its return to meet the rising check ball as it is expelled by the steam formation in reservoir (435) at (446).

Figure 100:
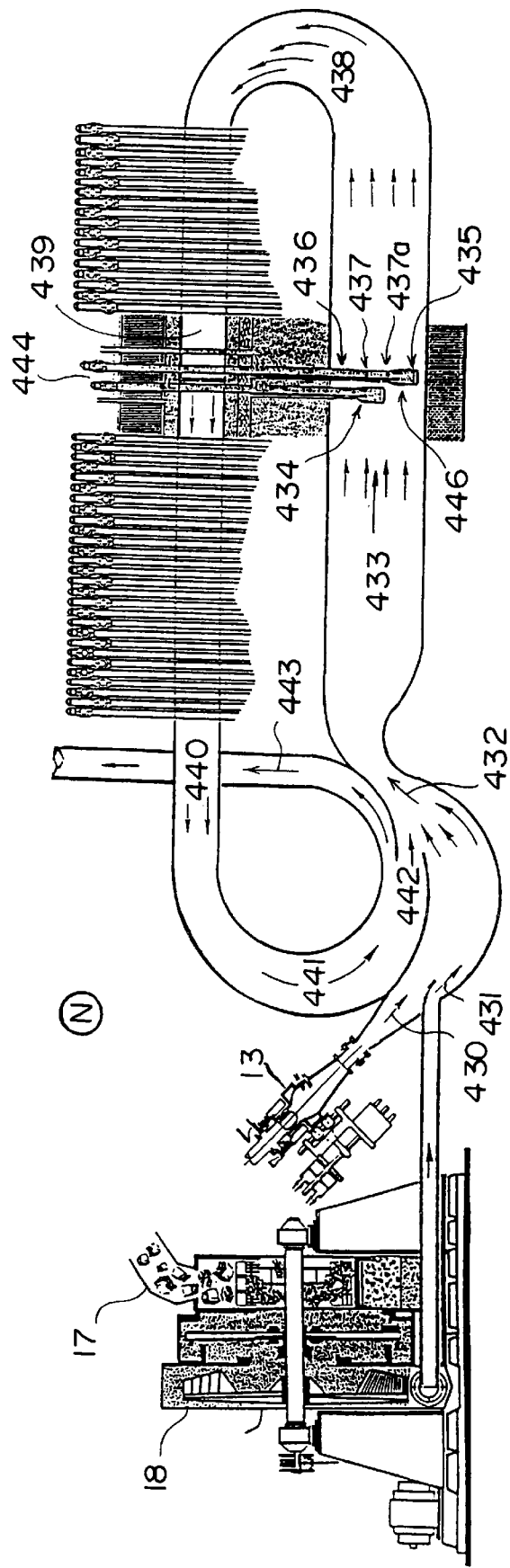
FIG. 100-N a cut-away schematic of the newsprint fired steam boiler of this invention that employs the cottonized newsprint as fuel driven past banks of vertical water tubes using heavy balls to iron the nucleate bubble from the tube wall as they cycle up and down within each tube.
Figure 101:
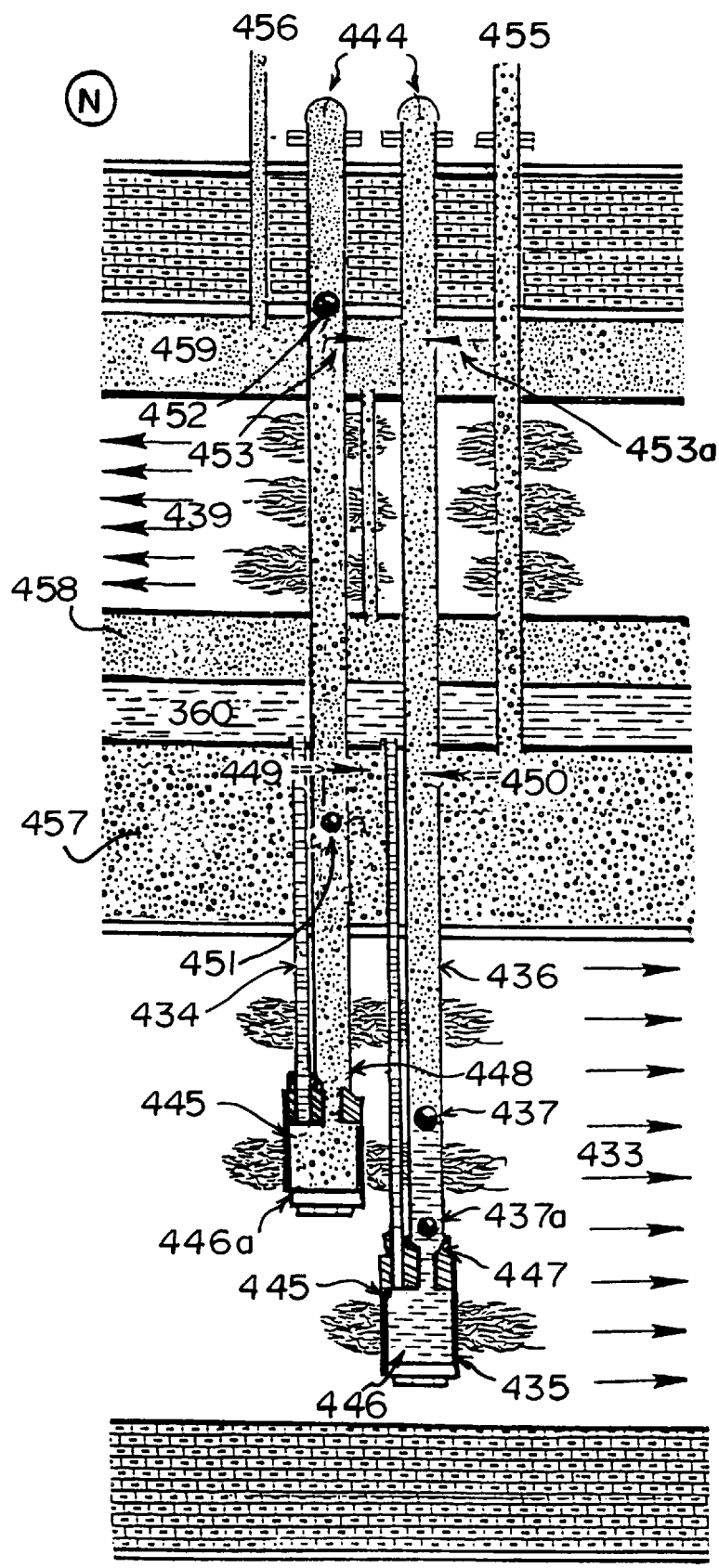
FIG. 101-N a cut-away and cross-sectional view of the boiler tube elements of the newsprint boiler of FIG. 100 and detail of function.

FIG. 101 a cut-away and enlarged cross-sectional view of a pair of the boiler tube elements of the newsprint boiler of FIG. 100 and the detail of their function. The flame travels past the tube bank in two directions (433) and (439). In the first trip the tube water reservoirs at (446) and (446a) are subjected to this heat and their water content creates steam and pressure to activate the feedwater heater function of the water supply tubes (434) that extend down to this level from the main water supply source (360) that is positioned between the two steam trunks of the boiler body (457) holding the saturated steam and (458) the superheated steam. Check valves in the water tube at the bottom at (445) control this inflow when water pressure above (topped with some steam pressure) is overcome by the pressure of steam generated in the reservoir (446) or (446a) The check valve (445) opens to the water above that flows briefly in a steam exchange with the content of reservoir. This new water is pre-heated and quickly becomes steam and the process repeats itself. The primary action is automatic and each tube (436) functions independently of every other. There is no connection between them except the open ports of each that connect to the saturated steam in space (457) with ports (449) and (450) and superheated steam levels (459) with ports (453) and (453a). These are simply open holes in the tube walls. The impact ball (437) and the check ball (437a) have a rolling and almost loose fit in the tube and are driven in their upward travel by expanding steam beneath them (447). They fall back as the steam contracts beneath them and steam trapped above increases in pressure. The very slightly smaller ball check valve ball that seats itself at (445) on the top of the bottom water reservoir (446) showing water flow into that reservoir. The Impact ball (437) is struck by the rising check ball (437a) as it is driven violently upward by the steam as shown formed in (446a). In the tube topping the (446) reservoir the balls are falling. In the adjoining tube topping the reservoir (446a) expanding steam (448) has driven the check ball to its maximum height (451). It has struck the impact ball violently causing it to move to the position (452) where it is compressing some steam at the top of the tube against the capped ends (444) above it that will provide the bounce force for its return. As it has passed the two ports, generated steam exits the boiler at two temperatures, saturated at (449) and superheat at (453). The boiler product is saturated steam at (455) and superheated steam at (456).

PROCESS I

A Feedstock Extruder Capable of Dual Extrusion
Intermediate Drive Unit Apparatus
Rotating Absorber Receiver Retention Tube Apparatus
Fire Tube Injection Apparatus in Extruder
Fuel Injection Apparatus in Extruder
Gas Collection Chamber Apparatus and System
Center-Fire Spool Checker Brick Radiator

PROCESS II

Rotating Feedstock Extruder Capable of Dual Extrusion
Intermediate Drive Unit Apparatus
Rotating Absorber Receiver Retention Tube Apparatus
Rotary Fire Tube Injection Apparatus in Extruder
Rotary Fuel Injection Apparatus in Extruder
Gas Collection Chamber Apparatus and System
Center-Fire Spool Checker Brick Radiator

PROCESS III

Feedstock Extruder Capable of Dual Extrusion
Rotary Vacuum Apparatus at the Extruder
Chemical/Gas Injection Apparatus at the Extruder
Intermediate Drive Unit Apparatus
Rotating Absorber Receiver Retention Tube Apparatus
Rotating Fire Tube Injection Apparatus in Extruder
Rotating Fuel Injection Apparatus in Extruder
Gas Collection Chamber Apparatus and System
Center-Fire Spool Checker Brick Radiator
Ram-Jet Flame Drive Apparatus
Thermal Diffusion Gas Collection and Division Apparatus
Hollow Ball Dry Cleaning Apparatus & System
Renewable Cathode Gas Ionization Apparatus
Parabola/Centrifugal Collinmation Apparatus & System
Cyclotronic Molecular Division Apparatus & System

PROCESS IV

Reconstitution Media Extrusion Nozzle Apparatus
Rotary Vacuum Apparatus at the Extruder
Multiple Chemical/Gas Injection Apparatus at the Extruder
Intermediate Drive Unit Apparatus
Rotating Absorber Receiver Retention Tube Apparatus
Static Support Tube for Hot and Cold Transit
Rotating Fire Tube Injection Apparatus in Extruder
Rotating Cryogenic Tube Injection Apparatus at Extruder Reaction Tower Hot Catalyst System Apparatus
Reaction Tower Liquid Nitrogen Cold System Apparatus

PROCESS V

High Compression Chamber Apparatus
Nucleate Bubble Piston Apparatus
Ram Impact Mechanism Apparatus
Increment Gas Compression Chamber Apparatus
Piston Shock Arresting Apparatus
Radial Multi-Cylinder Compression Apparatus
Steam Attemperation Apparatus Form
Free Energy Close Coupling of Compression and Reactor
Fluid Bed Effect in the Mounting of the Reaction

I claim:

1. A method of forming liquid hydrocarbons from solid coal comprising the steps of:

pulverizing the coal to provide a particulate coal feed;

extruding said coal feed to provide a hollow tube of compressed coal supported inside of a support tube;

extruding a clay feed to provide a hollow tube of compressed clay supported inside of said coal tube;

burning a combustible fuel inside of said clay tube, the temperature of said combustion being sufficient to fire said extruded clay and pyrolyze said extruded coal to produce hydrocarbon gases and coal char, said support tube having holes for releasing said hydrocarbon gases, and said hydrocarbon gases containing suspended particles formed during said combustion;

removing said suspended particles from said hydrocarbon gases to provide clean gases;

passing said clean gases through an ionizing chamber to ionize at least a portion of said clean gases;

passing said ionized gases through a magnetic field to separate said ionized gases from each other according to their molecular weight;

mixing selected portions of at least some of said separated gases; and cooling said mixed gases to provide at least one liquid hydrocarbon product of predetermined composition.

2. A method according to claim 1, wherein said suspended particles are removed from said hydrocarbon gases by passing said hydrocarbon gases through a bed of metal balls contained within a chamber, each of said metal balls having a plurality of through holes for the passage of said hydrocarbon gases, and said passage of the hydrocarbon gases causing said suspended particles to be deposited as a residue on said metal balls;

withdrawing a portion of said metal balls from the bed in said chamber;

cleaning said withdrawn metal balls by blasting them with an inert gas to remove said residue; and, returning said cleaned metal balls to the bed in said chamber.

3. A method according to claim 1, further comprising the steps of:

breaking up and cooling said fired clay and said coal char to provide pieces of clay and pieces of char;

separating said char pieces from said clay pieces;

pulverizing said char pieces to provide powdered char; and dispersing said powdered char in a combustible liquid to provide a liquid hydrocarbon fuel, said combustible liquid being formed by a process comprised of heating a solid plastic material.

4. A method according to claim 3, wherein said suspended particles are removed from said hydrocarbon gases by:

passing said hydrocarbon gases through a bed of metal balls contained within a chamber, each of said metal balls having a plurality of through holes for the passage of said hydrocarbon gases, and said passage of the hydrocarbon gases causing said suspended particles to be deposited as a residue on said metal balls;

continuously withdrawing a portion of said metal balls from the bed in said chamber;

cleaning said withdrawn metal balls by blasting, them with an inert gas to remove said residue; and, returning said cleaned metal balls to the bed in said chamber.

5. A method according to claim 1, wherein said support tube is rotated at least during said coal extruding step, and wherein said support tube holes release said hydrocarbon gases into an oxygen free chamber.

6. A method according to claim 1, wherein a cryogen is used in the cooling of said mixed gases to provide said liquid hydrocarbon product.

7. A method according to claim 1, wherein said liquid hydrocarbon product comprises a reaction product of at least two of said mixed gases.

8. A method of converting solid coal and a solid plastic material to a liquid fuel comprising the steps of:

pulverizing the coal to provide a particulate coal feed;

extruding said coal feed to provide a hollow tube of compressed coal supported inside of a support tube;

extruding a clay feed to provide a hollow tube of compressed clay supported inside of said coal tube;

burning a combustible fuel inside of said clay tube, the temperature of said combustion being sufficient to fire said extruded clay and pyrolyze said extruded coal to produce hydrocarbon gases and coal char, said support tube having holes for releasing said hydrocarbon gases;

breaking up and cooling said fired clay and said coal char to provide pieces of clay and pieces of char;

separating said char pieces from said clay pieces;

pulverizing said char pieces to provide powdered char; and dispersing said powdered char in a combustible liquid to provide a liquid hydrocarbon fuel, said combustible liquid being formed by a process comprised of heating the solid plastic material.

9. A method according to claim 8, wherein said combustible liquid forming process comprises heating a waste plastic material containing organic chlorides to a sufficiently high temperature and compressing said waste plastic material in the presence of water at a sufficiently rapid rate to expel chlorine ions from said waste plastic material and convert said expelled chlorine ions to hydrogen chloride.

10. A method according to claim 8, wherein said support tube is rotated at least during said coal extruding step, and wherein said support tube holes release said hydrocarbon gases into an oxygen free chamber.

* * * * *